United States Patent [19]

Gill et al.

[11] Patent Number: 4,736,294

[45] Date of Patent: Apr. 5, 1988

[54] DATA PROCESSING METHODS AND APPARATUS FOR MANAGING VEHICLE FINANCING

[75] Inventors: Gwyneth Gill, Montreal, Canada; John P. Ryan, Northville, N.Y.; David Singer, Thornhill, Canada; Nicholas T. L. Diamand, Toronto, Canada; Alexandre J. Bernatchez, Mississauga, Canada; John Lai, Agincourt, Canada; David A. Le Grand, Burlington, Canada

[73] Assignee: The Royal Bank of Canada, Montreal, Canada

[21] Appl. No.: 65,176

[22] Filed: Jun. 23, 1987

Related U.S. Application Data

[63] Continuation of Ser. No. 690,841, Jan. 11, 1985.

[51] Int. Cl.⁴ .............................................. G06F 15/02
[52] U.S. Cl. ..................................... 364/408; 364/400; 235/379
[58] Field of Search ............... 364/408, 401, 406, 705, 364/715, 719; 235/379

[56] References Cited

U.S. PATENT DOCUMENTS 4,319,336  3/1982  Anderson et al. .................. 364/900

FOREIGN PATENT DOCUMENTS 1454266  11/1976  United Kingdom ................. 364/408

OTHER PUBLICATIONS

Mid-Continent Banker; "Bank's Balloon-Note Financing Makes Auto Loans Affordable"; Dec. 1984.
James Monroe, "Balloon Financing: Will It Float or Bust"; pp. 1-2.
Mid-Continent Banker; "Balloon Loan Financing as Alternate to Leasing", Dec. 1985.
Bankers Research, "Auto Leasing/Balloon Financing", Aug. 1985, pp. 2-5.

Primary Examiner—Jerry Smith
Assistant Examiner—Kim Thanh Tbui
Attorney, Agent, or Firm—Thomas L. Giannetti; Jeffrey H. Ingerman

[57] ABSTRACT

Data processing methods and apparatus for managing vehicle financing are disclosed. The data processing system provides information to assist in granting a loan applicant credit, processes the loan, and determinates at the time of making the loan a residual value of the vehicle at a predetermined option date.

8 Claims, 8 Drawing Sheets

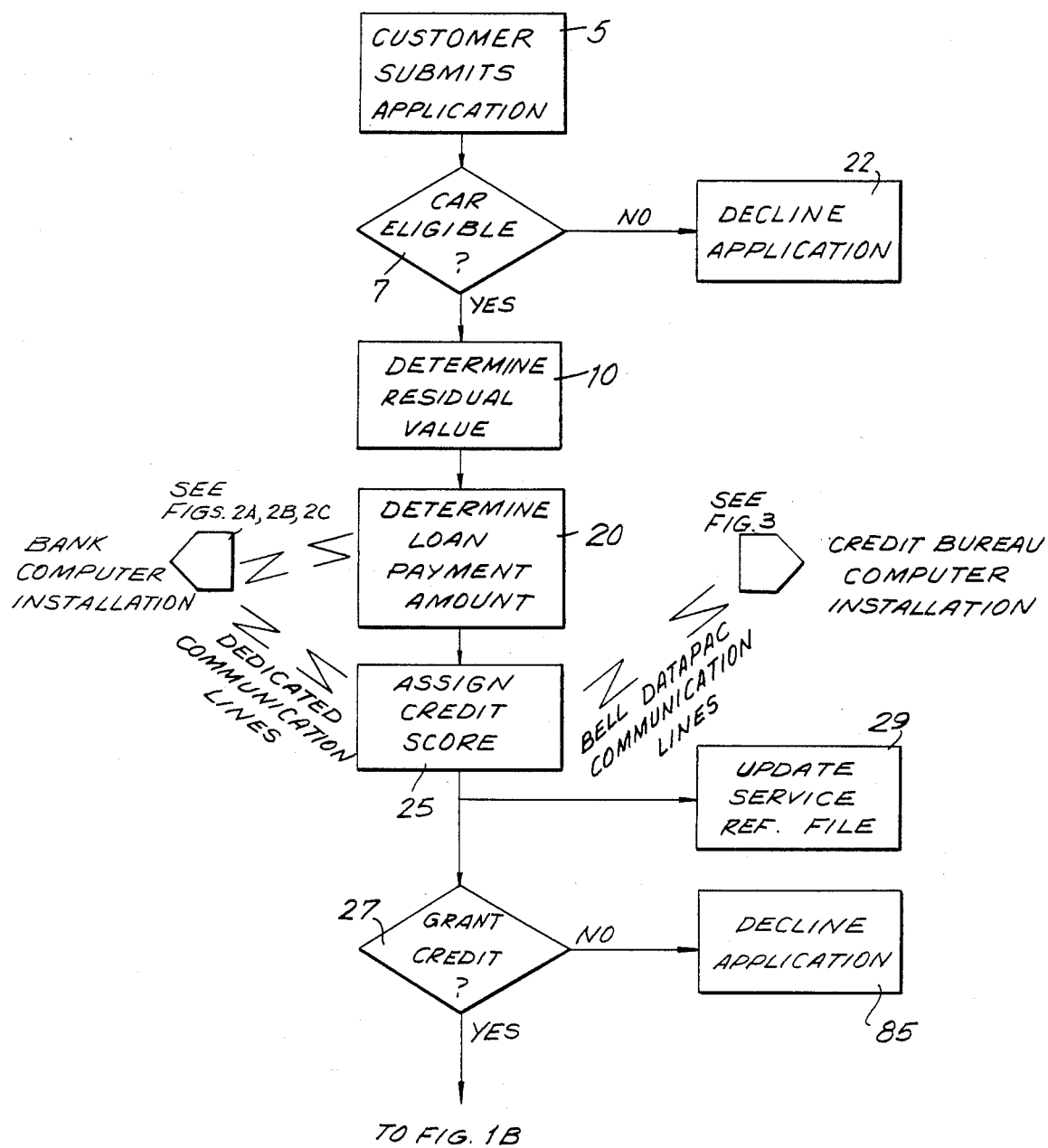

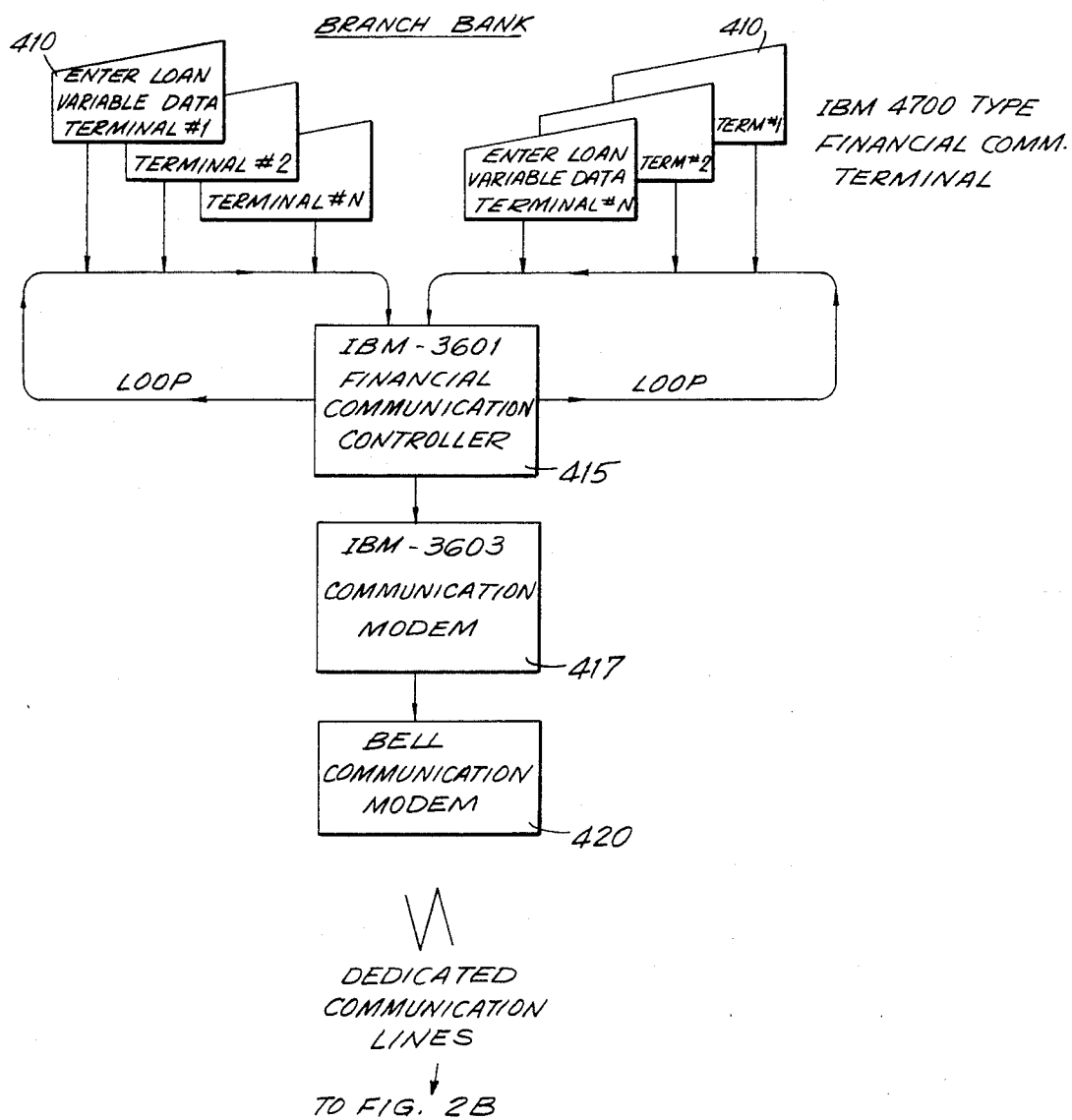

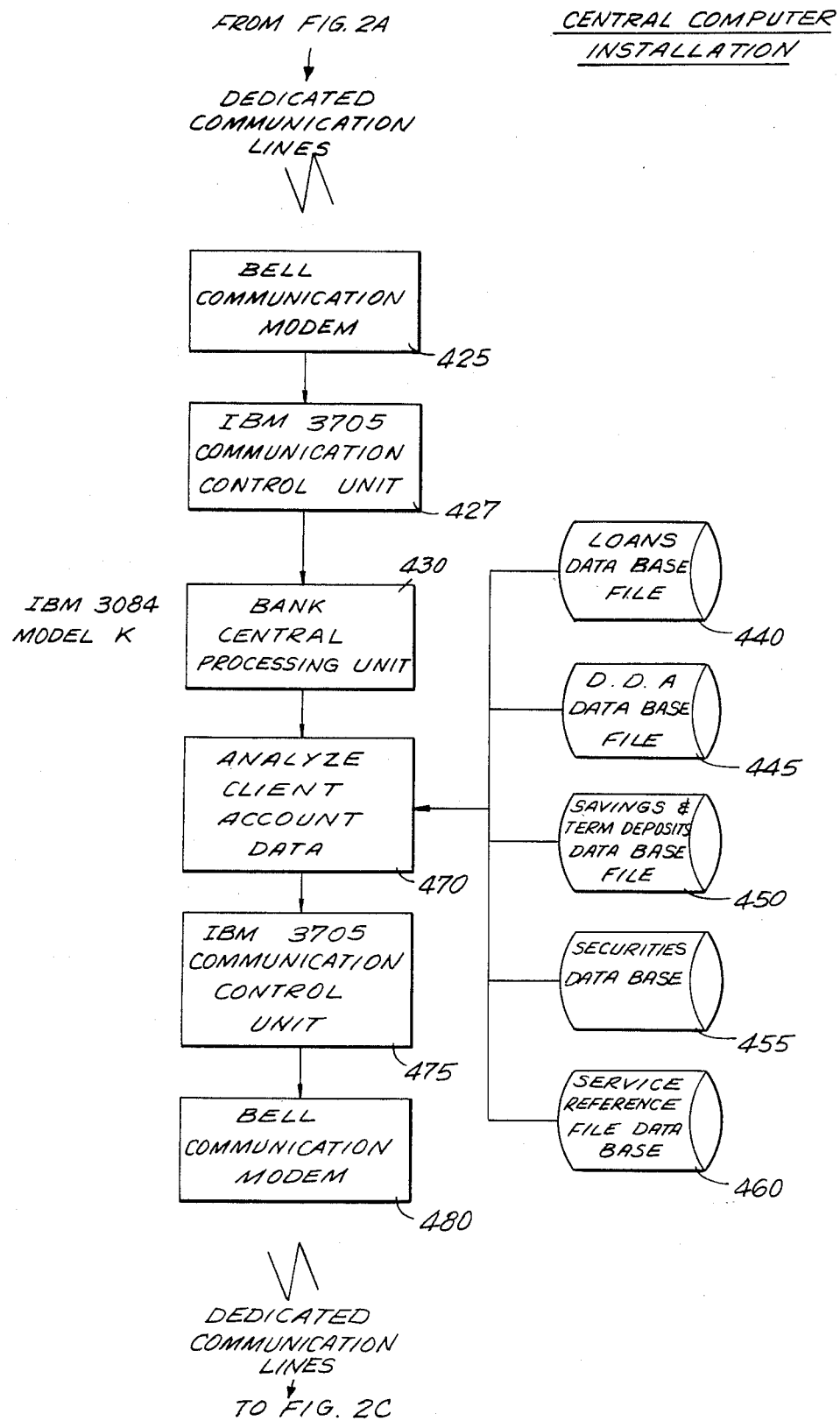

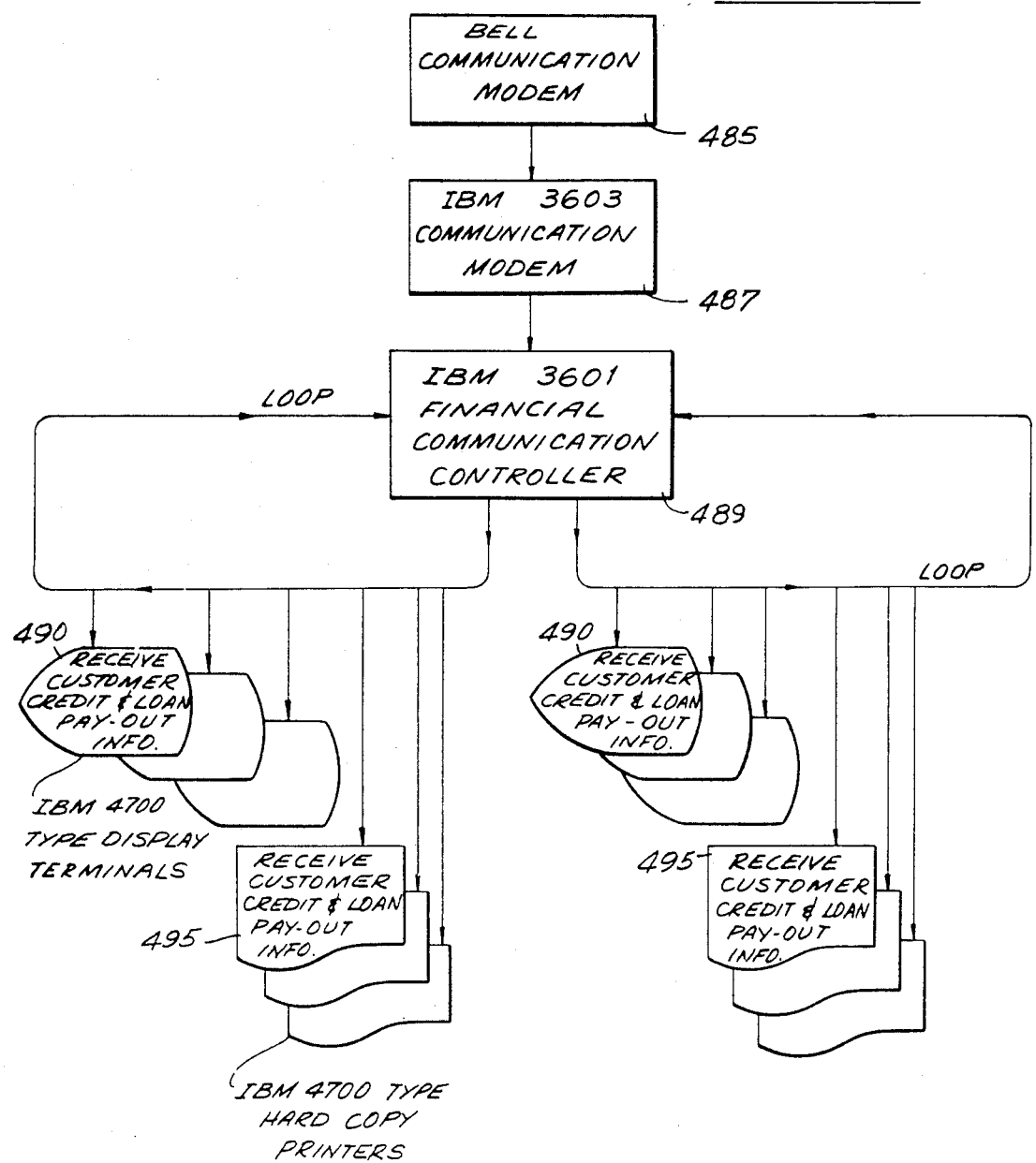

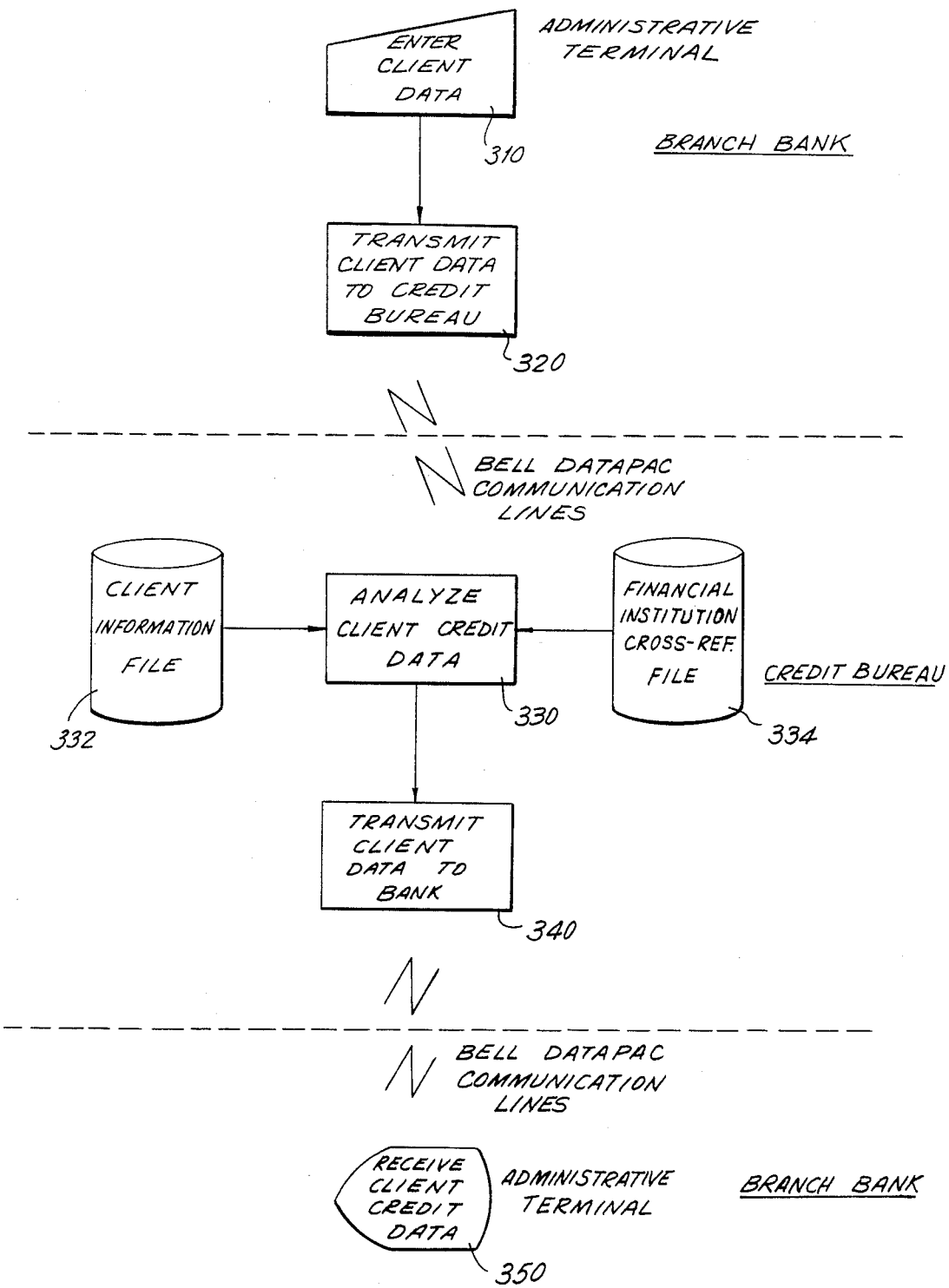

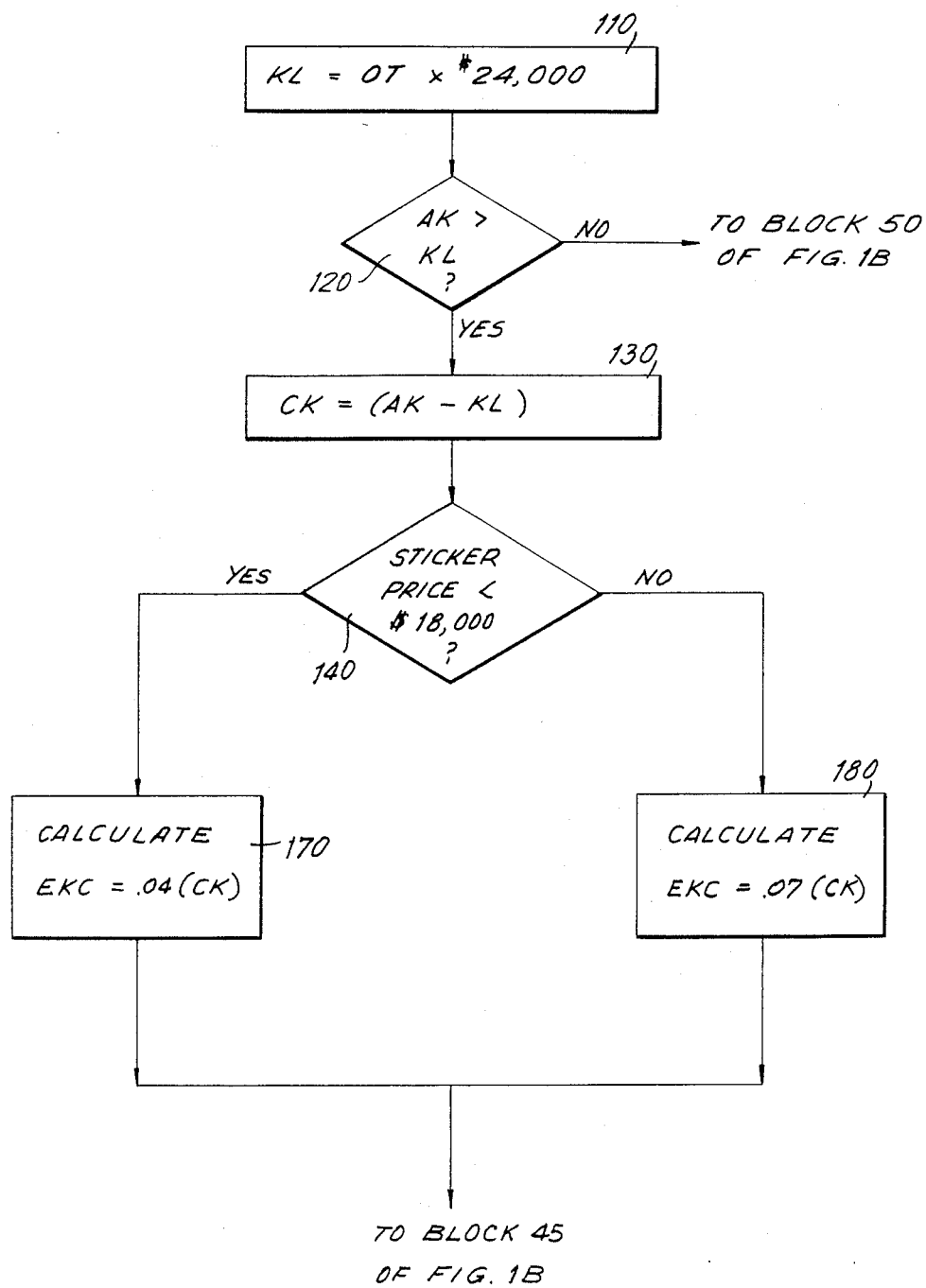

DATA PROCESSING METHODS AND APPARATUS FOR MANAGING VEHICLE FINANCING

This is a continuation, of application Ser. No. 690,841, filed Jan. 11, 1985, entitled DATA PROCESSING METHODS AND APPARATUS FOR MANAGING VEHICLE FINANCING.

BACKGROUND OF THE INVENTION

This application relates to data processing methods and apparatus for managing vehicle (e.g., automobile) financing.

Generally, vehicles such as automobiles have been financed through a personal loan system, whereby the purchaser makes a down payment, takes title to the automobile and pays the loan balance in monthly payments which amortize the full amount of the loan.

More recently, leasing arrangements have been introduced whereby the lessee makes monthly rental payments, returning the car to the lessor at the end of a predetermined term specified in the lease. No down payment is required, but title to the automobile remains in the lessor. It is sometimes specified in the lease that the lessee may at his option purchase the car for a stated value when the lease expires. The conditions of the lease may also include a charge for abnormal mileage or wear and tear on the automobile.

Also well known are systems for financing vehicles (especially automobiles) wherein the loan is secured by a chattel mortgage on the car, monthly payments are relatively low, but at the end of a specified term the entire balance of the loan comes due in one, relatively large "balloon" payment. If the purchaser does not have the financial resources to make this final payment, the purchaser must either refinance, default on the loan and face repossession of the automobile, or sell the car on the open market for whatever price he or she can get, which may not be high enough to meet the final payment.

It would be highly desirable to provide a system for financing vehicle purchases requiring relatively low monthly payments, where the purchaser takes title to the vehicle (unlike in a leasing transaction) and which ensures the borrower that at the end of the loan term, the car can be sold at a guaranteed price. To facilitate such a desirable result, it is important that the lender and the purchaser/borrower be placed in a good position to assess the relative risks, costs and benefits of the vehicle purchase and/or loan in a timely fashion, that the loan application be efficiently processed, and that the loan be efficiently administered.

In view of the foregoing, it is an object of this invention to provide data processing methods and apparatus for administering vehicle financing which provides for the purchaser to take title to the vehicle and which guarantees the purchaser that at the end of the loan term the vehicle can be sold for a predetermined amount.

It is a further object of this invention to provide a computerized system for managing vehicle financing which provides for determination of the loan payment amount; evaluation of a loan applicant's credit worthiness; follow-up of delinquent accounts; renewal of loan interest terms; determination at the time the loan is made of a car price ("residual value") guaranteed at the end of the predetermined term of the loan; adjustment of the residual value to take into account kilometers driven; and closing out or refinancing of the original loan at the end of the term.

The foregoing and additional advantages of the invention will be apparent from the detailed description which follows.

SUMMARY OF THE INVENTION

In accordance with one aspect of the invention, a system including a programmed data processor is provided for administering a vehicle loan financing transaction, said financing being granted for a specific amount, term and interest rate. The system comprises data entry means for entering information regarding the applicant, vehicle and financing sought; means for determining loan eligibility; means for computing a residual value of the vehicle based upon the type of vehicle and the loan term; means for computing the periodic loan payment amount based on the difference between the total financing sought and the residual value and on the computed periodic interest payments on the residual value; means for monitoring the status of the loan during the term of the loan, including means for determining whether the end of the term has been reached; and means for closing out the loan at the end of the term, including means for optionally applying the residual value to the loan balance.

In accordance with another aspect of the invention, a method is provided for administering vehicle financing using a programmable data processor. The method comprises the steps of entering and storing signals representative of data regarding the loan applicant, vehicle, interest rate, loan term and amount of financing sought; computing a residual value of the vehicle based upon the stored signals representative of the vehicle and loan term; computing a periodic principal and interest payment based upon the difference between the total amount of financing sought and the residual value over the loan term including interest thereon; computing the periodic interest on the residual value; processing the periodic principal and interest payment and the periodic interest on the residual value to obtain the periodic loan payment; retrieving financial information concerning the loan applicant from a file of stored information; analyzing said financial information to compute a credit score for use in determining whether to grant credit to the applicant; creating a new loan account; monitoring the status of said loan account to determine when the option date is reached, said option date being the last date of the term of said loan; and at the option of the borrower, applying the residual value to the balance of the loan to close out the loan at the end of the term.

In accordance with another aspect of the invention, a system is provided for managing vehicle financing, comprising a quantity of financial information stored in a memory, said information being recallable; and a programmed data processor adapted to receive and store coded input data representative of information regarding the vehicle and financing sought, said data processor being further programmed to use said stored financial information and said coded input data to compute a residual value for the vehicle being financed.

In accordance with another aspect of the invention, a process is provided for managing vehicle financing, comprising storing recorded signals representative of financial information in data storage means; using a data processor to receive and store coded input data representing information regarding the vehicle and financing sought; and using said coded input data and said stored financial information to compute a residual value for the vehicle being financed at the time of making the loan.

BRIEF DESCRIPTION OF THE DRAWINGS

FIGS. 1A and 1B comprise a schematic flow chart of a system for managing vehicle financing in accordance with the present invention.

FIGS. 2A, 2B and 2C comprise a diagram of a typical bank computer system and telecommunications network.

FIG. 3 is a diagram of a typical credit bureau computer installation, showing the relation between the credit bureau computer system and the bank computer system.

FIG. 5 is a flow chart showing the computation of the excess kilometers charge ("EKC") referred to in FIG. 1B.

DETAILED DESCRIPTION OF THE INVENTION

Figure 1B:
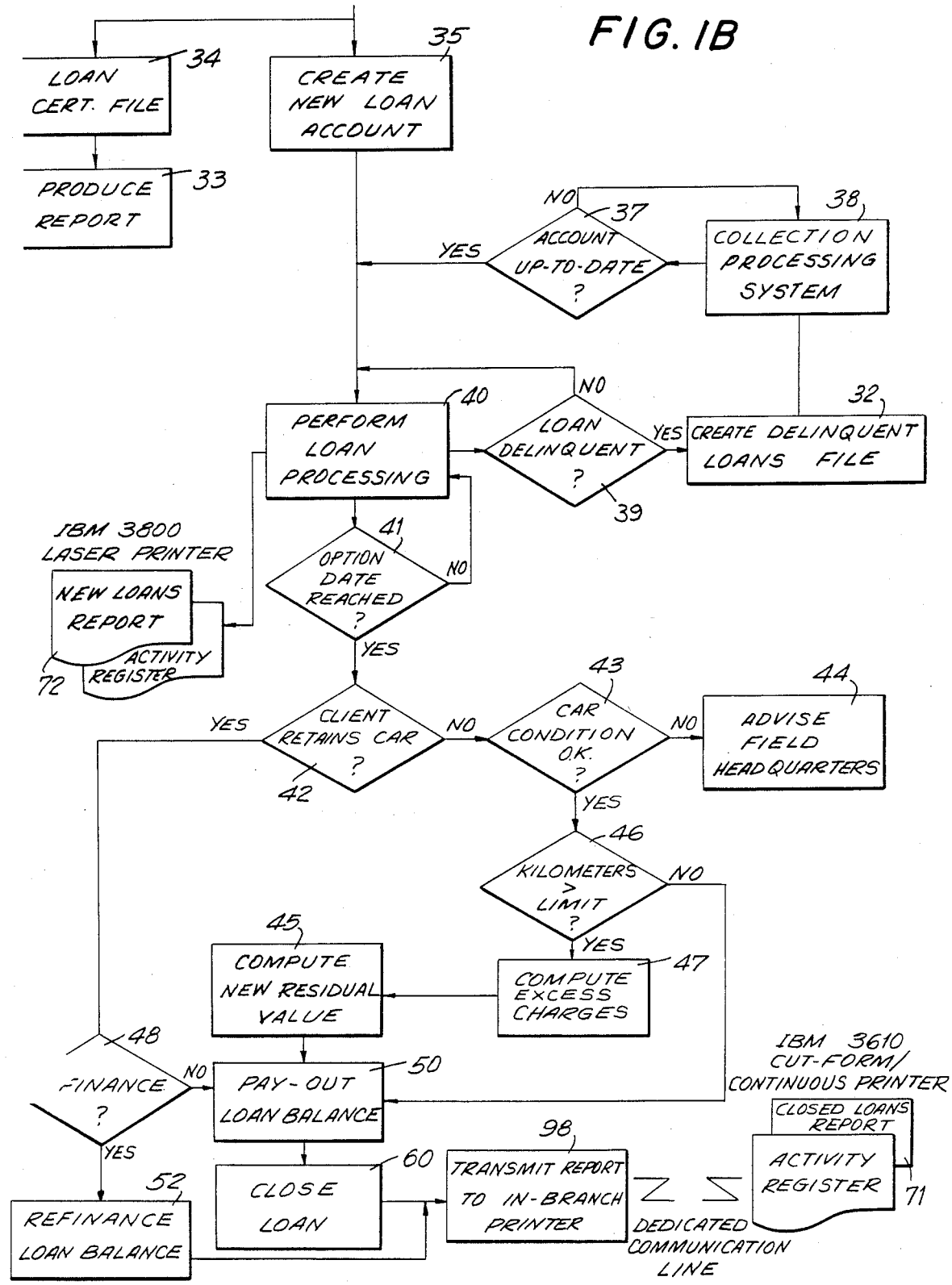

Referring to FIGS. 1A and 1B, there is shown an overview of the data processing system of the invention. An automobile financing system is described. However, it will be understood that in addition to automobiles, the data processing system described herein could be applied with only minor modification to the financing of other types of vehicles (e.g., trucks, boats, airplanes, house trailers, mobile homes, recreational vehicles).

Broadly, the system may be thought of as having three major functional aspects: (1) providing information to assist in granting a loan applicant credit, (2) processing the loan, and (3) determining at the time of making the loan the residual value of the car at a predetermined "option date" (typically, 36 or 48 months from the date of the purchase) and optionally applying the residual value to the loan balance to close out the loan. These aspects will now be considered in greater detail.

In order to decide whether or not to grant an applicant credit for purchase of a car, a number of factors must be considered. When an applicant submits an application for a loan, a determination of car eligibility is performed so that the residual value for the car can be computed. This along with the amount the applicant is borrowing determines the applicant's monthly loan payment, as described in greater detail below. Having this information, the applicant's ability to pay is verified through the internal systems of the bank or other lender (hereinafter referred to generically as "the bank") if the applicant is already a bank client, and/or through credit bureau offices. A credit score is thus determined, and a decision by the bank is made as to whether to grant the loan or decline the application.

In processing a loan, an integrated telecommunications link with the bank's loan accounting and collection systems is established. This allows for automatic monitoring of delinquent accounts and for identifying those loans which are up for renewal, either at the option date or earlier. For variable rate loans, for example, the payment amount may be renewed periodically, e.g., yearly, to bring it into line with changes in interest rates.

When the option date is reached, the third functional aspect of the system comes into play. At that time, the client may retain the car, in which case the remaining loan balance must be paid off or the client may renegotiate a new loan for the remaining outstanding loan balance. Alternatively the client may choose to give up the car to the bank, to a third party designated by the insurance underwriter of the program, or to a third party representative designated by the bank, depending on how the loan program has been structured. The client would then obtain the residual value of the car as credit towards the remaining loan balance.

Referring to FIGS. 1A and 1B, the bank first receives a loan application submitted by an applicant. The application will typically include such information as the applicant's name, the make, model and sticker price of the automobile and identification of related bank services (e.g., deposit or investment accounts) used by the applicant. The applicant may request financing in any amount, up to and including 100% of the price of the car being purchased.

The input of information from the applicant is represented by block 5, and can include the number of monthly payments (typically 36 or 48) and the interest rate term (typically 12, 24 or 36 months). A verification process assures that all information is correctly entered on the application. Following input and verification, the input information is employed by block 7 to test the eligibility of the car. Eligibility is determined by applying certain information from the application, typically that pertaining to make, model, use and optionally whether the new automobile is a demonstrator model or manufacturer's executive driven automobile.

If the automobile fails the eligibility test ("NO" branch), the system flow proceeds to block 22, where the application is declined. Assuming the test of block 7 is successful ("YES" branch), signaling that the automobile is eligible, the system flow proceeds to block 10, where the "residual value" of the automobile is determined. The details are set forth in the description of FIG. 4, below.

The system flow next proceeds to block 20, where the loan payment amount is determined. The details of the process for determining the loan payment amount are also set forth in the discussion of FIG. 4, below.

Data regarding the loan are transmitted to and received from the bank's central computer installation, which is further described below in connection with FIGS. 2A, 2B and 2C. The process flow next proceeds to block 25, "Assign Credit Score." Information is obtained from the credit bureau's computer installation as further described below in connection with FIG. 3, along with data from the bank's computer system files, in determining the "credit score" (block 25) using well-known techniques. These data are also used to update the service reference file (block 29). The service reference file contains demographic data concerning each of the bank's customers. For example, the file would typically contain a client's name, postal address, deposit and loan account numbers. The service reference file may also be used by the bank to identify through a single source the portfolio of banking services used by a particular client of the bank.

System flow then proceeds to block 27. If the block 27 test fails ("NO" branch), credit will not be granted and system flow proceeds to block 85, "Decline Application." If the "Grant Credit" test of block 27 succeeds, process flow proceeds to block 35, "Create New Loan Account." Following the approval of the loan credit application, the accumulated information on the transaction is employed in block 35 to create a new loan account for each client.

A file is maintained of the applications and other related documents (block 34) for purposes of preserving data to generate periodic monthly reports (block 33). The program flow now passes to the repetitive process (block 40) of updating the loan account over the life of the loan. Block 72 provides for the issuance of a "New Loans Report" and "Activity Register", produced by a high-speed printer (e.g., IBM's 3800 laser printer). These reports indicate which new loans have been granted and which loans have had any activity against the accounts, respectively. A typical activity would be a payment to a loan account.

During the life of the loan, the loan account is monitored (block 39) to identify those loans which are delinquent. As long as this test of block 39 is negative (i.e., loan not delinquent), loan processing (block 40) continues. If the delinquency test is affirmative, a file containing delinquency information regarding the client is created (block 32). This information is passed on to the collection processing system (block 38) for further processing.

Block 37 tests whether the loan has been brought up-to-date by the collection system. As long as the block 37 test fails ("NO" branch), signifying that the account is not up-to-date, processing remains within the "Collection Processing System" (block 38). Once the block 37 test is affirmative ("YES" branch), process flow returns to normal loan processing (block 40).

Block 41 tests whether or not the option date has arrived. If this date has arrived ("YES" branch), block 42 tests whether or not the client wishes to retain possession of the automobile or turn it in to the bank or the bank's representative. If the test of block 41 fails ("NO" branch), signifying that the option date has not been reached, system flow remains with block 40.

If the test of block 42 is affirmative ("YES" branch), indicating that the client wishes to retain the car, a decision (block 48) by the client either to pay off the loan or refinance the balance is made. Should the client choose not to refinance the loan, arrangements are made to close out the loan upon final payment of the remaining balance (block 50). Should the client choose to refinance the loan, control is passed to block 52, whereby all new terms and conditions (e.g., interest rate, interest rate term, payment amount) for refinancing the loan are reviewed by the client and the bank. After the relevant information concerning the refinanced loan has been entered in the system, reports are created and provided to the various bank branches.

If the block 42 test is negative ("NO" branch), block 43 tests the condition of the automobile. If this test of block 43 proves negative ("NO" branch), indicating that the condition of the car is not acceptable, then the respective field headquarters office is advised not to permit the client to turn in the car (block 44).

If the test of block 43 is affirmative, then block 46 tests whether the automobile has travelled more than a specified allowed number of kilometers. If that test is negative ("NO" branch), then arrangements are made to pay out the remaining outstanding loan balance (block 50). If the test of block 46 is positive ("YES" branch), then the necessary excess kilometers charge is computed (block 47). Blocks 46 and 47 of FIG. 1 are explained in greater detail below in connection with FIG. 5.

After the charges have been computed for any excess kilometers, a new residual value is determined (block 45). This computation is further described below in connection with FIG. 5. The client is then asked to pay off any remaining balance of the loan, after applying his residual value credit and additional payment necessary to cover any excess kilometers charge (see discussion below of new residual value). With the balance paid off, the loan is closed (block 60). The system then transmits report data (block 98) to in-branch printers (e.g., IBM's 3610 cut-form/continuous printer), whereby printed reports are produced (block 71).

Referring now to FIGS. 2A, 2B and 2C, there is shown the processing and the telecommunication of loan data between a bank branch and the bank central computer installation. In block 410, loan variable data together with client identification are entered through financial communication input terminals 410. Such loan variable data will typically include transactional information such as loan interest rate, amortized amount, residual value, and amortized term (in months). These input data are then passed to financial communication controller 45 via a loop configuration, and are sent via communication modem 417 to communication modem 420. The data are then transmitted over dedicated communication lines to communication modem 425 in the central computer installation, which, in turn, relays the data to communication control unit 427. The data are then sent to the bank central processing unit 430, completing the branch-to-central computer installation data link (comprising blocks 415, 417, 420, 425, 427 and 430) within the teleprocessing network.

The data are then analyzed (block 470), utilizing the cross-reference files 440, 445, 450, 455, 460. File 440 is accessed to obtain client loan data such as repayment history and amounts outstanding. File 445 is accessed to obtain client overdraft and demand deposit accounting data, such as amounts overdrawn and amounts on deposit. File 450 is accessed to obtain client savings and term deposit data, such as amounts and deposit terms. File 455 is accessed to obtain client securities data, such as types of securities and book values. File 460 is accessed to obtain client demographic data, such as address and language. These files are maintained at the bank central processing unit, and are updated by manual and/or automatic entries.

The resulting data are relayed via communication control unit 475 to communication modem 480. The data are then transmitted over dedicated communication lines to communication modem 485 in the branch bank, and are relayed to communication modem 487. The data are then sent to financial communication controller 489, completing the central computer installation-to-branch data link (comprising blocks 470, 480, 485, 487 and 489) within the bank's teleprocessing network. The data are then relayed to branch display stations 490, and/or hardcopy printers 495 via a loop configuration.

As indicated in FIGS. 2A, 2B and 2C, for financial communication input terminals 410, IBM's 4700 type are suitable. For financial communication controllers 415, 489, IBM's 3601 type are suitable. For communication modems 417, 487, IBM's 3603 type are suitable. For communication modems 420, 425, 480, 485, Bell modems are suitable. For communication control units 427, 475, IBM's 3705 type are suitable. For display stations 490, IBM's 4700 type display terminals are suitable. For hardcopy printers 495, IBM's 4700 type printers are suitable. However, these particular choices of equipment are merely illustrative. Other equipment known to those in the art can be used.

Referring to FIG. 3, there is shown a flow chart depicting the teleprocessing of data between a typical bank branch and a credit bureau computer installation. The required transactional information is entered through administrative terminal 310. This information is then transmitted (block 320) over communication lines (e.g., Bell DATAPAC) to the credit bereau computer installation. The required data are then analyzed (block 330), using cross-reference files 332 and 334.

File 332 is accessed to obtain client credit data such as the amount and repayment history on credit granted by retail institutions and other financial institutions, e.g., in the form of mortgages, charge accounts and promissory notes. Also, data are obtained on client deposits with other financial institutions. File 334 is accessed to determine whether the financial institution requesting the credit data is a member of the particular credit bureau, and, therefore, entitled to receive such data. These files are maintained at the credit bureau central processing unit, and are updated by manual and/or automatic entries. The resulting credit data are transmitted (block 340) from the credit bureau computer installation to the bank branch, where they are received through the respective administrative terminal display screen 350 and/or hardcopy printer (not shown).

Figure 4:
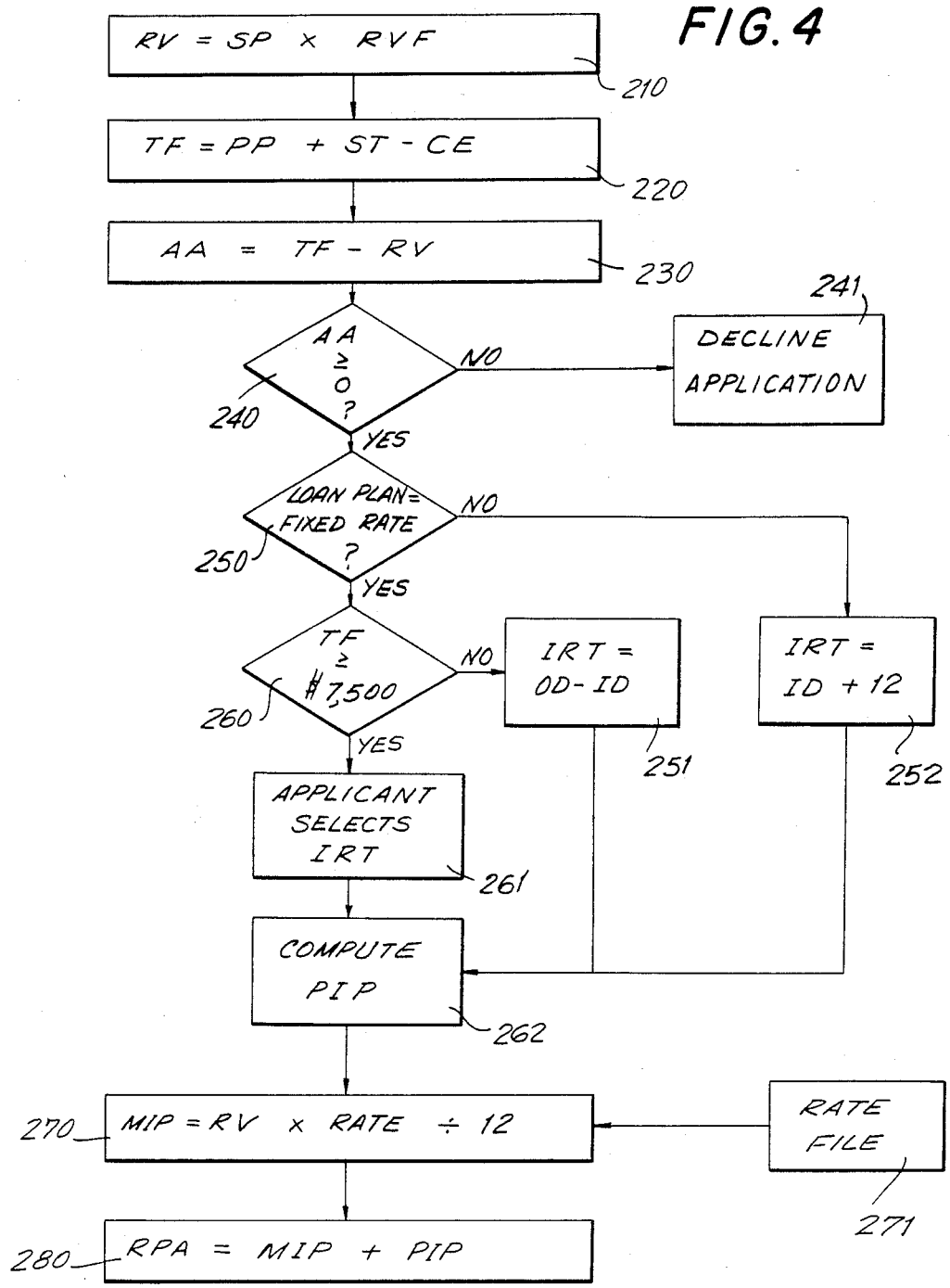
FIG. 4 is a flow chart showing the computation of the loan payment amount ("RPA") and the guaranteed car price at the option date ("residual value") referred to in FIG. 1A.

Referring now to FIG. 4, there is shown a detailed flow chart for determining the residual value and loan payment amount corresponding to blocks 10 and 20 of FIG. 1A. It is the overall objective of the process of FIG. 4 to determine the residual value (RV) and periodic (e.g., monthly) regular loan payment amount (RPA) for each loan application received. In describing the process of FIG. 4, the variables defined in Table A, below, will be employed.

TABLE A

| Variable | Definition |
|---|---|
| OD | OPTION DATE - A predetermined date which is agreed upon with the client at the time of the application. |
| ID | ISSUE DATE - The date on which the loan is to be issued by the bank. |
| RVF | RESIDUAL VALUE FACTOR - A factor expressed as a percentage to be applied to the sticker price (SP) of the automobile being financed and used to compute the residual value (RV). |
| RV | RESIDUAL VALUE - Value of the automobile guaranteed at the option date. |
| ST | SALES TAX - The value determined by applying the sales tax percentage to the purchase price (PP) of the automobile. |
| TF | TOTAL FINANCING REQUIREMENT - A computational variable expressed in dollars, the sum of the purchase price of the automobile and options (PP) and the sales tax (ST), minus the client's equity in the automobile (CE). |
| PP | PURCHASE PRICE - The purchase price of the new automobile as determined from the bill of sale, which includes optional equipment but excludes sales tax. |
| AA | AMORTIZED AMOUNT - A computational variable expressed in dollars, the difference between the total financing requirement (TF) and the residual value (RV). |
| PIP | PRINCIPAL & INTEREST PAYMENT - A computational variable expressed in dollars, the amount required to be paid on a monthly basis to pay off |

TABLE A-continued

| Variable | Definition |
|---|---|
| | the amortized amount. |
| RATE | RATE - The annual rate of interest expressed as a decimal (e.g., 17% = .17). |
| IRT | INTEREST RATE TERM - The term, in months, over which the interest rate remains constant. |
| MIP | MONTHLY INTEREST PAYMENT - A computational variable determined by applying the interest rate per term to the residual value (RV). |
| RPA | REGULAR PAYMENT AMOUNT - A computational variable arrived at by summing the principal and interest payment (PIP) and the monthly interest payment (MIP). The amount to be paid by the client on a periodic (e.g., monthly) basis. |
| CE | CLIENT EQUITY - The sum of the value of any automobile given on trade-in by the client and any cash down payment. |
| SP | STICKER PRICE - The list price of the new automobile as advised by the manufacturer's listing sticker, i.e., the manufacturer's suggested retail price. This includes optional equipment but excludes sales tax. |

With the variable definitions set forth in Table A in mind, attention will now be directed to the processing of FIG. 4. First, in block 210, the residual value (RV) is computed as the algebraic multiplication of the sticker price (SP) and residual value factor (RVF):

$$RV = SP \times RVF.$$

The residual value factor is selected from a file of such factors, based upon the make and model of the automobile, and the option date. In those instances where sticker price is not available through the dealer, the residual value is agreed upon and entered directly as SP and RVF is set to 1.

Next, the computational variable total financing required (TF) is set equal to the sum of the purchase price (PP) and the sales tax amount (ST), less any customer equity (CE) (block 220):

$$TF = PP + ST - CE.$$

Another computational variable, amortized amount (AA), is then set equal to the difference between the total financing required and the residual value (block 230):

$$AA = TF - RV.$$

Block 240 tests to see if the amortized amount (AA) is greater than or equal to zero. If this test of block 240 fails ("NO" branch), signaling that the amortised amount is less than zero, the loan application is declined (block 241). This terminates application processing for the applicant whose total financing required is less than the residual value.

If the amortized amount is greater than zero ("YES" branch out of block 240), then block 250 tests whether the loan plan selected by the applicant is a fixed rate personal loan or a variable rate personal loan. If the fixed rate personal loan was selected ("YES" branch), then block 260 tests whether the total financing (TF) is greater than or equal to a predetermined constant amount, e.g., $7,500, selected by the bank according to market and business conditions. If the block 260 test fails ("NO" branch), the interest rate term (IRT) is computed as the difference, in months, between the option date (OD) and the issue date (ID) of the loan (block 251):

$$IRT = OD - ID.$$

If the block 260 test succeeds ("YES" branch), indicating that the total financing is greater than or equal to $7,500, then the interest rate term, in months, is obtained from the loan application, as per the applicant's option (block 261).

If in the block 250 test the loan plan selected was the variable rate personal loan ("NO" branch), then the interest rate term (IRT) is computed as 12 months from the issue date (block 252).

Still referring to FIG. 4, the value of the monthly principal and interest payment (PIP) is computed as follows (block 262):

$$PIP = \frac{A \times O \times (1 + M)^D \times (1 + O)^{(N-1)}}{(1 + O)^N - 1}$$

where: A = Amortized Amount (AA)

O = Compounding Daily Interest Rate $= \{(1 + (I/C))^{(C/Z)}\}$

I = annual rate of interest (RATE)
C = Loan Interest Compounding Frequency = 12 (monthly)
Z = Days in Base year = 360

M = Compounding Payment Frequency Interest Rate $= \{(1 + (I/C))^{(C/F)}\}$

I = annual rate of interest (RATE)
C = Loan Interest Compounding Frequency = 12 (monthly)
F = Loan Payment Frequency = 12 (monthly)
D = Number of days from regular loan start date to first regular payment date
N = Option Term (OT) × 12 months = 36 or 48 months Then the value of the monthly interest payment (MIP) is computed (block 270) as the algebraic multiplication of the residual value (RV) and the monthly interest rate, i.e., RATE as obtained from rate file 271 divided by 12:

$$MIP = RV \times RATE \div 12.$$

Finally, the value of the regular loan payment amount (RPA) is computed (block 280) as the algebraic sum of the monthly intest payment variable (MIP) and the principal and interest payment (PIP):

$$RPA = MIP + PIP.$$

This completes the processing for an applicant whose loan application has been accepted. It will be understood that for variable rate loans ("NO" branch of test 270) the values of PIP, MIP and RPA (blocks 262, 270, 280, respectively) would be recomputed periodically, e.g., every 12 months, in accordance with the interest rate term, to adjust the regular payment amount for changing interest rates.

Referring now to FIG. 5, there is depicted a process for determining and calculating the excess kilometers charge (EKC) corresponding to functional blocks 46 and 47 of FIG. 1B. It is the overall objective of the process of FIG. 5 to compute an excess kilometers charge dollar value which will be used in the computation of the new residual value (NRV) (see block 45 of FIG. 1B). In describing the process of FIG. 5, the constants and variables described in Tables B and C, below, will be employed.

TABLE B

| Value | CONSTANTS Description |
|---|---|
| 24,000 kilometers | Typical value of maximum allowable kilometers per year of option term (OT) used in computing maximum allowable kilometers (KL) (see Table C below). |
| $18,000 | Typical monetary value used to determine the appropriate unit value (see immediately below) in computing excess kilometers charge (EKC). |
| .04¢ | Typical monetary value assigned to 1 unit of chargeable kilometers (CK) where sticker price (SP) is less than a preselected monetary value, e.g., $18,000. |
| .07¢ | Typical monetary value assigned to 1 unit of chargeable kilometers (CK) where sticker price (SP) is greater than or equal to a preselected monetary value, e.g., $18,000. |

TABLE C

| Variable | Definition |
|---|---|
| OT | OPTION TERM - The option term is equal to Option Date (OD) less Issue Date (ID), expressed in years (see Table A, above). |
| KL | MAXIMUM ALLOWABLE KILOMETERS - The maximum number of kilometers which the vehicle may be driven over the amortization term (OT) without incurring any excess kilometers charges, e.g., OT X 24,000 (see Table B, above). |
| SP | STICKER PRICE - The manufacturer's listing sticker price, including options, but not sales tax (see Table A, above). |
| AK | ACTUAL KILOMETERS, - The total number of kilometers driven over the option term, as determined from the odometer. |
| CK | CHARGEABLE KILOMETERS - The number of actual kilometers (AK) in excess of the maximum allowable (KL). |
| EKC | EXCESS KILOMETERS CHARGE - The dollar value calculated for chargeable kilometers CK. |

Referring to FIG. 5, as a first matter, the value of maximum allowable kilometers (KL) is computed (block 110) as the algebraic multiplication of the option term (OT) and a predetermined numerical value, e.g., 24,000 (see Table B):

$$KL = OT \times 24,000.$$

Block 120 tests whether actual kilometers (AK) is greater than the maximum allowable (KL). If test 120 fails ("NO" branch), then processing proceeds directly to block 50 of FIG. 1B. If the block 120 test succeeds, indicating that AK is greater than KL, then processing proceeds to block 130, which computes the chargeable kilometers (CK):

i CK=AK−KL.

Processing next proceeds to block 140, which tests whether the sticker price of the new automobile including options (SP) is less than a predetermined value, e.g., $18,000 (Table B). If the block 140 test succeeds ("YES" branch), then processing proceeds to block 170, which computes the excess kilometers charge (EKC) by multiplying a predetermined numerical value, e.g., 0.04¢, by the value of CK computed in block 130:

$$EKC = CK \times 0.04¢.$$

If the test of block 140 fails, indicating that SP is equal to or greater than $18,000, then the processing proceeds to block 180, which computes the excess kilometers charge (EKC) by applying a different predetermined numerical value, e.g., 0.07¢, to the value of CK computed in step 130:

$$EKC = CK \times 0.07¢.$$

The processing proceeds by taking the excess kilometers charge (EKC), computed in step 170 or 180, and using it in block 45 of FIG. 1B to compute a new residual value (NRV):

$$NRV = RV - EKC.$$

The detailed program listings for carrying out the data processing steps described in this application are set forth in the following Appendices A–D. Appendices A–C relate to the flow chart of FIG. 4 and Appendix D relates to the flow chart of FIG. 5.

Table D below cross-references the lines of the COBOL source program listing contained in Appendix A to functional blocks appearing in FIG. 4.

TABLE D

| Block No. (FIG. 4) | Line No. (Appendix A) |
|---|---|
| 210 | 35753–35761 |
| 230 | 35753–35761 |
| 240 | 35773–35779 |
| 250 | 35550–35554 |
| 251 | 35582–35596 |
| 252 | 35612–35619 |
| 260 | 35582–35596 |
| 262 | 35789–35792 |
| 270 | 35862–35863 |
| 280 | 36112–36115 |

Appendix B contains the COBOL source program listing which includes (at line nos. 35273-35293) the logic for calculating the interest rate. This program is called at line no. 35878 of the Appendix A program listing.

Appendix C contains three FORTRAN subroutine programs for calculating the principal and interest payment (block 262 of FIG. 4). Subroutine L5E183 is called at line no. 35822 of the Appendix A program listing. Subroutine L5E186 is called at line no. 0004 of the above subroutine L5E183. Subroutine L5E187 is called at line no. 0005 of the above subroutine L5E183.

The Appendix A program also contains a number of references to PEM ("Processing Environment Manager"), a well known applications program commercially available from Hogan Systems, Inc. Those references are identified in Table E below.

TABLE E

PEM
DATA GROUP
MAP
TRANSACTION CONTROL BLOCK

Table F below cross-references the lines of the COBOL source program listing contained in Appendix D to functional blocks appearing in FIG. 5.

TABLE F

| Block No. (FIG. 5) | Line No. (Appendix D) |
|---|---|
| 110 | 76500–76600 |
| 120 | 77400–78600 |
| 130 | 77400–78600 |
| 140 | 78800–79400 |
| 170 | 79000–79100 |
| 180 | 79300–79400 |

```
000010 IDENTIFICATION DIVISION.
000020 PROGRAM-ID.    L5E5196S.
000030 AUTHOR.        R. MOO
000040 DATE-COMPILED. JUL 27,1984.
000050 REMARKS.
000060                THIS IS THE MAINLINE PGM FOR BUY BACK CAR LOAN
000070                PROPOSAL TRANSACTION. (TRAN. 254)
000080
```

© 1984 The Royal Bank of Canada
All Rights Reserved.
An Unpublished Work.

APPENDIX A

```
000100 ENVIRONMENT  DIVISION.                                           LSE00100
000110                                                                  LSE00110

000130 DATA        DIVISION.                                            LSE00130

000150 WORKING-STORAGE SECTION.                                         LSE00150

000170 01  WS-ACTIVITY-DB-ID.                                           LSE00170
000180     05  FILLER                    PIC S9(8) COMP VALUE +51966.   LSE00180
000190     05  FILLER                    PIC S9(8) COMP VALUE +51968.   LSE00190
000200     05  FILLER                    PIC S9(8) COMP VALUE +61232.   LSE00200
000210     05  FILLER                    PIC S9(8) COMP VALUE +62000.   LSE00210
000220     05  FILLER                    PIC S9(8) COMP VALUE +62045.   LSE00220
000230     05  FILLER                    PIC S9(8) COMP VALUE +62050.   LSE00230
000240     05  FILLER                    PIC S9(8) COMP VALUE +62010.   LSE00240
000250     05  FILLER                    PIC S9(8) COMP VALUE +62300.   LSE00250
000260     05  FILLER                    PIC S9(8) COMP VALUE +62301.   LSE00260
000270     05  FILLER                    PIC S9(8) COMP VALUE +62405.   LSE00270
000280     05  FILLER                    PIC S9(8) COMP VALUE +64000.   LSE00280
000290     05  FILLER                    PIC S9(8) COMP VALUE +64232.   LSE00290
000300     05  FILLER                    PIC S9(8) COMP VALUE +64340.   LSE00300
000310     05  FILLER                    PIC S9(8) COMP VALUE +64341.   LSE00310
000320     05  FILLER                    PIC S9(8) COMP VALUE +64342.   LSE00320
000330     05  FILLER                    PIC S9(8) COMP VALUE +64343.   LSE00330
000340     05  FILLER                    PIC S9(8) COMP VALUE +64344.   LSE00340
000350     05  FILLER                    PIC S9(8) COMP VALUE +64345.   LSE00350
000360     05  FILLER                    PIC S9(8) COMP VALUE +64346.   LSE00360
000370     05  FILLER                    PIC S9(8) COMP VALUE +64347.   LSE00370
000380     05  FILLER                    PIC S9(8) COMP VALUE +65000.   LSE00380
000390     05  FILLER                    PIC S9(8) COMP VALUE +65003.   LSE00390

000410 01  FILLER REDEFINES WS-ACTIVITY-DB-ID.                          LSE00410
000420     05  FILLER                    PIC X(2).                      LSE00420
000430     05  WS-ALLOC-DB-ACT           PIC X(2).                      LSE00430
000440     05  FILLER                    PIC X(2).                      LSE00440
000450     05  WS-DEBLOCK-MAP-ACT        PIC X(2).                      LSE00450
000460     05  FILLER                    PIC X(2).                      LSE00460
000470     05  WS-VERIFY-DATE-RTN        PIC X(2).                      LSE00470
000480     05  FILLER                    PIC X(2).                      LSE00480
000490     05  WS-CONVERT-DISPLAY-FMT-RTN PIC X(2).                     LSE00490
000500     05  FILLER                    PIC X(2).                      LSE00500
000510     05  WS-INIT-ONLINE-TRAN-RTN   PIC X(2).                      LSE00510
000520     05  FILLER                    PIC X(2).                      LSE00520
000530     05  WS-INIT-SETUP-RTN         PIC X(2).                      LSE00530
000540     05  FILLER                    PIC X(2).                      LSE00540
000550     05  WS-FIND-NO-OF-PERIODS-RTN PIC X(2).                      LSE00550
000560     05  FILLER                    PIC X(2).                      LSE00560
000570     05  WS-CALC-EFF-INT-RATE-RTN  PIC X(2).                      LSE00570
000580     05  FILLER                    PIC X(2).                      LSE00580
000590     05  WS-CALC-COST-LOAN-RTN     PIC X(2).                      LSE00590
000600     05  FILLER                    PIC X(2).                      LSE00600
000610     05  WS-GET-INT-METHOD-DESC-RTN PIC X(2).                     LSE00610
000620     05  FILLER                    PIC X(2).                      LSE00620
000630     05  WS-DISPLAY-MAP-RTN        PIC X(2).                      LSE00630
000640     05  FILLER                    PIC X(2).                      LSE00640
000650     05  WS-WRITE-TXN-LOG-RTN      PIC X(2).                      LSE00650
000660     05  FILLER                    PIC X(2).                      LSE00660
000670     05  WS-DISPLAY-OSES0AM-ACT    PIC X(2).                      LSE00670
000680     05  FILLER                    PIC X(2).                      LSE00680

000690     05  WS-DISPLAY-OSES0BM-ACT    PIC X(2).                      LSE00690
000700     05  FILLER                    PIC X(2).                      LSE00700
000710     05  WS-DISPLAY-OSES0CM-ACT    PIC X(2).                      LSE00710
000720     05  FILLER                    PIC X(2).                      LSE00720
000730     05  WS-DISPLAY-OSES0DM-ACT    PIC X(2).                      LSE00730
000740     05  FILLER                    PIC X(2).                      LSE00740
000750     05  WS-DISPLAY-OSES0EM-ACT    PIC X(2).                      LSE00750
000760     05  FILLER                    PIC X(2).                      LSE00760
000770     05  WS-DISPLAY-OSES0FM-ACT    PIC X(2).                      LSE00770
000780     05  FILLER                    PIC X(2).                      LSE00780
000790     05  WS-DISPLAY-OSES0GM-ACT    PIC X(2).                      LSE00790
000800     05  FILLER                    PIC X(2).                      LSE00800
000810     05  WS-DISPLAY-OSES0HM-ACT    PIC X(2).                      LSE00810
000820     05  FILLER                    PIC X(2).                      LSE00820
000830     05  WS-ABEND-TRANS-ACT        PIC X(2).                      LSE00830
000840     05  FILLER                    PIC X(2).                      LSE00840
000850     05  WS-ERROR-RTN              PIC X(2).                      LSE00850
000870 01  WS-WORK-AREA.                                                LSE00870
000880     05  WS-POSITIVE               PIC X(1)  VALUE '1'.           LSE00880
000890     05  WS-NEGATIVE               PIC X(1)  VALUE '2'.           LSE00890
000900     05  WS-INIT-DATE              PIC 9(7)  VALUE 9999999.       LSE00900
000910     05  WS-FIXED                  PIC X(2)  VALUE '03'.          LSE00910
000920     05  WS-NB-PRIME               PIC X(2)  VALUE '04'.          LSE00920
000930     05  WS-PERSONAL-LN-RATE       PIC X(2)  VALUE '11'.          LSE00930
000940     05  WS-BLENDED                PIC X(2)  VALUE '01'.          LSE00940
000950     05  WS-MONTHLY                PIC X(2)  VALUE '04'.          LSE00950
000960     05  WS-ENGLISH                PIC X(1)  VALUE '1'.           LSE00960
000970     05  WS-OK                     PIC X(2)  VALUE '00'.          LSE00970
000980     05  WS-ONLINE.                                               LSE00980
000990         10  FILLER                PIC S9(4) COMP VALUE +0003.    LSE00990
001000     05  WS-NA.                                                   LSE01000
001010         10  FILLER                PIC X(16) VALUE SPACES.        LSE01010
001020         10  FILLER                PIC X(3)  VALUE 'N/A'.         LSE01020
```

```
001040 COPY FREQUENC.                                                   LSE01040
001041C*    *                                                           FRE00010
001042C*    *       DATA GROUP FREQUENCY                                FRE00020
001043C*    *       INTEREST PAYMENT FREQUENCY COPYBOOK                 FRE00030
001044C*    *                               REVISION DATE : MAY 31 1984 FRE00040
001045C*    *                                                           FRE00050
001046C*       01  FREQUENCY.                                           FRE00060
001047C*                                                                FRE00070
001048C*           05  FREQUENCY01.                                     FRE00080
001049C*               10  FILLER        PIC XX     VALUE '01'.         FRE00090
001050C*               10  FILLER        PIC X(8)   VALUE 'NOT SPEC'.   FRE00100
001051C*               10  FILLER        PIC X(8)   VALUE 'PAS SPEC'.   FRE00110
001052C*               10  FILLER        PIC XX     VALUE 'NS'.         FRE00120
001053C*               10  FILLER        PIC XX     VALUE 'PS'.         FRE00130
001054C*           05  FREQUENCY02.                                     FRE00140
001055C*               10  FILLER        PIC XX     VALUE '02'.         FRE00150
001056C*               10  FILLER        PIC X(8)   VALUE 'IRREGUL'.    FRE00160
001057C*               10  FILLER        PIC X(8)   VALUE 'IRREGUL'.    FRE00170
001058C*               10  FILLER        PIC XX     VALUE 'IR'.         FRE00180
001059C*               10  FILLER        PIC XX     VALUE 'IR'.         FRE00190
001060C*           05  FREQUENCY03.                                     FRE00200
001061C*               10  FILLER        PIC XX     VALUE '03'.         FRE00210
001062C*               10  FILLER        PIC X(8)   VALUE 'SEMI-MTH'.   FRE00220
001063C*               10  FILLER        PIC X(8)   VALUE 'BIMENSUL'.   FRE00230
001064C*               10  FILLER        PIC XX     VALUE 'SM'.         FRE00240
001065C*               10  FILLER        PIC XX     VALUE 'BS'.         FRE00250
001066C*           05  FREQUENCY04.                                     FRE00260
001067C*               10  FILLER        PIC XX     VALUE '04'.         FRE00270
001068C*               10  FILLER        PIC X(8)   VALUE 'MONTHLY'.    FRE00280
001069C*               10  FILLER        PIC X(8)   VALUE 'MENSUEL'.    FRE00290
001070C*               10  FILLER        PIC XX     VALUE 'MO'.         FRE00300
001071C*               10  FILLER        PIC XX     VALUE 'MN'.         FRE00310
001072C*           05  FREQUENCY05.                                     FRE00320
001073C*               10  FILLER        PIC XX     VALUE '05'.         FRE00330
001074C*               10  FILLER        PIC X(8)   VALUE 'BI-WKLY'.    FRE00340
001075C*               10  FILLER        PIC X(8)   VALUE 'BI-HEBO'.    FRE00350
001076C*               10  FILLER        PIC XX     VALUE 'BW'.         FRE00360
001077C*               10  FILLER        PIC XX     VALUE 'BH'.         FRE00370
001078C*           05  FREQUENCY06.                                     FRE00380
001079C*               10  FILLER        PIC XX     VALUE '06'.         FRE00390
001080C*               10  FILLER        PIC X(8)   VALUE 'QUARTLY'.    FRE00400
001081C*               10  FILLER        PIC X(8)   VALUE 'TRIMEST'.    FRE00410
001082C*               10  FILLER        PIC XX     VALUE 'QT'.         FRE00420
001083C*               10  FILLER        PIC XX     VALUE 'TR'.         FRE00430
001084C*           05  FREQUENCY07.                                     FRE00440
001085C*               10  FILLER        PIC XX     VALUE '07'.         FRE00450
001086C*               10  FILLER        PIC X(8)   VALUE 'SEMI-ANN'.   FRE00460
001087C*               10  FILLER        PIC X(8)   VALUE 'SEMESTRL'.   FRE00470
001088C*               10  FILLER        PIC XX     VALUE 'SA'.         FRE00480
001089C*               10  FILLER        PIC XX     VALUE 'SM'.         FRE00490
001090C*           05  FREQUENCY08.                                     FRE00500
001091C*               10  FILLER        PIC XX     VALUE '08'.         FRE00510
001092C*               10  FILLER        PIC X(8)   VALUE 'ANNUALLY'.   FRE00520
001093C*               10  FILLER        PIC X(8)   VALUE 'ANNUEL  '.   FRE00530
001094C*               10  FILLER        PIC XX     VALUE 'AN'.         FRE00540
001095C*               10  FILLER        PIC XX     VALUE 'AN'.         FRE00550
001096C*           05  FREQUENCY09.                                     FRE00560
001097C*               10  FILLER        PIC XX     VALUE '09'.         FRE00570
001098C*               10  FILLER        PIC X(8)   VALUE 'WEEKLY'.     FRE00580
001099C*               10  FILLER        PIC X(8)   VALUE 'HEBDOM'.     FRE00590
001100C*               10  FILLER        PIC XX     VALUE 'WK'.         FRE00600
001101C*               10  FILLER        PIC XX     VALUE 'HB'.         FRE00610
001102C*           05  FREQUENCY10.                                     FRE00620
001103C*               10  FILLER        PIC X(22)  VALUE SPACES.       FRE00630
001104C*           05  FREQUENCY11.                                     FRE00640
001105C*               10  FILLER        PIC XX     VALUE '11'.         FRE00650
001106C*               10  FILLER        PIC X(8)   VALUE 'BI-MTHLY'.   FRE00660
001107C*               10  FILLER        PIC X(8)   VALUE 'BIMESTRL'.   FRE00670
001108C*               10  FILLER        PIC XX     VALUE 'BM'.         FRE00680
001109C*               10  FILLER        PIC XX     VALUE 'BT'.         FRE00690
001110C*           05  FREQUENCY12.                                     FRE00700
001111C*               10  FILLER        PIC XX     VALUE '12'.         FRE00710
001112C*               10  FILLER        PIC X(8)   VALUE 'TRI-ANN'.    FRE00720
001113C*               10  FILLER        PIC X(8)   VALUE 'QUADRIMS'.   FRE00730
001114C*               10  FILLER        PIC XX     VALUE 'TA'.         FRE00740
001115C*               10  FILLER        PIC XX     VALUE 'QD'.         FRE00750
001116C*           05  FREQUENCY13.                                     FRE00760
001117C*               10  FILLER        PIC XX     VALUE '13'.         FRE00770
001118C*               10  FILLER        PIC X(8)   VALUE 'MATURITY'.   FRE00780
001119C*               10  FILLER        PIC X(8)   VALUE 'ECHEANCE'.   FRE00790
001120C*               10  FILLER        PIC XX     VALUE 'MA'.         FRE00800
001121C*               10  FILLER        PIC XX     VALUE 'EC'.         FRE00810
001122C*           05  FREQUENCY14.                                     FRE00820
001123C*               10  FILLER        PIC X(22)  VALUE SPACES.       FRE00830
001124C*           05  FREQUENCY15.                                     FRE00840
001125C*               10  FILLER        PIC X(22)  VALUE SPACES.       FRE00850
001126C*           05  FREQUENCY16.                                     FRE00860
001127C*               10  FILLER        PIC X(22)  VALUE SPACES.       FRE00870
001128C*           05  FREQUENCY17.                                     FRE00880
001129C*               10  FILLER        PIC X(22)  VALUE SPACES.       FRE00890
001130C*           05  FREQUENCY18.                                     FRE00900
001131C*               10  FILLER        PIC X(22)  VALUE SPACES.       FRE00910
001132C*           05  FREQUENCY19.                                     FRE00920
001133C*               10  FILLER        PIC XX     VALUE '19'.         FRE00930
001134C*               10  FILLER        PIC X(8)   VALUE 'N/A     '.   FRE00940
001135C*               10  FILLER        PIC X(8)   VALUE 'S/O     '.   FRE00950
001136C*               10  FILLER        PIC XX     VALUE 'NA'.         FRE00960
001137C*               10  FILLER        PIC XX     VALUE 'SO'.         FRE00970
001138C*                                                                FRE00980
```

```
001139C*       01  FILLER REDEFINES FREQUENCY.                          FRE00990
001140C*                                                                FRE01000
001141C*           05  FILLER OCCURS 19.                                 FRE01010
001142C*               10  FREQUENCY-CODE        PIC XX.                 FRE01020
001143C*               10  FREQUENCY-DESC-E      PIC X(8).               FRE01030
001144C*               10  FREQUENCY-DESC-F      PIC X(8).               FRE01040
001145C*               10  FREQUENCY-LIT-E       PIC XX.                 FRE01050
001146C*               10  FREQUENCY-LIT-F       PIC XX.                 FRE01060
          8

001148***001060 COPY P490020.                                           LSE01060
001149C*000010***** START OF P490020  ***** TCB RESULT CONSTANTS        *****P490020
001150C*000020*                                                         *P490020
001151C*000030 01  TCB-RESULT-CONSTANTS.                                 P490020
001152C*000040     05  TCB-RESULTS.                                      P490020
001153C*000050         10  TCB-OK.
001154C*000060             15  FILLER PIC S9(4) COMP VALUE +0000.
001155C*000070         10  TCB-ERR.
001156C*000080             15  FILLER PIC S9(4) COMP VALUE +0001.
001157C*000090         10  TCB-NO-ACT.
001158C*000100             15  FILLER PIC S9(4) COMP VALUE +0002.
001159C*000110         10  TCB-NOT-AUTH.
001160C*000120             15  FILLER PIC S9(4) COMP VALUE +0003.
001161C*000130         10  TCB-FAIL.
001162C*000140             15  FILLER PIC S9(4) COMP VALUE +0004.
001163C*000150         10  TCB-FULL.
001164C*000160             15  FILLER PIC S9(4) COMP VALUE +0005.
001165C*000170         10  TCB-ABEND-EXIT.
001166C*000180             15  FILLER PIC S9(4) COMP VALUE +0006.
001167C*000181         10  TCB-DEADLOCK.                                 CC003801
001168C*000182             15  FILLER PIC S9(4) COMP VALUE +0007.        CC003801
001169C*000183         10  TCB-DATA-BASE-FULL.                           CC003801
001170C*000184             15  FILLER PIC S9(4) COMP VALUE +0008.        CC003801
001171C*000185         10  TCB-DB-NOT-AVAILABLE.                         CC003801
001172C*000186             15  FILLER PIC S9(4) COMP VALUE +0009.        CC003801
001173C*000187         10  TCB-OK-CHECKPOINT.                            CC003801
001174C*000188             15  FILLER PIC S9(4) COMP VALUE +0010.        CC003801
001175C*000189         10  TCB-FAIL-CHECKPOINT.                          CC003801
001176C*000190             15  FILLER PIC S9(4) COMP VALUE +0011.        CC003801
001177C*000191         10  TCB-ABEND-TRANS.                              CC003801
001178C*000192             15  FILLER PIC S9(4) COMP VALUE +0012.        CC003801
001179C*000195*                                                         *P490020
001180C*000200***** END OF P490020  *********************************** *P490020
          9

001182***001080 COPY P490030.                                           LSE01080
001183C*000010***** START OF P490030  ***** PEM COMMON ACTIVITIES       *****P490030
001184C*000020*                                                         *P490030
001185C*000030 01  PEM-COMMON-ACTIVITIES.                                P490030
001186C*000040     05  PEM-ACTIVITIES.                                   P490030
001187C*000050         10  CA-PEM-END-PROG.
001188C*000060             15  FILLER PIC S9(4) COMP VALUE +0001.
001189C*000070         10  CA-PEM-END-TRANS.
001190C*000080             15  FILLER PIC S9(4) COMP VALUE +0002.
001191C*000090         10  CA-PEM-DYN-DB-ALOC.
001192C*000100             15  FILLER PIC S9(4) COMP VALUE +0004.
001193C*000110         10  CA-PEM-DYN-DB-REL.
001194C*000120             15  FILLER PIC S9(4) COMP VALUE +0005.
001195C*000130         10  CA-PEM-DYN-DB-INIT.
001196C*000140             15  FILLER PIC S9(4) COMP VALUE +0006.
001197C*000150         10  CA-PEM-NO-OP.
001198C*000160             15  FILLER PIC S9(4) COMP VALUE +0013.
001199C*000170         10  CA-PEM-TRANS-DUMP-RETURN.
001200C*000180             15  FILLER PIC S9(4) COMP VALUE +0014.
001201C*000190         10  CA-PEM-TRANS-DUMP-END.
001202C*000200             15  FILLER PIC S9(4) COMP VALUE +0015.
001203C*000210         10  CA-PEM-DUMP-TCB-TRACE.
001204C*000220             15  FILLER PIC S9(4) COMP VALUE +0016.
001205C*000230         10  CA-PEM-DUMP-DB-RETURN.
001206C*000240             15  FILLER PIC S9(4) COMP VALUE +0017.
001207C*000250         10  CA-PEM-DUMP-DB-END.
001208C*000260             15  FILLER PIC S9(4) COMP VALUE +0018.
001209C*000270         10  CA-PEM-ENABLE-ABEND-EXIT.
001210C*000280             15  FILLER PIC S9(4) COMP VALUE +0020.
001211C*000290         10  CA-PEM-DISABLE-ABEND-EXIT.
001212C*000300             15  FILLER PIC S9(4) COMP VALUE +0021.
001213C*000310         10  CA-PEM-CHECKPOINT.
001214C*000320             15  FILLER PIC S9(4) COMP VALUE +0028.
001215C*000330*                                                         *P490030
001216C*000340***** END OF P490030  *********************************** *P490030
          10

001218***001100 LINKAGE SECTION.                                        LSE01100

001220***001120 COPY P490000.                                           LSE01120
001221C*000010***** START OF P490000  ***** TCB ************************ *
001222C*000020*                                                          *
001223C*000030  DATA GROUP NUMBER 0001                                   *
001224C*000040*                                                          *
001225C*000050*                                                          *
001226C*000060 01  TRANSACTION-CONTROL-BLOCK.
001227C*000070     05  FILLER           PIC XXXX.
001228C*000080     05  TCB-TRANS-NO     PIC XXXX.                       TPE49001
001229C*000090     05  TCB-CO-ID        PIC XX.                         TPE49002
001230C*000100     05  TCB-APPL-ID      PIC XX.                         TPE49003
001231C*000110     05  TCB-FUNC-ID      PIC XX.                         TPE49004
001232C*000120     05  TCB-SOURCE-TYPE  PIC XX.                         TPE49005
001233C*000121     05  TCB-SOURCE-TYPE-N REDEFINES TCB-SOURCE-TYPE
001234C*000122                          PIC S9(4) COMP.
001235C*000123         88  TCB-ONLINE                  VALUE +0003
001236C*000124                                               +0005
001237C*000125                                               +0006.
```

```
001238C*000126        88  TCB-BTCH                       VALUE +0004.
001239C*000130    05  TCB-ACTIVITY     PIC XX.                            TPE49006
001240C*000140    05  TCB-RESULT       PIC XX.                            TPE49007
001241C*000150    05  TCB-USER-DATA.
001242C*000151        10  FILLER       PIC X(6).
001243C*000152        10  TCB-DATA-GROUP PIC XX.                          TPE49092
001244C*000153        10  TCB-PARM-POS PIC XX.                            TPE49103
001245C*000154    05  TCB-USER-AREA-1  REDEFINES TCB-USER-DATA.
001246C*000160        10  TCB-USER-INFO PIC XXXX.                         TPE49024
001247C*000170        10  TCB-USER-COND PIC XX.                           TPE49025
001248C*000180    05  TCB-USER-AREA-2  REDEFINES TCB-USER-DATA.
001249C*000190        10  TCB-USER-CC  PIC XX.                            TPE49017
001250C*000200        10  TCB-USER-RESULT PIC XX.                         TPE49018
001251C*000210        10  TCB-USER-ENVMT PIC XX.                          TPE49019
001252C*000211    05  TCB-USER-AREA-3  REDEFINES TCB-USER-DATA.
001253C*000212        10  TCB-EOJ-CALL PIC XXXX.
001254C*000220    05  TCB-ENR          REDEFINES TCB-USER-DATA.
001255C*000221        10  TCB-ENR-ID   PIC X(8).
001256C*000240    05  TCB-TIME         PIC S9(7) COMP-3.                  TPE49012
001257C*000250    05  TCB-SYS-DATE     PIC S9(7) COMP-3.                  TPE49011
001258C*000260    05  TCB-SOURCE       PIC X(8).                          TPE49013
001259C*000270    05  TCB-OPERATOR     PIC X(20).                         TPE49014
001260C*000280    05  TCB-DESTINATION  PIC X(8).                          TPE49015
001261C*000290    05  TCB-TERM-DATA.
001262C*000300        10  TCB-PFKEY    PIC X.                             TPE49020
001263C*000310            88  TCB-ENTER             VALUE QUOTE.
001264C*000320            88  TCB-PF01              VALUE '1'.
001265C*000330            88  TCB-PF02              VALUE '2'.
001266C*000340            88  TCB-PF03              VALUE '3'.
001267C*000350            88  TCB-PF04              VALUE '4'.
001268C*000360            88  TCB-PF05              VALUE '5'.
001269C*000370            88  TCB-PF06              VALUE '6'.
001270C*000380            88  TCB-PF07              VALUE '7'.
001271C*000390            88  TCB-PF08              VALUE '8'.

001272C*000400            88  TCB-PF09              VALUE '9'.
001273C*000410            88  TCB-PF10              VALUE ':'.
001274C*000420            88  TCB-PF11              VALUE '#'.
001275C*000430            88  TCB-PF12              VALUE '3'.
001276C*000440            88  TCB-PF13              VALUE 'A'.
001277C*000450            88  TCB-PF14              VALUE 'B'.
001278C*000460            88  TCB-PF15              VALUE 'C'.
001279C*000470            88  TCB-PF16              VALUE 'D'.
001280C*000480            88  TCB-PF17              VALUE 'E'.
001281C*000490            88  TCB-PF18              VALUE 'F'.
001282C*000500            88  TCB-PF19              VALUE 'G'.
001283C*000510            88  TCB-PF20              VALUE 'H'.
001284C*000520            88  TCB-PF21              VALUE 'I'.
001285C*000530            88  TCB-PF22              VALUE '4'.
001286C*000540            88  TCB-PF23              VALUE '.'.
001287C*000550            88  TCB-PF24              VALUE '<'.
001288C*000560            88  TCB-PFKEY-NOT-PRESENT VALUE LOW-VALUE.
001289C*000570        10  FILLER       PIC XXX.
001290C*000580    05  TCB-EFFECTIVE-DATE PIC S9(7) COMP-3.                 TPE49022
001291C*000590    05  TCB-DEVICE-TYPE  PIC X.                              TPE49023
001292C*000591            88  TCB-3270-2            VALUE 'A'.
001293C*000592            88  TCB-BATCH             VALUE 'B'.
001294C*000593            88  TCB-3270-1            VALUE 'C'.
001295C*000594            88  TCB-3604-001          VALUE 'D'.
001296C*000595            88  TCB-3604-DS3          VALUE 'E'.
001297C*000596            88  TCB-3604-DS4          VALUE 'F'.
001298C*000597            88  TCB-3600-JP           VALUE 'G'.
001299C*000598            88  TCB-3600-PB           VALUE 'H'.
001300C*000599            88  TCB-3600-LP           VALUE 'I'.
001301C*000600            88  TCB-3270-MOD1-PRINTER VALUE 'J'.
001302C*000601            88  TCB-3270-MOD2-PRINTER VALUE 'K'.
001303C*000602            88  TCB-TMX               VALUE 'L'.
001304C*000603            88  TCB-2470-MOD2         VALUE 'M'.
001305C*000604            88  TCB-2740-MOD1         VALUE 'N'.
001306C*000605            88  TCB-ALIEN-X           VALUE 'X'.
001307C*000606            88  TCB-ALIEN-Y           VALUE 'Y'.
001308C*000607            88  TCB-ALIEN-Z           VALUE 'Z'.
001309C*000608
001310C*000610****** END OF P490008 ***************************************P490008

001311***001140 COPY CSE51965.                                             LSE01140
001312C*                                                                   CSE00010
001313C*         *    DATA GROUP 51965              04 05 16                CSE00020
001314C*         *    DECL REG. PYMT AMT PROP. TXN INPUT FIELDS (TRAN. CODE 254)CSE00030
001315C*         *                                                         CSE00040
001316C*         01  CSE51965.                                             CSE00050
001317C*         *                                                         CSE00060
001318C*             05  CS1965-ACTION                     PIC XX.         CSE00070
001319C*             05  CS1965-RESULT                     PIC XX.         CSE00080
001320C*         *                                                         CSE00090
001321C*             05  CS1965-TRAN-TRANSIT-LN            PIC X(5).       CSE00100
001322C*             05  CS1965-TRAN-FIELDS.                               CSE00110
001323C*                 10  CS1965-TRAN-INT-RATE-X.                       CSE00120
001324C*                     15  CS1965-TRAN-INT-RATE      PIC V9(8).      CSE00130
001325C*                 10  CS1965-TRAN-RULE-RATE-INFO.                   CSE00140
001326C*                     15  CS1965-TRAN-INT-RULE      PIC XX.         CSE00150
001327C*                     15  CS1965-TRAN-INT-RATE-IND  PIC X.          CSE00160
001328C*                 10  CS1965-TRAN-FREQ-DATE-INFO.                   CSE00170
001329C*                     15  CS1965-TRAN-PYMT-FREQ     PIC XX.         CSE00180
001330C*                     15  CS1965-TRAN-FIRST-PDD.                    CSE00190
001331C*                         20  CS1965-TRAN-FIRST-PDD-M  PIC XX.      CSE00200
001332C*                         20  CS1965-TRAN-FIRST-PDD-D  PIC XX.      CSE00210
001333C*                         20  CS1965-TRAN-FIRST-PDD-Y  PIC XX.      CSE00220
001334C*                 10  CS1965-TRAN-PROCEEDS-X.                       CSE00230
001335C*                     15  CS1965-TRAN-PROCEEDS      PIC 9(13)V99.   CSE00240
001336C*                 10  CS1965-TRAN-AMORT-RENEW-TERM.                 CSE00250
```

```
001338C*              15  CS1965-TRAN-AMORT-TERM          PIC XXX.         CSE00260
001339C*              15  CS1965-TRAN-INT-RENEW-TERM      PIC XXX.         CSE00270
001340C*          10  CS1965-TRAN-STK-PRICE-RV-FACTR.                      CSE00280
001341C*              15  CS1965-TRAN-STICKER-PRICE-X.                     CSE00290
001342C*                  20  CS1965-TRAN-STICKER-PRICE   PIC 9(11)V99.    CSE00300
001343C*              15  CS1965-TRAN-RV-FACTOR-X.                         CSE00310
001344C*                  20  CS1965-TRAN-RV-FACTOR       PIC V99.         CSE00320
001345C*          10  CS1965-TRAN-INT-METHOD              PIC XX.          CSE00330
001346C*          10  CS1965-TRAN-START-ADJ-DATE.                          CSE00340
001347C*              15  CS1965-TRAN-START-DATE.                          CSE00350
001348C*                  20  CS1965-TRAN-ST-DT-M         PIC XX.          CSE00360
001349C*                  20  CS1965-TRAN-ST-DT-D         PIC XX.          CSE00370
001350C*                  20  CS1965-TRAN-ST-DT-Y         PIC XX.          CSE00380
001351C*              15  CS1965-TRAN-ADJ-DATE.                            CSE00390
001352C*                  20  CS1965-TRAN-ADJ-DT-M        PIC XX.          CSE00400
001353C*                  20  CS1965-TRAN-ADJ-DT-D        PIC XX.          CSE00410
001354C*                  20  CS1965-TRAN-ADJ-DT-Y        PIC XX.          CSE00420
001355C*          10  CS1965-TRAN-PERC-RATE-FACTOR-X.                      CSE00430
001356C*              15  CS1965-TRAN-PERC-RATE-FACTOR    PIC 9V9(5).      CSE00440
     15

001443C*          10  T2504-NS-MAX-EFF-INT-RATE   PIC S99V9(8)  COMP-3.    TRA00390
001444C*          10  T2504-NS-PAYOUT-TERMS       PIC S9(5)V9(6) COMP-3.   TRA00400
001445C*          10  T2504-NS-PROCEEDS-AMT-RND   PIC S9(13)V99  COMP-3.   TRA00410
001446C*          10  T2504-NS-PYMT-AMT-REG-RND   PIC S9(13)V99  COMP-3.   TRA00420
001447C*          10  T2504-NS-AMORT-TERM-RND     PIC 9(5).                TRA00430
001448C*  *                                                                TRA00440
001449C*          10  T2504-FILLER                PIC X(158).              TRA00450
     15

001358**001160 COPY CSES1979.                                              LSE01160
001359C*                                                                   CSE00010
001360C*  *   DATA GROUP S1979                                             CSE00020
001361C*  *   DISPLAY DG FOR PROPOSAL TRANSACTIONS                         CSE00030
001362C*  *                                                                CSE00040
001363C*      01  CSES1979.                                                CSE00050
001364C*  *                                                                CSE00060
001365C*          05  CS1979-ACTION               PIC XX.                  CSE00070
001366C*          05  CS1979-RESULT               PIC XX.                  CSE00080
001367C*  *                                                                CSE00090
001368C*          05  CS1979-DATA-OBE050AM-OBE050M.                        CSE00100
001369C*              10  CS1979-LOCAL-ENTRY-DATE     PIC X(9).            CSE00110
001370C*              10  CS1979-LOCAL-ENTRY-TIME.                         CSE00120
001371C*                  15  CS1979-LOCAL-ENTRY-HH   PIC X(2).            CSE00130
001372C*                  15  CS1979-COLON-1          PIC X(1).            CSE00140
001373C*                  15  CS1979-LOCAL-ENTRY-MM   PIC X(2).            CSE00150
001374C*                  15  CS1979-COLON-2          PIC X(1).            CSE00160
001375C*                  15  CS1979-LOCAL-ENTRY-SS   PIC X(2).            CSE00170
001376C*              10  CS1979-PROCEEDS         PIC S9(13)V99 COMP-3.    CSE00180
001377C*              10  CS1979-INT-RATE         PIC S99V9(7)  COMP-3.    CSE00190
001378C*              10  CS1979-INT-METHOD-DESC  PIC X(15).               CSE00200
001379C*              10  CS1979-INT-TERM-X.                               CSE00210
001380C*                  15  CS1979-INT-TERM     PIC ZZ9.                 CSE00220
001381C*              10  CS1979-PYMT-FREQ-DESC   PIC X(8).                CSE00230
001382C*              10  CS1979-FILLER-1         PIC X(27).               CSE00240
001383C*  *                                                                CSE00250
001384C*          05  CS1979-DATA-OBE050BM-OBE050M.                        CSE00260
001385C*              10  CS1979-START-DATE           PIC X(9).            CSE00270
001386C*              10  CS1979-FIRST-PYMT-DUE-DATE  PIC X(9).            CSE00280
001387C*              10  CS1979-INT-ADJ-DATE         PIC X(9).            CSE00290
001388C*              10  CS1979-NO-OF-PYMT           PIC 9(3).            CSE00300
001389C*              10  CS1979-REG-PYMT-AMT     PIC S9(13)V99 COMP-3.    CSE00310
001390C*              10  CS1979-TOTAL-INT-COST   PIC S9(13)V99 COMP-3.    CSE00320
001391C*              10  CS1979-FILLER-2         PIC X(20).               CSE00330
001392C*  *                                                                CSE00340
001393C*          05  CS1979-DATA-OBE050CM-OBE050FM.                       CSE00350
001394C*              10  CS1979-INT-RENEW-TERM-COST-X  PIC X(19).         CSE00360
001395C*              10  CS1979-INT-RENEW-TERM-COST  REDEFINES            CSE00370
001396C*                  CS1979-INT-RENEW-TERM-COST-X                     CSE00380
001397C*                                           PIC ZZZZ,ZZZ,ZZZ,ZZZ.99. CSE00390
001398C*              10  CS1979-INT-ADJ-AMT-X          PIC X(19).         CSE00400
001399C*              10  CS1979-INT-ADJ-AMT  REDEFINES                    CSE00410
001400C*                  CS1979-INT-ADJ-AMT-X     PIC ZZZZ,ZZZ,ZZZ,ZZZ.99. CSE00420
001401C*              10  CS1979-FILLER-3         PIC X(20).               CSE00430
001402C*  *                                                                CSE00440
001403C*          05  CS1979-DATA-OBE050GM-OBE050HM.                       CSE00450
001404C*              10  CS1979-PYMT-FREQ-INT    PIC S9(13)V99 COMP-3.    CSE00460
001405C*              10  CS1979-RESIDUAL-VALUE   PIC S9(13)V99 COMP-3.    CSE00470
001406C*              10  CS1979-STICKER-PRICE    PIC S9(13)V99 COMP-3.    CSE00480
001407C*              10  CS1979-RESIDUAL-FACTOR  PIC 9(2).                CSE00490
001408C*              10  CS1979-AMORT-NO-PYMT    PIC 9(4).                CSE00500
001409C*              10  CS1979-FILLER-4         PIC X(16).               CSE00510
     14

001411**001180 COPY CSJ60300.                                              LSE01180
001412C*  *                                                                CSJ00010
001413C*  *   DATA GROUP 60300                                             CSJ00020
001414C*  *   WORK AREA FOR TRANSACTION                                    CSJ00030
001415C*  *                                                                CSJ00040
001416C*      01  CSJ60300.                                                CSJ00050
001417C*  *                                                                CSJ00060
001418C*          05  C60300-ACTION               PIC XX.                  CSJ00070
001419C*          05  C60300-RESULT               PIC XX.                  CSJ00080
001420C*  *                                                                CSJ00090
001421C*          05  C60300-WORK-AREA.                                    CSJ00100
001422C*              10  FILLER                  PIC X(1200).             CSJ00110

001424**001200 COPY TRANSDM.                                               LSE01200
001425C*                                                                   TRA00010
```

```
001426C*    *                                                                        TRA00020
001427C*    *     TRAN25XX                                                           TRA00030
001428C*    *     PROPOSAL TXN WORK AREA              84 06 27  JL                   TRA00040
001429C*    01 TRAN25XX REDEFINES C3J60300.                                          TRA00050
001430C*    *                                                                        TRA00060
001431C*         05 FILLER                          PIC X(4).                        TRA00070
001432C*         05 TRAN25XX-WORK-AREA.                                              TRA00080
001433C*    *                                                                        TRA00090
001434C*             10 T25XX-PROP-PROCEEDS-AMT      PIC S9(13)V9(4) COMP-3.         TRA00100
001435C*             10 T25XX-PROP-PYMT-AMT-REG      PIC S9(13)V9(4) COMP-3.         TRA00110
001436C*             10 T25XX-PROP-AMORT-TERM        PIC S9(5)V9(6)  COMP-3.         TRA00120
001437C*    *                                                                        TRA00130
001438C*             10 T25XX-PROP-AMORT-COSTS       PIC S9(13)V99   COMP-3.         TRA00140
001439C*             10 T25XX-PROP-INT-REN-TERM-COSTS PIC S9(13)V99  COMP-3.         TRA00150
001440C*             10 T25XX-PROP-INT-ADJ-AMT       PIC S9(13)V99   COMP-3.         TRA00160
001441C*    * WORK FIELDS                                                            TRA00170
001442C*             10 T25XX-WS-FACTOR              PIC S999                        TRA00180
001443C*             10 T25XX-WS-INT-RATE-ADDN       PIC S9V9(8)     COMP-3.         TRA00190
001444C*             10 T25XX-WS-AMORT-TERM          PIC S999V9999   COMP-3.         TRA00200
001445C*             10 T25XX-WS-INT-RENEW-TERM      PIC S999V9999   COMP-3.         TRA00210
001446C*    * FOR TXN 254 ONLY                                                       TRA00220
001447C*             10 T25XX-WS-RES-VALUE           PIC S9(13)V9(4) COMP-3.         TRA00230
001448C*             10 T25XX-WS-RV-PYMT-FREQ-INT    PIC S9(13)V9(4) COMP-3.         TRA00240
001449C*             10 T25XX-WS-RV-INT-COSTS-AMORT  PIC S9(13)V9(4) COMP-3.         TRA00250
001450C*             10 T25XX-WS-RV-INT-COSTS-RENEW  PIC S9(13)V9(4) COMP-3.         TRA00260
001451C*             10 T25XX-WS-RV-INT-ADJ-AMT      PIC S9(13)V99   COMP-3.         TRA00270
001452C*    *                                                                        TRA00280
001453C*             10 T25XX-SUB                    PIC S9(4)       COMP.           TRA00290
001454C*             10 T25XX-WS-ENTRY-TIME          PIC 9(7).                       TRA00300
001455C*             10 FILLER REDEFINES T25XX-WS-ENTRY-TIME.                        TRA00310
001456C*                 15 FILLER                   PIC X(1).                       TRA00320
001457C*                 15 T25XX-WS-ENTRY-HH        PIC 9(2).                       TRA00330
001458C*                 15 T25XX-WS-ENTRY-MM        PIC 9(2).                       TRA00340
001459C*                 15 T25XX-WS-ENTRY-SS        PIC 9(2).                       TRA00350
001460C*             10 T25XX-WS-INT-RENEW-COST      PIC S9(13)V99   COMP-3.         TRA00360
001461C*             10 T25XX-WS-INT-ADJ-AMT         PIC S9(13)V99   COMP-3.         TRA00370
001462C*             10 T25XX-WS-MIN-EFF-INT-RATE    PIC S99V9(8)    COMP-3.         TRA00380
     16

001471==001220 COPY C3J61232.                                                        LBE01220
001472C*    *                                                                        C3J00010
001473C*    *    DATA GROUP 61232                                                    C3J00020
001474C*    *    I/O INTERFACES FOR EDITING OF DATE                                  C3J00030
001475C*    *                                                                        C3J00040
001476C*    *    INPUT OF 02(FEB) 31/04(APR) 31/... IS VALID WHEN                    C3J00050
001477C*    *    SPEC-EDIT-IND IS "Y   YES"   (OTHERWISE SET TO "N    NO")           C3J00060
001478C*    *                                                                        C3J00070
001479C*    01 C3J61232.                                                             C3J00080
001480C*         05 C61232-ACTION                   PIC XX.                          C3J00090
001481C*         05 C61232-RESULT                   PIC XX.                          C3J00100
001482C*    * INPUT                                                                  C3J00110
001483C*         05 C61232-INPUT-DATE-X.                                             C3J00120
001484C*             10 C61232-IN-CENTURY           PIC X.                           C3J00130
001485C*             10 C61232-INPUT-DATE.                                           C3J00140
001486C*                 15 C61232-IN-YEAR          PIC XX.                          C3J00150
001487C*                 15 C61232-IN-MONTH         PIC XX.                          C3J00160
001488C*                 15 C61232-IN-DAY           PIC XX.                          C3J00170
001489C*         05 C61232-SPEC-EDIT-IND            PIC X.                           C3J00180
001490C*         05 C61232-CORRECTION               PIC X.                           C3J00190
001491C*         05 C61232-REQ-MAND-IND             PIC X.                           C3J00200
001492C*         05 C61232-CORR-MAND-IND            PIC X.                           C3J00210
001493C*         05 C61232-FIELD-NO                 PIC S999   COMP-3.               C3J00220
001494C*    * OUTPUT                                                                 C3J00230
001495C*         05 C61232-OUT-DATE.                                                 C3J00240
001496C*             10 C61232-CENT-YEAR.                                            C3J00250
001497C*                 15 C61232-OUT-CENTURY      PIC X.                           C3J00260
001498C*                 15 C61232-OUT-YEAR         PIC XX.                          C3J00270
001499C*             10 C61232-OUT-MONTH            PIC XX.                          C3J00280
001500C*             10 C61232-OUT-DAY              PIC XX.                          C3J00290
001501C*         05 C61232-OUT-DATE-NUM REDEFINES C61232-OUT-DATE PIC 9(7).          C3J00300
001502C*    * WORK AREA                                                              C3J00310
001503C*         05 C61232-WS-MAND-IND              PIC X.                           C3J00320
001504C*         05 C61232-FILLER                   PIC X(50).                       C3J00330
     17

001506==001240 COPY C3J62008.                                                        LBE01240
001507C*000010*       Data group 62008                                               C3J00010
001508C*000020*       convert calendar date to output format.                        C3J00020
001509C*000030                                                                       C3J00030
001510C*000040 01 C3J62008.                                                          C3J00040
001511C*000050                                                                       C3J00050
001512C*000060     05 C62008-ACTION                 PIC XX.                          C3J00060
001513C*000070     05 C62008-RESULT                 PIC XX.                          C3J00070
001514C*000100                                                                       C3J00080
001515C*000110*INPUT:                                                                C3J00090
001516C*000120                                                                       C3J00100
001517C*000130     05 C62008-CALENDAR-DATE          PIC S9(7) COMP-3.                C3J00110
001518C*000200                                                                       C3J00120
001519C*000210*OUTPUT:                                                               C3J00130
001520C*000220                                                                       C3J00140
001521C*000230     05 C62008-DATE-DISPLAY-FORMAT    PIC X(9).                        C3J00150
     18

001523==001260 COPY C3J62010.                                                        LBE01260
001524C*000010*       Data group 62010                                               C3J00010
001525C*000020*       find the number of full periods between two given dates.      C3J00020
001526C*000030                                                                       C3J00030
001527C*000040 01 C3J62010.                                                          C3J00040
001528C*000050                                                                       C3J00050
001529C*000060     05 C62010-ACTION                 PIC XX.                          C3J00060
001530C*000070     05 C62010-RESULT                 PIC XX.                          C3J00070
```

```
001531C=000080                                                      C3J00080
001532C=000100= INPUT:                                              C3J00090
001533C=000110                                                      C3J00100
001534C=000120     05  C62010-FREQUENCY             PIC 99.          C3J00110
001535C=000120     05  C62010-START-DATE            PIC S9(7) COMP-3. C3J00120
001536C=000120     05  C62010-END-DATE              PIC S9(7) COMP-3. C3J00130
001537C=000130                                                      C3J00140
001538C=000200= OUTPUT:                                             C3J00150
001539C=000210                                                      C3J00160
001540C=000220     05  C62010-NO-OF-PERIOD          PIC S9(4) COMP.  C3J00170
      19

001542==001200 COPY C3J62000.                                       L3E01200
001543C=       *                                                    C3J00010
001544C=       *        DATA GROUP 62000             83/09/15       C3J00020
001545C=       *        STORE TRANSACTION BUSINESS DAY DATE AND     C3J00030
001546C=       *        THE COMMON PROCESSING DAILY RULE FOR THE BRANCH OF  C3J00040
001547C=       *        ACCOUNT (TRANSIT-LN)                        C3J00050
001548C=       *                                                    C3J00060
001549C=         01  C3J62000.                                      C3J00070
001550C=             05  C62000-ACTION                PIC XX.        C3J00080
001551C=             05  C62000-RESULT                PIC XX.        C3J00090
001552C=       * INPUT                                              C3J00100
001553C=             05  C62000-APPL-CODE             PIC X(2).      C3J00110
001554C=             05  C62000-TRANSIT               PIC 9(5).      C3J00120
001555C=             05  C62000-FILLER                PIC X(8).      C3J00130
001556C=             05  C62000-TRAN-ENTRY-TIMESTAMP.                C3J00140
001557C=                 10  C62000-TRAN-ENTRY-DATE   PIC S9(7) COMP-3. C3J00150
001558C=                 10  C62000-TRAN-ENTRY-TIME   PIC S9(7) COMP-3. C3J00160
001559C=       *     MEMO-INJ-IND                    (FROM C3J65252) C3J00170
001560C=       *     SOURCE-TYPE                     (FROM TCB)      C3J00180
001561C=                                                            C3J00190
001562C=       * OUTPUT/UPDATE                                      C3J00200
001563C=                                                            C3J00210
001564C=             05  C62000-TRAN-BUS-DAY          PIC S9(7) COMP-3. C3J00220
001565C=             05  C62000-BR-BUS-DAY-CURR       PIC S9(7) COMP-3. C3J00230
001566C=             05  C62000-BR-BUS-DAY-NEXT       PIC S9(7) COMP-3. C3J00240
001567C=             05  C62000-BR-BUS-DAY-BACK       PIC S9(7) COMP-3. C3J00250
001568C=             05  C62000-TRAN-PROC-MODE        PIC X.          C3J00260
001569C=       *                                                    C3J00270
001570C=       * COMMON BRANCH VARIABLES (BV01)                     C3J00280
001571C=       *                                                    C3J00290
001572C=             05  C62000-BV01.                                C3J00300
001573C=                 10  C62000-BV01-BR-DATE-POINTERS.           C3J00310
001574C=                     15  C62000-BV01-BR-DATE-POINTER OCCURS 10 TIMES C3J00320
001575C=                                                  PIC S9(3) COMP-3. C3J00330
001576C=                 10  FILLER REDEFINES C62000-BV01-BR-DATE-POINTERS. C3J00340
001577C=                     15  C62000-BV01-BR-DATE-POINTER-WN PIC S9(3) COMP-3. C3J00350
001578C=                     15  C62000-BV01-BR-DATE-POINTER-SE PIC S9(3) COMP-3. C3J00360
001579C=                     15  C62000-BV01-BR-DATE-POINTER-3J PIC S9(3) COMP-3. C3J00370
001580C=                     15  C62000-BV01-BR-DATE-POINTER-04 PIC S9(3) COMP-3. C3J00380
001581C=                     15  C62000-BV01-BR-DATE-POINTER-05 PIC S9(3) COMP-3. C3J00390
001582C=                     15  C62000-BV01-BR-DATE-POINTER-06 PIC S9(3) COMP-3. C3J00400
001583C=                     15  C62000-BV01-BR-DATE-POINTER-07 PIC S9(3) COMP-3. C3J00410
001584C=                     15  C62000-BV01-BR-DATE-POINTER-08 PIC S9(3) COMP-3. C3J00420
001585C=                     15  C62000-BV01-BR-DATE-POINTER-09 PIC S9(3) COMP-3. C3J00430
001586C=                     15  C62000-BV01-BR-DATE-POINTER-10 PIC S9(3) COMP-3. C3J00440
001587C=                 10  C62000-BV01-BR-TIME-ZONE    PIC 9(2).    C3J00450
001588C=                 10  C62000-BV01-BR-LANG-CODE    PIC 9.       C3J00460
001589C=                 10  C62000-BV01-BR-COMB-1.                  C3J00470
001590C=                     15  C62000-BV01-BR-COMB-2.              C3J00480
001591C=                         20  C62000-BV01-BR-DISTRICT PIC 9(2). C3J00490
001592C=                         20  C62000-BV01-BR-AREA     PIC 9(2). C3J00500
001593C=                     15  C62000-BV01-BR-REGION       PIC 9(2). C3J00510
001594C=                 10  C62000-BV01-BR-CPC              PIC 9(5). C3J00520
001595C=                 10  C62000-BV01-BR-RESIDENCE-CODE   PIC 9(4). C3J00530
      20

001596C=                 10  C62000-BV01-BR-PROC-STATUS   PIC X.      C3J00540
001597C=                 10  C62000-BV01-BR-ONLINE-CPC    PIC X.      C3J00550
001598C=                 10  C62000-BV01-BR-PARENT-TRANSIT PIC 9(5).  C3J00560
001599C=                 10  C62000-BV01-BR-DEL-ADV-TABLE.            C3J00570
001600C=                     15  C62000-BV01-BR-DEL-ADV-CODE PIC 9 OCCURS 3 TIMES. C3J00580
001601C=                 10  C62000-BV01-BR-ICA-FED-CONS   PIC 9(7).  C3J00590
001602C=                 10  C62000-BV01-BR-ICA-FED-COMM   PIC 9(7).  C3J00600
001603C=                 10  C62000-BV01-BR-ICA-PROV-CONS  PIC 9(7).  C3J00610
001604C=                 10  C62000-BV01-BR-ICA-PROV-COMM  PIC 9(7).  C3J00620
001605C=                 10  C62000-BV01-BR-INT-BASE-DAY   PIC 99.    C3J00630
001606C=                 10  C62000-BV01-BR-TRANSIT-TYPE   PIC X.     C3J00640
001607C=                 10  FILLER                        PIC X(221). C3J00650
001608C=       *                                                     C3J00660
001609C=       *     ICA = INT-CHG-ACCT                              C3J00670
001610C=       *                                                     C3J00680
001611C=       * WORK FIELDS:                                        C3J00690
001612C=       *                                                     C3J00700
001613C=             05  C62000-DATE-POINTER-X.                      C3J00710
001614C=                 10  C62000-DATE-POINTER          PIC 999.    C3J00720
001615C=             05  FILLER                           PIC X(20).  C3J00730
      21

001617==001300 COPY C9M62081.                                        L3E01300
001618C=       *                                                     C9M00010
001619C=       *        DATA GROUP 62081             83/09/15        C9M00020
001620C=       *        STORE TRANSACTION BUSINESS DAY DATE AND      C9M00030
001621C=       *        THE COMMON PROCESSING DAILY RULE FOR THE BRANCH OF  C9M00040
001622C=       *        SOURCE (TRANSIT-SRC)                         C9M00050
001623C=       *                                                     C9M00060
001624C=         01  C9M62081.                                       C9M00070
001625C=             05  C62081-ACTION                PIC XX.         C9M00080
001626C=             05  C62081-RESULT                PIC XX.         C9M00090
001627C=       * INPUT                                               C9M00100
```

```
001628C*          05  C62081-APPL-CODE                 PIC X(2).       C9H00110
001629C*          05  C62081-TRANSIT                   PIC 9(5).       C9H00120
001630C*          05  C62081-FILLER                    PIC X(8).       C9H00130
001631C*          05  C62081-TRAN-ENTRY-TIMESTAMP.                     C9H00140
001632C*              10  C62081-TRAN-ENTRY-DATE       PIC S9(7) COMP-3.C9H00150
001633C*              10  C62081-TRAN-ENTRY-TIME       PIC S9(7) COMP-3.C9H00160
001634C*      *   MEMO-INJ-IND                         (FROM C9H65252) C9H00170
001635C*      *   SOURCE-TYPE                          (FROM TCB)      C9H00180
001636C*                                                               C9H00190
001637C*      * OUTPUT/UPDATE                                          C9H00200
001638C*                                                               C9H00210
001639C*          05  C62081-TRAN-BUS-DAY              PIC S9(7) COMP-3.C9H00220
001640C*          05  C62081-BR-BUS-DAY-CURR           PIC S9(7) COMP-3.C9H00230
001641C*          05  C62081-BR-BUS-DAY-NEXT           PIC S9(7) COMP-3.C9H00240
001642C*          05  C62081-BR-BUS-DAY-BACK           PIC S9(7) COMP-3.C9H00250
001643C*          05  C62081-TRAN-PROC-MODE            PIC X.          C9H00260
001644C*      *                                                        C9H00270
001645C*      * COMMON BRANCH VARIABLES (BV01)                         C9H00280
001646C*      *                                                        C9H00290
001647C*          05  C62081-BV01.                                     C9H00300
001648C*              10  C62081-BV01-BR-DATE-POINTERS.                C9H00310
001649C*                  15  C62081-BV01-BR-DATE-POINTER OCCURS 10 TIMES C9H00320
001650C*                                                PIC S9(3) COMP-3.C9H00330
001651C*              10  FILLER REDEFINES C62081-BV01-BR-DATE-POINTERS.C9H00340
001652C*                  15  C62081-BV01-BR-DATE-POINTER-9M PIC S9(3) COMP-3.C9H00350
001653C*                  15  C62081-BV01-BR-DATE-POINTER-SE PIC S9(3) COMP-3.C9H00360
001654C*                  15  C62081-BV01-BR-DATE-POINTER-SJ PIC S9(3) COMP-3.C9H00370
001655C*                  15  C62081-BV01-BR-DATE-POINTER-04 PIC S9(3) COMP-3.C9H00380
001656C*                  15  C62081-BV01-BR-DATE-POINTER-05 PIC S9(3) COMP-3.C9H00390
001657C*                  15  C62081-BV01-BR-DATE-POINTER-06 PIC S9(3) COMP-3.C9H00400
001658C*                  15  C62081-BV01-BR-DATE-POINTER-07 PIC S9(3) COMP-3.C9H00410
001659C*                  15  C62081-BV01-BR-DATE-POINTER-08 PIC S9(3) COMP-3.C9H00420
001660C*                  15  C62081-BV01-BR-DATE-POINTER-09 PIC S9(3) COMP-3.C9H00430
001661C*                  15  C62081-BV01-BR-DATE-POINTER-10 PIC S9(3) COMP-3.C9H00440
001662C*              10  C62081-BV01-BR-TIME-ZONE         PIC 9(2).   C9H00450
001663C*              10  C62081-BV01-BR-LANG-CODE         PIC 9.      C9H00460
001664C*              10  C62081-BV01-BR-COMB-1.                       C9H00470
001665C*                  15  C62081-BV01-BR-COMB-2.                   C9H00480
001666C*                      20  C62081-BV01-BR-DISTRICT  PIC 9(2).   C9H00490
001667C*                      20  C62081-BV01-BR-AREA      PIC 9(2).   C9H00500
001668C*                  15  C62081-BV01-BR-REGION        PIC 9(2).   C9H00510
001669C*              10  C62081-BV01-BR-CPC               PIC 9(5).   C9H00520
001670C*              10  C62081-BV01-BR-RESIDENCE-CODE    PIC 9(4).   C9H00530

001671C*              10  C62081-BV01-BR-PROC-STATUS       PIC X.      C9H00540
001672C*              10  C62081-BV01-BR-ONLINE-CPC        PIC X.      C9H00550
001673C*              10  C62081-BV01-BR-PARENT-TRANSIT    PIC 9(5).   C9H00560
001674C*              10  C62081-BV01-BR-DEL-ADV-TABLE.                C9H00570
001675C*                  15  C62081-BV01-BR-DEL-ADV-CODE  PIC 9 OCCURS 3 TIMES.C9H00580
001676C*              10  C62081-BV01-BR-ICA-FED-CONS      PIC 9(7).   C9H00590
001677C*              10  C62081-BV01-BR-ICA-FED-COMM      PIC 9(7).   C9H00600
001678C*              10  C62081-BV01-BR-ICA-PROV-CONS     PIC 9(7).   C9H00610
001679C*              10  C62081-BV01-BR-ICA-PROV-COMM     PIC 9(7).   C9H00620
001680C*              10  C62081-BV01-BR-INT-BASE-DAY      PIC 99.     C9H00630
001681C*              10  C62081-BV01-BR-TRANSIT-TYPE      PIC X.      C9H00640
001682C*              10  FILLER                           PIC X(221). C9H00650
001683C*      *                                                        C9H00660
001684C*      *   ICA = INT-CHG-ACCT                                   C9H00670
001685C*      *                                                        C9H00680
001686C*      * WORK FIELDS:                                           C9H00690
001687C*      *                                                        C9H00700
001688C*          05  C62081-DATE-POINTER-X.                           C9H00710
001689C*              10  C62081-DATE-POINTER              PIC 999.    C9H00720
001690C*          05  FILLER                               PIC X(20).  C9H00730

001692**001320 COPY C9H62300.                                          LBE01320
001693C*                                                               C9H00010
001694C*      *                                                        C9H00020
001695C*      *     DATA GROUP 62300    84 04 30                       C9H00030
001696C*      *     VERIFY CONSISTENCY AND CAL EFF RATE FOR PROPOSED LN C9H00040
001697C*       01 C9H62300.                                            C9H00050
001698C*      *                                                        C9H00060
001699C*          05  C62300-ACTION                        PIC XX.     C9H00070
001700C*          05  C62300-RESULT                        PIC XX.     C9H00080
001701C*      *                                                        C9H00090
001702C*      * INPUT                                                  C9H00100
001703C*      *                                                        C9H00110
001704C*      *     1.   TRAN2504                                      C9H00120
001705C*      *     2.   TRAN2504                                      C9H00130
001706C*      *                                                        C9H00140
001707C*      * OUTPUT                                                 C9H00150
001708C*      *                                                        C9H00160
001709C*          05  C62300-EFF-INT-RATE             PIC S99V9(8) COMP-3.C9H00170
001710C*      *                                                        C9H00180
001711C*          05  C62300-MB-BASE-RATE             PIC S9V9(10) COMP-3.C9H00190
001712C*          05  C62300-FILLER                   PIC X(100). C9H00200

001714**001340 COPY C9H62405.                                          LBE01340
001715C**001000*                                                       C9H00010
     C 002000*          D A T A   G R O U P   62405                    C9H00020
     C 003000*                                                         C9H00030
     C 004000*     CONVERT INTEREST METHOD TO MNEMONICS                C9H00040
     C 005000*                                                         C9H00050
     C 006000*                                                         C9H00060
     C 007000 01 C9H62405.                                             C9H00070
     C 008000                                                          C9H00080
     C 009000     05  C62405-ACTION                    PIC XX.         C9H00090
     C 010000     05  C62405-RESULT                    PIC XX.         C9H00100
```

```
C 011000*
C 012000*      I N P U T                                                    C9H00110
C 013000*                                                                   C9H00120
C 014000           05  C62405-INT-METHOD         PIC XX.                    C9H00130
C 015000           05  C62405-LANG-CODE          PIC 9.                     C9H00140
C 016000*                                                                   C9H00150
C 017000*      O U T P U T                                                  C9H00160
C 018000*                                                                   C9H00170
C 019000           05  C62405-INT-METH-LIT       PIC XX.                    C9H00180
C 020000           05  C62405-INT-METH-DESC      PIC X(15).                 C9H00190
C 021000*                                                                   C9H00200
C 022000*      W O R K   A R E A                                            C9H00210
C 023000*                                                                   C9H00220
C 024000           05  C62405-IM-DATA.                                      C9H00230
C 025000               10  C62405-SUB            PIC S9(4)      COMP.       C9H00240
C 026000               10  C62405-COUNT          PIC S9(4)      COMP.       C9H00250
C 027000               10  C62405-IM-TABLE       OCCURS 25.                 C9H00260
C 028000                   15  C62405-IM-CODE    PIC XX.                    C9H00280
C 029000                   15  C62405-IM-LIT-E   PIC XX.                    C9H00290
C 030000                   15  C62405-IM-LIT-F   PIC XX.                    C9H00300
C 031000                   15  C62405-IM-DESC-E  PIC X(15).                 C9H00310
C 032000                   15  C62405-IM-DESC-F  PIC X(15).                 C9H00320
                                                                            25

032002**001360 COPY C9H64000.                                               LNE01360
032003C*001000*                                                             C9H00010
032004C*002000*        D A T A   G R O U P  64000                           C9H00020
032005C*003000*                                                             C9H00030
032006C*004000*        3600 DISPLAY OUTPUT INTERFACE PARAMETERS.            C9H00040
032007C*005000*                                        REVISION: JAN 25 84  C9H00050
032008C*006000*                                                             C9H00060
032009C*007000    01  C9H64000.                                             C9H00070
032010C*008000*                                                             C9H00080
032011C*009000        05  C64000-ACTION           PIC XX.                   C9H00090
032012C*010000        05  C64000-RESULT           PIC XX.                   C9H00100
032013C*011000*                                                             C9H00110
032014C*012000*   I N P U T                                                 C9H00120
032015C*013000*                                                             C9H00130
032016C*014000        05  C64000-DISPLAY-ACTIVITY-E  PIC XX.                C9H00140
032017C*015000        05  C64000-DISPLAY-ACTIVITY-F  PIC XX.                C9H00150
032018C*016000        05  C64000-LANGUAGE-CODE       PIC X.                 C9H00160
032019C*017000        05  C64000-PRINT-LN-MESS-IND   PIC X.                 C9H00170
032020C*018000        05  C64000-PRINT-BRCH-MESS-IND PIC X.                 C9H00180
032021C*019000        05  C64000-CALL-TYPE-IND       PIC X.                 C9H00190
032022C*020000*                                                             C9H00200
032023C*021000*   WORK-AREA                                                 C9H00210
032024C*022000*                                                             C9H00220
032025C*023000        05  C64000-FILLER              PIC X(120).            C9H00230
                                                                            26

032027**001380 COPY C9H64232.                                               LNE01380
032028C*       *                                                            C9H00010
032029C*       *   DATA GROUP 64232                              AS OF 21   C9H00020
032030C*       *   I/O INTERFACE FOR WRITING TRANSACTION LOG RECORD (REAL/MEMO) C9H00030
032031C*       *   (THE BMP COUNT KEY IS USED ONLY WHEN THE CALLING PROGRAM IS  C9H00040
032032C*       *    BMP )                                                   C9H00050
032033C*       *                                                            C9H00060
032034C*          01  C9H64232.                                             C9H00070
032035C*       *                                                            C9H00080
032036C*              05  C64232-ACTION           PIC XX.                   C9H00090
032037C*              05  C64232-RESULT           PIC XX.                   C9H00100
032038C*       *  INPUT                                                     C9H00110
032039C*              05  C64232-BMP-COUNT-KEY    PIC 9.                    C9H00120
032040C*              05  C64232-TRAN-TYPE        PIC X.                    C9H00130
032041C*                  88  C64232-TRAN-TYPE-INR    VALUE 'I'.            C9H00140
032042C*                  88  C64232-TRAN-TYPE-UPD    VALUE 'U'.            C9H00150
032043C*                  88  C64232-TRAN-TYPE-PROP   VALUE 'P'.            C9H00160
032044C*                  88  C64232-TRAN-TYPE-RPT    VALUE 'R'.            C9H00170
032045C*              05  C64232-LOG-IND          PIC X.                    C9H00180
032046C*                  88  C64232-LOG-IND-MANDATORY VALUE 'M'.           C9H00190
032047C*                  88  C64232-LOG-IND-OPTIONAL  VALUE 'O'.           C9H00200
032048C*              05  C64232-FILL-COMMON-IND  PIC X.                    C9H00210
032049C*                  88  C64232-FILL-COMMON-YES  VALUE 'Y'.            C9H00220
032050C*                  88  C64232-FILL-COMMON-NO   VALUE 'N'.            C9H00230
032051C*       *  OUTPUT                                                    C9H00240
032052C*       *    NONE                                                    C9H00250
032053C*       *  WORK AREA                                                 C9H00260
032054C*              05  C64232-ONLINE-KEY.                                C9H00270
032055C*                  10  C64232-ONLINE-KEY1  PIC X(6).                 C9H00280
032056C*                  10  C64232-ONLINE-KEY2  PIC 99.                   C9H00290
032057C*       *                                                            C9H00300
032058C*              05  C64232-BMP-KEY.                                   C9H00310
032059C*                  10  C64232-BMP-KEY1     PIC X(5).                 C9H00320
032060C*                  10  C64232-BMP-KEY2     PIC 99.                   C9H00330
032061C*                  10  C64232-BMP-KEY3     PIC 9.                    C9H00340
032062C*       *                                                            C9H00350
032063C*              05  C64232-NB-PROC-MODE     PIC X.                    C9H00360
032064C*       *                                                            C9H00370
032065C*              05  C64232-FILLER           PIC X(14).                C9H00380
                                                                            27

032067**001400 COPY C3J65003.                                               LNE01400
032068C*       *    Data group 65003                                        C3J0001
032069C*       *    record error codes and messages.                        C3J0002
032070C*       *                                      REVISION: MAY 17 83   C3J0003
032071C*       *                                                            C3J0004
032072C*          01  C3J65003.                                             C3J0005
032073C*       *                                                            C3J0006
032074C*              05  C65003-ACTION           PIC XX.                   C3J0007
032075C*              05  C65003-RESULT           PIC XX.                   C3J0008
032076C*       *                                                            C3J0009
032077C*          01  AUT:                                                  C3J0010
```

```
032078C*                                                           C3J001
032079C*         05 C65003-INPUT-ERROR-X.                          C3J001
032080C*             10 C65003-INPUT-ERROR       PIC 999.           C3J001
032081C*         05 C65003-TXN-BUSINESS-DATE     PIC S9(7) COMP-3.  C3J001
032082C*         05 C65003-APPLICATION-CODE      PIC XX.            C3J001
032083C*         05 C65003-LANGUAGE-CODE-X.                         C3J001
032084C*             10 C65003-LANGUAGE-CODE     PIC 9.             C3J001
032085C*    *                                                       C3J001
032086C*    *OUTPUT/UPDATE:                                         C3J001
032087C*    *                                                       C3J001
032088C*         05 C65003-ERROR-COUNT           PIC S999 COMP-3.   C3J00
032089C*         05 C65003-ERROR-CODE            PIC S999 COMP-3 OCCURS 10. C3J00
032090C*         05 C65003-ERROR-MESSAGE         PIC X(40)   OCCURS 10. C3J00
032091C*    *                                                       C3J00
032092C*    *WORK-AREA                                              C3J00
032093C*    *                                                       C3J00
032094C*         05 C65003-WORK-AREA             PIC X(50).         C3J00
032095C*    *                                                       C3J00
032096C*    *ADDITIONAL INPUT                                       C3J00
032097C*    *                                                       C3J00
032098C*         05 C65003-ERROR-MESS            PIC X(40).         C3J00
032099C*         05 C65003-ERROR-VAR-1           PIC X(20).         C3J00
032100C*         05 C65003-ERROR-VAR-2           PIC X(20).         C3J0C
032101C*         05 C65003-ERROR-VAR-3           PIC X(20).         C3J0C

032103**001420 COPY C3J65150.                                      LSE01420
032104C*    *                                                       C3J00010
032105C*    *                                                       C3J00020
032106C*    *   DATA GROUP 65150           REVISION DATE: 83/09/27  C3J00030
032107C*    *   THE TRANSACTION LOG RECORD    (FOR REAL AND MEMO LOG DB) C3J00040
032108C*    *   AND THE                                             C3J00050
032109C*    *   BATCH DAILY REAL TRANSACTION LOG (FOR DAILY REAL LOG DB) C3J00060
032110C*    *                                                       C3J00070
032111C*    *   THIS COPYBOOK IS IDENTICAL TO CSE65152 EXCEPT FOR THE C3J00080
032112C*    *   FIRST 10 BYTES                                      C3J00090
032113C*    *                                                       C3J00100
032114C*     01 C3J65150.                                           C3J00110
032115C*    *                                                       C3J00120
032116C*         05 C65150-TL-ACTION             PIC XX.            C3J00130
032117C*         05 C65150-TL-RESULT             PIC XX.            C3J00140
032118C*    *                                                       C3J00150
032119C*         05 C65150-TL-TRAN-LOG-RECORD.                      C3J00160
032120C*    *                                                       C3J00170
032121C*             10 C65150-TL-LOG-KEY.                          C3J00180
032122C*                 15 C65150-TL-TRAN-BUS-DAY     PIC S9(7) COMP-3. C3J00190
032123C*                 15 C65150-TL-MAST-TIMESTAMP-REAL.              C3J00200
032124C*                     20 C65150-TL-MAST-DATE-REAL  PIC S9(7) COMP-3. C3J00210
032125C*                     20 C65150-TL-MAST-TIME-REAL  PIC S9(7) COMP-3. C3J00220
032126C*                 15 C65150-TL-TRANSIT-REPORTING PIC X(5).    C3J00230
032127C*                 15 C65150-TL-TRANSIT-LN-X.                   C3J00240
032128C*                     20 C65150-TL-TRANSIT-LN    PIC 9(5).    C3J00250
032129C*                 15 C65150-TL-APPL-KEY.                       C3J00260
032130C*                     20 C65150-TL-ACCT-LN-NO.                 C3J00270
032131C*                         25 C65150-TL-ACCT-NO   PIC X(8).    C3J00280
032132C*                         25 C65150-TL-LN-NO     PIC X(3).    C3J00290
032133C*                     20 FILLER-1                PIC X(4).    C3J00300
032134C*                 15 C65150-TL-APPL-KEY1 REDEFINES C65150-TL-APPL-KEY. C3J00310
032135C*                     20 C65150-TL-AC-NO-SGMT.                 C3J00320
032136C*                         25 C65150-TL-AC-NO     PIC X(7).    C3J00330
032137C*                         25 C65150-TL-AC-SGMT   PIC X(3).    C3J00340
032138C*                     20 FILLER-2                PIC X(5).    C3J00350
032139C*                 15 C65150-TL-TRAN-SRC-CODE     PIC X.       C3J00360
032140C*                 15 C65150-TL-EMP-NAME          PIC X(8).    C3J00370
032141C*    *                                                       C3J00380
032142C*             10 C65150-TL-LOG-DATA.                          C3J00390
032143C*                 15 C65150-TL-LOG-RECORD-CODE   PIC X.       C3J00400
032144C*                     88 C65150-TL-LOG-REC-SEM        VALUE '0'. C3J00410
032145C*                     88 C65150-TL-LOG-REC-ONLINE     VALUE '1'. C3J00420
032146C*                     88 C65150-TL-LOG-REC-SECURITY   VALUE '2'. C3J00430
032147C*                     88 C65150-TL-LOG-REC-CYC-ON-REQ VALUE '3'. C3J00440
032148C*                     88 C65150-TL-LOG-REC-SCHED-UPDT VALUE '5'. C3J00450
032149C*                     88 C65150-TL-LOG-REC-TZ-PARM    VALUE 'T'. C3J00460
032150C*                 15 C65150-TL-TRAN-TYPE         PIC X.       C3J00470
032151C*                     88 C65150-TL-TRAN-TYPE-INQ      VALUE 'I'. C3J00480
032152C*                     88 C65150-TL-TRAN-TYPE-UPDT     VALUE 'U'. C3J00490
032153C*                     88 C65150-TL-TRAN-TYPE-PROP     VALUE 'P'. C3J00500
032154C*                     88 C65150-TL-TRAN-TYPE-RPT      VALUE 'R'. C3J00510
032155C*                 15 C65150-TL-ACCEPT-REJECT-IND PIC X.       C3J00520
032156C*                     88 C65150-TL-ACCEPT             VALUE 'A'. C3J00530

032157C*                     88 C65150-TL-OVERRIDE           VALUE 'O'. C3J00540
032158C*                     88 C65150-TL-REJECT             VALUE 'R'. C3J00550
032159C*                 15 C65150-TL-TRACE-NO          PIC S9(7) COMP-3. C3J00560
032160C*                 15 C65150-TL-TIME-ZONE         PIC 99.      C3J00570
032161C*    *                                                       C3J00580
032162C*                 15 C65150-TL-MORAN-TCB-DATA.                C3J00590
032163C*                     20 C65150-TL-PEM-TRAN-CODE.             C3J00600
032164C*                         25 C65150-TL-CO-ID     PIC XX.      C3J00610
032165C*                         25 C65150-TL-APPL-ID   PIC XX.      C3J00620
032166C*                         25 C65150-TL-FUNC-ID   PIC XX.      C3J00630
032167C*                         25 C65150-TL-SOURCE-TYPE PIC XX.    C3J00640
032168C*                     20 C65150-TL-TRANENTRY-TIMESTAMP.       C3J00650
032169C*                         25 C65150-TL-TRANENTRY-DATE  PIC S9(7) COMP-3. C3J00660
032170C*                         25 C65150-TL-TRANENTRY-TIME  PIC S9(7) COMP-3. C3J00670
032171C*                     20 C65150-TL-TCB-SOURCE       PIC X(8). C3J00680
032172C*                     20 C65150-TL-TCB-DESTINATION  PIC X(8). C3J00690
032173C*                     20 C65150-TL-TCB-DEVICE-TYPE  PIC X.    C3J00700
032174C*    *                                                       C3J00710
032175C*                 15 C65150-TL-RPT-INFO.                      C3J00720
032176C*                     20 C65150-TL-LIC              PIC X.    C3J00730
```

```
032177C=                    88 C65150-TL-NO-LIC-PRODUCED         VALUE '0'.     C3J00740
032178C=                    88 C65150-TL-LIC-PRODUCED            VALUE '1'.     C3J00750
032179C=                    88 C65150-TL-CLS-LIC-PRODUCED        VALUE '2'.     C3J00760
032180C=                    88 C65150-TL-CLS-LIC-AC-PRODUCED     VALUE '3'.     C3J00770
032181C=                    88 C65150-TL-AC-PRODUCED             VALUE '4'.     C3J00780
032182C=                    88 C65150-TL-AC-LIC-PRODUCED         VALUE '5'.     C3J00790
032183C=                 20 C65150-TL-RPT-CODE-COUNT     PIC S9      COMP-3.    C3J00800
032184C=                 20 C65150-TL-RPT-MESS-COUNT     PIC S9      COMP-3.    C3J00810
032185C=                 20 C65150-TL-RPT-CODE-IND       OCCURS 3 TIMES         C3J00820
032186C=                                                 PIC X.                 C3J00830
032187C= *  valid entries are F (forecast) U (unpostable) E (exception)         C3J00840
032188C=                 20 C65150-TL-RPT-CODE           OCCURS 3 TIMES         C3J00850
032189C=                                                 PIC S999 COMP-3.       C3J00860
032190C=                 20 C65150-TL-RPT-MESS-IND       OCCURS 3 TIMES         C3J00870
032191C=                                                 PIC X.                 C3J00880
032192C= *  valid entries are F (forecast) U (unpostable) E (exception)         C3J00890
032193C=                 20 C65150-TL-RPT-MESS           OCCURS 3 TIMES         C3J00900
032194C=                                                 PIC X(60).             C3J00910
032195C=                 20 C65150-TL-OVERLMT-IND        PIC X.                 C3J00920
032196C=                    88 C65150-TL-OVERLMT-NO-IND           VALUE '0'.    C3J00930
032197C=                    88 C65150-TL-OVERLMT-AC-IND           VALUE '1'.    C3J00940
032198C=                    88 C65150-TL-OVERLMT-LN-OFF-IND VALUE '2'.          C3J00950
032199C=                 20 C65150-TL-OVERLMT-AMT        PIC S9(13)V99          C3J00960
032200C=                                                             COMP-3.    C3J00970
032201C=                 20 C65150-TL-MIRLR-IND          PIC X.                 C3J00980
032202C=                    88 C65150-TL-MIRLR-OFF                VALUE '0'.    C3J00990
032203C=                    88 C65150-TL-MIRLR-ON                 VALUE '1'.    C3J01000
032204C=                 20 C65150-TL-LATE-PAYMENT-IND   PIC X.                 C3J01010
032205C=                    88 C65150-TL-LP-OFF                   VALUE '0'.    C3J01020
032206C=                    88 C65150-TL-LP-ON                    VALUE '1'.    C3J01030
032207C= *                                                                      C3J01040
032208C=              15 C65150-TL-TRAN-IMAGE.                                  C3J01050
032209C=                 20 C65150-TL-RNA-INPUT-HEADER   PIC X(9).              C3J01060
032210C=                 20 C65150-TL-TRAN-INPUT-HEADER.                        C3J01070
30

032211C=                    25 C65150-TL-TRANSIT-SRC     PIC X(5).              C3J01080
032212C=                    25 C65150-TL-PRINT-REQUEST   PIC X.                 C3J01090
032213C=                    25 C65150-TL-OVERRIDE-IND    PIC X.                 C3J01100
032214C=                    25 C65150-TL-CORRECTION-IND  PIC X.                 C3J01110
032215C=                    25 C65150-TL-TRAN-CODE       PIC X(3).              C3J01120
032216C=                    25 C65150-TL-OTHER-BR-ID     PIC X.                 C3J01130
032217C=                       88 C65150-TL-OTHER-BR-ID-NONE   VALUE '0'.       C3J01140
032218C=                       88 C65150-TL-OTHER-BR-ID-BR-BR   VALUE '1'.      C3J01150
032219C=                       88 C65150-TL-OTHER-BR-ID-HUB-SUB VALUE '2'.      C3J01160
032220C=                 20 C65150-TL-TRAN-FIELDS        PIC X(120).            C3J01170
032221C= *                                                                      C3J01180
032222C=              15 C65150-TL-APPL-MAINT-INFO       PIC X(120).            C3J01190
032223C= *                                                                      C3J01200
032224C=              15 C65150-TL-CNTL-TOT-DIFF         OCCURS 10 TIMES        C3J01210
032225C=                                                 PIC S9(13)V99          C3J01220
032226C=                                                             COMP-3.    C3J01230
032227C= *                                                                      C3J01240
032228C=              15 C65150-TL-MEMO-INJ-CTL-TOTS     OCCURS 10 TIMES        C3J01250
032229C=                                                 PIC S9(13)V99          C3J01260
032230C=                                                             COMP-3.    C3J01270
032231C= *                                                                      C3J01280
032232C=           10 C65150-TL-NON-ESSENTIAL-DATA.                             C3J01290
032233C=              15 C65150-TL-LOCALENTRY-TIMSTAMP.                         C3J01300
032234C=                 20 C65150-TL-LOCALENTRY-DATE    PIC S9(7) COMP-3.      C3J01310
032235C=                 20 C65150-TL-LOCALENTRY-TIME    PIC S9(7) COMP-3.      C3J01320
032236C=              15 C65150-TL-TRAN-BUS-DAY-SRC      PIC S9(7) COMP-3.      C3J01330
032237C=              15 C65150-TL-TRAN-BUS-DAY-LN       PIC S9(7) COMP-3.      C3J01340
032238C=              15 C65150-TL-MAST-TIMESTAMP-MEMO.                         C3J01350
032239C=                 20 C65150-TL-MAST-DATE-MEMO     PIC S9(7) COMP-3.      C3J01360
032240C=                 20 C65150-TL-MAST-TIME-MEMO     PIC S9(7) COMP-3.      C3J01370
032241C= *                                                                      C3J01380
032242C=           10 FILLER-3                           PIC X(65).             C3J01390
31

032244==001440 COPY C3J65251.                                                   LBE01440
032245C=001000                                                                  C3J00010
032246C=002000=     DATA GROUP 65251                                            C3J00020
032247C=003000=     TRANSACTION APPLICATION INPUT HEADER                        C3J00030
032248C=004000=                                                                 C3J00040
032249C=005000 01  C3J65251.                                                    C3J00050
032250C=006000=                                                                 C3J00060
032251C=007000     05  C65251-ACTION                    PIC XX.                 C3J00070
032252C=008000     05  C65251-RESULT                    PIC XX.                 C3J00080
032253C=009000=                                                                 C3J00090
032254C=010000     05  C65251-TRAN-INPUT-HEADER.                                C3J00100
032255C=011000         10  C65251-TRAN-CNTL-BYTE        PIC X.                  C3J00110
032256C=012000         10  C65251-TRANSIT-SRC           PIC X(5).               C3J00120
032257C=013000         10  C65251-PRINT-REQUEST         PIC X.                  C3J00130
032258C=014000         10  C65251-OVERRIDE-IND          PIC X.                  C3J00140
032259C=015000         10  C65251-CORRECTION-IND        PIC X.                  C3J00150
032260C=016000         10  C65251-TRAN-CODE             PIC X(3).               C3J00160
032261C=017000         10  C65251-APPL-KEY.                                     C3J00170
032262C=018000             15  C65251-ACCT-NO-X.                                C3J00180
032263C=019000                 20  C65251-ACCT-NO       PIC 9(8).               C3J00190
032264C=020000             15  C65251-LN-NO-X.                                  C3J00200
032265C=021000                 20  C65251-LN-NO         PIC 9(3).               C3J00210
032266C=022000         10  C65251-AC-KEY REDEFINES C65251-APPL-KEY.             C3J00220
032267C=023000             15  C65251-AC-FILLER         PIC X.                  C3J00230
032268C=024000             15  C65251-AC-NO-X.                                  C3J00240
032269C=025000                 20  C65251-AC-NO         PIC 9(7).               C3J00250
032270C=026000             15  C65251-AC-SGMT-NO-X.                             C3J00260
032271C=027000                 20  C65251-AC-SGMT-NO    PIC 9(3).               C3J00270
032272C=028000         10  C65251-OTHER-BR-ID           PIC X.                  C3J00280
032273C=029000=                                                                 C3J00290
032274C=030000         10  C65251-TESTING-INFO.                                 C3J00300
032275C=031000             15  C65251-TEST-RUN-NO       PIC 9(4).               C3J00310
032276C=032000             15  C65251-TEST-STEP-NO      PIC 9(3).               C3J00320
```

```
C 033000           15  C65251-TEST-CASE-NO      PIC 9(4).         C3J00330
C 034000           15  C65251-TEST-DATE         PIC 9(7).         C3J00340
C 035000           15  C65251-TEST-TIME         PIC 9(6).         C3J00350
   32

035002==001460 COPY C3J65252.                                    LSE01460
035003C*      *                                                  C3J00010
035004C*      *        DATA GROUP 65252                          C3J00020
035005C*      *        STANDARD TRANSACTION FIELDS               C3J00030
035006C*      *        (IF TRANSACTION IS BR-TO-BR THEN FIELD "TRANSIT-LN"  C3J00040
035007C*      *         MAY BE UPDATED BY L9N62050)              C3J00050
035008C*      *                                                  C3J00060
035009C*         01  C3J65252.                                   C3J00070
035010C*      *                                                  C3J00080
035011C*             05  C65252-ACTION            PIC XX.        C3J00090
035012C*             05  C65252-RESULT            PIC XX.        C3J00100
035013C*      *                                                  C3J00110
035014C*             05  C65252-TRAN-MEMO-INJ-IND PIC X.         C3J00120
035015C*             05  C65252-TRAN-SRC-CODE     PIC X.         C3J00130
035016C*             05  C65252-TRAN-TRANSIT-LN   PIC X(5).      C3J00140
035017C*             05  C65252-TRAN-FIELDS       PIC X(120).    C3J00150

035019==001480 COPY TRAN2SX.                                     LSE01480
035020C*      *                                                  TRA00010
035021C*      *        COPYBOOK TRAN2SX             04 04 15     TRA00020
035022C*      *        COMMON FOR TXN 250, 251, ....            TRA00030
035023C*      *                                                  TRA00040
035024C*      *        (HOGAN MUST INIT. ALL FIELDS TO HIGH VALUES)  TRA00050
035025C*      *                                                  TRA00060
035026C*         01  TRAN2SX REDEFINES C3J65252.                 TRA00070
035027C*             05  FILLER                   PIC X(11).     TRA00080
035028C*             05  T2SX-TRAN-APPL-DATA.                    TRA00090
035029C*                 10  T2SX-TRAN-INT-RATE-X.               TRA00100
035030C*                     15  T2SX-TRAN-INT-RATE   PIC V9(8). TRA00110
035031C*                 10  T2SX-TRAN-RULE-RATE-INFO.           TRA00120
035032C*                     15  T2SX-TRAN-INT-RULE     PIC XX.  TRA00130
035033C*                     15  T2SX-TRAN-INT-RATE-IND PIC X.   TRA00140
035034C*                 10  T2SX-TRAN-FREQ-RATE-INFO.           TRA00150
035035C*                     15  T2SX-TRAN-PYMT-FREQ    PIC XX.  TRA00160
035036C*                     15  T2SX-TRAN-FIRST-PDD-X.          TRA00170
035037C*                         20  T2SX-TRAN-FIRST-PDD-C  PIC X.  TRA00180
035038C*                         20  T2SX-TRAN-FIRST-PDD-YMD.    TRA00190
035039C*                             25  T2SX-TRAN-FIRST-PDD-Y PIC XX.  TRA00200
035040C*                             25  T2SX-TRAN-FIRST-PDD-M PIC XX.  TRA00210
035041C*                             25  T2SX-TRAN-FIRST-PDD-D PIC XX.  TRA00220
035042C*                     15  T2SX-TRAN-FIRST-PDD   REDEFINES  TRA00230
035043C*                         T2SX-TRAN-FIRST-PDD-X  PIC 9(7).  TRA00240
035044C*                 10  T2SX-TRAN-PROCEEDS-X.               TRA00250
035045C*                     15  T2SX-TRAN-PROCEEDS   PIC 9(13)V99.  TRA00260
035046C*                 10  T2SX-TRAN-AMORT-RENEW-TERM.         TRA00270
035047C*                     15  T2SX-TRAN-AMORT-TERM-X.         TRA00280
035048C*                         20  T2SX-TRAN-AMORT-TERM  PIC 999.  TRA00290
035049C*                     15  T2SX-TRAN-INT-RENEW-TERM-X.     TRA00300
035050C*                         20  T2SX-TRAN-INT-RENEW-TERM  PIC 999.  TRA00310
035051C*                 10  T2SX-TRAN-PYMT-AMT-REG-X.           TRA00320
035052C*                     15  T2SX-TRAN-PYMT-AMT-REG  PIC 9(13)V99.  TRA00330
035053C*                 10  T2SX-TRAN-STK-PRICE-RV-FACTOR REDEFINES  TRA00340
035054C*                     T2SX-TRAN-PYMT-AMT-REG-X.           TRA00350
035055C*                     15  T2SX-TRAN-STICKER-PRICE-X.      TRA00360
035056C*                         20  T2SX-TRAN-STICKER-PRICE  PIC 9(11)V99.  TRA00370
035057C*                     15  T2SX-TRAN-RV-FACTOR-X.          TRA00380
035058C*                         20  T2SX-TRAN-RV-FACTOR  PIC V99.  TRA00390
035059C*                 10  T2SX-TRAN-INT-METHOD   PIC XX.      TRA00400
035060C*                 10  T2SX-TRAN-START-ADJ-DATE.           TRA00410
035061C*                     15  T2SX-TRAN-START-DATE-X.         TRA00420
035062C*                         20  T2SX-TRAN-START-DATE-C  PIC X.  TRA00430
035063C*                         20  T2SX-TRAN-START-DATE-YMD.   TRA00440
035064C*                             25  T2SX-TRAN-START-DATE-Y  PIC XX.  TRA00450
035065C*                             25  T2SX-TRAN-START-DATE-M  PIC XX.  TRA00460
035066C*                             25  T2SX-TRAN-START-DATE-D  PIC XX.  TRA00470
035067C*                     15  T2SX-TRAN-START-DATE  REDEFINES  TRA00480
035068C*                         T2SX-TRAN-START-DATE-X  PIC 9(7).  TRA00490
035069C*                     15  T2SX-TRAN-INT-ADJ-DATE-X.       TRA00500
035070C*                         20  T2SX-TRAN-INT-ADJ-DATE-C  PIC X.  TRA00510
035071C*                         20  T2SX-TRAN-INT-ADJ-DATE-YMD.  TRA00520
035072C*                             25  T2SX-TRAN-INT-ADJ-DATE-Y  PIC XX.  TRA00530
   34

035073C*                             25  T2SX-TRAN-INT-ADJ-DATE-M  PIC XX.  TRA00540
035074C*                             25  T2SX-TRAN-INT-ADJ-DATE-D  PIC XX.  TRA00550
035075C*                     15  T2SX-TRAN-INT-ADJ-DATE  REDEFINES  TRA00560
035076C*                         T2SX-TRAN-INT-ADJ-DATE-X  PIC 9(7).  TRA00570
035077C*                 10  T2SX-TRAN-PERC-RATE-FACTOR-X.       TRA00580
035078C*                     15  T2SX-TRAN-PERC-RATE-FACTOR  PIC 9V9(6).  TRA00590
   36

035126==001560 COPY CSE182.                                      LSE01560
035127C*      *        CMS FILE CSE182                           CSE00010
035128C*      *        USED AS LINKAGE SECTION TO FORTRAN MODULES  CSE00020
035129C*      *        CALC. AMORT. TERM FOR BLENDED NON CAP.    CSE00030
035130C*      *                                                  CSE00040
035131C*      *        A - INT-AMT-PR-PAY                        CSE00050
035132C*      *        D - DAYS-PR-OUT                           CSE00060
035133C*      *        F - FREQ-PAY-MADE                         CSE00070
035134C*      *        G - AMT-ACC-INT-NCAP                      CSE00080
035135C*      *        I - ANN-NOM-INT-RATE                      CSE00090
035136C*      *        P - AMT-SCH-PAY                           CSE00100
035137C*      *        Z - NO-DAYS-BASE-YR                       CSE00110
035138C*      *        K - DL-INT-RATE                           CSE00120
035139C*      *        R - PAY-FREQ-INT-RATE                     CSE00130
```

```
035140C*   *                                                    CSE00140
035141C*      01 CSE182 REDEFINES C9M65255.                     CSE00150
035142C*   *                                                    CSE00160
035143C*         05 FILLER                    PIC X(4).         CSE00170
035144C*   *** INPUT                                            CSE00180
035145C*         05 CSE182-INPUT.                               CSE00190
035146C*   *                                                    CSE00200
035147C*            10 CSE182-A                COMP-2.           CSE00210
035148C*            10 CSE182-D                PIC S9(8) COMP.   CSE00220
035149C*            10 CSE182-F                PIC S9(8) COMP.   CSE00230
035150C*            10 CSE182-G                COMP-2.           CSE00240
035151C*            10 CSE182-I                COMP-2.           CSE00250
035152C*            10 CSE182-P                COMP-2.           CSE00260
035153C*            10 CSE182-Z                PIC S9(8) COMP.   CSE00270
035154C*   *  USED INTERNALLY TO CALL OTHER FORTRAN MODULES (NOT TO BE  CSE00280
035155C*   *  SET UP BY CALLING MODULE)                         CSE00290
035156C*            10 CSE182-K                COMP-2.           CSE00300
035157C*            10 CSE182-R                COMP-2.           CSE00310
035158C*   *** OUTPUT AREA                                      CSE00320
035159C*         05 CSE182-OUTPUT.                              CSE00330
035160C*            10 CSE182-TERM-REMAIN-X.                    CSE00340
035161C*               15 CSE182-TERM-REMAIN   COMP-2.           CSE00350
035162C*   *** WORKAREA                                         CSE00360
035163C*         05 CSE182-WORKAREA.                            CSE00370
035164C*            10 CSE182-T                COMP-2.           CSE00380
035165C*            10 CSE182-U                COMP-2.           CSE00390
035166C*            10 CSE182-V                PIC S9(8) COMP.   CSE00400
035167C*            10 CSE182-W                COMP-2.           CSE00410
035168C*            10 CSE182-X                COMP-2.           CSE00420
035169C*            10 CSE182-Y                COMP-2.           CSE00430
  36

035101**001520 COPY C3J65254.                                   L5E01520
035102C*   *                                                    C3J00010
035103C*   *       DATA GROUP 65254                             C3J00020
035104C*   *       TRANSACTION APPLICATION OUTPUT HEADER        C3J00030
035105C*   *                                                    C3J00040
035106C*      01 C3J65254.                                      C3J00050
035107C*   *                                                    C3J00060
035108C*         05 C65254-ACTION              PIC XX.          C3J00070
035109C*         05 C65254-RESULT              PIC XX.          C3J00080
035110C*   *                                                    C3J00090
035111C*         05 C65254-TRAN-APPL-OUTPUT-HEADER.             C3J00100
035112C*            10 C65254-OVERRIDE-LEVEL-IND  PIC X.        C3J00110
035113C*            10 C65254-CLEAR-SCREEN-IND   PIC X.         C3J00120
  37

035115**001540 COPY C9M65255.                                   L5E01540
035116C*   *                                                    C9M00010
035117C*   *       DATA GROUP   65255                           C9M00020
035118C*   *       DATA GROUP USED AS LINKAGE SECTION TO FORTRAN MODULES  C9M00030
035119C*   *                                                    C9M00040
035120C*      01 C9M65255.                                      C9M00050
035121C*   *                                                    C9M00060
035122C*         05 C65255-ACTION              PIC XX.          C9M00070
035123C*         05 C65255-RESULT              PIC XX.          C9M00080
035124C*   *** INPUT                                            C9M00090
035125C*         05 C65255-DATA                PIC X(500).      C9M00090
  38

035126**001560 COPY CSE182.                                     L5E01560
035127C*   *  CMS FILE CSE182                                   CSE00010
035128C*   *     USED AS LINKAGE SECTION TO FORTRAN MODULES     CSE00020
035129C*   *     CALC. AMORT. TERM FOR BLENDED NON CAP.         CSE00030
035130C*   *                                                    CSE00040
035131C*   *     A - INT-AMT-PR-PAY                             CSE00050
035132C*   *     D - DAYS-PR-OUT                                CSE00060
035133C*   *     F - FREQ-PAY-MADE                              CSE00070
035134C*   *     G - AMT-ACC-INT-NCAP                           CSE00080
035135C*   *     I - ANN-NOM-INT-RATE                           CSE00090
035136C*   *     P - AMT-SCH-PAY                                CSE00100
035137C*   *     Z - NO-DAYS-BASE-YR                            CSE00110
035138C*   *     K - DL-INT-RATE                                CSE00120
035139C*   *     R - PAY-FREQ-INT-RATE                          CSE00130
035140C*   *                                                    CSE00140
035141C*      01 CSE182 REDEFINES C9M65255.                     CSE00150
035142C*   *                                                    CSE00160
035143C*         05 FILLER                    PIC X(4).         CSE00170
035144C*   *** INPUT                                            CSE00180
035145C*         05 CSE182-INPUT.                               CSE00190
035146C*   *                                                    CSE00200
035147C*            10 CSE182-A                COMP-2.           CSE00210
035148C*            10 CSE182-D                PIC S9(8) COMP.   CSE00220
035149C*            10 CSE182-F                PIC S9(8) COMP.   CSE00230
035150C*            10 CSE182-G                COMP-2.           CSE00240
035151C*            10 CSE182-I                COMP-2.           CSE00250
035152C*            10 CSE182-P                COMP-2.           CSE00260
035153C*            10 CSE182-Z                PIC S9(8) COMP.   CSE00270
035154C*   *  USED INTERNALLY TO CALL OTHER FORTRAN MODULES (NOT TO BE  CSE00280
035155C*   *  SET UP BY CALLING MODULE)                         CSE00290
035156C*            10 CSE182-K                COMP-2.           CSE00300
035157C*            10 CSE182-R                COMP-2.           CSE00310
035158C*   *** OUTPUT AREA                                      CSE00320
035159C*         05 CSE182-OUTPUT.                              CSE00330
035160C*            10 CSE182-TERM-REMAIN-X.                    CSE00340
035161C*               15 CSE182-TERM-REMAIN   COMP-2.           CSE00350
035162C*   *** WORKAREA                                         CSE00360
035163C*         05 CSE182-WORKAREA.                            CSE00370
035164C*            10 CSE182-T                COMP-2.           CSE00380
035165C*            10 CSE182-U                COMP-2.           CSE00390
035166C*            10 CSE182-V                PIC S9(8) COMP.   CSE00400
035167C*            10 CSE182-W                COMP-2.           CSE00410
035168C*            10 CSE182-X                COMP-2.           CSE00420
035169C*            10 CSE182-Y                COMP-2.           CSE00430
```

```
035171**001580 COPY CSE183.                                        LSE01580
035172C*      *    CMS FILE CSE183                                 CSE00010
035173C*      *       USED AS LINKAGE SECTION TO FORTRAN MODULES   CSE00020
035174C*      *       CALC. AVE. PAYMENT AMT. FOR BLENDED          CSE00030
035175C*      *                                                    CSE00040
035176C*      *       A - INT-AMT-PR-PAY                           CSE00050
035177C*      *       D - DAYS-PR-OUT                              CSE00060
035178C*      *       M - COMP-OL-INT-RATE                         CSE00070
035179C*      *       N - NO-SCH-PAY                               CSE00080
035180C*      *       O - COMP-APP-INT-RATE                        CSE00090
035181C*      *       I - ANN-NOM-INT-RATE                         CSE00100
035182C*      *       C - FREQ-INT-COMP                            CSE00110
035183C*      *       F - FREQ-PAY-MADE                            CSE00120
035184C*      *       Z - NO-DAYS-BASE-YR                          CSE00130
035185C*      *                                                    CSE00140
035186C*       01  CSE183 REDEFINES C9N65255.                      CSE00150
035187C*      *                                                    CSE00160
035188C*           05 FILLER                      PIC X(4).        CSE00170
035189C* *** INPUT                                                 CSE00180
035190C*           05 CSE183-INPUT.                                CSE00190
035191C*      *                                                    CSE00200
035192C*               10 CSE183-A                COMP-2.          CSE00210
035193C*               10 CSE183-D                PIC S9(8) COMP.  CSE00220
035194C*               10 CSE183-M                COMP-2.          CSE00230
035195C*               10 CSE183-N                PIC S9(8) COMP.  CSE00240
035196C*               10 CSE183-O                COMP-2.          CSE00250
035197C*               10 CSE183-I                COMP-2.          CSE00260
035198C*               10 CSE183-C                PIC S9(8) COMP.  CSE00270
035199C*               10 CSE183-F                PIC S9(8) COMP.  CSE00280
035200C*               10 CSE183-Z                PIC S9(8) COMP.  CSE00290
035201C*      * PARAMETERS M AND O ARE NOT TO BE SET BY CALLING MODULE. THEY CSE00300
035202C*      * ARE USED INTERNALLY TO CALL OTHER FORTRAN MODULES. CSE00310
035203C* *** OUTPUT AREA                                           CSE00320
035204C*           05 CSE183-OUTPUT.                               CSE00330
035205C*               10 CSE183-AVE-PYMT-AMT-X.                   CSE00340
035206C*                 15 CSE183-AVE-PYMT-AMT   COMP-2.          CSE00350

035208**001600 PROCEDURE DIVISION USING  TRANSACTION-CONTROL-BLOCK LSE01600
035209**001610                           CSE51965                  LSE01610
035210**001620                           CSE51979                  LSE01620
035211**001630                           C3J60300                  LSE01630
035212**001640                           C3J61232                  LSE01640
035213**001650                           C3J62008                  LSE01650
035214**001660                           C3J62010                  LSE01660
035215**001670                           C3J62080                  LSE01670
035216**001680                           C9N62081                  LSE01680
035217**001690                           C9N62380                  LSE01690
035218**001700                           C9N62405                  LSE01700
035219**001710                           C9N64008                  LSE01710
035220**001720                           C9N64232                  LSE01720
035221**001730                           C3J65003                  LSE01730
035222**001740                           C3J65150                  LSE01740
035223**001750                           C3J65251                  LSE01750
035224**001760                           C3J65252                  LSE01760
035225**001770                           C3J65253                  LSE01770
035226**001780                           C3J65254                  LSE01780
035227**001790                           C9N65255.                 LSE01790

035229**001810 000-MAINLINE.                                       LSE01810

035231**001830     MOVE MS-ONLINE  TO  TCB-SOURCE-TYPE.            LSE01830

035233**001850     PERFORM A100-INITIALIZATION.                    LSE01850

035235**001870     IF C65150-TL-ACCEPT                             LSE01870
035236**001880         PERFORM B100-EDIT-INPUT-DATA.               LSE01880

035238**001900     IF C65150-TL-ACCEPT                             LSE01900
035239**001910         PERFORM C100-CALC-EFF-INT-RATE.             LSE01910

035241**001930     IF C65150-TL-ACCEPT                             LSE01930
035242**001940         PERFORM D100-CAL-PROPOSED-REG-PYMT-AMT.     LSE01940

035244**001960     IF C65150-TL-ACCEPT                             LSE01960
035245**001970         PERFORM E100-CAL-COST-OF-PROPOSED-LOAN.     LSE01970

035247**001990     IF C65150-TL-ACCEPT                             LSE01990
035248**002000         PERFORM F100-CAL-BUY-BACK-CAR-LN-FIELD.     LSE02000

035250**002020     PERFORM G100-WRITE-TRAN-LOG-REC.                LSE02020

035252**002040     PERFORM H100-DISPLAY-PYMT-PROPOSAL.             LSE02040

035254**002060     PERFORM Z300-END-PROGRAM.                       LSE02060

035256**002080     STOP RUN.                                       LSE02080
```

```
035258**002100 A100-INITIALIZATION SECTION.                              LSE0210

035260**002120      PERFORM A110-ALLOC-DB.                                LSE0212

035262**002140      PERFORM A120-DEBLOCK-MAP-OBE254MA.                    LSE0214

035264**002160      PERFORM A130-SET-UP-TRAN-FIELDS.                      LSE0216

035266**002180      PERFORM A140-INIT-ONLINE-TRANS.                       LSE0218

035268**002200      PERFORM A150-INIT-TRANS.                              LSE0220

035270**002220      PERFORM A160-INIT-WORK-FIELDS.                        LSE0222

035272**002240      IF  C65251-CORRECTION-IND = SPACES OR HIGH-VALUES     LSE0224
035273**002250          MOVE 'N' TO C65251-CORRECTION-IND.                LSE0225

035275**002270      IF  C65251-OVERRIDE-IND  = SPACES OR HIGH-VALUES      LSE0227
035276**002280          MOVE '0' TO C65251-OVERRIDE-IND.                  LSE0228

035278**002300      IF  C65251-ACCT-NO-X = HIGH-VALUES                    LSE0230
035279**002310          MOVE 0   TO C65251-ACCT-NO.                       LSE0231

035281**002330      IF  C65251-LN-NO-X = HIGH-VALUES                      LSE0233
035282**002340          MOVE 0  TO C65251-LN-NO.                          LSE0234

035284**002360 A100-EXIT.                                                 LSE0236

035286**002380      EXIT.                                                 LSE0238

035288**002400 A110-ALLOC-DB SECTION.                                     LSE0

035290**002420      MOVE MS-ALLOC-DB-ACT  TO  TCB-ACTIVITY.               LSE0
035291**002430      PERFORM Z100-CALL-PEM.                                LSE0

035293**002450 A110-EXIT.                                                 LSE0

035295**002470      EXIT.                                                 LSE0

035298**002500 A120-DEBLOCK-MAP-OBE254MA SECTION.                         LSE0

035300**002520      MOVE MS-DEBLOCK-MAP-ACT  TO  TCB-ACTIVITY.            LSE0
035301**002530      PERFORM Z100-CALL-PEM.                                LSE0

035303**002550 A120-EXIT.                                                 LSE0

035305**002570      EXIT.                                                 LSE0

035308**002600 A130-SET-UP-TRAN-FIELDS SECTION.                           LSE02600

035310**002620      MOVE C5196S-TRAN-TRANSIT-LN      TO  C65252-TRAN-TRANSIT-LN.  LSE02620
035311**002630      MOVE C5196S-TRAN-INT-RATE-X      TO  T25X-TRAN-INT-RATE-X.    LSE02630
035312**002640      MOVE C5196S-TRAN-RULE-RATE-INFO  TO  T25X-TRAN-RULE-RATE-INFO.LSE02640
035313**002650      MOVE C5196S-TRAN-PYMT-FREQ       TO  T25X-TRAN-PYMT-FREQ.     LSE02650
035314**002660      MOVE C5196S-TRAN-FIRST-PDD-M     TO  T25X-TRAN-FIRST-PDD-M.   LSE02660
035315**002670      MOVE C5196S-TRAN-FIRST-PDD-D     TO  T25X-TRAN-FIRST-PDD-D.   LSE02670
035316**002680      MOVE C5196S-TRAN-FIRST-PDD-Y     TO  T25X-TRAN-FIRST-PDD-Y.   LSE02680
035317**002690      MOVE C5196S-TRAN-PROCEEDS-X      TO  T25X-TRAN-PROCEEDS-X.    LSE02690
035318**002700      MOVE C5196S-TRAN-INT-METHOD      TO  T25X-TRAN-INT-METHOD.    LSE02700
035319**002710      MOVE C5196S-TRAN-ST-DT-M         TO  T25X-TRAN-START-DATE-M.  LSE02710
035320**002720      MOVE C5196S-TRAN-ST-DT-D         TO  T25X-TRAN-START-DATE-D.  LSE02720
035321**002730      MOVE C5196S-TRAN-ST-DT-Y         TO  T25X-TRAN-START-DATE-Y.  LSE02730
035322**002740      MOVE C5196S-TRAN-ADJ-DT-M        TO  T25X-TRAN-INT-ADJ-DATE-M.LSE02740
035323**002750      MOVE C5196S-TRAN-ADJ-DT-D        TO  T25X-TRAN-INT-ADJ-DATE-D.LSE02750
035324**002760      MOVE C5196S-TRAN-ADJ-DT-Y        TO  T25X-TRAN-INT-ADJ-DATE-Y.LSE02760

035326**002780      MOVE C5196S-TRAN-AMORT-RENEW-TERM  TO                 LSE02780
035327**002790          T25X-TRAN-AMORT-RENEW-TERM.                       LSE02790
035328**002800      MOVE C5196S-TRAN-STK-PRICE-RV-FACTR  TO               LSE02800
035329**002810          T25X-TRAN-STK-PRICE-RV-FACTOR.                    LSE02810

035331**002830      IF  C5196S-TRAN-PERC-RATE-FACTOR-X = HIGH-VALUES      LSE02830
035332**002840          MOVE HIGH-VALUES TO T25X-TRAN-PERC-RATE-FACTOR-X  LSE02840
035333**002850      ELSE                                                  LSE02850
035334**002860          MOVE C5196S-TRAN-PERC-RATE-FACTOR   TO            LSE02860
035335**002870              T25X-TRAN-PERC-RATE-FACTOR.                   LSE02870

035337**002890 A130-EXIT.                                                 LSE02890

035339**002910      EXIT.                                                 LSE02910
```

```
035341**002930 A140-INIT-ONLINE-TRANS SECTION.

035343**002950    MOVE MS-INIT-ONLINE-TRAN-RTN  TO  TCB-ACTIVITY.
035344**002960    PERFORM Z100-CALL-PEM.

035346**002980 A140-EXIT.

035348**003000    EXIT.

035351**003030 A150-INIT-TRANS SECTION.

035353**003050    MOVE MS-INIT-SETUP-RTN       TO  TCB-ACTIVITY.
035354**003060    PERFORM Z100-CALL-PEM.

035356**003080 A150-EXIT.

035358**003100    EXIT.

035361**003130 A160-INIT-WORK-FIELDS SECTION.

035363**003150    MOVE SPACES TO TRAN2D04-WORK-AREA.

035365**003170    MOVE 0      TO T25D04-PROP-PROCEEDS-AMT
035366**003180                   T25D04-PROP-PYMT-AMT-REG
035367**003190                   T25D04-PROP-AMORT-TERM
035368**003200                   T25D04-PROP-AMORT-COSTS
035369**003210                   T25D04-PROP-INT-REN-TERM-COSTS
035370**003220                   T25D04-PROP-INT-ADJ-AMT
035371**003230                   T25D04-MS-FACTOR
035372**003240                   T25D04-MS-INT-RATE-ADDN
035373**003250                   T25D04-MS-AMORT-TERM
035374**003260                   T25D04-MS-INT-RENEM-TERM
035375**003270                   T25D04-MS-RES-VALUE
035376**003280                   T25D04-MS-RV-PYMT-FREQ-INT
035377**003290                   T25D04-MS-RV-INT-COSTS-AMORT
035378**003300                   T25D04-MS-RV-INT-COSTS-RENEM
035379**003310                   T25D04-MS-RV-INT-ADJ-AMT
035380**003320                   T25D04-MS-INT-RENEM-COST
035381**003330                   T25D04-MS-INT-ADJ-AMT.

035383**003350 A160-EXIT.

035385**003370    EXIT.

035387**003390 B100-EDIT-INPUT-DATA SECTION.

035389**003410    PERFORM B110-EDIT-INT-RATE.

035391**003430    PERFORM B120-EDIT-INT-RULE.

035393**003450    PERFORM B130-EDIT-INT-RATE-IND.

035395**003470    PERFORM B140-EDIT-PYMT-FREQ.

035397**003490    PERFORM B150-EDIT-FIRST-PYMT-DUE-DATE.

035399**003510    PERFORM B160-EDIT-PROCEEDS-AMT.

035401**003530    PERFORM B170-EDIT-AMORT-TERM.

035403**003550    PERFORM B180-EDIT-INT-RENEM-TERM.

035405**003570    PERFORM B190-EDIT-STICKER-RV-FACTOR.

035407**003590    PERFORM B200-EDIT-INT-METHOD.

035409**003610    PERFORM B210-EDIT-START-DATE.

035411**003630    PERFORM B220-EDIT-INT-ADJ-DATE.

035413**003650    PERFORM B230-EDIT-PERC-RATE-FACTOR.

035415**003670 B100-EXIT.

035417**003690    EXIT.

035419**003710 B110-EDIT-INT-RATE SECTION.

035421**003730    IF T25X-TRAN-INT-RATE-X  NOT NUMERIC

035423**003750       MOVE 001 TO C65003-INPUT-ERROR
035424**003760       PERFORM Y100-CALL-COMMON-ERROR-RTN
035425**003770    ELSE
035426**003780       MOVE T25X-TRAN-INT-RATE TO T25D04-MS-INT-RATE-ADDN.
```

```
035428**003800 B110-EXIT.
035430**003820      EXIT.

035433**003850 B120-EDIT-INT-RULE  SECTION.

035435**003870      IF  T25X-TRAN-INT-RULE  NOT = MS-FIXED           AND
035436**003880                                 NOT = MS-RB-PRIME     AND
035437**003890                                 NOT = MS-PERSONAL-LN-RATE

035439**003910          MOVE 802 TO C65003-INPUT-ERROR
035440**003920          PERFORM Y100-CALL-COMMON-ERROR-RTN.

035442**003940 B120-EXIT.

035444**003960      EXIT.

035447**003990 B130-EDIT-INT-RATE-IND  SECTION.

035449**004010      IF  T25X-TRAN-INT-RATE-IND NOT = MS-POSITIVE     AND
035450**004020                                 NOT = HIGH-VALUES     AND
035451**004030                                 NOT = SPACES

035453**004050          MOVE 802 TO C65003-INPUT-ERROR
035454**004060          PERFORM Y100-CALL-COMMON-ERROR-RTN.

035456**004080 B130-EXIT.

035458**004100      EXIT.

035460**004120 B140-EDIT-PYMT-FREQ  SECTION.

035462**004140      IF  T25X-TRAN-PYMT-FREQ = HIGH-VALUES

035464**004160          MOVE MS-MONTHLY TO  T25X-TRAN-PYMT-FREQ
035465**004170      ELSE
035466**004180      IF  T25X-TRAN-PYMT-FREQ NOT = MS-MONTHLY

035468**004200          MOVE 803 TO C65003-INPUT-ERROR
035469**004210          PERFORM Y100-CALL-COMMON-ERROR-RTN.

035471**004230 B140-EXIT.

035473**004250      EXIT.

035476**004280 B150-EDIT-FIRST-PYMT-DUE-DATE  SECTION.

035478**004300      IF  T25X-TRAN-FIRST-PDD-YMD NOT = HIGH-VALUES  AND
035479**004310                                  NOT = SPACES

035481**004330          MOVE T25X-TRAN-FIRST-PDD-X  TO  C61232-INPUT-DATE-X
035482**004340          MOVE C65251-CORRECTION-IND  TO  C61232-CORRECTION
035483**004350          MOVE '0'                    TO  C61232-REG-MAND-IND
035484**004360                                          C61232-CORR-MAND-IND
035485**004370          MOVE 'Y'                    TO  C61232-SPEC-EDIT-IND
035486**004380          MOVE 3                      TO  C61232-FIELD-NO

035488**004400          MOVE MS-VERIFY-DATE-RTN     TO  TCB-ACTIVITY
035489**004410          PERFORM Z100-CALL-PEM

035491**004430          MOVE C61232-OUT-CENTURY     TO  T25X-TRAN-FIRST-PDD-C.

035493**004450 B150-EXIT.

035495**004470      EXIT.

035497**004490 B160-EDIT-PROCEEDS-AMT  SECTION.

035499**004510      IF  T25X-TRAN-PROCEEDS-X NOT NUMERIC

035501**004530          MOVE 804 TO C65003-INPUT-ERROR
035502**004540          PERFORM Y100-CALL-COMMON-ERROR-RTN.

035504**004560 B160-EXIT.

035506**004580      EXIT.
```

```
035509**004610 B170-EDIT-AMORT-TERM  SECTION.                            LSE04610

035511**004630        IF  T2EX-TRAN-AMORT-TERM-X  NOT =  '036'  AND       LSE04630
035512**004640                                    NOT =  '048'            LSE04640

035514**004660           MOVE 805  TO  C65003-INPUT-ERROR                 LSE04660
035515**004670           PERFORM Y100-CALL-COMMON-ERROR-RTN               LSE04670
035516**004680        ELSE                                                LSE04680
035517**004690           MOVE T2EX-TRAN-AMORT-TERM TO T2E04-PROP-AMORT-TERM. LSE04690

035519**004710 B170-EXIT.                                                 LSE04710

035521**004730        EXIT.                                               LSE04730
      50

035523**004750 B180-EDIT-INT-RENEW-TERM  SECTION.                         LSE04750

035525**004770        IF  T2EX-TRAN-INT-RENEW-TERM-X  NOT = HIGH-VALUES AND  LSE04770
035526**004780                                        NOT = SPACES       AND  LSE04780
035527**004790                                        NOT = '012'        AND  LSE04790
035528**004800                                        NOT = '024'        AND  LSE04800
035529**004810                                        NOT = '036'        AND  LSE04810
035530**004820                                        NOT = '048'             LSE04820

035532**004840           MOVE 805  TO  C65003-INPUT-ERROR                 LSE04840
035533**004850           PERFORM Y100-CALL-COMMON-ERROR-RTN.              LSE04850

035535**004870**                                                          LSE04870
035536**004880**       PROGRAM LINES 35550 TO 35584 REPRESENT THE DECISION BLOCK  LSE04880
035537**004890**       250, FIGURE 4 OF THE BUSINESS SYSTEM FLOW CHART. A DETER-  LSE04890
035538**004900**       MINATION AS TO WHETHER THE LOAN BEING GRANTED IS ON A     LSE04900
035539**004910**       FIXED INTEREST OR VARIABLE INTEREST RATE BASIS IS PERFORMED. LSE04910
035540**004920**       A FIXED RATE LOAN IS ONE FOR WHICH THE INTEREST RATE ESTA-  LSE04920
035541**004930**       BLISHED AT THE TIME A LOAN IS GRANTED REMAINS CONSTANT FOR  LSE04930
035542**004940**       A PRE-SET PERIOD OF TIME. A VARIABLE RATE LOAN IS ONE FOR   LSE04940
035543**004950**       WHICH THE INTEREST RATE ESTABLISHED AT THE TIME A LOAN IS   LSE04950
035544**004960**       GRANTED MAY FLUCTUATE PERIODICALLY DEPENDING ON PREVAILING  LSE04960
035545**004970**       ECONOMIC CONDITIONS.                                        LSE04970
035546**004980**                                                                   LSE04980
035547**004990                                                                     LSE04990
035548**005000        IF  C65150-TL-ACCEPT                                         LSE05000

035550**005020           IF  T2EX-TRAN-INT-RULE = MB-FIXED                         LSE05020

035552**005040              PERFORM B182-EDIT-INT-RENEW-TERM-FIXED                 LSE05040
035553**005050           ELSE                                                      LSE05050
035554**005060              PERFORM B184-EDIT-RENEW-TERM-NOT-FIXED.                LSE05060

035556**005080 B180-EXIT.                                                          LSE05080

035558**005100        EXIT.                                                        LSE05100

EJECT
035561**005130 B182-EDIT-INT-RENEW-TERM-FIXED  SECTION.                            LSE05130
035562**005140                                                                     LSE05140
035563**005150**                                                                   LSE05150
035564**005160**       PROGRAM LINES 35582 TO 35596 REPRESENT FUNCTIONAL BLOCKS    LSE05160
035565**005170**       260 AND 261, FIGURE 4 OF THE BUSINESS SYSTEM FLOW CHART,    LSE05170
035566**005180**       HAVING ALREADY DETERMINED THAT THE LOAN WILL BE ESTABLISHED LSE05180
035567**005190**       ON A FIXED RATE BASIS. IF THE AMOUNT OF THE LOAN IS LESS    LSE05190
035568**005200**       THAN 07,500 , THE INTEREST RENEWAL TERM IS COMPUTED AS THE  LSE05200
035569**005210**       DIFFERENCE BETWEEN THE OPTION DATE SELECTED BY THE CUSTOMER LSE05210
035570**005220**       ( IE. THE DATE UPON WHICH THE RESIDUAL VALUE IS EFFECTIVE ) LSE05220
      51

035571**005230**       AND THE ISSUE DATE OF THE LOAN. IN ACCORDANCE WITH CURRENT  LSE05230
035572**005240**       BANK POLICY, THE OPTION DATE IS EITHER THREE OR FOUR YEARS  LSE05240
035573**005250**       FROM THE LOAN ISSUE DATE. IN THIS CASE THE AMORTIZATION     LSE05250
035574**005260**       TERM OF THE LOAN AND THE INTEREST RENEWAL TERM ARE IDENTICAL LSE05260
035575**005270**       AND ARE ESTABLISHED IN PROGRAM LINE 35591.                  LSE05270
035576**005280**                                                                   LSE05280
035577**005290**       IF THE LOAN IS GREATER THAN OR EQUAL TO 07,500 THE CLIENT   LSE05290
035578**005300**       MAY SELECT AN INTEREST RENEWAL TERM AS PRESENTLY OFFERED BY LSE05300
035579**005310**       THE BANK.                                                   LSE05310
035580**005320**                                                                   LSE05320
035581**005330                                                                     LSE05330
035582**005340        IF  T2EX-TRAN-PROCEEDS  <  7500.00                           LSE05340

035584**005360           IF  T2EX-TRAN-INT-RENEW-TERM-X  NUMERIC   AND             LSE05360
035585**005370               T2EX-TRAN-INT-RENEW-TERM-X  NOT =                     LSE05370
035586**005380               T2EX-TRAN-AMORT-TERM-X                                LSE05380

035588**005400              MOVE 805  TO  C65003-INPUT-ERROR                       LSE05400
035589**005410              PERFORM Y100-CALL-COMMON-ERROR-RTN                     LSE05410
035590**005420           ELSE                                                      LSE05420
035591**005430              MOVE T2EX-TRAN-AMORT-TERM TO T2EX-TRAN-INT-RENEW-TERM. LSE05430
035592**005440        ELSE                                                         LSE05440
035593**005450           IF  T2EX-TRAN-INT-RENEW-TERM-X  NOT NUMERIC               LSE05450

035595**005470              MOVE 805  TO  C65003-INPUT-ERROR                       LSE05470
035596**005480              PERFORM Y100-CALL-COMMON-ERROR-RTN.                    LSE05480

035598**005500 B182-EXIT.                                                          LSE05500

035600**005520        EXIT.                                                        LSE05520
```

```
035602==005540 B184-EDIT-RENEW-TERM-NOT-FIXED SECTION.                    LSE05540
035603==005550                                                            LSE05550
035604==005560==                                                          LSE05560
035605==005570==        PROGRAM LINES 35612 TO 35619 REPRESENT FUNCTIONAL BLOCK  LSE05570
035606==005580==        252, FIGURE 4 OF THE BUSINESS SYSTEM FLOW CHART. AT THIS LSE05580
035607==005590==        POINT IN THE PROGRAM THE INTEREST RENEWAL TERM FOR A    LSE05590
035608==005600==        VARIABLE RATE LOAN IS ESTABLISHED ON THE BASIS OF EVERY LSE05600
035609==005610==        TWELVE MONTHS FOR THE LIFE OF THE LOAN.           LSE05610
035610==005620==                                                          LSE05620
035611==005630                                                            LSE05630
035612==005640         IF  T25X-TRAN-INT-RENEM-TERM-X  NOT  NUMERIC        LSE05640

035614==005660             MOVE 12  TO  T25X-TRAN-INT-RENEM-TERM           LSE05660
035615==005670         ELSE                                                LSE05670
035616==005680             IF  T25X-TRAN-INT-RENEM-TERM  NOT = 12          LSE05680

035618==005700                 MOVE 805  TO  C65003-INPUT-ERROR            LSE05700
035619==005710                 PERFORM Y100-CALL-COMMON-ERROR-RTN.         LSE05710

035621==005730 B184-EXIT.                                                  LSE05730

035623==005750     EXIT.                                                   LSE05750

035626==005780 B190-EDIT-STICKER-RV-FACTOR SECTION.                        LSE05780

035628==005800         IF  T25X-TRAN-STICKER-PRICE-X  NOT NUMERIC  OR      LSE05800
035629==005810             T25X-TRAN-RV-FACTOR-X      NOT NUMERIC          LSE05810

035631==005830             MOVE 806  TO  C65003-INPUT-ERROR                LSE05830
035632==005840             PERFORM Y100-CALL-COMMON-ERROR-RTN.             LSE05840

035634==005860 B190-EXIT.                                                  LSE05860

035636==005880     EXIT.                                                   LSE05880

035639==005910 B200-EDIT-INT-METHOD SECTION.                               LSE05910

035641==005930         IF  T25X-TRAN-INT-METHOD = HIGH-VALUES              LSE05930

035643==005950             MOVE MS-BLENDED  TO  T25X-TRAN-INT-METHOD       LSE05950
035644==005960         ELSE                                                LSE05960
035645==005970             IF  T25X-TRAN-INT-METHOD  NOT = MS-BLENDED      LSE05970

035647==005990                 MOVE 807  TO  C65003-INPUT-ERROR            LSE05990

035648==006000                 PERFORM Y100-CALL-COMMON-ERROR-RTN.         LSE06000

035650==006020 B200-EXIT.                                                  LSE06020

035652==006040     EXIT.                                                   LSE06040

035654==006060 B210-EDIT-START-DATE SECTION.                               LSE06060

035656==006080         IF  T25X-TRAN-START-DATE-X = HIGH-VALUES            LSE06080

035658==006100             MOVE C62080-TRAN-BUS-DAY  TO  T25X-TRAN-START-DATE  LSE06100
035659==006110         ELSE                                                LSE06110
035660==006120             MOVE T25X-TRAN-START-DATE-X  TO  C61232-INPUT-DATE-X LSE06120
035661==006130             MOVE C65251-CORRECTION-IND  TO  C61232-CORRECTION    LSE06130
035662==006140             MOVE '0'                    TO  C61232-REG-MAND-IND  LSE06140
035663==006150                                             C61232-CORR-MAND-IND LSE06150
035664==006160             MOVE 'N'                    TO  C61232-SPEC-EDIT-IND LSE06160
035665==006170             MOVE 8                      TO  C61232-FIELD-NO      LSE06170

035667==006190             MOVE MS-VERIFY-DATE-RTN     TO  TCB-ACTIVITY    LSE06190
035668==006200             PERFORM Z100-CALL-PEM                           LSE06200

035670==006220             MOVE C61232-OUT-CENTURY  TO  T25X-TRAN-START-DATE-C  LSE06220

035672==006240             IF  C65150-TL-ACCEPT       AND                  LSE06240
035673==006250                 T25X-TRAN-START-DATE  <  C62080-BR-BUS-DAY-BACK  LSE06250

035675==006270                 MOVE 57 TO C65003-INPUT-ERROR               LSE06270
035676==006280                 PERFORM Y100-CALL-COMMON-ERROR-RTN.         LSE06280

035678==006300 B210-EXIT.                                                  LSE06300

035680==006320     EXIT.                                                   LSE06320
035683==006350 B220-EDIT-INT-ADJ-DATE SECTION.                             LSE06350

035685==006370         IF  T25X-TRAN-INT-ADJ-DATE-YMD  NOT = HIGH-VALUES  AND  LSE06370
035686==006380                                         NOT = SPACES        LSE06380

035688==006400             MOVE T25X-TRAN-INT-ADJ-DATE-X TO C61232-INPUT-DATE-X LSE06400
```

```
035689**006410        MOVE C65251-CORRECTION-IND    TO C61232-CORRECTION        LSE06410
035690**006420        MOVE '0'                      TO C61232-REG-MAND-IND      LSE06420
035691**006430                                         C61232-CORR-MAND-IND     LSE06430
035692**006440        MOVE 'N'                      TO C61232-SPEC-EDIT-IND     LSE06440
035693**006450        MOVE 8                        TO C61232-FIELD-NO          LSE06450

035695**006470        MOVE MS-VERIFY-DATE-RTN       TO TCB-ACTIVITY             LSE06470
035696**006480        PERFORM Z100-CALL-PEM                                     LSE06480

035698**006500        MOVE C61232-OUT-CENTURY       TO TZEX-TRAN-INT-ADJ-DATE-C.LSE06500

035700**006520 B220-EXIT.                                                       LSE06520

035702**006540        EXIT.                                                     LSE06540

035705**006570 B230-EDIT-PERC-RATE-FACTOR SECTION.                              LSE06570

035707**006590        IF TZEX-TRAN-PERC-RATE-FACTOR-X = HIGH-VALUES             LSE06590

035709**006610            MOVE 1 TO TZEX-TRAN-PERC-RATE-FACTOR                  LSE06610
035710**006620        ELSE                                                      LSE06620
035711**006630            MOVE 809 TO C65003-INPUT-ERROR                        LSE06630
035712**006640            PERFORM Y100-CALL-COMMON-ERROR-RTN.                   LSE06640

035714**006660 B230-EXIT.                                                       LSE06660

035716**006680        EXIT.                                                     LSE06680

035719**006710 C100-CALC-EFF-INT-RATE SECTION.                                  LSE06710

035721**006730        MOVE MS-CALC-EFF-INT-RATE-RTN TO TCB-ACTIVITY.            LSE06730
035722**006740        PERFORM Z100-CALL-PEM.                                    LSE06740

035724**006760 C100-EXIT.                                                       LSE06760

035726**006780        EXIT.                                                     LSE06780
035728**006800 D100-CAL-PROPOSED-REG-PYMT-AMT SECTION.                          LSE06800

035730**006820**      CALC PROPOSED PROCEEDS                                    LSE06820
035731**006830**                                                                LSE06830
035732**006840**      PROGRAM LINES 35753 TO 35761 PERFORM THE CALCULATIONS AS  LSE06840
035733**006850**      OUTLINED IN BLOCKS 210 AND 230, FIGURE 4 OF THE BUSINESS  LSE06850
035734**006860**      SYSTEM FLOW CHART PATENT APPLICATION.                     LSE06860
035735**006870**                                                                LSE06870
035736**006880**      ESSENTIALLY THE RESIDUAL VALUE IS DERIVED IN ONE OF TWO   LSE06880
035737**006890**      METHODS:  (1) IF THE STICKER PRICE IS UNAVAILABLE FROM    LSE06890
035738**006900**                    THE DEALER, THE RESIDUAL VALUE IS DETERMINEDLSE06900
035739**006910**                    BY THE BRANCH AND IS INPUT DIRECTLY TO THE  LSE06910
035740**006920**                    SYSTEM WITH THE RESIDUAL VALUE FACTOR SET   LSE06920
035741**006930**                    TO 01.                                      LSE06930
035742**006940**                (2) IF THE STICKER PRICE IS AVAILABLE, THE RES- LSE06940
035743**006950**                    IDUAL VALUE IS COMPUTED BY MULTIPLYING THE  LSE06950
035744**006960**                    STICKER PRICE BY THE RESIDUAL VALUE FACTOR. LSE06960
035745**006970**                                                                LSE06970
035746**006980**      ONCE KNOWN, THE RESIDUAL VALUE IS SUBTRACTED FROM THE TOTALLSE06980
035747**006990**      FINANCING REQUIRED YIELDING AN AMOUNT ( REFERRED IN THE   LSE06990
035748**007000**      PROGRAM AS "PROP-PROCEEDS-AMT" ) ON WHICH A REGULAR PAYMENTLSE07000
035749**007010**      WILL BE FURTHER DETERMINED ( PROGRAM LINES 35789 - 35792 ).LSE07010
035750**007020**                                                                LSE07020
035751**007030                                                                  LSE07030

035753**007050        IF TZEX-TRAN-RV-FACTOR = 0.01                             LSE07050

035755**007070            MOVE TZEX-TRAN-STICKER-PRICE TO TZDOM-MS-RES-VALUE    LSE07070
035756**007080        ELSE                                                      LSE07080
035757**007090            COMPUTE TZDOM-MS-RES-VALUE = TZEX-TRAN-STICKER-PRICE *LSE07090
035758**007100                                         TZEX-TRAN-RV-FACTOR.     LSE07100

035760**007120        COMPUTE TZDOM-PROP-PROCEEDS-AMT = TZEX-TRAN-PROCEEDS -    LSE07120
035761**007130                                          TZDOM-MS-RES-VALUE.     LSE07130
035762**007140                                                                  LSE07140
035763**007150**                                                                LSE07150
035764**007160**      PROGRAM LINES 35773 TO 35779 REPRESENT THE DECISION BLOCK LSE07160
035765**007170**      240, FIGURE 4 ENSURING THE PROCEEDS AMOUNT ON WHICH A     LSE07170
035766**007180**      REGULAR PAYMENT WILL BE COMPUTED IS INDEED GREATER THAN   LSE07180
035767**007190**      OR EQUAL TO ZERO. IF THE AMOUNT IS LESS THAN ZERO, THE    LSE07190
035768**007200**      SYSTEM WILL REJECT THE REQUEST TO DETERMINE A REGULAR     LSE07200
035769**007210**      PAYMENT AMOUNT AND THE APPLICATION FOR THE LOAN IS DECLINED.LSE07210
035770**007220**                                                                LSE07220
035771**007230                                                                  LSE07230

035773**007250        IF TZDOM-PROP-PROCEEDS-AMT < 0                            LSE07250

035775**007270            MOVE 804 TO C65003-INPUT-ERROR                        LSE07270
035776**007280            PERFORM Y100-CALL-COMMON-ERROR-RTN                    LSE07280
035777**007290        ELSE                                                      LSE07290
035778**007300            IF TZDOM-PROP-PROCEEDS-AMT = 0                        LSE07300
```

```
035779**007310            MOVE 0 TO T25X04-PROP-PYMT-AMT-REG.                  LSE07310

035781**007330                                                                  LSE07330
035782**007340**        PROGRAM LINES 35789 TO 35792 REPRESENT FUNCTION BLOCK 262, LSE07340
035783**007350**        FIGURE 4, AND PERFORM THE CALCULATIONS FOR COMPUTING THE   LSE07350
035784**007360**        REGULAR PAYMENT AMOUNT. THIS PORTION OF THE PROGRAM CALLS  LSE07360
035785**007370**        A COMMON PROGRAM MODULE FOR COMPUTING THE PRINCIPAL AND    LSE07370
035786**007380**        INTEREST PORTION OF THE PROCEEDS AMOUNT.                   LSE07380
035787**007390**                                                                   LSE07390
035788**007400                                                                     LSE07400
035789**007410          IF C65150-TL-ACCEPT AND T25X04-PROP-PROCEEDS-AMT > 0       LSE07410

035791**007430              PERFORM D110-SET-OO-CSE183                             LSE07430
035792**007440              PERFORM D120-CALC-PYMT-AMT-LSE183                      LSE07440

035794**007460              IF CSE183-AVE-PYMT-AMT < 0                             LSE07460
035795**007470                 MOVE 15 TO C65003-INPUT-ERROR                       LSE07470
035796**007480                 PERFORM Y100-CALL-COMMON-ERROR-RTN                  LSE07480
035797**007490              ELSE                                                   LSE07490
035798**007500                 MOVE CSE183-AVE-PYMT-AMT TO T25X04-PROP-PYMT-AMT-REG. LSE07500

035800**007520 D100-EXIT.                                                          LSE07520

035802**007540     EXIT.                                                           LSE07540

035804**007560 D110-SET-OO-CSE183  SECTION.                                        LSE07560

035806**007580     MOVE T25X04-PROP-PROCEEDS-AMT    TO  CSE183-A.                  LSE07580
035807**007590     MOVE C62010-NO-OF-PERIOD         TO  CSE183-D.                  LSE07590
035808**007600                                          CSE183-O.                  LSE07600
035809**007610     MOVE T25X04-PROP-AMORT-TERM      TO  CSE183-N.                  LSE07610
035810**007620     MOVE C62380-EFF-INT-RATE         TO  CSE183-I.                  LSE07620
035811**007630     MOVE T25X04-MB-FACTOR            TO  CSE183-C.                  LSE07630
035812**007640                                          CSE183-F.                  LSE07640
035813**007650     MOVE 365                         TO  CSE183-Z.                  LSE07650

035815**007670 D110-EXIT.                                                          LSE07670

035817**007690     EXIT.                                                           LSE07690

035820**007720 D120-CALC-PYMT-AMT-LSE183  SECTION.                                 LSE07720

035822**007740     CALL  'LSE183'  USING    CSE183-A                               LSE07740
035823**007750                              CSE183-D                               LSE07750
035824**007760                              CSE183-M                               LSE07760
035825**007770                              CSE183-N                               LSE07770
035826**007780                              CSE183-O                               LSE07780
035827**007790                              CSE183-I                               LSE07790
035828**007800                              CSE183-C                               LSE07800
035829**007810                              CSE183-F                               LSE07810
035830**007820                              CSE183-Z                               LSE07820
035831**007830                              CSE183-AVE-PYMT-AMT.                   LSE07830

035833**007850 D120-EXIT.                                                          LSE07850

035835**007870     EXIT.                                                           LSE07870

035837**007890 E100-CAL-COST-OF-PROPOSED-LOAN  SECTION.                            LSE07890

035839**007910     MOVE MB-CALC-COST-LOAN-RTN TO TCB-ACTIVITY.                     LSE07910
035840**007920     PERFORM Z100-CALL-PEM.                                          LSE07920

035842**007940 E100-EXIT.                                                          LSE07940

035844**007960     EXIT.                                                           LSE07960

035846**007980 F100-CAL-BUY-BACK-CAR-LN-FIELD  SECTION.                            LSE07980
035847**007990                                                                     LSE07990
035848**008000**                                                                   LSE08000
035849**008010**       PROGRAM LINES 35862 AND 35863 PERFORM THE COMPUTATION AS    LSE08010
035850**008020**       DESCRIBED IN BLOCKS 270 AND 271, FIGURE 4 OF THE BUSINESS   LSE08020
035851**008030**       SYSTEM FLOW CHART.                                          LSE08030
035852**008040**                                                                   LSE08040
035853**008050**       THE COMPUTATION DETERMINES THE MONTHLY INTEREST PORTION     LSE08050
035854**008060**       OF THE RESIDUAL VALUE BY MULTIPLYING THE EFFECTIVE LOAN     LSE08060
035855**008070**       INTEREST RATE BY THE RESIDUAL VALUE.                        LSE08070
035856**008080**                                                                   LSE08080
035857**008090**       THE EFFECTIVE INTEREST RATE IS OBTAINED AS DEPICTED IN      LSE08090
035858**008100**       BLOCK 271 FROM AN EXTERNAL RATE FILE AND PASSED TO THE      LSE08100
035859**008110**       PROGRAM THROUGH COMMON MODULE C62380.                       LSE08110
035860**008120**                                                                   LSE08120
035861**008130                                                                     LSE08130
035862**008140     COMPUTE T25X04-MB-RV-PYMT-FREQ-INT =                            LSE08140
035863**008150             T25X04-MB-RES-VALUE * C62380-EFF-INT-RATE / 12.         LSE08150

035865**008170     COMPUTE T25X04-MB-RV-INT-COSTS-AMORT =                          LSE08170
035866**008180             T25X04-MB-RV-PYMT-FREQ-INT * T25X-TRAN-AMORT-TERM.      LSE08180
```

```
035868==008200    COMPUTE  T25X04-HS-RV-INT-COSTS-RENEW  =           LSE08200
035869==008210             T25X04-HS-RV-PYMT-FREQ-INT    *           LSE08210
035870==008220             T25X-TRAN-INT-RENEW-TERM.                 LSE08220

035872==008240    IF  T25X-TRAN-INT-ADJ-DATE-X   IS  NUMERIC         LSE08240

035874==008260        MOVE T25X-TRAN-START-DATE     TO C62010-START-DATE   LSE08260
035875==008270        MOVE T25X-TRAN-INT-ADJ-DATE   TO C62010-END-DATE     LSE08270

035877==008290        MOVE HS-FIND-NO-OF-PERIODS-RTN  TO TCB-ACTIVITY      LSE08290
035878==008300        PERFORM Z100-CALL-PEM                                LSE08300

035880==008320        COMPUTE  T25X04-HS-RV-INT-ADJ-AMT   =                LSE08320
035881==008330                 T25X04-HS-RES-VALUE        *                LSE08330
035882==008340                 C62380-EFF-INT-RATE / 365  *                LSE08340
035883==008350                 C62010-NO-OF-PERIOD.                        LSE08350

035885==008370    MOVE T25X-TRAN-PROCEEDS  TO  T25X04-PROP-PROCEEDS-AMT.   LSE08370

035887==008390    PERFORM F200-CALC-NO-OF-PYMTS-LSE182.                    LSE08390

035889==008410 F100-EXIT.                                                  LSE08410

035891==008430    EXIT.                                                    LSE08430
   61

035893==008450 F200-CALC-NO-OF-PYMTS-LSE182 SECTION.                       LSE08450

035895==008470    MOVE T25X-TRAN-PROCEEDS      TO  CSE182-A.                LSE08470
035896==008480    MOVE T25X04-HS-FACTOR        TO  CSE182-F.                LSE08480
035897==008490    MOVE 0                       TO  CSE182-G.                LSE08490
035898==008500    MOVE C62380-EFF-INT-RATE     TO  CSE182-I.                LSE08500

035900==008520    COMPUTE CSE182-P = T25X04-PROP-PYMT-AMT-REQ +             LSE08520
035901==008530                       T25X04-HS-RV-PYMT-FREQ-INT.            LSE08530

035903==008550    MOVE 365                     TO  CSE182-Z.                LSE08550

035905==008570    PERFORM F210-CALL-LSE182.                                 LSE08570

035907==008590    IF  CSE182-TERM-REMAIN  <  0                              LSE08590

035909==008610        MOVE 15 TO C65003-INPUT-ERROR                         LSE08610
035910==008620        PERFORM Y100-CALL-COMMON-ERROR-RTN                    LSE08620
035911==008630    ELSE                                                      LSE08630
035912==008640        MOVE CSE182-TERM-REMAIN TO T25X04-HS-PAYOUT-TERMS.    LSE08640

035914==008660 F200-EXIT.                                                   LSE08660

035916==008680    EXIT.                                                     LSE08680

035919==008710 F210-CALL-LSE182  SECTION.                                   LSE08710

035921==008730    CALL  'LSE182'  USING  CSE182-A                           LSE08730
035922==008740                           CSE182-G                           LSE08740
035923==008750                           CSE182-F                           LSE08750
035924==008760                           CSE182-G                           LSE08760
035925==008770                           CSE182-I                           LSE08770
035926==008780                           CSE182-P                           LSE08780
035927==008790                           CSE182-Z                           LSE08790
035928==008800                           CSE182-K                           LSE08800
035929==008810                           CSE182-R                           LSE08810
035930==008820                           CSE182-TERM-REMAIN.                LSE08820

035932==008840 F210-EXIT.                                                   LSE08840

035934==008860    EXIT.                                                     LSE08860
   62

035936==008880 G100-WRITE-TRAN-LOG-REC  SECTION.                            LSE08880

035938==008900    MOVE '1'              TO C65150-TL-LOG-RECORD-CODE.       LSE08900
035939==008910    MOVE '1'              TO C65150-TL-LIC.                   LSE08910

035941==008930    MOVE '00'             TO C64232-ACTION.                   LSE08930
035942==008940    MOVE 'P'              TO C64232-TRAN-TYPE.                LSE08940
035943==008950    MOVE 'O'              TO C64232-LOG-IND.                  LSE08950
035944==008960    MOVE 'Y'              TO C64232-FILL-COMMON-IND.          LSE08960

035946==008980    MOVE HS-WRITE-TXN-LOG-RTN  TO  TCB-ACTIVITY.              LSE08980
035947==008990    PERFORM Z100-CALL-PEM.                                    LSE08990

035949==009010 G100-EXIT.                                                   LSE09010

035951==009030    EXIT.                                                     LSE09030
035953==009050 H100-DISPLAY-PYMT-PROPOSAL SECTION.                          LSE09050
```

```
035955**009070      MOVE  'N'     TO  C64000-PRINT-LN-MESS-IND           LSE09070
035956**009080                        C64000-PRINT-BRCH-MESS-IND         LSE09080
035957**009090                        C65254-CLEAR-SCREEN-IND.           LSE09090

035959**009110      IF  C65150-TL-ACCEPT                                 LSE09110

035961**009130          PERFORM M110-DISPLAY-PROPOSAL-INFO               LSE09130
035962**009140      ELSE                                                 LSE09140
035963**009150          MOVE 'A'         TO  C65253-DISPLAY-CLASS        LSE09150
035964**009160          MOVE '0'         TO  C65253-PRINT-CLASS          LSE09160
035965**009170          MOVE 'L'         TO  C64000-CALL-TYPE-IND        LSE09170

035967**009190          MOVE MS-DISPLAY-MAP-RTN  TO  TCB-ACTIVITY        LSE09190
035968**009200          PERFORM Z100-CALL-PEM.                           LSE09200

035970**009220  M100-EXIT.                                               LSE09220

035972**009240      EXIT.                                                LSE09240
       **

035974**009260  M110-DISPLAY-PROPOSAL-INFO  SECTION.                     LSE09260

035976**009280      IF  C65251-PRINT-REQUEST = 'P'                       LSE09280

035978**009300          MOVE '0' TO  C65253-DISPLAY-CLASS                LSE09300
035979**009310          MOVE '1' TO  C65253-PRINT-CLASS                  LSE09310
035980**009320      ELSE                                                 LSE09320
035981**009330          MOVE 'A' TO  C65253-DISPLAY-CLASS                LSE09330
035982**009340          MOVE '0' TO  C65253-PRINT-CLASS.                 LSE09340

035984**009360      MOVE 'N'    TO  C64000-CALL-TYPE-IND.                LSE09360

035986**009380      PERFORM N200-SET-DISPLAY-DO.                         LSE09380

035988**009400      MOVE MS-DISPLAY-OSE050AM-ACT  TO  C64000-DISPLAY-ACTIVITY-E.  LSE09400
035989**009410      MOVE MS-DISPLAY-OSE050BM-ACT  TO  C64000-DISPLAY-ACTIVITY-F.  LSE09410
035990**009420      MOVE MS-DISPLAY-MAP-RTN       TO  TCB-ACTIVITY.                LSE09420
035991**009430      PERFORM Z100-CALL-PEM.                               LSE09430

035993**009450      MOVE MS-DISPLAY-OSE050BM-ACT  TO  C64000-DISPLAY-ACTIVITY-E.  LSE09450
035994**009460      MOVE MS-DISPLAY-OSE050EM-ACT  TO  C64000-DISPLAY-ACTIVITY-F.  LSE09460
035995**009470      MOVE MS-DISPLAY-MAP-RTN       TO  TCB-ACTIVITY.                LSE09470
035996**009480      PERFORM Z100-CALL-PEM.                               LSE09480

035998**009500      MOVE MS-DISPLAY-OSE050CM-ACT  TO  C64000-DISPLAY-ACTIVITY-E.  LSE09500
035999**009510      MOVE MS-DISPLAY-OSE050FM-ACT  TO  C64000-DISPLAY-ACTIVITY-F.  LSE09510
036000**009520      MOVE MS-DISPLAY-MAP-RTN       TO  TCB-ACTIVITY.                LSE09520
036001**009530      PERFORM Z100-CALL-PEM.                               LSE09530

036003**009550      MOVE 'L'    TO  C64000-CALL-TYPE-IND.                LSE09550
036004**009560      MOVE MS-DISPLAY-OSE050GM-ACT  TO  C64000-DISPLAY-ACTIVITY-E.  LSE09560
036005**009570      MOVE MS-DISPLAY-OSE050HM-ACT  TO  C64000-DISPLAY-ACTIVITY-F.  LSE09570
036006**009580      MOVE MS-DISPLAY-MAP-RTN       TO  TCB-ACTIVITY.                LSE09580
036007**009590      PERFORM Z100-CALL-PEM.                               LSE09590

036009**009610  M110-EXIT.                                               LSE09610

036011**009630      EXIT.                                                LSE09630
       **

036013**009650  N200-SET-DISPLAY-DO  SECTION.                            LSE09650

036015**009670      PERFORM N210-SET-DO-FOR-OSE050AM-DM.                 LSE09670

036017**009690      PERFORM N220-SET-DO-FOR-OSE050BM-EM.                 LSE09690

036019**009710      PERFORM N230-SET-DO-FOR-OSE050CM-FM.                 LSE09710

036021**009730      PERFORM N240-SET-DO-FOR-OSE050GM-HM.                 LSE09730

036023**009750  N200-EXIT.                                               LSE09750

036025**009770      EXIT.                                                LSE09770
       **

036027**009790  N210-SET-DO-FOR-OSE050AM-DM  SECTION.                    LSE09790

036029**009810      MOVE C65150-TL-LOCALENTRY-DATE   TO C62000-CALENDAR-DATE.   LSE09810
036030**009820      PERFORM N250-CONVERT-DATE-TO-DISP-FMT.                      LSE09820
036031**009830      MOVE C62000-DATE-DISPLAY-FORMAT  TO C51979-LOCAL-ENTRY-DATE.LSE09830

036033**009850      MOVE C65150-TL-LOCALENTRY-TIME   TO T25DM-MS-ENTRY-TIME.    LSE09850
036034**009860      MOVE T25DM-MS-ENTRY-HH   TO C51979-LOCAL-ENTRY-HH.          LSE09860
036035**009870      MOVE ':'                 TO C51979-COLON-1.                 LSE09870
036036**009880      MOVE T25DM-MS-ENTRY-MM   TO C51979-LOCAL-ENTRY-MM.          LSE09880
036037**009890      MOVE ':'                 TO C51979-COLON-2.                 LSE09890
036038**009900      MOVE T25DM-MS-ENTRY-SS   TO C51979-LOCAL-ENTRY-SS.          LSE09900

036040**009920      MOVE T25DM-PROP-PROCEEDS-AMT  TO C51979-PROCEEDS.           LSE09920
036041**009930      COMPUTE C51979-INT-RATE = C62380-EFF-INT-RATE * 100.        LSE09930

036043**009950      MOVE T25X-TRAN-INT-METHOD     TO C62405-INT-METHOD.         LSE09950
036044**009960      MOVE C62061-BV01-BR-LANG-CODE TO C62405-LANG-CODE.          LSE09960
036045**009970      MOVE MS-GET-INT-METHOD-DESC-RTN TO TCB-ACTIVITY.            LSE09970
036046**009980      PERFORM Z100-CALL-PEM.                                      LSE09980
```

```
036048==010000        MOVE C62405-INT-METH-DESC      TO  CS19 -INT-METHOD-DESC. LSE10000

036050==010020        IF T25X-TRAN-INT-RENEW-TERM-X  IS NUMERIC                 LSE10020
036051==010030            MOVE T25X-TRAN-INT-RENEW-TERM TO CS1979-INT-TERM      LSE10030
036052==010040        ELSE                                                      LSE10040
036053==010050            MOVE 'N/A'                    TO CS1979-INT-TERM-X.   LSE10050

036055==010070        PERFORM H212-GET-PYMT-FREQ-DESC                           LSE10070
036056==010080            VARYING T25XX-SUB FROM 1 BY 1                         LSE10080
036057==010090            UNTIL   T25XX-SUB > 19              OR                LSE10090
036058==010100                T25X-TRAN-PYMT-FREQ = FREQENCY-CODE (T25XX-SUB)   LSE10100

036060==010120        IF T25XX-SUB > 19                                         LSE10120
036061==010130            MOVE SPACES                TO CS1979-PYMT-FREQ-DESC   LSE10130
036062==010140        ELSE                                                      LSE10140
036063==010150            IF C62081-BV01-BR-LANG-CODE = NS-ENGLISH              LSE10150
036064==010160                MOVE FREQENCY-DESC-E (T25XX-SUB) TO               LSE10160
036065==010170                    CS1979-PYMT-FREQ-DESC                        LSE10170
036066==010180            ELSE                                                  LSE10180
036067==010190                MOVE FREQENCY-DESC-F (T25XX-SUB) TO               LSE10190
036068==010200                    CS1979-PYMT-FREQ-DESC.                       LSE10200

036070==010220  H210-EXIT.                                                      LSE10220

036072==010240        EXIT.                                                     LSE10240

036075==010270  H212-GET-PYMT-FREQ-DESC  SECTION.                               LSE10270
  67

036077==010290  H212-EXIT.                                                      LSE10290

036079==010310        EXIT.                                                     LSE10310
036081==010330  H220-SET-OG-FOR-OSE0SOGM-EN  SECTION.                           LSE10330
036082==010340                                                                  LSE10340
036083==010350**                                                                LSE10350
036084==010360**     PROGRAM LINES 36112 TO 36115 REPRESENT THE CALCULATION     LSE10360
036085==010370**     BLOCK 280, FIGURE 4 OF THE BUSINESS SYSTEM FLOW CHART      LSE10370
036086==010380**     WHEREIN THE REGULAR PAYMENT AMOUNT FOR A BUY BACK CAR LOAN LSE10380
036087==010390**     CAN NOW BE COMPUTED. THE REGULAR PAYMENT AMOUNT IS THE     LSE10390
036088==010400**     SUM OF THE AMOUNTS COMPUTED FROM PROGRAM LINES 15792 AND   LSE10400
036089==010410**     35862.                                                    LSE10410
036090==010420**                                                                LSE10420
036091==010430                                                                  LSE10430
036092==010440        MOVE T25X-TRAN-START-DATE     TO C62000-CALENDAR-DATE.    LSE10440
036093==010450        PERFORM H250-CONVERT-DATE-TO-DISP-FMT.                    LSE10450
036094==010460        MOVE C62000-DATE-DISPLAY-FORMAT TO CS1979-START-DATE.     LSE10460

036096==010480        MOVE T25X-TRAN-FIRST-PDB      TO C62000-CALENDAR-DATE.    LSE10480
036097==010490        PERFORM H250-CONVERT-DATE-TO-DISP-FMT.                    LSE10490
036098==010500        MOVE C62000-DATE-DISPLAY-FORMAT TO                        LSE10500
036099==010510            CS1979-FIRST-PYMT-DUE-DATE.                           LSE10510

036101==010530        IF T25X-TRAN-INT-ADJ-DATE-X    NUMERIC                    LSE10530

036103==010550            MOVE T25X-TRAN-INT-ADJ-DATE TO C62000-CALENDAR-DATE   LSE10550
036104==010560            PERFORM H250-CONVERT-DATE-TO-DISP-FMT                 LSE10560
036105==010570            MOVE C62000-DATE-DISPLAY-FORMAT TO CS1979-INT-ADJ-DATE LSE10570
036106==010580        ELSE                                                      LSE10580
036107==010590            MOVE '   N/A'              TO CS1979-INT-ADJ-DATE.    LSE10590

036109==010610        COMPUTE CS1979-NO-OF-PYMT =                               LSE10610
036110==010620                T25XX-PROP-AMORT-TERM + 0.999999.                 LSE10620

036112==010640        COMPUTE CS1979-REG-PYMT-AMT =                             LSE10640
036113==010650                T25XX-PROP-PYMT-AMT-REG  +                        LSE10650
036114==010660                T25XX-MB-RV-PYMT-FREQ-INT +                       LSE10660
036115==010670                0.0099.                                           LSE10670

036117==010690        COMPUTE CS1979-TOTAL-INT-COST =                           LSE10690
036118==010700                T25XX-PROP-AMORT-COSTS   +                        LSE10700
036119==010710                T25XX-PROP-INT-ADJ-AMT   +                        LSE10710
036120==010720                T25XX-MB-RV-INT-ADJ-AMT  +                        LSE10720
036121==010730                T25XX-MB-RV-INT-COSTS-AMORT.                      LSE10730

036123==010750  H220-EXIT.                                                      LSE10750

036125==010770        EXIT.                                                     LSE10770
  69

036127==010790  H250-SET-OG-FOR-OSE0SOCM-FM  SECTION.                           LSE10790

036129==010810        IF T25X-TRAN-INT-RENEW-TERM-X  NOT NUMERIC   AND          LSE10810
036130==010820            T25X-TRAN-INT-ADJ-DATE-X   NOT NUMERIC                LSE10820

036132==010840            MOVE NS-NA         TO CS1979-INT-RENEW-TERM-COST-X    LSE10840
036133==010850        ELSE                                                      LSE10850
036134==010860            COMPUTE T25XX-MB-INT-RENEW-COST =                     LSE10860
036135==010870                T25XX-PROP-INT-REN-TERM-COSTS   +                 LSE10870
036136==010880                T25XX-PROP-INT-ADJ-AMT          +                 LSE10880
036137==010890                T25XX-MB-RV-INT-ADJ-AMT         +                 LSE10890
036138==010900                T25XX-MB-RV-INT-COSTS-RENEW                       LSE10900

036140==010920            MOVE T25XX-MB-INT-RENEW-COST TO                       LSE10920
036141==010930                CS1979-INT-RENEW-TERM-COST.                       LSE10930
```

```
036143**010950      IF T25X-TRAN-INT-ADJ-DATE-X IS NUMERIC              LSE10950
036145**010970         COMPUTE T25DM-MS-INT-ADJ-AMT =                   LSE10970
036146**010980             T25DM-PROP-INT-ADJ-AMT + T25DM-MS-RV-INT-ADJ-AMT LSE10980

036148**011000         MOVE T25DM-MS-INT-ADJ-AMT TO CS1979-INT-ADJ-AMT  LSE11000
036149**011010      ELSE                                                LSE11010
036150**011020         MOVE MS-NA               TO  CS1979-INT-ADJ-AMT-X. LSE11020

036152**011040 M230-EXIT.                                               LSE11040

036154**011060      EXIT.                                               LSE11060
         70

036156**011080 M240-SET-DO-FOR-OSEOSOGM-MM SECTION.                     LSE11080

036158**011100      MOVE T25DM-MS-RV-PYMT-FREQ-INT TO CS1979-PYMT-FREQ-INT. LSE11100
036159**011110      MOVE T25DM-MS-RES-VALUE        TO CS1979-RESIDUAL-VALUE. LSE11110
036160**011120      MOVE T25X-TRAN-STICKER-PRICE   TO CS1979-STICKER-PRICE. LSE11120

036162**011140      COMPUTE CS1979-RESIDUAL-FACTOR =                    LSE11140
036163**011150          T25X-TRAN-RV-FACTOR * 100.                      LSE11150

036165**011170      COMPUTE CS1979-AMORT-NO-PYMT =                      LSE11170
036166**011180          T25DM-MS-PAYOUT-TERMS + 0.999999.               LSE11180

036168**011200 M240-EXIT.                                               LSE11200

036170**011220      EXIT.                                               LSE11220

036173**011250 M250-CONVERT-DATE-TO-DISP-FMT SECTION.                   LSE11250

036175**011270      MOVE MS-CONVERT-DISPLAY-FMT-RTN TO TCB-ACTIVITY.    LSE11270
036176**011280      PERFORM Z100-CALL-PEM.                              LSE11280

036178**011300 M250-EXIT.                                               LSE11300

036180**011320      EXIT.                                               LSE11320
         71

036182**011340 Y100-CALL-COMMON-ERROR-RTN SECTION.                      LSE11340

036184**011360      MOVE MS-ERROR-RTN TO TCB-ACTIVITY.                  LSE11360
036185**011370      PERFORM Z100-CALL-PEM.                              LSE11370

036187**011390 Y100-EXIT.                                               LSE11390

036189**011410      EXIT.                                               LSE11410
         72

036191**011430 Z100-CALL-PEM SECTION.                                   LSE11430

036193**011450      CALL 'PEM' USING TRANSACTION-CONTROL-BLOCK.         LSE11450

036195**011470 Z100-EXIT.                                               LSE11470

036197**011490      EXIT.                                               LSE11490

036200**011520 Z300-END-PROGRAM SECTION.                                LSE11520

036202**011540      MOVE CA-PEM-END-PROG TO TCB-ACTIVITY.               LSE11540
036203**011550      PERFORM Z100-CALL-PEM.                              LSE11550

036205**011570 Z300-EXIT.                                               LSE11570

036207**011590      EXIT.                                               LSE11590
              MEMORY MAP

TGT                       00310

SAVE AREA                    00310
   SWITCH                       00358
   TALLY                        0035C
   SORT SAVE                    00360
   ENTRY-SAVE                   00364
   SORT CORE SIZE               00368
   RET CODE                     0036C
   SORT RET                     0036E
   WORKING CELLS                00370
   SORT FILE SIZE               004A0
   SORT MODE SIZE               004A4
   PGT-VN TBL                   004A8
   TGT-VN TBL                   004AC
   RESERVED                     004B0
```

| | |
|---|---|
| LENGTH OF VN TBL | 00484 |
| LABEL RET | 00486 |
| RESERVED | 00487 |
| DBG R14SAVE | 00488 |
| COBOL INDICATOR | 0048C |
| A(INIT1) | 004C0 |
| DEBUG TABLE PTR | 004C4 |
| SUBCOM PTR | 004C8 |
| SORT-MESSAGE | 004CC |
| SYSOUT DDNAME | 004D4 |
| RESERVED | 004D5 |
| COBOL ID | 004D6 |
| COMPILED POINTER | 004D8 |
| COUNT TABLE ADDRESS | 004DC |
| RESERVED | 004E0 |
| DBG R11SAVE | 004E8 |
| COUNT CHAIN ADDRESS | 004EC |
| PRBL1 CELL PTR | 004F0 |
| RESERVED | 004F4 |
| TA LENGTH | 004F9 |
| RESERVED | 004FC |
| PCS LIT PTR | 00504 |
| DEBUGGING | 00508 |
| CD FOR INITIAL INPUT | 0050C |
| OVERFLOW CELLS | 00510 |
| BL CELLS | 00510 |
| DECBADR CELLS | 00514 |
| FIB CELLS | 00514 |
| TEMP STORAGE | 00518 |
| TEMP STORAGE-2 | 00548 |
| TEMP STORAGE-3 | 00560 |
| TEMP STORAGE-4 | 00560 |
| BLL CELLS | 00560 |
| VLC CELLS | 005BC |

7A

| | |
|---|---|
| SBL CELLS | 005BC |
| INDEX CELLS | 005BC |
| SUBADR CELLS | 005BC |
| ONCTL CELLS | 005C0 |
| PFMCTL CELLS | 005C0 |
| PFMSAV CELLS | 005C0 |
| VN CELLS | 00708 |
| SAVE AREA =2 | 00848 |
| SAVE AREA =3 | 00848 |
| XSASM CELLS | 00848 |
| XSA CELLS | 00848 |
| PARAM CELLS | 00848 |
| RPTSAV AREA | 00890 |
| CHECKPT CTR | 00890 |

LITERAL POOL (HEX)

```
00A20 (LIT+0)    F0F0F0F0  F0F0F0F0  00000000  00000000  0CF0F0F1  F0F0F2F8
00A38 (LIT+24)   F0F300SC  F0F0F4F8  F0F507S0  000CF0F1  F201ZCF8  F0F6F8F0
00A50 (LIT+48)   F7008CF0  F8F7F1F0  F0F0F0F0  F0F8F0F9  1CF0F1F5  00000160
00A68 (LIT+72)   365C100C  40202120  00010013  00000016  099999C  099C4020
00A80 (LIT+96)   20202068  20202068  20202068  20202148  2020F8F3  F6F0F2F4
00A98 (LIT+120)  05610140  40404040  400561C1
```

| | |
|---|---|
| PGT | 00890 |
| DEBUG LINKAGE AREA | 00890 |
| OVERFLOW CELLS | 00890 |
| VIRTUAL CELLS | 00894 |
| PROCEDURE NAME CELLS | 008BC |
| GENERATED NAME CELLS | 008BC |
| DCB ADDRESS CELLS | 008BC |
| VNI CELLS | 008BC |
| LITERALS | 00A20 |
| DISPLAY LITERALS | 00AA4 |
| PROCEDURE BLOCK CELLS | 00AA4 |

REGISTER ASSIGNMENT

| | |
|---|---|
| REG 6 | BLL =19 |
| REG 7 | BLL =6 |
| REG 8 | BL =1 |
| REG 9 | BLL =5 |
| REG 10 | BLL =22 |

WORKING-STORAGE STARTS AT LOCATION 000A0 FOR A LENGTH OF 0026C.

7B

PROCEDURE BLOCK ASSIGNMENT

PBL = REG 11

PBL =1   STARTS AT LOCATION 000AAC STATEMENT 35208
PBL =2   STARTS AT LOCATION 00190A STATEMENT 35796

CONDENSED LISTING

| | | | | | | | | |
|---|---|---|---|---|---|---|---|---|
| 35208 | ENTRY | 000AAC | 35231 | MOVE | 000B44 | 35233 | PERFORM | 000B4E |
| 35235 | IF | 000B8A | 35236 | PERFORM | 000B94 | 35238 | IF | 000BB2 |
| 35239 | PERFORM | 000BC2 | 35241 | IF | 000BDA | 35242 | PERFORM | 000BEA |
| 35244 | IF | 000C02 | 35245 | PERFORM | 000C12 | 35247 | IF | 000C2E |
| 35248 | PERFORM | 000C3E | 35250 | PERFORM | 000C5A | 35252 | PERFORM | 000C7A |
| 35254 | PERFORM | 000C9A | 35256 | STOP | 000CBA | 35260 | PERFORM | 000CC0 |
| 35262 | PERFORM | 000CDC | 35264 | PERFORM | 000CF8 | 35266 | PERFORM | 000D14 |
| 35268 | PERFORM | 000D30 | 35270 | PERFORM | 000D4C | 35272 | IF | 000D68 |

| | | | | | | | | |
|---|---|---|---|---|---|---|---|---|
| 35273 | MOVE | 000080 | 35275 | IF | 000088 | 35276 | MOVE | 00009C |
| 35278 | IF | 0000A4 | 35279 | MOVE | 0000BA | 35281 | IF | 0000C0 |
| 35282 | MOVE | 0000D6 | 35284 | EXIT | 0000DC | 35290 | MOVE | 0000E2 |
| 35291 | PERFORM | 0000EC | 35295 | MOVE | 0000E08 | 35300 | MOVE | 0000E12 |
| 35301 | PERFORM | 000E1C | 35305 | EXIT | 000E38 | 35310 | MOVE | 000E42 |
| 35311 | MOVE | 000E4C | 35312 | MOVE | 000E52 | 35313 | MOVE | 000E58 |
| 35314 | MOVE | 000E5E | 35315 | MOVE | 000E64 | 35316 | MOVE | 000E6A |
| 35317 | MOVE | 000E70 | 35318 | MOVE | 000E76 | 35319 | MOVE | 000E7C |
| 35320 | MOVE | 000E82 | 35321 | MOVE | 000E88 | 35322 | MOVE | 000E8E |
| 35323 | MOVE | 000E94 | 35324 | MOVE | 000E9A | 35326 | MOVE | 000EA0 |
| 35328 | MOVE | 000EA6 | 35331 | IF | 000EAC | 35332 | MOVE | 000EBE |
| 35334 | MOVE | 000ECC | 35339 | EXIT | 000EDE | 35343 | MOVE | 000EE4 |
| 35344 | PERFORM | 000EEE | 35348 | EXIT | 000F0A | 35353 | MOVE | 000F14 |
| 35354 | PERFORM | 000F1E | 35358 | EXIT | 000F3A | 35363 | MOVE | 000F44 |
| 35365 | MOVE | 000F54 | 35385 | EXIT | 000F8A | 35389 | PERFORM | 000FC0 |
| 35391 | MOVE | 000FD8 | 35393 | PERFORM | 000FF4 | 35395 | PERFORM | 001010 |
| 35397 | PERFORM | 00102C | 35399 | PERFORM | 001048 | 35401 | PERFORM | 001064 |
| 35403 | PERFORM | 001080 | 35405 | PERFORM | 00109C | 35407 | PERFORM | 001088 |
| 35409 | PERFORM | 0010D4 | 35411 | PERFORM | 0010F0 | 35413 | PERFORM | 00110C |
| 35417 | EXIT | 001128 | 35421 | IF | 001132 | 35423 | MOVE | 001140 |
| 35424 | PERFORM | 00114A | 35426 | MOVE | 00116E | 35430 | EXIT | 001182 |
| 35435 | IF | 001188 | 35439 | MOVE | 0011A6 | 35440 | PERFORM | 0011B0 |
| 35444 | EXIT | 0011CC | 35449 | IF | 0011D6 | 35453 | MOVE | 0011F0 |
| 35454 | PERFORM | 0011FA | 35458 | EXIT | 001216 | 35462 | IF | 001220 |
| 35464 | MOVE | 001232 | 35466 | IF | 00123C | 35468 | MOVE | 001244 |
| 35469 | PERFORM | 001250 | 35473 | EXIT | 00126C | 35478 | IF | 001276 |
| 35481 | MOVE | 00129A | 35482 | MOVE | 0012A4 | 35483 | MOVE | 0012AE |
| 35485 | MOVE | 0012B6 | 35486 | MOVE | 0012BA | 35488 | MOVE | 0012C0 |
| 35489 | PERFORM | 0012CA | 35491 | MOVE | 0012E6 | 35495 | EXIT | 0012F0 |
| 35499 | IF | 0012FA | 35501 | MOVE | 001308 | 35502 | PERFORM | 001312 |
| 35506 | EXIT | 00132E | 35511 | IF | 001338 | 35514 | MOVE | 00134C |
| 35515 | PERFORM | 001356 | 35517 | MOVE | 00137A | 35521 | EXIT | 001394 |
| 35525 | IF | 00139A | 35532 | MOVE | 0013E6 | 35533 | PERFORM | 0013F0 |
| 35548 | IF | 00140C | 35550 | IF | 00141C | 35552 | PERFORM | 001426 |
| 35554 | PERFORM | 001446 | 35558 | EXIT | 00145E | 35582 | IF | 001468 |
| 35584 | IF | 001478 | 35588 | MOVE | 001490 | 35589 | PERFORM | 00149A |
| 35591 | MOVE | 0014BE | 35595 | IF | 0014CC | 35595 | MOVE | 0014BA |
| 35596 | PERFORM | 0014E4 | 35600 | EXIT | 001500 | 35612 | IF | 00150A |
| 35614 | MOVE | 001518 | 35616 | IF | 001522 | 35618 | MOVE | 001532 |
| 35619 | PERFORM | 00153C | 35623 | EXIT | 001558 | 35628 | IF | 001562 |
| 35631 | MOVE | 00157E | 35632 | PERFORM | 001588 | 35636 | EXIT | 0015A4 |
| 35641 | IF | 0015AE | 35643 | MOVE | 0015C0 | 35645 | IF | 0015CA |
| 35647 | MOVE | 0015D4 | 35648 | PERFORM | 0015DE | 35652 | EXIT | 0015FA |
| 35656 | IF | 001604 | 35658 | MOVE | 001616 | 35660 | MOVE | 001628 |

| | | | | | | | | |
|---|---|---|---|---|---|---|---|---|
| 35661 | MOVE | 001632 | 35662 | MOVE | 00163C | 35664 | MOVE | 001646 |
| 35665 | MOVE | 00164A | 35667 | MOVE | 00164E | 35668 | PERFORM | 001658 |
| 35670 | MOVE | 001674 | 35672 | IF | 00167E | 35675 | MOVE | 0016A2 |
| 35676 | PERFORM | 0016AC | 35680 | EXIT | 0016C8 | 35685 | IF | 0016D2 |
| 35688 | MOVE | 0016F6 | 35689 | MOVE | 001700 | 35690 | MOVE | 00170A |
| 35692 | MOVE | 001712 | 35693 | MOVE | 001716 | 35695 | MOVE | 00171C |
| 35696 | PERFORM | 001726 | 35698 | MOVE | 001742 | 35702 | EXIT | 00174C |
| 35707 | IF | 001756 | 35709 | MOVE | 001768 | 35711 | MOVE | 001772 |
| 35712 | PERFORM | 00177C | 35716 | EXIT | 001798 | 35721 | MOVE | 0017A2 |
| 35722 | PERFORM | 0017AC | 35726 | EXIT | 0017C8 | 35753 | IF | 0017D2 |
| 35755 | MOVE | 0017E2 | 35757 | COMPUTE | 001800 | 35760 | COMPUTE | 00181E |
| 35773 | IF | 00183C | 35775 | MOVE | 001846 | 35776 | PERFORM | 001850 |
| 35778 | IF | 001874 | 35779 | MOVE | 00187E | 35789 | IF | 001884 |
| 35791 | PERFORM | 00189E | 35792 | PERFORM | 0018BE | 35794 | IF | 0018DE |
| 35795 | MOVE | 0018EE | 35796 | PERFORM | 0018F8 | 35798 | MOVE | 001918 |
| 35802 | EXIT | 00195C | 35806 | MOVE | 001942 | 35807 | MOVE | 001954 |
| 35809 | MOVE | 001968 | 35810 | MOVE | 00197C | 35811 | MOVE | 001992 |
| 35813 | MOVE | 0019AE | 35817 | EXIT | 0019B4 | 35822 | CALL | 0019BA |
| 35835 | EXIT | 001A2C | 35839 | MOVE | 001A32 | 35840 | PERFORM | 001A3C |
| 35844 | EXIT | 001A54 | 35862 | COMPUTE | 001A8E | 35865 | COMPUTE | 001AB6 |
| 35868 | COMPUTE | 001A9E | 35872 | IF | 001AB6 | 35874 | MOVE | 001AC4 |
| 35875 | MOVE | 001ABC | 35877 | MOVE | 001AF0 | 35878 | PERFORM | 001AFA |
| 35880 | COMPUTE | 001B12 | 35885 | MOVE | 001B62 | 35887 | PERFORM | 001B82 |
| 35891 | EXIT | 001B9E | 35895 | MOVE | 001BA8 | 35896 | MOVE | 001BC0 |
| 35897 | MOVE | 001BCE | 35898 | MOVE | 001BD4 | 35900 | COMPUTE | 001BEA |
| 35903 | MOVE | 001C08 | 35905 | PERFORM | 001C0E | 35907 | IF | 001C26 |
| 35909 | MOVE | 001C36 | 35910 | PERFORM | 001C40 | 35912 | MOVE | 001C60 |
| 35916 | EXIT | 001C84 | 35921 | CALL | 001C8A | 35954 | EXIT | 001CFC |
| 35938 | MOVE | 001D02 | 35939 | MOVE | 001D0A | 35941 | IF | 001D0E |
| 35942 | MOVE | 001D18 | 35943 | MOVE | 001D1C | 35944 | MOVE | 001D20 |
| 35946 | MOVE | 001D24 | 35947 | PERFORM | 001D2E | 35951 | EXIT | 001D46 |
| 35955 | MOVE | 001D50 | 35959 | IF | 001D64 | 35961 | PERFORM | 001D70 |
| 35963 | MOVE | 001D90 | 35964 | MOVE | 001D98 | 35965 | MOVE | 001D9C |
| 35967 | MOVE | 001DA4 | 35968 | PERFORM | 001DAE | 35972 | EXIT | 001DC6 |
| 35976 | IF | 001DD0 | 35978 | MOVE | 001DDC | 35979 | MOVE | 001DE4 |
| 35981 | MOVE | 001DEC | 35982 | MOVE | 001DF4 | 35984 | MOVE | 001DF8 |
| 35986 | PERFORM | 001E00 | 35988 | MOVE | 001E18 | 35989 | MOVE | 001E22 |
| 35990 | MOVE | 001E28 | 35991 | PERFORM | 001E32 | 35993 | MOVE | 001E4E |
| 35994 | MOVE | 001E58 | 35995 | MOVE | 001E5E | 35996 | PERFORM | 001E68 |
| 35998 | MOVE | 001E84 | 35999 | MOVE | 001E8E | 36000 | MOVE | 001E94 |
| 36001 | PERFORM | 001E9E | 36003 | MOVE | 001EBA | 36004 | MOVE | 001EC2 |
| 36005 | MOVE | 001EC8 | 36006 | MOVE | 001ECE | 36007 | PERFORM | 001ED8 |
| 36011 | EXIT | 001EF4 | 36015 | PERFORM | 001EFE | 36017 | PERFORM | 001F16 |
| 36019 | PERFORM | 001F32 | 36021 | PERFORM | 001F4E | 36025 | EXIT | 001F6A |
| 36029 | MOVE | 001F74 | 36030 | PERFORM | 001F82 | 36031 | MOVE | 001F9A |
| 36033 | MOVE | 001FA4 | 36034 | MOVE | 001FB2 | 36035 | MOVE | 001FB8 |
| 36036 | MOVE | 001FBC | 36037 | MOVE | 001FC2 | 36038 | MOVE | 001FC6 |
| 36040 | MOVE | 001FCC | 36041 | COMPUTE | 001FDE | 36043 | MOVE | 001FFA |
| 36044 | MOVE | 002004 | 36045 | MOVE | 002012 | 36046 | PERFORM | 00201C |
| 36048 | MOVE | 002038 | 36050 | IF | 002042 | 36051 | MOVE | 002054 |
| 36053 | MOVE | 002070 | 36055 | PERFORM | 002076 | 36060 | IF | 00200C |
| 36061 | MOVE | 0020EC | 36063 | IF | 0020FA | 36064 | MOVE | 002108 |
| 36067 | MOVE | 00212C | 36072 | EXIT | 00214C | 36079 | EXIT | 002152 |
| 36092 | MOVE | 002158 | 36093 | PERFORM | 002170 | 36094 | MOVE | 002188 |

| | | | | | | | | | |
|---|---|---|---|---|---|---|---|---|---|
| 36094 | MOVE | 002192 | | 36097 | PERFORM | 0021A6 | 36098 | MOVE | 0021C2 |
| 36101 | IF | 0021CC | | 36103 | MOVE | 0021DE | 36104 | PERFORM | 0021F2 |
| 36105 | MOVE | 00220A | | 36107 | MOVE | 00221C | 36109 | COMPUTE | 002222 |
| 36112 | COMPUTE | 00223E | | 36117 | COMPUTE | 00225C | 36125 | EXIT | 002286 |
| 36129 | IF | 00228C | | 36132 | MOVE | 0022A8 | 36134 | COMPUTE | 0022B2 |
| 36140 | MOVE | 0022DC | | 36143 | IF | 0022EE | 36145 | COMPUTE | 0022FC |
| 36148 | MOVE | 0023OE | | 36150 | MOVE | 002324 | 36154 | EXIT | 00232A |
| 36158 | MOVE | 002330 | | 36159 | MOVE | 002342 | 36160 | MOVE | 002354 |
| 36162 | COMPUTE | 002368 | | 36165 | COMPUTE | 002384 | 36170 | EXIT | 0023A8 |
| 36173 | MOVE | 0023A6 | | 36176 | PERFORM | 002380 | 36180 | EXIT | 0023C8 |
| 36184 | MOVE | 0023D2 | | 36185 | PERFORM | 0023DC | 36189 | EXIT | 0023F4 |
| 36193 | CALL | 0023FE | | 36197 | EXIT | 00242C | 36202 | MOVE | 002432 |
| 36203 | PERFORM | 00243C | | 36207 | EXIT | 002464 | | | |

```
*STATISTICS*    SOURCE RECORDS = 2297   DATA DIVISION STATEMENTS = 898   PROCEDURE DIVISION STATEMENTS = 578
*OPTIONS IN EFFECT*   SIZE = 706432  BUF = 176128  LINECNT = 54  SPACE1, FLAGW,   SEQ,   SOURCE
*OPTIONS IN EFFECT*   NODMAP, NOPMAP,   CLIST,    SUPMAP,NOXREF,   SXREF,   LOAD, NODECK, APOST, NOTRUNC, NOFLOW
*OPTIONS IN EFFECT*   TERM,   NUM, NOBATCH, NONAME, COMPILE=01, NOSTATE, NORESIDENT, NODYNAM,   LIB,  CSYNTAX
*OPTIONS IN EFFECT*   OPTIMIZE, NOSYMDMP, NOTEST,    VERB,    ZWB, SYST, NOENDJOB, NOLVL
*OPTIONS IN EFFECT*   NDLST , NOFDECK,NOCDECK, LCOL2, L120, NODUMP , NOADV , NOPRINT,
*OPTIONS IN EFFECT*   NOCOUNT, NOVBSUM, NOVBREF, LANGLVL(2)
```

CROSS-REFERENCE DICTIONARY

| DATA NAMES | DEFN | REFERENCE | | |
|---|---|---|---|---|
| CA-PEM-CHECKPOINT | 001213 | | | |
| CA-PEM-DISABLE-ABEND-EXIT | 001211 | | | |
| CA-PEM-DUMP-DG-END | 001207 | | | |
| CA-PEM-DUMP-DG-RETURN | 001205 | | | |
| CA-PEM-DUMP-TCB-TRACE | 001203 | | | |
| CA-PEM-DYN-DG-ALOC | 001191 | | | |
| CA-PEM-DYN-DG-INIT | 001195 | | | |
| CA-PEM-DYN-DG-REL | 001193 | | | |
| CA-PEM-ENABLE-ABEND-EXIT | 001209 | | | |
| CA-PEM-END-PROG | 001187 | 036202 | | |
| CA-PEM-END-TRANS | 001189 | | | |
| CA-PEM-NO-OP | 001197 | | | |
| CA-PEM-TRANS-DUMP-END | 001201 | | | |
| CA-PEM-TRANS-DUMP-RETURN | 001199 | | | |
| C3J60300 | 001416 | | | |
| C3J61232 | 001479 | | | |
| C3J62008 | 001510 | | | |
| C3J62010 | 001527 | | | |
| C3J62080 | 001549 | | | |
| C3J65003 | 032072 | | | |
| C3J65150 | 032114 | | | |
| C3J65251 | 032249 | | | |
| C3J65252 | 035009 | | | |
| C3J65253 | 035085 | | | |
| C3J65254 | 035106 | | | |
| CSE182 | 035141 | | | |
| CSE182-A | 035147 | 035895 | 035921 | |
| CSE182-D | 035148 | 035807 | 035921 | |
| CSE182-F | 035149 | 035896 | 035921 | |
| CSE182-G | 035150 | 035897 | 035921 | |
| CSE182-I | 035151 | 035898 | 035921 | |
| CSE182-INPUT | 035145 | | | |
| CSE182-K | 035156 | 035921 | | |
| CSE182-OUTPUT | 035159 | | | |
| CSE182-P | 035152 | 035900 | 035921 | |
| CSE182-R | 035157 | 035921 | | |
| CSE182-T | 035164 | | | |
| CSE182-TERM-REMAIN | 035161 | 035907 | 035912 | 035921 |
| CSE182-TERM-REMAIN-X | 035160 | | | |
| CSE182-U | 035165 | | | |
| CSE182-V | 035166 | | | |
| CSE182-W | 035167 | | | |
| CSE182-WORKAREA | 035163 | | | |
| CSE182-X | 035168 | | | |
| CSE182-Y | 035169 | | | |
| CSE182-Z | 035153 | 035903 | 035921 | |
| CSE183 | 035186 | | | |
| CSE183-A | 035192 | 035806 | 035822 | |
| CSE183-AVE-PYMT-AMT | 035204 | 035794 | 035798 | 035822 |
| CSE183-AVE-PYMT-AMT-X | 035205 | | | |
| CSE183-C | 035198 | 035811 | 035822 | |
| CSE183-D | 035193 | 035807 | 035822 | |
| CSE183-F | 035199 | 035811 | 035822 | |
| CSE183-I | 035197 | 035810 | 035822 | |
| CSE183-INPUT | 035190 | | | |
| CSE183-M | 035194 | 035822 | | |
| CSE183-N | 035195 | 035809 | 035822 | |
| CSE183-O | 035196 | 035822 | | |
| CSE183-OUTPUT | 035204 | | | |
| CSE183-Z | 035200 | 035813 | 035822 | |
| CSE51965 | 001317 | | | |
| CSE51979 | 001363 | | | |
| CS1965-ACTION | 001319 | | | |
| CS1965-RESULT | 001320 | | | |
| CS1965-TRAN-ADJ-DATE | 001351 | | | |
| CS1965-TRAN-ADJ-DT-D | 001353 | 035323 | | |
| CS1965-TRAN-ADJ-DT-M | 001352 | 035322 | | |

| | | | | |
|---|---|---|---|---|
| C51965-TRAN-ADJ-DT-Y | 001354 | 035324 | | |
| C51965-TRAN-AMORT-RENEW-TERM | 001337 | 035326 | | |
| C51965-TRAN-AMORT-TERM | 001338 | | | |
| C51965-TRAN-FIELDS | 001323 | | | |
| C51965-TRAN-FIRST-PDD | 001331 | | | |
| C51965-TRAN-FIRST-PDD-D | 001333 | 035315 | | |
| C51965-TRAN-FIRST-PDD-M | 001332 | 035314 | | |
| C51965-TRAN-FIRST-PDD-Y | 001334 | 035316 | | |
| C51965-TRAN-FREQ-DATE-INFO | 001329 | | | |
| C51965-TRAN-INT-METHOD | 001345 | 035318 | | |
| C51965-TRAN-INT-RATE | 001325 | | | |
| C51965-TRAN-INT-RATE-IND | 001328 | | | |
| C51965-TRAN-INT-RATE-X | 001324 | 035311 | | |
| C51965-TRAN-INT-RENEW-TERM | 001339 | | | |
| C51965-TRAN-INT-RULE | 001327 | | | |
| C51965-TRAN-PERC-RATE-FACTOR | 001356 | 035334 | | |
| C51965-TRAN-PERC-RATE-FACTOR-X | 001355 | 035331 | | |
| C51965-TRAN-PROCEEDS | 001336 | | | |
| C51965-TRAN-PROCEEDS-X | 001335 | 035317 | | |
| C51965-TRAN-PYMT-FREQ | 001330 | 035313 | | |
| C51965-TRAN-RULE-RATE-INFO | 001326 | 035312 | | |
| C51965-TRAN-RV-FACTOR | 001344 | | | |
| C51965-TRAN-RV-FACTOR-X | 001343 | | | |
| C51965-TRAN-ST-DT-D | 001349 | 035320 | | |
| C51965-TRAN-ST-DT-M | 001348 | 035319 | | |
| C51965-TRAN-ST-DT-Y | 001350 | 035321 | | |
| C51965-TRAN-START-ADJ-DATE | 001346 | | | |
| C51965-TRAN-START-DATE | 001347 | | | |
| C51965-TRAN-STICKER-PRICE | 001342 | | | |
| C51965-TRAN-STICKER-PRICE-X | 001341 | | | |
| C51965-TRAN-STK-PRICE-RV-FACTR | 001340 | 035328 | | |
| C51965-TRAN-TRANSIT-LN | 001322 | 035310 | | |
| C51979-ACTION | 001365 | | | |
| C51979-AMORT-NO-PYMT | 001408 | 036165 | | |
| C51979-COLON-1 | 001372 | 036035 | | |

82

| | | | | |
|---|---|---|---|---|
| C51979-COLON-2 | 001374 | 036037 | | |
| C51979-DATA-OSE050BM-OSE050EM | 001384 | | | |
| C51979-DATA-OSE050CM-OSE050FM | 001393 | | | |
| C51979-DATA-OSE050GM-OSE050NM | 001403 | | | |
| C51979-DATA-OSE50AM-OSE500M | 001368 | | | |
| C51979-FILLER-1 | 001382 | | | |
| C51979-FILLER-2 | 001391 | | | |
| C51979-FILLER-3 | 001401 | | | |
| C51979-FILLER-4 | 001409 | | | |
| C51979-FIRST-PYMT-DUE-DATE | 001386 | 036090 | | |
| C51979-INT-ADJ-AMT | 001399 | 036148 | | |
| C51979-INT-ADJ-AMT-X | 001398 | 036150 | | |
| C51979-INT-ADJ-DATE | 001387 | 036105 | 036107 | |
| C51979-INT-METHOD-DESC | 001378 | 036048 | | |
| C51979-INT-RATE | 001377 | 036041 | | |
| C51979-INT-RENEW-TERM-COST | 001395 | 036140 | | |
| C51979-INT-RENEW-TERM-COST-X | 001394 | 036132 | | |
| C51979-INT-TERM | 001380 | 036051 | | |
| C51979-INT-TERM-X | 001379 | 036053 | | |
| C51979-LOCAL-ENTRY-DATE | 001369 | 036031 | | |
| C51979-LOCAL-ENTRY-HH | 001371 | 036034 | | |
| C51979-LOCAL-ENTRY-MM | 001373 | 036036 | | |
| C51979-LOCAL-ENTRY-SS | 001375 | 036038 | | |
| C51979-LOCAL-ENTRY-TIME | 001370 | | | |
| C51979-NO-OF-PYMT | 001388 | 036109 | | |
| C51979-PROCEEDS | 001376 | 036040 | | |
| C51979-PYMT-FREQ-DESC | 001381 | 036061 | 036064 | 036067 |
| C51979-PYMT-FREQ-INT | 001404 | 036158 | | |
| C51979-REG-PYMT-AMT | 001389 | 036112 | | |
| C51979-RESIDUAL-FACTOR | 001407 | 036162 | | |
| C51979-RESIDUAL-VALUE | 001405 | 036159 | | |
| C51979-RESULT | 001366 | | | |
| C51979-START-DATE | 001385 | 036094 | | |
| C51979-STICKER-PRICE | 001406 | 036160 | | |
| C51979-TOTAL-INT-COST | 001390 | 036117 | | |
| C60300-ACTION | 001418 | | | |
| C60300-RESULT | 001419 | | | |
| C60300-WORK-AREA | 001421 | | | |
| C61232-ACTION | 001480 | | | |
| C61232-CENT-YEAR | 001496 | | | |
| C61232-CORR-MAND-IND | 001492 | 035483 | 035662 | 035690 |
| C61232-CORRECTION | 001490 | 035482 | 035661 | 035689 |
| C61232-FIELD-NO | 001493 | 035484 | 035665 | 035693 |
| C61232-FILLER | 001504 | | | |
| C61232-IN-CENTURY | 001484 | | | |
| C61232-IN-DAY | 001488 | | | |
| C61232-IN-MONTH | 001487 | | | |
| C61232-IN-YEAR | 001486 | | | |
| C61232-INPUT-DATE | 001485 | | | |
| C61232-INPUT-DATE-X | 001483 | 035481 | 035660 | 035688 |
| C61232-OUT-CENTURY | 001497 | 035491 | 035670 | 035698 |
| C61232-OUT-DATE | 001495 | | | |
| C61232-OUT-DATE-NUM | 001501 | | | |
| C61232-OUT-DAY | 001500 | | | |

83

| | | | | |
|---|---|---|---|---|
| C61232-OUT-MONTH | 001499 | | | |
| C61232-OUT-YEAR | 001498 | | | |
| C61232-REG-MAND-IND | 001491 | 035483 | 035662 | 035690 |
| C61232-RESULT | 001481 | | | |
| C61232-SPEC-EDIT-IND | 001489 | 035485 | 035664 | 035692 |
| C61232-WS-MAND-IND | 001503 | | | |
| C62008-ACTION | 001512 | | | |
| C62008-CALENDAR-DATE | 001517 | 036029 | 036092 | 036096 036103 |
| C62008-DATE-DISPLAY-FORMAT | 001521 | 036031 | 036094 | 036098 036105 |
| C62008-RESULT | 001513 | | | |

| | | | |
|---|---|---|---|
| C62010-ACTION | 001529 | | |
| C62010-END-DATE | 001536 | 035075 | |
| C62010-FREQUENCY | 001534 | | |
| C62010-NO-OF-PERIOD | 001540 | 035007 | 035000 |
| C62010-RESULT | 001530 | | |
| C62010-START-DATE | 001535 | 035074 | |
| C62080-ACTION | 001550 | | |
| C62080-APPL-CODE | 001553 | | |
| C62080-BR-BUS-DAY-BACK | 001567 | 035672 | |
| C62080-BR-BUS-DAY-CURR | 001565 | | |
| C62080-BR-BUS-DAY-NEXT | 001566 | | |
| C62080-BV01 | 001572 | | |
| C62080-BV01-BR-AREA | 001592 | | |
| C62080-BV01-BR-COMB-1 | 001589 | | |
| C62080-BV01-BR-COMB-2 | 001590 | | |
| C62080-BV01-BR-CPC | 001594 | | |
| C62080-BV01-BR-DATE-POINTER | 001574 | | |
| C62080-BV01-BR-DATE-POINTER-04 | 001580 | | |
| C62080-BV01-BR-DATE-POINTER-05 | 001581 | | |
| C62080-BV01-BR-DATE-POINTER-06 | 001582 | | |
| C62080-BV01-BR-DATE-POINTER-07 | 001583 | | |
| C62080-BV01-BR-DATE-POINTER-08 | 001584 | | |
| C62080-BV01-BR-DATE-POINTER-09 | 001585 | | |
| C62080-BV01-BR-DATE-POINTER-10 | 001586 | | |
| C62080-BV01-BR-DATE-POINTER-3J | 001579 | | |
| C62080-BV01-BR-DATE-POINTER-5E | 001578 | | |
| C62080-BV01-BR-DATE-POINTER-9H | 001577 | | |
| C62080-BV01-BR-DATE-POINTERS | 001573 | | |
| C62080-BV01-BR-DEL-ADV-CODE | 001600 | | |
| C62080-BV01-BR-DEL-ADV-TABLE | 001599 | | |
| C62080-BV01-BR-DISTRICT | 001591 | | |
| C62080-BV01-BR-ICA-FED-COMM | 001602 | | |
| C62080-BV01-BR-ICA-FED-CONS | 001601 | | |
| C62080-BV01-BR-ICA-PROV-COMM | 001604 | | |
| C62080-BV01-BR-ICA-PROV-CONS | 001603 | | |
| C62080-BV01-BR-INT-BASE-DAY | 001605 | | |
| C62080-BV01-BR-LANG-CODE | 001588 | | |
| C62080-BV01-BR-ONLINE-CPC | 001597 | | |
| C62080-BV01-BR-PARENT-TRANSIT | 001598 | | |
| C62080-BV01-BR-PROC-STATUS | 001596 | | |
| C62080-BV01-BR-REGION | 001593 | | |
| C62080-BV01-BR-RESIDENCE-CODE | 001595 | | |
| C62080-BV01-BR-TIME-ZONE | 001587 | | |
| C62080-BV01-BR-TRANSIT-TYPE | 001606 | | |
| C62080-DATE-POINTER | 001614 | | |
| C62080-DATE-POINTER-X | 001613 | | |
| C62080-FILLER | 001555 | | |
| C62080-RESULT | 001551 | | |
| C62080-TRAN-BUS-DAY | 001564 | 035658 | |
| C62080-TRAN-ENTRY-DATE | 001557 | | |
| C62080-TRAN-ENTRY-TIME | 001558 | | |
| C62080-TRAN-ENTRY-TIMESTAMP | 001556 | | |
| C62080-TRAN-PROC-MODE | 001568 | | |
| C62080-TRANSIT | 001554 | | |
| C62081-ACTION | 001625 | | |
| C62081-APPL-CODE | 001628 | | |
| C62081-BR-BUS-DAY-BACK | 001642 | | |
| C62081-BR-BUS-DAY-CURR | 001640 | | |
| C62081-BR-BUS-DAY-NEXT | 001641 | | |
| C62081-BV01 | 001647 | | |
| C62081-BV01-BR-AREA | 001667 | | |
| C62081-BV01-BR-COMB-1 | 001664 | | |
| C62081-BV01-BR-COMB-2 | 001665 | | |
| C62081-BV01-BR-CPC | 001669 | | |
| C62081-BV01-BR-DATE-POINTER | 001649 | | |
| C62081-BV01-BR-DATE-POINTER-04 | 001655 | | |
| C62081-BV01-BR-DATE-POINTER-05 | 001656 | | |
| C62081-BV01-BR-DATE-POINTER-06 | 001657 | | |
| C62081-BV01-BR-DATE-POINTER-07 | 001658 | | |
| C62081-BV01-BR-DATE-POINTER-08 | 001659 | | |
| C62081-BV01-BR-DATE-POINTER-09 | 001660 | | |
| C62081-BV01-BR-DATE-POINTER-10 | 001661 | | |
| C62081-BV01-BR-DATE-POINTER-3J | 001654 | | |
| C62081-BV01-BR-DATE-POINTER-5E | 001653 | | |
| C62081-BV01-BR-DATE-POINTER-9H | 001652 | | |
| C62081-BV01-BR-DATE-POINTERS | 001648 | | |
| C62081-BV01-BR-DEL-ADV-CODE | 001675 | | |
| C62081-BV01-BR-DEL-ADV-TABLE | 001674 | | |
| C62081-BV01-BR-DISTRICT | 001666 | | |
| C62081-BV01-BR-ICA-FED-COMM | 001677 | | |
| C62081-BV01-BR-ICA-FED-CONS | 001676 | | |
| C62081-BV01-BR-ICA-PROV-COMM | 001679 | | |
| C62081-BV01-BR-ICA-PROV-CONS | 001678 | | |
| C62081-BV01-BR-INT-BASE-DAY | 001680 | | |
| C62081-BV01-BR-LANG-CODE | 001663 | 036044 | 036063 |
| C62081-BV01-BR-ONLINE-CPC | 001672 | | |
| C62081-BV01-BR-PARENT-TRANSIT | 001673 | | |
| C62081-BV01-BR-PROC-STATUS | 001671 | | |
| C62081-BV01-BR-REGION | 001668 | | |
| C62081-BV01-BR-RESIDENCE-CODE | 001670 | | |
| C62081-BV01-BR-TIME-ZONE | 001662 | | |
| C62081-BV01-BR-TRANSIT-TYPE | 001681 | | |
| C62081-DATE-POINTER | 001689 | | |
| C62081-DATE-POINTER-X | 001688 | | |
| C62081-FILLER | 001630 | | |
| C62081-RESULT | 001626 | | |
| C62081-TRAN-BUS-DAY | 001639 | | |
| C62081-TRAN-ENTRY-DATE | 001632 | | |

```
C62081-TRAN-ENTRY-TIME            001633
C62081-TRAN-ENTRY-TIMESTAMP       001631
C62081-TRAN-PROC-MODE             001643
C62081-TRANSIT                    001629
C62380-ACTION                     001699
C62380-EFF-INT-RATE               001709   035810  035862  035880  035898  036041
C62380-FILLER                     001712
C62380-RESULT                     001700
C62380-MS-BASE-RATE               001711
C62405-ACTION                     009000
C62405-COUNT                      026000
C62405-IM-CODE                    028000
C62405-IM-DATA                    024000
C62405-IM-DESC-E                  031000
C62405-IM-DESC-F                  032000
C62405-IM-LIT-E                   029000
C62405-IM-LIT-F                   030000
C62405-IM-TABLE                   027000
C62405-INT-METH-DESC              020000   036048
C62405-INT-METH-LIT               019000
C62405-INT-METHOD                 014000   036043
C62405-LANG-CODE                  015000   036044
C62405-RESULT                     010000
C62405-SUB                        025000
C64000-ACTION                     032011
C64000-CALL-TYPE-IND              032021   035965  035984  036003
C64000-DISPLAY-ACTIVITY-E         032016   035988  035993  035998  036004
C64000-DISPLAY-ACTIVITY-F         032017   035989  035994  035999  036005
C64000-FILLER                     032025
C64000-LANGUAGE-CODE              032018
C64000-PRINT-BRCH-MESS-IND        032020   035955
C64000-PRINT-LN-MESS-IND          032019   035955
C64000-RESULT                     032012
C64232-ACTION                     032036   035941
C64232-BMP-COUNT-KEY              032039
C64232-BMP-KEY                    032058
C64232-BMP-KEY1                   032059
C64232-BMP-KEY2                   032060
C64232-BMP-KEY3                   032061
C64232-FILL-COMMON-IND            032048   035944
C64232-FILL-COMMON-NO             032050
C64232-FILL-COMMON-YES            032049
C64232-FILLER                     032065
C64232-LOG-IND                    032045   035943
C64232-LOG-IND-MANDATORY          032046
C64232-LOG-IND-OPTIONAL           032047
C64232-ONLINE-KEY                 032054
C64232-ONLINE-KEY1                032055
C64232-ONLINE-KEY2                032056
C64232-RESULT                     032037
C64232-TRAN-TYPE                  032040   035942
C64232-TRAN-TYPE-INQ              032041
C64232-TRAN-TYPE-PROP             032043
C64232-TRAN-TYPE-RPT              032044

C64232-TRAN-TYPE-UPD              032042
C64232-MB-PROC-MODE               032063
C65003-ACTION                     032074
C65003-APPLICATION-CODE           032082
C65003-ERROR-CODE                 032089
C65003-ERROR-COUNT                032088
C65003-ERROR-MESS                 032098
C65003-ERROR-MESSAGE              032090
C65003-ERROR-VAR-1                032099
C65003-ERROR-VAR-2                032100
C65003-ERROR-VAR-3                032101
C65003-INPUT-ERROR                032080   035423  035439  035453  035468  035501  035514  035532  035568  035595  035618
                                           035631  035647  035675  035711  035775  035795  035909
C65003-INPUT-ERROR-X              032079
C65003-LANGUAGE-CODE              032084
C65003-LANGUAGE-CODE-X            032083
C65003-RESULT                     032075
C65003-TXN-BUSINESS-DATE          032081
C65003-WORK-AREA                  032094
C65150-TL-AC-LIC-PRODUCED         032182
C65150-TL-AC-NO                   032136
C65150-TL-AC-NO-SGMT              032135
C65150-TL-AC-PRODUCED             032181
C65150-TL-AC-SGMT                 032137
C65150-TL-ACCEPT                  032156   035235  035238  035241  035244  035247  035648  035672  035789  035959
C65150-TL-ACCEPT-REJECT-IND       032155
C65150-TL-ACCT-LN-NO              032130
C65150-TL-ACCT-NO                 032131
C65150-TL-ACTION                  032116
C65150-TL-APPL-ID                 032165
C65150-TL-APPL-KEY                032129
C65150-TL-APPL-KEY1               032134
C65150-TL-APPL-MAINT-INFO         032222
C65150-TL-BMP-NAME                032140
C65150-TL-CLS-LIC-AC-PRODUCED     032180
C65150-TL-CLS-LIC-PRODUCED        032179
C65150-TL-CNTL-TOT-DIFF           032224
C65150-TL-CO-ID                   032164
C65150-TL-CORRECTION-IND          032214
C65150-TL-FUNC-ID                 032166
C65150-TL-HOGAN-TCB-DATA          032162
C65150-TL-LATE-PAYMENT-IND        032204
C65150-TL-LIC                     032176   035939
C65150-TL-LIC-PRODUCED            032178
C65150-TL-LN-NO                   032132
C65150-TL-LOCALENTRY-DATE         032234   036029
```

| | | |
|---|---|---|
| C65150-TL-LOCALENTRY-TIME | 032235 | 036033 |
| C65150-TL-LOCALENTRY-TIMSTAMP | 032233 | |
| C65150-TL-LOG-DATA | 032142 | |
| C65150-TL-LOG-KEY | 032121 | |
| C65150-TL-LOG-REC-CYC-ON-REQ | 032147 | |
| C65150-TL-LOG-REC-ONLINE | 032145 | |
| C65150-TL-LOG-REC-SCHED-UPDT | 032148 | |
| C65150-TL-LOG-REC-SECURITY | 032146 | |
| C65150-TL-LOG-REC-SEM | 032144 | |
| C65150-TL-LOG-REC-TZ-PARM | 032149 | |
| C65150-TL-LOG-RECORD-CODE | 032143 | 035958 |
| C65150-TL-LP-OFF | 032205 | |
| C65150-TL-LP-ON | 032206 | |
| C65150-TL-MAST-DATE-MEMO | 032239 | |
| C65150-TL-MAST-DATE-REAL | 032124 | |
| C65150-TL-MAST-TIME-MEMO | 032240 | |
| C65150-TL-MAST-TIME-REAL | 032125 | |
| C65150-TL-MAST-TIMESTAMP-MEMO | 032238 | |
| C65150-TL-MAST-TIMESTAMP-REAL | 032123 | |
| C65150-TL-MEMO-INJ-CTL-TOTS | 032228 | |
| C65150-TL-MIRLR-IND | 032201 | |
| C65150-TL-MIRLR-OFF | 032202 | |
| C65150-TL-MIRLR-ON | 032203 | |
| C65150-TL-NO-LIC-PRODUCED | 032177 | |
| C65150-TL-NON-ESSENTIAL-DATA | 032232 | |
| C65150-TL-OTHER-BR-ID | 032216 | |
| C65150-TL-OTHER-BR-ID-BR-BR | 032218 | |
| C65150-TL-OTHER-BR-ID-HUB-SUB | 032219 | |
| C65150-TL-OTHER-BR-ID-NONE | 032217 | |
| C65150-TL-OVERLMT-AC-IND | 032197 | |
| C65150-TL-OVERLMT-AMT | 032199 | |
| C65150-TL-OVERLMT-IND | 032195 | |
| C65150-TL-OVERLMT-LN-OFF-IND | 032198 | |
| C65150-TL-OVERLMT-NO-IND | 032196 | |
| C65150-TL-OVERRIDE | 032157 | |
| C65150-TL-OVERRIDE-IND | 032213 | |
| C65150-TL-PEM-TRAN-CODE | 032163 | |
| C65150-TL-PRINT-REQUEST | 032212 | |
| C65150-TL-REJECT | 032158 | |
| C65150-TL-RESULT | 032117 | |
| C65150-TL-RNA-INPUT-HEADER | 032209 | |
| C65150-TL-RPT-CODE | 032188 | |
| C65150-TL-RPT-CODE-COUNT | 032183 | |
| C65150-TL-RPT-CODE-IND | 032185 | |
| C65150-TL-RPT-INFO | 032175 | |
| C65150-TL-RPT-MESS | 032193 | |
| C65150-TL-RPT-MESS-COUNT | 032184 | |
| C65150-TL-RPT-MESS-IND | 032190 | |
| C65150-TL-SOURCE-TYPE | 032167 | |
| C65150-TL-TCB-DESTINATION | 032172 | |
| C65150-TL-TCB-DEVICE-TYPE | 032173 | |
| C65150-TL-TCB-SOURCE | 032171 | |
| C65150-TL-TIME-ZONE | 032168 | |
| C65150-TL-TRACE-NO | 032159 | |
| C65150-TL-TRAN-BUS-DAY | 032122 | |
| C65150-TL-TRAN-BUS-DAY-LN | 032237 | |
| C65150-TL-TRAN-BUS-DAY-SRC | 032236 | |
| C65150-TL-TRAN-CODE | 032215 | |
| C65150-TL-TRAN-FIELDS | 032229 | |
| C65150-TL-TRAN-IMAGE | 032208 | |
| C65150-TL-TRAN-INPUT-HEADER | 032210 | |
| C65150-TL-TRAN-LOG-RECORD | 032119 | |
| C65150-TL-TRAN-SRC-CODE | 032139 | |
| C65150-TL-TRAN-TYPE | 032150 | |
| C65150-TL-TRAN-TYPE-INQ | 032151 | |
| C65150-TL-TRAN-TYPE-PROP | 032153 | |
| C65150-TL-TRAN-TYPE-RPT | 032154 | |
| C65150-TL-TRAN-TYPE-UPDT | 032152 | |
| C65150-TL-TRANENTRY-DATE | 032169 | |
| C65150-TL-TRANENTRY-TIME | 032170 | |
| C65150-TL-TRANENTRY-TIMESTAMP | 032168 | |
| C65150-TL-TRANSIT-LN | 032128 | |
| C65150-TL-TRANSIT-LN-X | 032127 | |
| C65150-TL-TRANSIT-REPORTING | 032126 | |
| C65150-TL-TRANSIT-SRC | 032211 | |
| C65251-AC-FILLER | 032267 | |
| C65251-AC-KEY | 032266 | |
| C65251-AC-NO | 032269 | |
| C65251-AC-NO-X | 032268 | |
| C65251-AC-SGMT-NO | 032271 | |
| C65251-AC-SGMT-NO-X | 032270 | |
| C65251-ACCT-NO | 032263 | 035279 |
| C65251-ACCT-NO-X | 032262 | 035278 |
| C65251-ACTION | 032251 | |
| C65251-APPL-KEY | 032261 | |
| C65251-CORRECTION-IND | 032259 | 035272 035273 035482 035661 035609 |
| C65251-LN-NO | 032265 | 035282 |
| C65251-LN-NO-X | 032264 | 035281 |
| C65251-OTHER-BR-ID | 032272 | |
| C65251-OVERRIDE-IND | 032258 | 035275 035276 |
| C65251-PRINT-REQUEST | 032257 | 035976 |
| C65251-RESULT | 032252 | |
| C65251-TEST-CASE-NO | 033000 | |
| C65251-TEST-DATE | 034000 | |
| C65251-TEST-RUN-NO | 032275 | |
| C65251-TEST-STEP-NO | 032276 | |
| C65251-TEST-TIME | 035000 | |
| C65251-TESTING-INFO | 032274 | |
| C65251-TRAN-CNTL-BYTE | 032255 | |

| | |
|---|---|
| C65251-TRAN-CODE | 032260 |
| C65251-TRAN-INPUT-HEADER | 032254 |
| C65251-TRANSIT-SRC | 032256 |
| C65252-ACTION | 035011 |
| C65252-RESULT | 035012 |
| C65252-TRAN-FIELDS | 035017 |
| C65252-TRAN-MEMO-INJ-IND | 035014 |
| C65252-TRAN-SRC-CODE | 035015 |
| C65252-TRAN-TRANSIT-LN | 035016 035318 |
| C65253-ACTION | 035087 |
| C65253-DISPLAY-CLASS | 035094 035963 035978 035981 |
| C65253-HEADER-LENGTH | 035091 |
| C65253-ITERATION-COUNT | 035097 |
| C65253-LAST-BUFFER-IND | 035098 |
| C65253-MESSAGE-TYPE | 035092 |
| C65253-PRINT-CLASS | 035095 035964 035979 035982 |
| C65253-REJECT-CODE | 035096 |
| C65253-RESULT | 035088 |
| C65253-RNA-OUTPUT-HEADER | 035090 |
| C65253-SEQUENCE-NO | 035099 |
| C65253-MX-STN-ID | 035093 |
| C65254-ACTION | 035108 |
| C65254-CLEAR-SCREEN-IND | 035113 035955 |
| C65254-OVERRIDE-LEVEL-IND | 035112 |
| C65254-RESULT | 035109 |
| C65254-TRAN-APPL-OUTPUT-HEADER | 035111 |
| C65255-ACTION | 035121 |
| C65255-DATA | 035124 |
| C65255-RESULT | 035122 |
| C9N62061 | 001624 |
| C9N62300 | 001697 |
| C9N62405 | 007000 |
| C9N64000 | 032009 |
| C9N64232 | 032034 |
| C9N65255 | 035119 |
| FILLER-1 | 032133 |
| FILLER-2 | 032138 |
| FILLER-3 | 032242 |
| FREQENCY | 001046 |
| FREQENCY-CODE | 001142 036055 |
| FREQENCY-DESC-E | 001143 036064 |
| FREQENCY-DESC-F | 001144 036067 |
| FREQENCY-LIT-E | 001145 |
| FREQENCY-LIT-F | 001146 |
| FREQENCY01 | 001048 |
| FREQENCY02 | 001054 |
| FREQENCY03 | 001060 |
| FREQENCY04 | 001066 |
| FREQENCY05 | 001072 |
| FREQENCY06 | 001078 |
| FREQENCY07 | 001084 |
| FREQENCY08 | 001090 |
| FREQENCY09 | 001096 |
| FREQENCY10 | 001102 |
| FREQENCY11 | 001104 |
| FREQENCY12 | 001110 |
| FREQENCY13 | 001116 |
| FREQENCY14 | 001122 |
| FREQENCY15 | 001124 |
| FREQENCY16 | 001126 |
| FREQENCY17 | 001128 |
| FREQENCY18 | 001130 |
| FREQENCY19 | 001132 |
| PEM-ACTIVITIES | 001186 |
| PEM-COMMON-ACTIVITIES | 001185 |
| TCB-ABEND-EXIT | 001165 |
| TCB-ABEND-TRANS | 001177 |
| TCB-ACTIVITY | 001239 035290 035300 035343 035353 035488 035667 035695 035721 035839 035877 035946 035967 035990 035995 036000 036006 036045 036175 036184 036202 |
| TCB-ALIEN-X | 001306 |
| TCB-ALIEN-Y | 001307 |
| TCB-ALIEN-Z | 001308 |
| TCB-APPL-ID | 001230 |
| TCB-BATCH | 001293 |
| TCB-BTCH | 001238 |
| TCB-CO-ID | 001229 |
| TCB-DATA-BASE-FULL | 001169 |
| TCB-DATA-GROUP | 001243 |
| TCB-DB-NOT-AVAILABLE | 001171 |
| TCB-DEADLOCK | 001167 |
| TCB-DESTINATION | 001260 |
| TCB-DEVICE-TYPE | 001291 |
| TCB-EFFECTIVE-DATE | 001290 |
| TCB-ENR | 001254 |
| TCB-ENR-ID | 001255 |
| TCB-ENTER | 001263 |
| TCB-EOJ-CALL | 001253 |
| TCB-ERR | 001155 |
| TCB-FAIL | 001161 |
| TCB-FAIL-CHECKPOINT | 001175 |
| TCB-FULL | 001163 |
| TCB-FUNC-ID | 001231 |
| TCB-NO-ACT | 001157 |
| TCB-NOT-AUTH | 001159 |
| TCB-OK | 001153 |
| TCB-OK-CHECKPOINT | 001173 |
| TCB-ONLINE | 001235 |
| TCB-OPERATOR | 001259 |
| TCB-PARM-POS | 001244 |

| | |
|---|---|
| TCB-PFKEY | 001262 |
| TCB-PFKEY-NOT-PRESENT | 001288 |
| TCB-PF01 | 001264 |
| TCB-PF02 | 001265 |
| TCB-PF03 | 001266 |
| TCB-PF04 | 001267 |
| TCB-PF05 | 001268 |
| TCB-PF06 | 001269 |
| TCB-PF07 | 001270 |
| TCB-PF08 | 001271 |
| TCB-PF09 | 001272 |
| TCB-PF10 | 001273 |
| TCB-PF11 | 001274 |
| TCB-PF12 | 001275 |
| TCB-PF13 | 001276 |
| TCB-PF14 | 001277 |
| TCB-PF15 | 001278 |
| TCB-PF16 | 001279 |
| TCB-PF17 | 001280 |
| TCB-PF18 | 001281 |
| TCB-PF19 | 001282 |
| TCB-PF20 | 001283 |
| TCB-PF21 | 001284 |
| TCB-PF22 | 001285 |
| TCB-PF23 | 001286 |
| TCB-PF24 | 001287 |

| | | | | |
|---|---|---|---|---|
| S-RESULT | 001240 | | | |
| S-RESULT-CONSTANTS | 001151 | | | |
| S-RESULTS | 001152 | | | |
| S-SOURCE | 001258 | | | |
| S-SOURCE-TYPE | 001232 | 035251 | | |
| S-SOURCE-TYPE-N | 001233 | | | |
| S-SYS-DATE | 001257 | | | |
| S-TERM-DATA | 001261 | | | |
| S-TIME | 001256 | | | |
| S-TRANS-NO | 001228 | | | |
| S-TXX | 001303 | | | |
| S-USER-AREA-1 | 001243 | | | |
| S-USER-AREA-2 | 001248 | | | |
| S-USER-AREA-3 | 001252 | | | |
| S-USER-CC | 001249 | | | |
| S-USER-COND | 001247 | | | |
| S-USER-DATA | 001241 | | | |
| S-USER-ENVMT | 001251 | | | |
| S-USER-INFO | 001244 | | | |
| S-USER-RESULT | 001250 | | | |
| S-2470-MOD2 | 001304 | | | |
| S-2740-MOD1 | 001305 | | | |
| S-3270-MOD1-PRINTER | 001301 | | | |
| S-3270-MOD2-PRINTER | 001302 | | | |
| S-3270-1 | 001294 | | | |
| S-3270-2 | 001292 | | | |
| S-3600-JP | 001298 | | | |
| S-3600-LP | 001300 | | | |
| S-3600-PB | 001299 | | | |
| S-3604-OS1 | 001295 | | | |
| S-3604-OS3 | 001296 | | | |
| S-3604-OS4 | 001297 | | | |
| TRANSACTION-CONTROL-BLOCK | 001226 | 036195 | | |
| AN25X | 035026 | | | |
| AN25XN | 001429 | | | |
| AN25XM-WORK-AREA | 001432 | 035363 | | |
| SX-TRAN-AMORT-RENEW-TERM | 035046 | 035326 | | |
| SX-TRAN-AMORT-TERM | 035048 | 035517 | 035591 | 035645 |
| SX-TRAN-AMORT-TERM-X | 035047 | 035511 | 035504 | |
| SX-TRAN-APPL-DATA | 035028 | | | |
| SX-TRAN-FIRST-PDO | 035042 | 036096 | | |
| SX-TRAN-FIRST-PDO-C | 035037 | 035491 | | |
| SX-TRAN-FIRST-PDO-D | 035041 | 035515 | | |
| SX-TRAN-FIRST-PDO-M | 035040 | 035514 | | |
| SX-TRAN-FIRST-PDO-X | 035036 | 035401 | | |
| SX-TRAN-FIRST-PDO-Y | 035039 | 035516 | | |
| SX-TRAN-FIRST-PDO-YMD | 035038 | 035478 | | |
| SX-TRAN-FREQ-DATE-INFO | 035034 | | | |
| SX-TRAN-INT-ADJ-DATE | 035075 | 035875 | 036105 | |
| SX-TRAN-INT-ADJ-DATE-C | 035070 | 035690 | | |
| SX-TRAN-INT-ADJ-DATE-D | 035074 | 035323 | | |
| SX-TRAN-INT-ADJ-DATE-M | 035073 | 035322 | | |
| SX-TRAN-INT-ADJ-DATE-X | 035069 | 035688 | 035872 | 036101 | 036129 | 036143 |
| SX-TRAN-INT-ADJ-DATE-Y | 035072 | 035324 | | |

| | | | | | | |
|---|---|---|---|---|---|---|
| T2SX-TRAN-INT-ADJ-DATE-YMD | 035071 | 035685 | | | | |
| T2SX-TRAN-INT-METHOD | 035059 | 035318 | 035441 | 035643 | 035645 | 036045 |
| T2SX-TRAN-INT-RATE | 035030 | 035426 | | | | |
| T2SX-TRAN-INT-RATE-IND | 035033 | 035449 | | | | |
| T2SX-TRAN-INT-RATE-X | 035029 | 035311 | 035421 | | | |
| T2SX-TRAN-INT-RENEW-TERM | 035050 | 035591 | 035614 | 035616 | 035648 | 036051 |
| T2SX-TRAN-INT-RENEW-TERM-X | 035049 | 035525 | 035504 | 035593 | 035612 | 036050 | 036129 |
| T2SX-TRAN-INT-RULE | 035032 | 035435 | 035550 | | | |
| T2SX-TRAN-PERC-RATE-FACTOR | 035078 | 035334 | 035709 | | | |
| T2SX-TRAN-PERC-RATE-FACTOR-X | 035077 | 035332 | 035707 | | | |
| T2SX-TRAN-PROCEEDS | 035045 | 035562 | 035760 | 035885 | 035895 | |
| T2SX-TRAN-PROCEEDS-X | 035044 | 035317 | 035499 | | | |
| T2SX-TRAN-PYMT-AMT-REG | 035052 | | | | | |
| T2SX-TRAN-PYMT-AMT-REG-X | 035051 | | | | | |
| T2SX-TRAN-PYMT-FREQ | 035035 | 035313 | 035442 | 035444 | 035446 | 036055 |
| T2SX-TRAN-RULE-RATE-INFO | 035031 | 035312 | | | | |
| T2SX-TRAN-RV-FACTOR | 035058 | 035733 | 035737 | 036162 | | |
| T2SX-TRAN-RV-FACTOR-X | 035057 | 035428 | | | | |
| T2SX-TRAN-START-ADJ-DATE | 035060 | | | | | |

| Name | Defn | Reference | | | | | | |
|---|---|---|---|---|---|---|---|---|
| T25X-TRAN-START-DATE | 035067 | 035658 | 035672 | 035874 | 036092 | | | |
| T25X-TRAN-START-DATE-C | 035062 | 035670 | | | | | | |
| T25X-TRAN-START-DATE-D | 035066 | 035320 | | | | | | |
| T25X-TRAN-START-DATE-M | 035065 | 035319 | | | | | | |
| T25X-TRAN-START-DATE-X | 035061 | 035656 | 035660 | | | | | |
| T25X-TRAN-START-DATE-Y | 035064 | 035321 | | | | | | |
| T25X-TRAN-START-DATE-YMD | 035063 | | | | | | | |
| T25X-TRAN-STICKER-PRICE | 035056 | 035755 | 035757 | 036160 | | | | |
| T25X-TRAN-STICKER-PRICE-X | 035055 | 035628 | | | | | | |
| T25X-TRAN-STK-PRICE-RV-FACTOR | 035053 | 035328 | | | | | | |
| T25XM-FILLER | 001469 | | | | | | | |
| T25XM-PROP-AMORT-COSTS | 001438 | 035365 | 036117 | | | | | |
| T25XM-PROP-AMORT-TERM | 001436 | 035365 | 035517 | 036009 | 036109 | | | |
| T25XM-PROP-INT-ADJ-AMT | 001440 | 035365 | 036117 | 036134 | 036145 | | | |
| T25XM-PROP-INT-REN-TERM-COSTS | 001439 | 035365 | 036134 | | | | | |
| T25XM-PROP-PROCEEDS-AMT | 001434 | 035365 | 035760 | 035773 | 035778 | 035789 | 035804 | 035885 | 036040 |
| T25XM-PROP-PYMT-AMT-REG | 001435 | 035365 | 035779 | 035790 | 035900 | 036112 | | |
| T25XM-SUB | 001453 | 036055 | 036060 | 036064 | 036067 | | | |
| T25XM-MS-AMORT-TERM | 001444 | 035365 | | | | | | |
| T25XM-MS-AMORT-TERM-RND | 001467 | | | | | | | |
| T25XM-MS-ENTRY-HH | 001457 | 036034 | | | | | | |
| T25XM-MS-ENTRY-MM | 001458 | 036036 | | | | | | |
| T25XM-MS-ENTRY-SS | 001459 | 036038 | | | | | | |
| T25XM-MS-ENTRY-TIME | 001456 | 036033 | | | | | | |
| T25XM-MS-FACTOR | 001442 | 035365 | 035811 | 035896 | | | | |
| T25XM-MS-INT-ADJ-AMT | 001461 | 035365 | 036145 | 036148 | | | | |
| T25XM-MS-INT-RATE-ADDN | 001443 | 035365 | 035426 | | | | | |
| T25XM-MS-INT-RENEW-COST | 001460 | 035365 | 036134 | 036148 | | | | |
| T25XM-MS-INT-RENEW-TERM | 001445 | 035365 | | | | | | |
| T25XM-MS-MAX-EFF-INT-RATE | 001463 | | | | | | | |
| T25XM-MS-MIN-EFF-INT-RATE | 001462 | | | | | | | |
| T25XM-MS-PAYOUT-TERMS | 001464 | 035912 | 036145 | | | | | |
| T25XM-MS-PROCEEDS-AMT-RND | 001465 | | | | | | | |
| T25XM-MS-PYMT-AMT-REG-RND | 001466 | | | | | | | |
| T25XM-MS-RES-VALUE | 001447 | 035365 | 035755 | 035757 | 035760 | 035862 | 035880 | 036159 |
| T25XM-MS-RV-INT-ADJ-AMT | 001451 | 035365 | 035880 | 036117 | 036134 | 036145 | | |
| T25XM-MS-RV-INT-COSTS-AMORT | 001449 | 035365 | 035865 | 036117 | | | | |
| T25XM-MS-RV-INT-COSTS-RENEM | 001450 | 035365 | 035868 | 036134 | | | | |
| T25XM-MS-RV-PYMT-FREQ-INT | 001448 | 035365 | 035862 | 035865 | 035868 | 035900 | 036112 | 036158 |
| MS-ABEND-TRANS-ACT | 000830 | | | | | | | |
| MS-ACTIVITY-DG-ID | 000170 | | | | | | | |
| MS-ALLOC-DG-ACT | 000430 | 035290 | | | | | | |
| MS-BLENDED | 000940 | 035643 | 035645 | | | | | |
| MS-CALC-COST-LOAN-RTN | 000590 | 035839 | | | | | | |
| MS-CALC-EFF-INT-RATE-RTN | 000570 | 035721 | | | | | | |
| MS-CONVERT-DISPLAY-PMT-RTN | 000490 | 036175 | | | | | | |
| MS-DEBLOCK-MAP-ACT | 000450 | 035300 | | | | | | |
| MS-DISPLAY-MAP-RTN | 000630 | 035967 | 035990 | 035995 | 036000 | 036006 | | |
| MS-DISPLAY-OSE50AM-ACT | 000670 | 035988 | | | | | | |
| MS-DISPLAY-OSE50BM-ACT | 000690 | 035993 | | | | | | |
| MS-DISPLAY-OSE50CM-ACT | 000710 | 035998 | | | | | | |
| MS-DISPLAY-OSE50DM-ACT | 000730 | 035989 | | | | | | |
| MS-DISPLAY-OSE50EM-ACT | 000750 | 035994 | | | | | | |
| MS-DISPLAY-OSE50FM-ACT | 000770 | 035999 | | | | | | |
| MS-DISPLAY-OSE50GM-ACT | 000790 | 036004 | | | | | | |
| MS-DISPLAY-OSE50HM-ACT | 000810 | 036005 | | | | | | |
| MS-ENGLISH | 000960 | 036063 | | | | | | |
| MS-ERROR-RTN | 000850 | 036104 | | | | | | |
| MS-FIND-NO-OF-PERIODS-RTN | 000550 | 035877 | | | | | | |
| MS-FIXED | 000910 | 035435 | 035550 | | | | | |
| MS-GET-INT-METHOD-DESC-RTN | 000610 | 036045 | | | | | | |
| MS-INIT-DATE | 000900 | | | | | | | |
| MS-INIT-ONLINE-TRAN-RTN | 000510 | 035343 | | | | | | |
| MS-INIT-SETUP-RTN | 000530 | 035353 | | | | | | |
| MS-MONTHLY | 000950 | 035464 | 035466 | | | | | |
| MS-NA | 001000 | 036132 | 036150 | | | | | |
| MS-NEGATIVE | 000890 | | | | | | | |
| MS-OK | 000970 | | | | | | | |
| MS-ONLINE | 000900 | 035231 | | | | | | |
| MS-PERSONAL-LN-RATE | 000930 | 035435 | | | | | | |
| MS-POSITIVE | 000880 | 035449 | | | | | | |
| MS-RB-PRIME | 000920 | 035435 | | | | | | |
| MS-VERIFY-DATE-RTN | 000470 | 035488 | 035667 | 035695 | | | | |
| MS-WORK-AREA | 000870 | | | | | | | |
| MS-WRITE-TXN-LOG-RTN | 000650 | 035946 | | | | | | |

| PROCEDURE NAMES | DEFN | REFERENCE |
|---|---|---|
| A100-EXIT | 035284 | |
| A100-INITIALIZATION | 035258 | 035233 |
| A110-ALLOC-DG | 035208 | 035260 |
| A110-EXIT | 035293 | |
| A120-DEBLOCK-MAP-OSE254MA | 035298 | 035262 |
| A120-EXIT | 035303 | |
| A130-EXIT | 035337 | |
| A130-SET-UP-TRAN-FIELDS | 035308 | 035264 |
| A140-EXIT | 035346 | |
| A140-INIT-ONLINE-TRANS | 035341 | 035266 |
| A150-EXIT | 035356 | |
| A150-INIT-TRANS | 035351 | 035268 |
| A160-EXIT | 035363 | |
| A160-INIT-WORK-FIELDS | 035361 | 035270 |
| B100-EDIT-INPUT-DATA | 035387 | 035236 |
| B100-EXIT | 035415 | |
| B110-EDIT-INT-RATE | 035419 | 035389 |
| B110-EXIT | 035428 | |
| B120-EDIT-INT-RULE | 035433 | 035391 |
| B120-EXIT | 035442 | |
| B130-EDIT-INT-RATE-IND | 035447 | 035393 |
| B130-EXIT | 035456 | |
| B140-EDIT-PYMT-FREQ | 035460 | 035395 |
| B140-EXIT | 035471 | |

```
B150-EDIT-FIRST-PYMT-DUE-DATE      035476   035397
B150-EXIT                          035493
B160-EDIT-PROCEEDS-AMT             035497   035399
B160-EXIT                          035504
B170-EDIT-SHORT-TERM               035509   035401
B170-EXIT                          035519
B180-EDIT-INT-RENEW-TERM           035523   035403
B180-EXIT                          035556
B182-EDIT-INT-RENEW-TERM-FIXED     035561   035552
B182-EXIT                          035598
B184-EDIT-RENEW-TERM-NOT-FIXED     035602   035554
B184-EXIT                          035621
B190-EDIT-STICKER-RV-FACTOR        035626   035405
B190-EXIT                          035634
B200-EDIT-INT-METHOD               035639   035407
B200-EXIT                          035650
B210-EDIT-START-DATE               035654   035409
B210-EXIT                          035678
B220-EDIT-INT-ADJ-DATE             035683   035411
B220-EXIT                          035700
B230-EDIT-PERC-RATE-FACTOR         035705   035413
B230-EXIT                          035714
C100-CALC-EFF-INT-RATE             035719   035239
C100-EXIT                          035724
D100-CAL-PROPOSED-REG-PYMT-AMT     035728   035242
D100-EXIT                          035800
D110-EXIT                          035815
D110-SET-DB-CSE183                 035804   035791
D120-CALC-PYMT-AMT-LSE183          035820   035792
D120-EXIT                          035833
E100-CAL-COST-OF-PROPOSED-LOAN     035837   035245
E100-EXIT                          035842
F100-CAL-BUY-BACK-CAR-LN-FIELD     035846   035248
F100-EXIT                          035889
F200-CALC-NO-OF-PYMTS-LSE182       035893   035887
F200-EXIT                          035914
F210-CALL-LSE182                   035919   035905
F210-EXIT                          035932
G100-EXIT                          035949
G100-WRITE-TRAN-LOG-REC            035936   035250
H100-DISPLAY-PYMT-PROPOSAL         035953   035252
H100-EXIT                          035970
H110-DISPLAY-PROPOSAL-INFO         035974   035961
H110-EXIT                          036009
H200-EXIT                          036023
H200-SET-DISPLAY-DG                036013   035906
H210-EXIT                          036070
H210-SET-DB-FOR-OSE050AM-DM        036027   036015
H212-EXIT                          036077
H212-GET-PYMT-FREQ-DESC            036078   036055
H220-EXIT                          036123
H220-SET-DB-FOR-OSE050BM-EM        036081   036017
H230-EXIT                          036152
H230-SET-DB-FOR-OSE050CM-FM        036127   036019
H240-EXIT                          036168
H240-SET-DB-FOR-OSE050GM-HM        036156   036021
H250-CONVERT-DATE-TO-DISP-FMT      036173   036030  036093  036097  036104
H250-EXIT                          036178
Y100-CALL-COMMON-ERROR-RTN         036182   035424  035440  035454  035469  035502  035515  035533  035569  035596  035619
                                            035632  035648  035676  035712  035776  035796  035910
Y100-EXIT                          036187
Z100-CALL-PEM                      036191   035291  035301  035344  035354  035489  035668  035696  035722  035840  035878
                                            035947  035968  035991  035996  036001  036007  036044  036176  036185  036203
Z100-EXIT                          036195
Z300-END-PROGRAM                   036200   035254
Z300-EXIT                          036205
000-MAINLINE                       035229
%

CARD    ERROR MESSAGE

IKF1100I-W    2159 SEQUENCE ERRORS IN SOURCE PROGRAM.
35880   IKF5011I-W    AN INTERMEDIATE RESULT OR A SENDING FIELD MIGHT HAVE ITS HIGH ORDER DIGIT POSITION
                      TRUNCATED.
```

© 1984 The Royal Bank of Canada
All Rights Reserved.
An Unpublished Work.

APPENDIX B

```
             IDENTIFICATION DIVISION.                                    L9H00010
000001**     PROGRAM-ID.    L9H62380.                                    L9H00020
000002**                                                                 L9H00030
000003**     DATE-COMPILED. JUL 10,1984.                                 L9H00040
000004**     REMARKS.                                                    L9H00050
000005**                    THIS PROGRAM VERIFIES CONSISTENCY AND CALCULATES L9H00060
000006**                    EFF. RATE FOR PROPOSED LOAN.                 L9H00070
000007**                                                                 L9H00080
000008**                                                                 L9H00090
000009**                    INVOKED BY :                                 L9H00100
000010**                                                                 L9H00110
000011**                    - ANY PROPOSAL TRANSACTION                   L9H00120
000012**                                                                 L9H00130
000013**                                                                 L9H00140
000014**                                                                 L9H00150
000015**                                                                 L9H00160
```

```
000017**        ENVIRONMENT DIVISION.                              L9H00100

000019**        DATA       DIVISION.                               L9H00200

000021**        WORKING-STORAGE SECTION.                           L9H00220

000023**        01  WS-ACTIVITY-DG-ID.                             L9H00240
000024**            05  FILLER              PIC S9(8) COMP VALUE +68110.L9H00250
000025**            05  FILLER              PIC S9(8) COMP VALUE +62000.L9H00260
000026**            05  FILLER              PIC S9(8) COMP VALUE +62010.L9H00270
000027**            05  FILLER              PIC S9(8) COMP VALUE +62011.L9H00280
000028**            05  FILLER              PIC S9(8) COMP VALUE +62304.L9H00290
000029**            05  FILLER              PIC S9(8) COMP VALUE +65000.L9H00300
000030**            05  FILLER              PIC S9(8) COMP VALUE +65003.L9H00310
000031**            05  FILLER              PIC S9(8) COMP VALUE +65012.L9H00320
000032**            05  FILLER              PIC S9(8) COMP VALUE +62300.L9H00330

000034**        01  FILLER REDEFINES WS-ACTIVITY-DG-ID.            L9H00350
000035**            05  FILLER                    PIC X(2).        L9H00360
000036**            05  WS-DRLI-RTN               PIC X(2).        L9H00370
000037**            05  FILLER                    PIC X(2).        L9H00380
000038**            05  WS-FIND-BASE-DATE-RTN     PIC X(2).        L9H00390
000039**            05  FILLER                    PIC X(2).        L9H00400
000040**            05  WS-CALC-NO-OF-PERIODS-RTN PIC X(2).        L9H00410
000041**            05  FILLER                    PIC X(2).        L9H00420
000042**            05  WS-FIND-END-DATE-RTN      PIC X(2).        L9H00430
000043**            05  FILLER                    PIC X(2).        L9H00440
000044**            05  WS-BUILD-BASE-RATE-TBLE-RTN PIC X(2).      L9H00450
000045**            05  FILLER                    PIC X(2).        L9H00460
000046**            05  WS-ABEND-TRANS-ACT        PIC X(2).        L9H00470
000047**            05  FILLER                    PIC X(2).        L9H00480
000048**            05  WS-ERROR-RTN              PIC X(2).        L9H00490
000049**            05  FILLER                    PIC X(2).        L9H00500
000050**            05  WS-RECORD-OVERRIDE-RTN    PIC X(2).        L9H00510
000051**            05  FILLER                    PIC X(2).        L9H00520
000052**            05  WS-CALLING-PGM-ID-62300   PIC X(2).        L9H00530

000054**        01  WS-TABLE.                                      L9H00550
000055**            05  FILLER              PIC X(2) VALUE '03'.   L9H00560
000056**            05  FILLER              PIC 9(3) VALUE 24.     L9H00570
000057**            05  FILLER              PIC X(2) VALUE '04'.   L9H00580
000058**            05  FILLER              PIC 9(3) VALUE 12.     L9H00590
000059**            05  FILLER              PIC X(2) VALUE '05'.   L9H00600
000060**            05  FILLER              PIC 9(3) VALUE 26.     L9H00610
000061**            05  FILLER              PIC X(2) VALUE '06'.   L9H00620
000062**            05  FILLER              PIC 9(3) VALUE 4.      L9H00630
000063**            05  FILLER              PIC X(2) VALUE '07'.   L9H00640
000064**            05  FILLER              PIC 9(3) VALUE 2.      L9H00650
000065**            05  FILLER              PIC X(2) VALUE '08'.   L9H00660
000066**            05  FILLER              PIC 9(3) VALUE 1.      L9H00670
000067**            05  FILLER              PIC X(2) VALUE '09'.   L9H00680
000068**            05  FILLER              PIC 9(3) VALUE 52.     L9H00690
000069**            05  FILLER              PIC X(2) VALUE '10'.   L9H00700
000070**            05  FILLER              PIC 9(3) VALUE 365.    L9H00710
000071**            05  FILLER              PIC X(2) VALUE '11'.   L9H00720
000072**            05  FILLER              PIC 9(3) VALUE 6.      L9H00730
000073**            05  FILLER              PIC X(2) VALUE '12'.   L9H00740
000074**            05  FILLER              PIC 9(3) VALUE 3.      L9H00750

000076**        01  WS-PYMT-FREQ-TABLE REDEFINES WS-TABLE.         L9H00770
000077**            05  FILLER OCCURS 10 TIMES.                    L9H00780
000078**                10  WS-PYMT-FREQ          PIC X(2).        L9H00790
000079**                10  WS-NO-OF-PYMT-PER-YR  PIC 9(3).        L9H00800

000081**        01  WS-WORK-AREA.                                  L9H00820
000082**            05  WS-FIXED            PIC X(2) VALUE '03'.   L9H00830
000083**            05  WS-DAILY            PIC X(2) VALUE '10'.   L9H00840

000085**        01  WS-ABEND-MESSAGES.                             L9H00860
000086**            05  WS-ABEND-MSG-1      PIC X(50) VALUE        L9H00870
000087**                'DAILY RULE DB ERROR'.                     L9H00880

000089**    COPY P49002D.                                          L9H00900
000090C*000010**** START OF P49002D ***** TCB RESULT CONSTANTS     *****P49002D
000091C*000020*                                                    *P49002D
000092C*000030 01  TCB-RESULT-CONSTANTS.                           P49002D
000093C*000040     05  TCB-RESULTS.                                P49002D
000094C*000050         10  TCB-OK.
000095C*000060             15  FILLER PIC S9(4) COMP VALUE +0000.
000096C*000070         10  TCB-ERR.
000097C*000080             15  FILLER PIC S9(4) COMP VALUE +0001.
000098C*000090         10  TCB-NO-ACT.
     C 000100             15  FILLER PIC S9(4) COMP VALUE +0002.
     C 000110         10  TCB-NOT-AUTH.
     C 000120             15  FILLER PIC S9(4) COMP VALUE +0003.
     C 000130         10  TCB-FAIL.
     C 000140             15  FILLER PIC S9(4) COMP VALUE +0004.
     C 000150         10  TCB-FULL.
     C 000160             15  FILLER PIC S9(4) COMP VALUE +0005.
     C 000170         10  TCB-ABEND-EXIT.
     C 000180             15  FILLER PIC S9(4) COMP VALUE +0006.
     C 000181         10  TCB-DEADLOCK.                            CC003801
     C 000182             15  FILLER PIC S9(4) COMP VALUE +0007.   CC003801
```

```
C 000183            10  TCB-DATA-BASE-FULL.
C 000184                    15  FILLER PIC S9(4) COMP VALUE +0008.   CC003801
C 000185            10  TCB-DB-NOT-AVAILABLE.                         CC003801
C 000186                    15  FILLER PIC S9(4) COMP VALUE +0009.   CC003801
C 000187            10  TCB-OK-CHECKPOINT.                            CC003801
C 000188                    15  FILLER PIC S9(4) COMP VALUE +0010.   CC003801
C 000189            10  TCB-FAIL-CHECKPOINT.                          CC003801
C 000190                    15  FILLER PIC S9(4) COMP VALUE +0011.   CC003801
C 000191            10  TCB-ABEND-TRANS.                              CC003801
C 000192                    15  FILLER PIC S9(4) COMP VALUE +0012.   CC003801
C 000193*                                                            *P49002D
C 000200***** END OF P49002D *****************************************P49002D
       7

000202**       COPY P490030.                                           L9H00920
 000203C*000010**** START OF P490030 ***** PEM COMMON ACTIVITIES      *****P490030
 000204C*000020*                                                         *P490030
 000205C*000030 01  PEM-COMMON-ACTIVITIES.                                P490030
 000206C*000040     05  PEM-ACTIVITIES.                                   P490030
 000207C*000050         10  CA-PEM-END-PROG.
 000208C*000060             15  FILLER PIC S9(4) COMP VALUE +0001.
 000209C*000070         10  CA-PEM-END-TRANS.
 000210C*000080             15  FILLER PIC S9(4) COMP VALUE +0002.
 000211C*000090         10  CA-PEM-DYN-DG-ALOC.
 000212C*000100             15  FILLER PIC S9(4) COMP VALUE +0004.
 000213C*000110         10  CA-PEM-DYN-DG-REL.
 000214C*000120             15  FILLER PIC S9(4) COMP VALUE +0005.
 000215C*000130         10  CA-PEM-DYN-DG-INIT.
 000216C*000140             15  FILLER PIC S9(4) COMP VALUE +0006.
 000217C*000150         10  CA-PEM-NO-OP.
 000218C*000160             15  FILLER PIC S9(4) COMP VALUE +0013.
 000219C*000170         10  CA-PEM-TRANS-DUMP-RETURN.
 000220C*000180             15  FILLER PIC S9(4) COMP VALUE +0014.
 000221C*000190         10  CA-PEM-TRANS-DUMP-END.
 000222C*000200             15  FILLER PIC S9(4) COMP VALUE +0015.
 000223C*000210         10  CA-PEM-DUMP-TCB-TRACE.
 000224C*000220             15  FILLER PIC S9(4) COMP VALUE +0016.
  C 000230               10  CA-PEM-DUMP-DG-RETURN.
  C 000240                   15  FILLER PIC S9(4) COMP VALUE +0017.
  C 000250               10  CA-PEM-DUMP-DG-END.
  C 000260                   15  FILLER PIC S9(4) COMP VALUE +0018.
  C 000270               10  CA-PEM-ENABLE-ABEND-EXIT.
  C 000280                   15  FILLER PIC S9(4) COMP VALUE +0020.
  C 000290               10  CA-PEM-DISABLE-ABEND-EXIT.
  C 000300                   15  FILLER PIC S9(4) COMP VALUE +0021.
  C 000310               10  CA-PEM-CHECKPOINT.
  C 000320                   15  FILLER PIC S9(4) COMP VALUE +0028.
  C 000330*                                                              *P490030
  C 000340***** END OF P490030 ***************************************P490030
       8

000342**       COPY C3JORACT.                                           L9H00940
 000343C*000100*                                                         C3J00010
 000344C*000200*  THIS COPY BOOK CONTAINS ALL VALID DAILY RULE INTERFACE C3J00020
 000345C*000300*  ACTION CODES.                                          C3J00030
   C 000400*                                                             C3J00040
   C 000500  01  DAILY-RULE-ACTION-CODES.                                C3J00050
   C 000600                                                              C3J00060
   C 000700      05  DRI-GET-RULE         PIC XX        VALUE '01'.      C3J00070
   C 000800      05  DRI-GET-NEXT-RULE    PIC XX        VALUE '02'.      C3J00080
       9

000802**       COPY C3JORRES.                                           L9H00960
   C 001000*                                                             C3J00010
   C 002000*  THIS COPY BOOK CONTAINS ALL VALID DAILY RULE INTERFACE     C3J00020
   C 003000*  RESULT CODES.                                              C3J00030
   C 004000*                                                             C3J00040
   C 005000  01  DAILY-RULE-RESULT-CODES.                                C3J00050
   C 006000                                                              C3J00060
   C 007000      05  DRI-OK                  PIC XX    VALUE '00'.       C3J00070
   C 008000      05  DRI-RULE-NOT-FOUND      PIC XX    VALUE '01'.       C3J00080
   C 009000      05  DRI-NEXT-RULE-NOT-FOUND PIC XX    VALUE '02'.       C3J00090
   C 010000      05  DRI-RULE-NOT-CREATED    PIC XX    VALUE '03'.       C3J00100
      10

010002**       LINKAGE SECTION.                                         L9H00980

010004**       COPY P49000D.                                            L9H01000
 010005C*000010**** START OF P490000 ***** TCB ***************************
 010006C*000020*
 010007C*000030*  DATA GROUP NUMBER 0001
 010008C*000040*
 010009C*000050*
 010010C*000060 01  TRANSACTION-CONTROL-BLOCK.
 010011C*000070     05  FILLER              PIC XXXX.
 010012C*000080     05  TCB-TRANS-NO        PIC XXXX.                    TPE49001
 010013C*000090     05  TCB-CO-ID           PIC XX.                      TPE49002
 010014C*000100     05  TCB-APPL-ID         PIC XX.                      TPE49003
 010015C*000110     05  TCB-FUNC-ID         PIC XX.                      TPE49004
 010016C*000120     05  TCB-SOURCE-TYPE     PIC X.                       TPE49005
 010017C*000121     05  TCB-SOURCE-TYPE-N   REDEFINES TCB-SOURCE-TYPE
 010018C*000122                             PIC S9(4) COMP.
 010019C*000123         88  TCB-ONLINE                  VALUE +0003
 010020C*000124                                                +0005
 010021C*000125                                                +0006.
 010022C*000126         88  TCB-BTCH                    VALUE +0004.
 010023C*000130     05  TCB-ACTIVITY        PIC XX.                      TPE49006
 010024C*000140     05  TCB-RESULT          PIC XX.                      TPE49007
 010025C*000150     05  TCB-USER-DATA.
 010026C*000151         10  FILLER          PIC X(6).
 010027C*000152         10  TCB-DATA-GROUP  PIC XX.                      TPE49092
```

```
010028C=000153          10  TCB-PARM-POS        PIC XX.
010029C=000154      05  TCB-USER-AREA-1         REDEFINES TCB-USER-DATA.        TPE49103
010030C=000160          10  TCB-USER-INFO       PIC XXXX.                       TPE49024
010031C=000170          10  TCB-USER-COND       PIC XX.                         TPE49025
010032C=000180      05  TCB-USER-AREA-2         REDEFINES TCB-USER-DATA.
010033C=000190          10  TCB-USER-CC         PIC XX.                         TPE49017
010034C=000200          10  TCB-USER-RESULT     PIC XX.                         TPE49018
010035C=000210          10  TCB-USER-ENVMT      PIC XX.                         TPE49019
010036C=000211      05  TCB-USER-AREA-3         REDEFINES TCB-USER-DATA.
010037C=000212          10  TCB-EOJ-CALL        PIC XXXX.
010038C=000220      05  TCB-ENQ                 REDEFINES TCB-USER-DATA.
010039C=000221          10  TCB-ENQ-ID          PIC X(8).
010040C=000240      05  TCB-TIME                PIC S9(7) COMP-3.               TPE49012
010041C=000250      05  TCB-SYS-DATE            PIC S9(7) COMP-3.               TPE49011
010042C=000260      05  TCB-SOURCE              PIC X(8).                       TPE49013
010043C=000270      05  TCB-OPERATOR            PIC X(20).                      TPE49014
010044C=000280      05  TCB-DESTINATION         PIC X(8).                       TPE49015
010045C=000290      05  TCB-TERM-DATA.
010046C=000300          10  TCB-PFKEY           PIC X.                          TPE49020
010047C=000310              88  TCB-ENTER                   VALUE QUOTE.
010048C=000320              88  TCB-PF01                    VALUE '1'.
010049C=000330              88  TCB-PF02                    VALUE '2'.
010050C=000340              88  TCB-PF03                    VALUE '3'.
010051C=000350              88  TCB-PF04                    VALUE '4'.
010052C=000360              88  TCB-PF05                    VALUE '5'.
010053C=000370              88  TCB-PF06                    VALUE '6'.
010054C=000380              88  TCB-PF07                    VALUE '7'.
010055C=000390              88  TCB-PF08                    VALUE '8'.

010056C=000400              88  TCB-PF09                    VALUE '9'.
010057C=000410              88  TCB-PF10                    VALUE ':'.
010058C=000420              88  TCB-PF11                    VALUE ';'.
010059C=000430              88  TCB-PF12                    VALUE '3'.
010060C=000440              88  TCB-PF13                    VALUE 'A'.
010061C=000450              88  TCB-PF14                    VALUE 'B'.
010062C=000460              88  TCB-PF15                    VALUE 'C'.
010063C=000470              88  TCB-PF16                    VALUE 'D'.
010064C=000480              88  TCB-PF17                    VALUE 'E'.
010065C=000490              88  TCB-PF18                    VALUE 'F'.
010066C=000500              88  TCB-PF19                    VALUE 'G'.
010067C=000510              88  TCB-PF20                    VALUE 'H'.
010068C=000520              88  TCB-PF21                    VALUE 'I'.
010069C=000530              88  TCB-PF22                    VALUE '¢'.
010070C=000540              88  TCB-PF23                    VALUE '.'.
010071C=000550              88  TCB-PF24                    VALUE '<'.
010072C=000560              88  TCB-PFKEY-NOT-PRESENT       VALUE LOW-VALUE.
010073C=000570          10  FILLER              PIC XXX.
010074C=000580      05  TCB-EFFECTIVE-DATE      PIC S9(7) COMP-3.               TPE49022
010075C=000590      05  TCB-DEVICE-TYPE         PIC X.                          TPE49023
010076C=000591              88  TCB-3270-2                  VALUE 'A'.
010077C=000592              88  TCB-BATCH                   VALUE 'B'.
010078C=000593              88  TCB-3270-1                  VALUE 'C'.
010079C=000594              88  TCB-3604-DS1                VALUE 'D'.
010080C=000595              88  TCB-3604-DS3                VALUE 'E'.
010081C=000596              88  TCB-3604-DS4                VALUE 'F'.
010082C=000597              88  TCB-3600-JP                 VALUE 'G'.
010083C=000598              88  TCB-3600-PB                 VALUE 'H'.
010084C=000599              88  TCB-3600-LP                 VALUE 'I'.
010085C=000600              88  TCB-3270-MOD1-PRINTER       VALUE 'J'.
010086C=000601              88  TCB-3270-MOD2-PRINTER       VALUE 'K'.
010087C=000602              88  TCB-TWX                     VALUE 'L'.
010088C=000603              88  TCB-2470-MOD2               VALUE 'M'.
010089C=000604              88  TCB-2740-MOD1               VALUE 'N'.
010090C=000605              88  TCB-ALIEN-X                 VALUE 'X'.
010091C=000606              88  TCB-ALIEN-Y                 VALUE 'Y'.
010092C=000607              88  TCB-ALIEN-Z                 VALUE 'Z'.
010093C=000608*                                                                 *
010094C=000610****** END OF P490000 ****************************************P490000

010096**        COPY C3J60118.                                                  L9H01020
010097C=000100*                                                                 C3J00010
010098C=000200*    THIS DATA GROUP IS USED TO PASS PARAMETERS TO THE            C3J00020
010099C=000300*    DAILY RULES INTERFACE ACTIVITY.                              C3J00030
010100C=000400*                                                                 C3J00040
010101C=000500  01  C3J60118.                                                   C3J00050
010102C=000600                                                                  C3J00060
010103C=000700      05  C60118-ACTION           PIC XX.                         C3J00070
010104C=000800      05  C60118-RESULT           PIC XX.                         C3J00080
010105C=000900      05  C60118-DAILY-RULE-ID    PIC X(8).                       C3J00090
010106C=001000      05  C60118-USER-DATE        PIC S9(7)    COMP-3.            C3J00100
010107C=001100      05  C60118-DATA-GROUP-NO    PIC XX.                         C3J00110
010108C=001200      05  C60118-QUALIFIER        PIC X(11).                      C3J00120

010110**        COPY C3J60300.                                                  L9H01040
010111C*                                                                        C3J00010
010112C*        DATA GROUP 60300                                                C3J00020
010113C*        WORK AREA FOR TRANSACTION                                       C3J00030
010114C*                                                                        C3J00040
010115C*    01  C3J60300.                                                       C3J00050
010116C*                                                                        C3J00060
010117C*        05  C60300-ACTION               PIC XX.                         C3J00070
010118C*        05  C60300-RESULT               PIC XX.                         C3J00080
010119C*                                                                        C3J00090
010120C*        05  C60300-WORK-AREA.                                           C3J00100
010121C*            10  FILLER                  PIC X(1200).                    C3J00110

010123**        COPY TRAN25XM.                                                  L9H01060
```

```
010124C*                                                                TRA00010
010125C*                                                                TRA00020
010126C*            TRAN25XM                                            TRA00030
010127C*            PROPOSAL TXN WORK AREA           84 06 27  JL       TRA00040
010128C*   01 TRAN25XM REDEFINES C3J60300.                              TRA00050
010129C*                                                                TRA00060
010130C*       05 FILLER                         PIC X(4).              TRA00070
010131C*       05 TRAN25XM-WORK-AREA.                                   TRA00080
010132C*                                                                TRA00090
010133C*          10 T25XM-PROP-PROCEEDS-AMT      PIC S9(13)V9(4) COMP-3.TRA00100
010134C*          10 T25XM-PROP-PYMT-AMT-REG      PIC S9(13)V9(4) COMP-3.TRA00110
010135C*          10 T25XM-PROP-AMORT-TERM        PIC S9(5)V9(6)  COMP-3.TRA00120
010136C*                                                                TRA00130
010137C*          10 T25XM-PROP-AMORT-COSTS       PIC S9(13)V99   COMP-3.TRA00140
010138C*          10 T25XM-PROP-INT-REN-TERM-COSTS PIC S9(13)V99  COMP-3.TRA00150
010139C*          10 T25XM-PROP-INT-ADJ-AMT       PIC S9(13)V99   COMP-3.TRA00160
010140C*       * WORK FIELDS                                            TRA00170
010141C*          10 T25XM-WS-FACTOR              PIC S999        COMP-3.TRA00180
010142C*          10 T25XM-WS-INT-RATE-ADDN       PIC S9V9(8)     COMP-3.TRA00190
010143C*          10 T25XM-WS-AMORT-TERM          PIC S999V9999   COMP-3.TRA00200
010144C*          10 T25XM-WS-INT-RENEW-TERM      PIC S999V9999   COMP-3.TRA00210
010145C*       * FOR TXN 254 ONLY                                       TRA00220
010146C*          10 T25XM-WS-RES-VALUE           PIC S9(13)V9(4) COMP-3.TRA00230
010147C*          10 T25XM-WS-RV-PYMT-FREQ-INT    PIC S9(13)V9(4) COMP-3.TRA00240
010148C*          10 T25XM-WS-RV-INT-COSTS-AMORT  PIC S9(13)V9(4) COMP-3.TRA00250
010149C*          10 T25XM-WS-RV-INT-COSTS-RENEW  PIC S9(13)V9(4) COMP-3.TRA00260
010150C*          10 T25XM-WS-RV-INT-ADJ-AMT      PIC S9(13)V99   COMP-3.TRA00270
010151C*                                                                TRA00280
010152C*          10 T25XM-SUB                    PIC S9(4)       COMP.  TRA00290
010153C*          10 T25XM-WS-ENTRY-TIME          PIC 9(7).              TRA00300
010154C*          10 FILLER REDEFINES T25XM-WS-ENTRY-TIME.               TRA00310
010155C*             15 FILLER                    PIC X(1).              TRA00320
010156C*             15 T25XM-WS-ENTRY-HH         PIC 9(2).              TRA00330
010157C*             15 T25XM-WS-ENTRY-MM         PIC 9(2).              TRA00340
010158C*             15 T25XM-WS-ENTRY-SS         PIC 9(2).              TRA00350
010159C*          10 T25XM-WS-INT-RENEW-COST      PIC S9(13)V99   COMP-3.TRA00360
010160C*          10 T25XM-WS-INT-ADJ-AMT         PIC S9(13)V99   COMP-3.TRA00370
010161C*          10 T25XM-WS-MIN-EFF-INT-RATE    PIC S99V9(8)    COMP-3.TRA00380
    14

010162C*          10 T25XM-WS-MAX-EFF-INT-RATE    PIC S99V9(8)    COMP-3.TRA00390
010163C*          10 T25XM-WS-PAYOUT-TERMS        PIC S9(5)V9(6)  COMP-3.TRA00400
010164C*                                                                TRA00410
010165C*          10 T25XM-FILLER                 PIC X(173).            TRA00420
    15

010167**       COPY C3J62000.                                           L9M01080
010168C*   *      Data group 62000                                      C3J00010
010169C*   *      convert calendar date to base date.                   C3J00020
010170C*       01 C3J62000.                                             C3J00030
010171C*          05 C62000-ACTION               PIC XX.                C3J00040
010172C*          05 C62000-RESULT               PIC XX.                C3J00050
010173C*   *INPUT:                                                      C3J00060
010174C*          05 C62000-CALENDAR-DATE        PIC S9(7) COMP-3.      C3J00070
010175C*   *OUTPUT:                                                     C3J00080
010176C*          05 C62000-BASE-DATE            PIC S9(8) COMP.        C3J00090
    16

010178**       COPY C3J62010.                                           L9M01100
010179C*000010*      Data group 62010                                   C3J00010
010180C*000020*      find the number of full periods between two given dates.C3J00020
010181C*000030                                                          C3J00030
010182C*000040  01 C3J62010.                                            C3J00040
010183C*000050                                                          C3J00050
010184C*000060     05 C62010-ACTION              PIC XX.                C3J00060
010185C*000070     05 C62010-RESULT              PIC XX.                C3J00070
010186C*000080                                                          C3J00080
010187C*000100* INPUT:                                                  C3J00090
010188C*000110                                                          C3J00100
010189C*000120     05 C62010-FREQUENCY           PIC 99.                C3J00110
010190C*000120     05 C62010-START-DATE          PIC S9(7) COMP-3.      C3J00120
010191C*000120     05 C62010-END-DATE            PIC S9(7) COMP-3.      C3J00130
010192C*000130                                                          C3J00140
010193C*000200* OUTPUT:                                                 C3J00150
010194C*000210                                                          C3J00160
010195C*000220     05 C62010-NO-OF-PERIOD        PIC S9(4) COMP.        C3J00170
    17

010197**       COPY C3J62011.                                           L9M01120
010198C*000010*      Data group 62011                                   C3J00010
010199C*000020*      find end date by giving the start date and the number C3J00020
010200C*000020*      of periods.                                        C3J00030
010201C*000030                                                          C3J00040
010202C*000040  01 C3J62011.                                            C3J00050
010203C*000050                                                          C3J00060
010204C*000060     05 C62011-ACTION              PIC XX.                C3J00070
010205C*000070     05 C62011-RESULT              PIC XX.                C3J00080
010206C*000080                                                          C3J00090
010207C*000100* INPUT:                                                  C3J00100
010208C*000110                                                          C3J00110
010209C*000120     05 C62011-FREQUENCY           PIC XX.                C3J00120
010210C*000120     05 C62011-START-DATE          PIC S9(7) COMP-3.      C3J00130
010211C*000130     05 C62011-NO-OF-PERIOD        PIC S9(4) COMP.        C3J00140
010212C*000200                                                          C3J00150
010213C*000210* OUTPUT:                                                 C3J00160
010214C*000220                                                          C3J00170
010215C*000230     05 C62011-END-DATE            PIC S9(7) COMP-3.      C3J00180
    18

010217**       COPY C3J62080.                                           L9M01140
```

```
010218C*     *                                                             C3J00010
010219C*     *          DATA GROUP 62080           83/09/15                C3J00020
010220C*     *          STORE TRANSACTION BUSINESS DAY DATE AND            C3J00030
010221C*     *          THE COMMON PROCESSING DAILY RULE FOR THE BRANCH OF C3J00040
010222C*     *          ACCOUNT (TRANSIT-LN)                               C3J00050
010223C*     *                                                             C3J00060
010224C*     01  C3J62080.                                                 C3J00070
010225C*         05  C62080-ACTION                   PIC XX.               C3J00080
010226C*         05  C62080-RESULT                   PIC XX.               C3J00090
010227C*     * INPUT                                                       C3J00100
010228C*         05  C62080-APPL-CODE                PIC X(2).             C3J00110
010229C*         05  C62080-TRANSIT                  PIC 9(5).             C3J00120
010230C*         05  C62080-FILLER                   PIC X(8).             C3J00130
010231C*         05  C62080-TRAN-ENTRY-TIMESTAMP.                          C3J00140
010232C*             10  C62080-TRAN-ENTRY-DATE      PIC S9(7) COMP-3.     C3J00150
010233C*             10  C62080-TRAN-ENTRY-TIME      PIC S9(7) COMP-3.     C3J00160
010234C*     *   MEMO-INJ-IND                        (FROM C3J65252)       C3J00170
010235C*     *   SOURCE-TYPE                         (FROM TCB)            C3J00180
010236C*     *                                                             C3J00190
010237C*     * OUTPUT/UPDATE                                               C3J00200
010238C*     *                                                             C3J00210
010239C*         05  C62080-TRAN-BUS-DAY             PIC S9(7) COMP-3.     C3J00220
010240C*         05  C62080-BR-BUS-DAY-CURR          PIC S9(7) COMP-3.     C3J00230
010241C*         05  C62080-BR-BUS-DAY-NEXT          PIC S9(7) COMP-3.     C3J00240
010242C*         05  C62080-BR-BUS-DAY-BACK          PIC S9(7) COMP-3.     C3J00250
010243C*         05  C62080-TRAN-PROC-MODE           PIC X.                C3J00260
010244C*     *                                                             C3J00270
010245C*     * COMMON BRANCH VARIABLES (BV01)                              C3J00280
010246C*     *                                                             C3J00290
010247C*         05  C62080-BV01.                                          C3J00300
010248C*             10  C62080-BV01-BR-DATE-POINTERS.                     C3J00310
010249C*                 15  C62080-BV01-BR-DATE-POINTER  OCCURS 10 TIMES  C3J00320
010250C*                                                  PIC S9(3) COMP-3.C3J00330
010251C*             10  FILLER REDEFINES C62080-BV01-BR-DATE-POINTERS.    C3J00340
010252C*                 15  C62080-BV01-BR-DATE-POINTER-9H PIC S9(3) COMP-3.C3J00350
010253C*                 15  C62080-BV01-BR-DATE-POINTER-SE PIC S9(3) COMP-3.C3J00360
010254C*                 15  C62080-BV01-BR-DATE-POINTER-3J PIC S9(3) COMP-3.C3J00370
010255C*                 15  C62080-BV01-BR-DATE-POINTER-04 PIC S9(3) COMP-3.C3J00380
010256C*                 15  C62080-BV01-BR-DATE-POINTER-05 PIC S9(3) COMP-3.C3J00390
010257C*                 15  C62080-BV01-BR-DATE-POINTER-06 PIC S9(3) COMP-3.C3J00400
010258C*                 15  C62080-BV01-BR-DATE-POINTER-07 PIC S9(3) COMP-3.C3J00410
010259C*                 15  C62080-BV01-BR-DATE-POINTER-08 PIC S9(3) COMP-3.C3J00420
010260C*                 15  C62080-BV01-BR-DATE-POINTER-09 PIC S9(3) COMP-3.C3J00430
010261C*                 15  C62080-BV01-BR-DATE-POINTER-10 PIC S9(3) COMP-3.C3J00440
010262C*             10  C62080-BV01-BR-TIME-ZONE        PIC 9(2).         C3J00450
010263C*             10  C62080-BV01-BR-LANG-CODE        PIC 9.            C3J00460
010264C*             10  C62080-BV01-BR-COMB-1.                            C3J00470
010265C*                 15  C62080-BV01-BR-COMB-2.                        C3J00480
010266C*                     20  C62080-BV01-BR-DISTRICT PIC 9(2).         C3J00490
010267C*                     20  C62080-BV01-BR-AREA     PIC 9(2).         C3J00500
010268C*                 15  C62080-BV01-BR-REGION       PIC 9(2).         C3J00510
010269C*             10  C62080-BV01-BR-CPC              PIC 9(5).         C3J00520
010270C*             10  C62080-BV01-BR-RESIDENCE-CODE   PIC 9(4).         C3J00530
  19

010271C*             10  C62080-BV01-BR-PROC-STATUS      PIC X.            C3J00540
010272C*             10  C62080-BV01-BR-ONLINE-CPC       PIC X.            C3J00550
010273C*             10  C62080-BV01-BR-PARENT-TRANSIT   PIC 9(5).         C3J00560
010274C*             10  C62080-BV01-BR-DEL-ADV-TABLE.                     C3J00570
010275C*                 15  C62080-BV01-BR-DEL-ADV-CODE PIC 9 OCCURS 3 TIMES.C3J00580
010276C*             10  C62080-BV01-BR-ICA-FED-CONS     PIC 9(7).         C3J00590
010277C*             10  C62080-BV01-BR-ICA-FED-COMM     PIC 9(7).         C3J00600
010278C*             10  C62080-BV01-BR-ICA-PROV-CONS    PIC 9(7).         C3J00610
010279C*             10  C62080-BV01-BR-ICA-PROV-COMM    PIC 9(7).         C3J00620
010280C*             10  C62080-BV01-BR-INT-BASE-DAY     PIC 99.           C3J00630
010281C*             10  C62080-BV01-BR-TRNASIT-TYPE     PIC X.            C3J00640
010282C*             10  FILLER                          PIC X(221).       C3J00650
010283C*     *                                                             C3J00660
010284C*     *   ICA = INT-CHG-ACCT                                        C3J00670
010285C*     *                                                             C3J00680
010286C*     * WORK FIELDS:                                                C3J00690
010287C*     *                                                             C3J00700
010288C*         05  C62080-DATE-POINTER-X.                                C3J00710
010289C*             10  C62080-DATE-POINTER         PIC 999.              C3J00720
010290C*         05  FILLER                          PIC X(20).            C3J00730
  20

010292C**   COPY C9H62304.                                                 L9H01160
010293C*    *          DATA GROUP  62304                                   C9H00010
010294C*    *          DATA GROUP USED TO BUILD BASE RATE TABLE            C9H00020
010295C*    * ****  IMPORTANT: TRAN-BUS-DAY FIELD IS NO LONGER USED. JUN 12 C9H00030
010296C*    *          EVENTUALLY, IT WILL BE TAKEN OUT AS WE GO INTO   LA C9H00040
010297C*    *          PHASE II.                                           C9H00050
010298C*    *          THIS FOLLOWING LOGIC IS NOW USED:                   C9H00060
010299C*    *          IF END-DATE IS < OCR-DR-DATE (1)                    C9H00070
010300C*    *              USE OCR-DR-DATE (1) AS USER-DATE                C9H00080
010301C*    *          ELSE                                                C9H00090
010302C*    *              FIND LAST OCR-DR-DATE (N)                       C9H00100
010303C*    *              IF END-DATE IS > OCR-DR-DATE (N)                C9H00110
010304C*    *                  USE OCR-DR-DATE (N) AS USER-DATE            C9H00120
010305C*    *              ELSE                                            C9H00130
010306C*    *                  USE END-DATE        AS USER-DATE            C9H00140
010307C*    *              ENDIF                                           C9H00150
010308C*    *          ENDIF                                               C9H00160
010309C*    01  C9H62304.                                                  C9H00170
010310C*    *                                                              C9H00180
010311C*        05  C62304-ACTION                    PIC XX.               C9H00190
010312C*        05  C62304-RESULT                    PIC XX.               C9H00200
010313C*    *** INPUT                                                      C9H00210
010314C*        05  C62304-PARAMETER-INFO.                                 C9H00220
010315C*            10  C62304-PERIOD-INFO.                                C9H00230
010316C*                15  C62304-START-DATE-X.                           C9H00240
010317C*                    20  C62304-START-DATE-B  PIC S9(8)  COMP.      C9H00250
010318C*                15  C62304-END-DATE-X.                             C9H00260
```

```
010319C*              20 C62304-END-DATE-B            PIC S9(8)       COMP. C9H00270
010320C*           10 C62304-TRAN-BUS-DAY             PIC S9(7)       COMP-3.C9H00280
010321C*        *  SEE NOTE ON TRAN-BUS-DAY ABOVE                           C9H00290
010322C*           10 C62304-BASE-RATE-AT-START-IND   PIC X.                C9H00300
010323C*              88 C62304-USE-ALL-BASE-RATES    VALUE ' '.            C9H00310
010324C*              88 C62304-USE-BASE-RATE-AT-START VALUE '1'.           C9H00320
010325C*           10 C62304-RULE-INFO.                                     C9H00330
010326C*              15 C62304-INT-RULE              PIC 9(2).             C9H00340
010327C*        *** OUTPUT                                                  C9H00350
010328C*           05 C62304-BASE-RATE-TABLE.                               C9H00360
010329C*              10 C62304-NO-OF-ENTRY           PIC S9(4)       COMP. C9H00370
010330C*              10 C62304-BASE-RATE-ENTRY    OCCURS 100 TIMES.        C9H00380
010331C*                 15 C62304-NO-OF-DAYS         PIC S9(5)       COMP-3.C9H00390
010332C*                 15 C62304-BASE-RATE          PIC S9V9(10)    COMP-3.C9H00400
010333C*                 15 C62304-YEAR-BASE          PIC S9(3)       COMP-3.C9H00410
010334C*        *** WORK AREA                                               C9H00420
010335C*           05 C62304-WK-INDEX-DR              PIC S9(4)       COMP. C9H00430
010336C*           05 C62304-WK-INDEX-RT              PIC S9(4)       COMP. C9H00440
010337C*           05 C62304-WK-END-DATE-B            PIC S9(8)       COMP. C9H00450
010338C*           05 C62304-WK-DR-SEQ                PIC 9(3).             C9H00460
010339C*           05 C62304-QUAL.                                          C9H00470
010340C*              10 C62304-QUAL-INT-RULE         PIC X(2).             C9H00480
010341C*              10 C62304-QUAL-DR-SEQ           PIC X(3).             C9H00490
010342C*              10 FILLER                       PIC X(6).             C9H00500
010343C*           05 C62304-WK-SUB                   PIC S9(4)       COMP. C9H00510
010344C*           05 C62304-WK-DR-DATE               PIC S9(7)       COMP-3.C9H00520
010345C*           05 C62304-FILLER                   PIC X(44).            C9H00530
           22

010369**        COPY C3J65000.                                              L9H01200
010370C*        *                                                           00001000
010371C*        *              D A T A    G R O U P    65000                00002000
010372C*        *                                                           00003000
010373C*        *  THIS DATA GROUP CONTAINS ABEND MODULE INTERFACE PARAMETERS. 00004000
010374C*        *       TOTAL 66 BYTES.                                     00005000
010375C*        *                                                           00006000
010376C*        01 C3J65000.                                                00007000
010377C*                                                                    00008000
010378C*           05 C65000-ACTION                   PIC XX.               00009000
010379C*           05 C65000-RESULT                   PIC XX.               00010000
010380C*           05 C65000-DUMP-IND                 PIC X.                00011000
010381C*              88 C65000-DUMP                                VALUE 'Y'. 00012000
010382C*              88 C65000-NO-DUMP                             VALUE 'N'. 00013000
010383C*           05 C65000-APPLICATION-CODE         PIC XX.               00014000
010384C*           05 C65000-CALLING-ACTIVITY         PIC XX.               00015000
010385C*           05 C65000-ABEND-MESSAGE            PIC X(50).            00016000
010386C*           05 C65000-USER-ABEND-CODE          PIC XXX.              00017000
010387C*           05 C65000-LANGUAGE-CODE            PIC X.                00018000
010388C*           05 FILLER                          PIC X.                00019000
010389C*           05 C65000-TCB-RESULT               PIC XX.               00020000
           23

010391**        COPY C3J65003.                                              L9H01220
010392C*        *        Data group 65003                                   C3J00010
010393C*        *        record error codes and messages.                   C3J00020
010394C*        *                                     REVISION: MAY 17 83   C3J00030
010395C*        *                                                           C3J00040
010396C*        01 C3J65003.                                                C3J00050
010397C*                                                                    C3J00060
010398C*           05 C65003-ACTION                   PIC XX.               C3J00070
010399C*           05 C65003-RESULT                   PIC XX.               C3J00080
010400C*        *                                                           C3J00090
010401C*        *INPUT:                                                     C3J00100
010402C*        *                                                           C3J00110
010403C*           05 C65003-INPUT-ERROR-X.                                 C3J00120
010404C*              10 C65003-INPUT-ERROR           PIC 999.              C3J00130
010405C*           05 C65003-TXN-BUSINESS-DATE        PIC S9(7) COMP-3.     C3J00140
010406C*           05 C65003-APPLICATION-CODE         PIC XX.               C3J00150
010407C*           05 C65003-LANGUAGE-CODE-X.                               C3J00160
010408C*              10 C65003-LANGUAGE-CODE         PIC 9.                C3J00170
010409C*        *                                                           C3J00180
010410C*        *OUTPUT/UPDATE:                                             C3J00190
010411C*        *                                                           C3J00200
010412C*           05 C65003-ERROR-COUNT              PIC S999 COMP-3.      C3J00210
010413C*           05 C65003-ERROR-CODE               PIC S999 COMP-3 OCCURS 10. C3J00220
010414C*           05 C65003-ERROR-MESSAGE            PIC X(40)       OCCURS 10. C3J00230
010415C*        *                                                           C3J00240
010416C*        *WORK-AREA                                                  C3J00250
010417C*        *                                                           C3J00260
010418C*           05 C65003-WORK-AREA                PIC X(50).            C3J00270
010419C*        *                                                           C3J00280
010420C*        *ADDITIONAL INPUT                                           C3J00290
010421C*        *                                                           C3J00300
010422C*           05 C65003-ERROR-MESS               PIC X(40).            C3J00310
010423C*           05 C65003-ERROR-VAR-1              PIC X(20).            C3J00320
010424C*           05 C65003-ERROR-VAR-2              PIC X(20).            C3J00330
010425C*           05 C65003-ERROR-VAR-3              PIC X(20).            C3J00340
           24

010427**        COPY C9H65012.                                              L9H01240
010428C*        *                                                           C9H00010
010429C*        *              DATA GROUP 65012                             C9H00020
010430C*        *        RECORD OVERRIDE/WARNING CODE AND MESSAGE           C9H00030
010431C*        *                                     REVISION: MAY 30 83   C9H00040
010432C*        *                                                           C9H00050
010433C*        01 C9H65012.                                                C9H00060
010434C*           05 C65012-ACTION                   PIC XX.               C9H00070
010435C*           05 C65012-RESULT                   PIC XX.               C9H00080
010436C*        *  INPUT                                                    C9H00090
010437C*           05 C65012-IN-OVERRIDE-CODE         PIC 999.              C9H00100
010438C*           05 C65012-IN-OVERRIDE-LEVEL        PIC X.                C9H00110
010439C*           05 C65012-IN-OVERRIDE-VARS.                              C9H00120
```

```
010440C*              10 C65012-IN-OVERRIDE-VAR-1    PIC X(20).                    C9H00130
010441C*              10 C65012-IN-OVERRIDE-VAR-2    PIC X(20).                    C9H00140
010442C*              10 C65012-IN-OVERRIDE-VAR-3    PIC X(20).                    C9H00150
010443C*           05 C65012-IN-OVERRIDE-VARIABLES   REDEFINES                     C9H00160
010444C*                                             C65012-IN-OVERRIDE-VARS.      C9H00170
010445C*              10 C65012-IN-VARS              PIC X(20) OCCURS 3 TIMES.     C9H00180
010446C*           05 C65012-TXN-BUSINESS-DATE       PIC S9(7) COMP-3.             C9H00190
010447C*           05 C65012-IN-APPLICATION-CODE     PIC XX.                       C9H00200
010448C*           05 C65012-LANGUAGE-CODE           PIC 9.                        C9H00210
010449C*       *  OUTPUT                                                           C9H00220
010450C*           05 C65012-OVRWARN-COUNT           PIC S999 COMP-3.              C9H00230
010451C*           05 C65012-OVRWARN-LEVEL-HI        PIC X.                        C9H00240
010452C*           05 C65012-OVRWARN-LEVEL           PIC X        OCCURS 20.       C9H00250
010453C*           05 C65012-OVRWARN-CODE            PIC 999      OCCURS 20.       C9H00260
010454C*           05 C65012-OVRWARN-MESSAGE         PIC X(40)    OCCURS 20.       C9H00270
010455C*       *  WORK-AREA                                                        C9H00280
010456C*           05 C65012-FILLER                  PIC X(60).                    C9H00290
    25

010458**       COPY C3J65110.                                                      L9H01260
010459C*       * DATA GROUP 65110 * * * * * * * * * * * * * * * * * * * * *C3J00010
010460C*       *                                                                   C3J00020
010461C*       * FOR STORAGE OF DAILY RULES RETRIEVED FROM DATA BASE.              C3J00030
010462C*       *                                                                   C3J00040
010463C*       01 C3J65110.                                                        C3J00050
010464C*                                                                           C3J00060
010465C*           05 C65110-ACTION                  PIC XX.                       C3J00070
010466C*           05 C65110-RESULT                  PIC XX.                       C3J00080
010467C*                                                                           C3J00090
010468C*       * OUTPUT:                                                           C3J00100
010469C*                                                                           C3J00110
010470C*           05 C65110-DAILY-RULE-OBTAINED     PIC X(1150).                  C3J00120
010471C*       *                                                                   C3J00130
010472C*       *                                                                   C3J00140
010473C*       * * * END OF 65110 * * * * * * * * * * * * * * * * * * * * *C3J00150
    26

010475**       COPY INTLIMIT.                                                      L9H01280
010476C*       *                                                                   INT00010
010477C*       *                INTLIMIT                                           INT00020
010478C*       *    INTEREST LIMIT DAILY RULE                                      INT00030
010479C*       *    QUALIFIER - NONE (ALL BLANKS)                                  INT00040
010480C*       *                                                                   INT00050
010481C*       01 INTLIMIT REDEFINES C3J65110.                                     INT00060
010482C*       *                                                                   INT00070
010483C*                                                                           INT00080
010484C*           05 FILLER                         PIC X(4).                     INT00090
010485C*           05 INTLMT-EFFECT-INT-RATE.                                      INT00100
010486C*              10 INTLMT-EFFECT-INT-RATE-MIN  PIC S99V9(8) COMP-3.INT00110
010487C*              10 INTLMT-EFFECT-INT-RATE-MAX  PIC S99V9(8) COMP-3.INT00120
    27

010489**       COPY C3J65150.                                                      L9H01300
010490C*       *                                                                   C3J00010
010491C*       *                                                                   C3J00020
010492C*       *    DATA GROUP 65150            REVISION DATE: 83/09/27            C3J00030
010493C*       *    THE TRANSACTION LOG RECORD     (FOR REAL AND MEMO LOG DB)      C3J00040
010494C*       *    AND THE                                                        C3J00050
010495C*       *    BATCH DAILY REAL TRANSACTION LOG (FOR DAILY REAL LOG DB)       C3J00060
010496C*       *                                                                   C3J00070
010497C*       *    THIS COPYBOOK IS IDENTICAL TO CSE65152 EXCEPT FOR THE          C3J00080
010498C*       *    FIRST 10 BYTES                                                 C3J00090
010499C*       *                                                                   C3J00100
010500C*       01 C3J65150.                                                        C3J00110
010501C*       *                                                                   C3J00120
010502C*           05 C65150-TL-ACTION               PIC XX.                       C3J00130
010503C*           05 C65150-TL-RESULT               PIC XX.                       C3J00140
010504C*       *                                                                   C3J00150
010505C*           05 C65150-TL-TRAN-LOG-RECORD.                                   C3J00160
010506C*       *                                                                   C3J00170
010507C*              10 C65150-TL-LOG-KEY.                                        C3J00180
010508C*                 15 C65150-TL-TRAN-BUS-DAY   PIC S9(7) COMP-3.             C3J00190
010509C*                 15 C65150-TL-MAST-TIMESTAMP-REAL.                         C3J00200
010510C*                    20 C65150-TL-MAST-DATE-REAL   PIC S9(7) COMP-3.        C3J00210
010511C*                    20 C65150-TL-MAST-TIME-REAL   PIC S9(7) COMP-3.        C3J00220
010512C*                 15 C65150-TL-TRANSIT-REPORTING   PIC X(5).                C3J00230
010513C*                 15 C65150-TL-TRANSIT-LN-X.                                C3J00240
010514C*                    20 C65150-TL-TRANSIT-LN       PIC 9(5).                C3J00250
010515C*                 15 C65150-TL-APPL-KEY.                                    C3J00260
010516C*                    20 C65150-TL-ACCT-LN-NO.                               C3J00270
010517C*                       25 C65150-TL-ACCT-NO       PIC X(8).                C3J00280
010518C*                       25 C65150-TL-LN-NO         PIC X(3).                C3J00290
010519C*                    20 FILLER-1                   PIC X(4).                C3J00300
010520C*                 15 C65150-TL-APPL-KEY1 REDEFINES C65150-TL-APPL-KEY.      C3J00310
010521C*                    20 C65150-TL-AC-NO-SGMT.                               C3J00320
010522C*                       25 C65150-TL-AC-NO         PIC X(7).                C3J00330
010523C*                       25 C65150-TL-AC-SGMT       PIC X(3).                C3J00340
010524C*                    20 FILLER-2                   PIC X(5).                C3J00350
010525C*                 15 C65150-TL-TRAN-SRC-CODE       PIC X.                   C3J00360
010526C*                 15 C65150-TL-BMP-NAME            PIC X(8).                C3J00370
010527C*       *                                                                   C3J00380
010528C*              10 C65150-TL-LOG-DATA.                                       C3J00390
010529C*                 15 C65150-TL-LOG-RECORD-CODE     PIC X.                   C3J00400
010530C*                    88 C65150-TL-LOG-REC-SEM      VALUE '0'.               C3J00410
010531C*                    88 C65150-TL-LOG-REC-ONLINE   VALUE '1'.               C3J00420
010532C*                    88 C65150-TL-LOG-REC-SECURITY VALUE '2'.               C3J00430
010533C*                    88 C65150-TL-LOG-REC-CYC-ON-REQ VALUE '3'.             C3J00440
010534C*                    88 C65150-TL-LOG-REC-SCHED-UPDT VALUE '5'.             C3J00450
010535C*                    88 C65150-TL-LOG-REC-TZ-PARM  VALUE 'T'.               C3J00460
010536C*                 15 C65150-TL-TRAN-TYPE           PIC X.                   C3J00470
010537C*                    88 C65150-TL-TRAN-TYPE-INQ    VALUE 'I'.               C3J00480
010538C*                    88 C65150-TL-TRAN-TYPE-UPDT   VALUE 'U'.               C3J00490
010539C*                    88 C65150-TL-TRAN-TYPE-PROP   VALUE 'P'.               C3J00500
```

```
010540C*              88 C65150-TL-TRAN-TYPE-RPT        VALUE 'R'.         C3J00510
010541C*        15 C65150-TL-ACCEPT-REJECT-IND     PIC X.             C3J00520
010542C*              88 C65150-TL-ACCEPT                VALUE 'A'.         C3J00530
010543C*              88 C65150-TL-OVERRIDE              VALUE 'O'.         C3J00540
010544C*              88 C65150-TL-REJECT                VALUE 'R'.         C3J00550
010545C*        15 C65150-TL-TRACE-NO              PIC S9(7) COMP-3.  C3J00560
010546C*        15 C65150-TL-TIME-ZONE             PIC 99.            C3J00570
010547C*   *                                                          C3J00580
010548C*        15 C65150-TL-HOGAN-TCB-DATA.                          C3J00590
010549C*           20 C65150-TL-PEM-TRAN-CODE.                        C3J00600
010550C*              25 C65150-TL-CO-ID            PIC XX.            C3J00610
010551C*              25 C65150-TL-APPL-ID          PIC XX.            C3J00620
010552C*              25 C65150-TL-FUNC-ID          PIC XX.            C3J00630
010553C*              25 C65150-TL-SOURCE-TYPE      PIC XX.            C3J00640
010554C*           20 C65150-TL-TRANENTRY-TIMESTAMP.                  C3J00650
010555C*              25 C65150-TL-TRANENTRY-DATE   PIC S9(7) COMP-3.  C3J00660
010556C*              25 C65150-TL-TRANENTRY-TIME   PIC S9(7) COMP-3.  C3J00670
010557C*           20 C65150-TL-TCB-SOURCE          PIC X(8).          C3J00680
010558C*           20 C65150-TL-TCB-DESTINATION     PIC X(8).          C3J00690
010559C*           20 C65150-TL-TCB-DEVICE-TYPE     PIC X.             C3J00700
010560C*   *                                                          C3J00710
010561C*        15 C65150-TL-RPT-INFO.                                C3J00720
010562C*           20 C65150-TL-LIC                 PIC X.             C3J00730
010563C*              88 C65150-TL-NO-LIC-PRODUCED       VALUE '0'.         C3J00740
010564C*              88 C65150-TL-LIC-PRODUCED          VALUE '1'.         C3J00750
010565C*              88 C65150-TL-CLS-LIC-PRODUCED      VALUE '2'.         C3J00760
010566C*              88 C65150-TL-CLS-LIC-AC-PRODUCED   VALUE '3'.         C3J00770
010567C*              88 C65150-TL-AC-PRODUCED           VALUE '4'.         C3J00780
010568C*              88 C65150-TL-AC-LIC-PRODUCED       VALUE '5'.         C3J00790
010569C*           20 C65150-TL-RPT-CODE-COUNT      PIC S9    COMP-3.  C3J00800
010570C*           20 C65150-TL-RPT-MESS-COUNT      PIC S9    COMP-3.  C3J00810
010571C*           20 C65150-TL-RPT-CODE-IND        OCCURS 3 TIMES     C3J00820
010572C*                                            PIC X.             C3J00830
010573C*   * valid entries are F (forecast) U (unpostable) E (exception) C3J00840
010574C*           20 C65150-TL-RPT-CODE            OCCURS 3 TIMES     C3J00850
010575C*                                            PIC S999  COMP-3.  C3J00860
010576C*           20 C65150-TL-RPT-MESS-IND        OCCURS 3 TIMES     C3J00870
010577C*                                            PIC X.             C3J00880
010578C*   * valid entries are F (forecast) U (unpostable) E (exception) C3J00890
010579C*           20 C65150-TL-RPT-MESS            OCCURS 3 TIMES     C3J00900
010580C*                                            PIC X(60).         C3J00910
010581C*           20 C65150-TL-OVERLMT-IND         PIC X.             C3J00920
010582C*              88 C65150-TL-OVERLMT-NO-IND        VALUE '0'.         C3J00930
010583C*              88 C65150-TL-OVERLMT-AC-IND        VALUE '1'.         C3J00940
010584C*              88 C65150-TL-OVERLMT-LN-OFF-IND VALUE '2'.          C3J00950
010585C*           20 C65150-TL-OVERLMT-AMT         PIC S9(13)V99      C3J00960
010586C*                                                      COMP-3.  C3J00970
010587C*           20 C65150-TL-MIRLR-IND           PIC X.             C3J00980
010588C*              88 C65150-TL-MIRLR-OFF             VALUE '0'.         C3J00990
010589C*              88 C65150-TL-MIRLR-ON              VALUE '1'.         C3J01000
010590C*           20 C65150-TL-LATE-PAYMENT-IND    PIC X.             C3J01010
010591C*              88 C65150-TL-LP-OFF                VALUE '0'.         C3J01020
010592C*              88 C65150-TL-LP-ON                 VALUE '1'.         C3J01030
010593C*   *                                                          C3J01040
010594C*        15 C65150-TL-TRAN-IMAGE.                              C3J01050
010595C*           20 C65150-TL-RNA-INPUT-HEADER    PIC X(9).          C3J01060
010596C*           20 C65150-TL-TRAN-INPUT-HEADER.                    C3J01070

010597C*              25 C65150-TL-TRANSIT-SRC      PIC X(5).          C3J01080
010598C*              25 C65150-TL-PRINT-REQUEST    PIC X.             C3J01090
010599C*              25 C65150-TL-OVERRIDE-IND     PIC X.             C3J01100
010600C*              25 C65150-TL-CORRECTION-IND   PIC X.             C3J01110
010601C*              25 C65150-TL-TRAN-CODE        PIC X(3).          C3J01120
010602C*              25 C65150-TL-OTHER-BR-ID      PIC X.             C3J01130
010603C*                 88 C65150-TL-OTHER-BR-ID-NONE   VALUE '0'.         C3J01140
010604C*                 88 C65150-TL-OTHER-BR-ID-BR-BR  VALUE '1'.         C3J01150
010605C*                 88 C65150-TL-OTHER-BR-ID-HUB-SUB VALUE '2'.        C3J01160
010606C*           20 C65150-TL-TRAN-FIELDS         PIC X(128).        C3J01170
010607C*   *                                                          C3J01180
010608C*        15 C65150-TL-APPL-MAINT-INFO        PIC X(128).        C3J01190
010609C*   *                                                          C3J01200
010610C*        15 C65150-TL-CNTL-TOT-DIFF          OCCURS 10 TIMES    C3J01210
010611C*                                            PIC S9(13)V99      C3J01220
010612C*                                                      COMP-3.  C3J01230
010613C*   *                                                          C3J01240
010614C*        15 C65150-TL-MEMO-INJ-CTL-TOTS      OCCURS 10 TIMES    C3J01250
010615C*                                            PIC S9(13)V99      C3J01260
010616C*                                                      COMP-3.  C3J01270
010617C*   *                                                          C3J01280
010618C*     10 C65150-TL-NON-ESSENTIAL-DATA.                         C3J01290
010619C*        15 C65150-TL-LOCALENTRY-TIMSTAMP.                     C3J01300
010620C*           20 C65150-TL-LOCALENTRY-DATE     PIC S9(7) COMP-3.  C3J01310
010621C*           20 C65150-TL-LOCALENTRY-TIME     PIC S9(7) COMP-3.  C3J01320
010622C*        15 C65150-TL-TRAN-BUS-DAY-SRC       PIC S9(7) COMP-3.  C3J01330
010623C*        15 C65150-TL-TRAN-BUS-DAY-LN        PIC S9(7) COMP-3.  C3J01340
010624C*        15 C65150-TL-MAST-TIMESTAMP-MEMO.                     C3J01350
010625C*           20 C65150-TL-MAST-DATE-MEMO      PIC S9(7) COMP-3.  C3J01360
010626C*           20 C65150-TL-MAST-TIME-MEMO      PIC S9(7) COMP-3.  C3J01370
010627C*   *                                                          C3J01380
010628C*     10 FILLER-3                            PIC X(65).         C3J01390

010630**   COPY C3J65251.                                             L*H01320
010631C*001000*                                                       C3J00010
010632C*002000*     DATA GROUP 65251                                  C3J00020
010633C*003000*     TRANSACTION APPLICATION INPUT HEADER              C3J00030
010634C*004000*                                                       C3J00040
010635C*005000* 01  C3J65251.                                         C3J00050
010636C*006000*                                                       C3J00060
```

```
010637C*007000        05  C65251-ACTION                    PIC XX.           C3J00070
010638C*008000        05  C65251-RESULT                    PIC XX.           C3J00080
010639C*009000*                                                              C3J00090
010640C*010000        05  C65251-TRAN-INPUT-HEADER.                          C3J00100
     C 011000             10  C65251-TRAN-CNTL-BYTE        PIC X.            C3J00110
     C 012000             10  C65251-TRANSIT-SRC           PIC X(5).         C3J00120
     C 013000             10  C65251-PRINT-REQUEST         PIC X.            C3J00130
     C 014000             10  C65251-OVERRIDE-IND          PIC X.            C3J00140
     C 015000             10  C65251-CORRECTION-IND        PIC X.            C3J00150
     C 016000             10  C65251-TRAN-CODE             PIC X(3).         C3J00160
     C 017000             10  C65251-APPL-KEY.                               C3J00170
     C 018000                 15  C65251-ACCT-NO-X.                          C3J00180
     C 019000                     20  C65251-ACCT-NO       PIC 9(8).         C3J00190
     C 020000                 15  C65251-LN-NO-X.                            C3J00200
     C 021000                     20  C65251-LN-NO         PIC 9(3).         C3J00210
     C 022000             10  C65251-AC-KEY REDEFINES C65251-APPL-KEY.       C3J00220
     C 023000                 15  C65251-AC-FILLER         PIC X.            C3J00230
     C 024000                 15  C65251-AC-NO-X.                            C3J00240
     C 025000                     20  C65251-AC-NO         PIC 9(7).         C3J00250
     C 026000                 15  C65251-AC-SGMT-NO-X.                       C3J00260
     C 027000                     20  C65251-AC-SGMT-NO    PIC 9(3).         C3J00270
     C 028000             10  C65251-OTHER-BR-ID           PIC X.            C3J00280
     C 029000*                                                               C3J00290
     C 030000             10  C65251-TESTING-INFO.                           C3J00300
     C 031000                 15  C65251-TEST-RUN-NO       PIC 9(4).         C3J00310
     C 032000                 15  C65251-TEST-STEP-NO      PIC 9(3).         C3J00320
     C 033000                 15  C65251-TEST-CASE-NO      PIC 9(4).         C3J00330
     C 034000                 15  C65251-TEST-DATE         PIC 9(7).         C3J00340
     C 035000                 15  C65251-TEST-TIME         PIC 9(6).         C3J00350
31

035002**         COPY C3J65252.                                              L9H01340
035003C*         *                                                           C3J00010
035004C*         *     DATA GROUP 65252                                      C3J00020
035005C*         *     STANDARD TRANSACTION FIELDS                           C3J00030
035006C*         *     (IF TRANSACTION IS BR-TO-BR THEN FIELD "TRANSIT-LN"   C3J00040
035007C*         *      MAY BE UPDATED BY L9H62050)                          C3J00050
035008C*         *                                                           C3J00060
035009C*         01  C3J65252.                                               C3J00070
035010C*         *                                                           C3J00080
035011C*             05  C65252-ACTION                    PIC XX.            C3J00090
035012C*             05  C65252-RESULT                    PIC XX.            C3J00100
035013C*         *                                                           C3J00110
035014C*             05  C65252-TRAN-MEMO-INJ-IND         PIC X.             C3J00120
035015C*             05  C65252-TRAN-SRC-CODE             PIC X.             C3J00130
035016C*             05  C65252-TRAN-TRANSIT-LN           PIC X(5).          C3J00140
035017C*             05  C65252-TRAN-FIELDS               PIC X(120).        C3J00150

035019**         COPY TRAN25X.                                               L9H01360
035020C*         *                                                           TRA00010
035021C*         *     COPYBOOK TRAN25X                    84 04 18          TRA00020
035022C*         *     COMMON FOR TXN 250, 251, ....                         TRA00030
035023C*         *                                                           TRA00040
035024C*         *     (HOGAN MUST INIT. ALL FIELDS TO HIGH VALUES)          TRA00050
035025C*         *                                                           TRA00060
035026C*         01  TRAN25X REDEFINES C3J65252.                             TRA00070
035027C*             05  FILLER                           PIC X(11).         TRA00080
035028C*             05  T25X-TRAN-APPL-DATA.                                TRA00090
035029C*                 10  T25X-TRAN-INT-RATE-X.                           TRA00100
035030C*                     15  T25X-TRAN-INT-RATE       PIC V9(8).         TRA00110
035031C*                 10  T25X-TRAN-RULE-RATE-INFO.                       TRA00120
035032C*                     15  T25X-TRAN-INT-RULE       PIC XX.            TRA00130
035033C*                     15  T25X-TRAN-INT-RATE-IND   PIC X.             TRA00140
035034C*                 10  T25X-TRAN-FREQ-DATE-INFO.                       TRA00150
035035C*                     15  T25X-TRAN-PYMT-FREQ      PIC XX.            TRA00160
035036C*                     15  T25X-TRAN-FIRST-PDD-X.                      TRA00170
035037C*                         20  T25X-TRAN-FIRST-PDD-C PIC X.            TRA00180
035038C*                         20  T25X-TRAN-FIRST-PDD-YMD.                TRA00190
035039C*                             25  T25X-TRAN-FIRST-PDD-Y  PIC XX.      TRA00200
035040C*                             25  T25X-TRAN-FIRST-PDD-M  PIC XX.      TRA00210
035041C*                             25  T25X-TRAN-FIRST-PDD-D  PIC XX.      TRA00220
035042C*                     15  T25X-TRAN-FIRST-PDD      REDEFINES          TRA00230
035043C*                         T25X-TRAN-FIRST-PDD-X    PIC 9(7).          TRA00240
035044C*                 10  T25X-TRAN-PROCEEDS-X.                           TRA00250
035045C*                     15  T25X-TRAN-PROCEEDS       PIC 9(13)V99.      TRA00260
035046C*                 10  T25X-TRAN-AMORT-RENEW-TERM.                     TRA00270
035047C*                     15  T25X-TRAN-AMORT-TERM-X.                     TRA00280
035048C*                         20  T25X-TRAN-AMORT-TERM  PIC 999.          TRA00290
035049C*                     15  T25X-TRAN-INT-RENEW-TERM-X.                 TRA00300
035050C*                         20  T25X-TRAN-INT-RENEW-TERM  PIC 999.      TRA00310
035051C*                 10  T25X-TRAN-PYMT-AMT-REG-X.                       TRA00320
035052C*                     15  T25X-TRAN-PYMT-AMT-REG   PIC 9(13)V99.      TRA00330
035053C*                 10  T25X-TRAN-STK-PRICE-RV-FACTOR  REDEFINES        TRA00340
32

035054C*                         T25X-TRAN-PYMT-AMT-REG-X.                   TRA00350
035055C*                     15  T25X-TRAN-STICKER-PRICE-X.                  TRA00360
035056C*                         20  T25X-TRAN-STICKER-PRICE  PIC 9(11)V99.  TRA00370
035057C*                     15  T25X-TRAN-RV-FACTOR-X.                      TRA00380
035058C*                         20  T25X-TRAN-RV-FACTOR      PIC V99.       TRA00390
035059C*                 10  T25X-TRAN-INT-METHOD         PIC XX.            TRA00400
035060C*                 10  T25X-TRAN-START-ADJ-DATE.                       TRA00410
035061C*                     15  T25X-TRAN-START-DATE-X.                     TRA00420
035062C*                         20  T25X-TRAN-START-DATE-C   PIC X.         TRA00430
035063C*                         20  T25X-TRAN-START-DATE-YMD.               TRA00440
035064C*                             25  T25X-TRAN-START-DATE-Y  PIC XX.     TRA00450
035065C*                             25  T25X-TRAN-START-DATE-M  PIC XX.     TRA00460
035066C*                             25  T25X-TRAN-START-DATE-D  PIC XX.     TRA00470
035067C*                     15  T25X-TRAN-START-DATE     REDEFINES          TRA00480
035068C*                         T25X-TRAN-START-DATE-X   PIC 9(7).          TRA00490
035069C*                     15  T25X-TRAN-INT-ADJ-DATE-X.                   TRA00500
```

```
35070C*              20  T25X-TRAN-INT-ADJ-DATE-C        PIC X.        TRA00510
035071C*             20  T25X-TRAN-INT-ADJ-DATE-YMD.                   TRA00520
035072C*                 25  T25X-TRAN-INT-ADJ-DATE-Y    PIC XX.       TRA00530
035073C*                 25  T25X-TRAN-INT-ADJ-DATE-M    PIC XX.       TRA00540
035074C*                 25  T25X-TRAN-INT-ADJ-DATE-D    PIC XX.       TRA00550
035075C*             15  T25X-TRAN-INT-ADJ-DATE          REDEFINES     TRA00560
035076C*                 T25X-TRAN-INT-ADJ-DATE-X        PIC 9(7).     TRA00570
035077C*         10  T25X-TRAN-PERC-RATE-FACTOR-X.                     TRA00580
035078C*             15  T25X-TRAN-PERC-RATE-FACTOR      PIC 9V9(6).   TRA00590
33

035080**         PROCEDURE DIVISION USING  TRANSACTION-CONTROL-BLOCK   L9H01380
035081**                                   C3J60110                    L9H01390
035082**                                   C3J60300                    L9H01400
035083**                                   C3J62000                    L9H01410
035084**                                   C3J62010                    L9H01420
035085**                                   C3J62011                    L9H01430
035086**                                   C3J62080                    L9H01440
035087**                                   C9H62304                    L9H01450
035088**                                   C9H62380                    L9H01460
035089**                                   C3J65000                    L9H01470
035090**                                   C3J65003                    L9H01480
035091**                                   C9H65012                    L9H01490
035092**                                   C3J65110                    L9H01500
035093**                                   C3J65150                    L9H01510
035094**                                   C3J65251                    L9H01520
035095**                                   C3J65252.                   L9H01530
34

035097**         000-MAINLINE SECTION.                                 L9H01550

035099**             PERFORM A100-VERIFY-INPUT-CONSISTENCY.            L9H01570

035101**             IF  C65150-TL-ACCEPT                              L9H01590

035103**                 PERFORM B100-CALC-EFF-INT-RATE.               L9H01610

035105**             IF  C65150-TL-ACCEPT                              L9H01630

035107**                 PERFORM C100-CALC-NO-OF-DAYS.                 L9H01650

035109**             PERFORM Z300-END-PROGRAM.                         L9H01670

035111**             STOP RUN.                                         L9H01690

035113**         000-EXIT.                                             L9H01710

035115**             EXIT.                                             L9H01730
35

035117**         A100-VERIFY-INPUT-CONSISTENCY SECTION.                L9H01750

035119**             PERFORM A110-VERIFY-FIRST-PDD.                    L9H01770

035121**             IF  C65150-TL-ACCEPT                              L9H01790

035123**                 PERFORM A120-CHECK-ADJ-VS-START-DATE.         L9H01810

035125**             IF  C65150-TL-ACCEPT                              L9H01830

035127**                 PERFORM A130-CHECK-INT-ADJ-DATE-VS-PDD.       L9H01850

035129**             IF  C65150-TL-ACCEPT    AND                       L9H01870
035130**                 T25X-TRAN-FIRST-PDD-X  NOT NUMERIC            L9H01880

035132**                 PERFORM A140-DEFAULT-FIRST-PDD.               L9H01900

035134**             IF  C65150-TL-ACCEPT            AND               L9H01920
035135**                 C65251-TRAN-CODE  NOT = '254'                 L9H01930

035137**                 PERFORM A150-CHECK-PROCEED-VS-PYMT-AMT.       L9H01950

035139**             IF  C65150-TL-ACCEPT                              L9H01970

035141**                 PERFORM A162-FIND-NO-OF-PYMT-PER-YR.          L9H01990

035143**             IF  C65150-TL-ACCEPT.                             L9H02010

035145**                 PERFORM A160-CHECK-AMORT-VS-RENEW-TERM.       L9H02030

035147**         A100-EXIT.                                            L9H02050

035149**             EXIT.                                             L9H02070
36

035151**         A110-VERIFY-FIRST-PDD SECTION.                        L9H02090
```

```
035153**     IF T25X-TRAN-FIRST-PDO-X  NUMERIC                        L9H02110

035155**         IF T25X-TRAN-FIRST-PDO NOT > T25X-TRAN-START-DATE    L9H02130

035157**             MOVE 58 TO C65003-INPUT-ERROR                    L9H02150
035158**             PERFORM D100-CALL-COMMON-ERROR-RTN.               L9H02160

035160**     A110-EXIT.                                                L9H02180

035162**         EXIT.                                                 L9H02200

035165**     A120-CHECK-ADJ-VS-START-DATE  SECTION.                    L9H02230

035167**     IF T25X-TRAN-INT-ADJ-DATE-X  NUMERIC                      L9H02250

035169**         IF T25X-TRAN-INT-ADJ-DATE NOT > T25X-TRAN-START-DATE  L9H02270

035171**             MOVE 59 TO C65003-INPUT-ERROR                    L9H02290
035172**             PERFORM D100-CALL-COMMON-ERROR-RTN.              L9H02300

035174**     A120-EXIT.                                                L9H02320

035176**         EXIT.                                                 L9H02340

035179**     A130-CHECK-INT-ADJ-DATE-VS-PDO  SECTION.                  L9H02370

035181**     IF  T25X-TRAN-INT-ADJ-DATE-X    NUMERIC  AND              L9H02390
035182**         T25X-TRAN-FIRST-PDO-X       NUMERIC                   L9H02400

035184**         IF T25X-TRAN-INT-ADJ-DATE > T25X-TRAN-FIRST-PDO       L9H02420

035186**             MOVE 60 TO C65003-INPUT-ERROR                    L9H02440
035187**             PERFORM D100-CALL-COMMON-ERROR-RTN.              L9H02450

035189**     A130-EXIT.                                                L9H02470

035191**         EXIT.                                                 L9H02490
   37

035193**     A140-DEFAULT-FIRST-PDO  SECTION.                          L9H02510

035195**         MOVE T25X-TRAN-PYMT-FREQ    TO C62011-FREQUENCY.      L9H02530
035196**         MOVE 1                      TO C62011-NO-OF-PERIOD.   L9H02540

035198**     IF T25X-TRAN-INT-ADJ-DATE-X  NUMERIC                      L9H02560

035200**         MOVE T25X-TRAN-INT-ADJ-DATE  TO C62011-START-DATE     L9H02580
035201**     ELSE                                                      L9H02590
035202**         MOVE T25X-TRAN-START-DATE    TO C62011-START-DATE.    L9H02600

035204**         MOVE WS-FIND-END-DATE-RTN    TO TCB-ACTIVITY.         L9H02620
035205**         PERFORM Z100-CALL-PEM.                                L9H02630

035207**         MOVE C62011-END-DATE         TO T25X-TRAN-FIRST-PDO.  L9H02650

035209**     A140-EXIT.                                                L9H02670

035211**         EXIT.                                                 L9H02690

035214**     A150-CHECK-PROCEED-VS-PYMT-AMT  SECTION.                  L9H02720

035216**     IF  T25X-TRAN-PROCEEDS-X      NOT = HIGH-VALUES  AND     L9H02740
035217**         T25X-TRAN-PYMT-AMT-REG-X  NOT = HIGH-VALUES          L9H02750

035219**         IF T25X-TRAN-PROCEEDS < T25X-TRAN-PYMT-AMT-REG        L9H02770

035221**             MOVE 61 TO C65003-INPUT-ERROR                    L9H02790
035222**             PERFORM D100-CALL-COMMON-ERROR-RTN.              L9H02800

035224**     A150-EXIT.                                                L9H02820

035226**         EXIT.                                                 L9H02840
   38

035228**     A160-CHECK-AMORT-VS-RENEW-TERM  SECTION.                  L9H02860

035230**     IF  T25X-TRAN-AMORT-TERM-X       NOT = HIGH-VALUES  AND  L9H02880
035231**        (T25X-TRAN-INT-RENEW-TERM-X   NOT = HIGH-VALUES  AND  L9H02890
035232**                                      NOT = SPACES)            L9H02900
```

```
035234**            COMPUTE  T25XM-WS-INT-RENEW-TERM  =                L9H02920
035235**                     T25X-TRAN-INT-RENEW-TERM / 12              L9H02930

035237**            COMPUTE  T25XM-WS-AMORT-TERM      =                L9H02950
035238**                     T25X-TRAN-AMORT-TERM   / T25XM-WS-FACTOR   L9H02960

035240**            IF  T25XM-WS-INT-RENEW-TERM > T25XM-WS-AMORT-TERM   L9H02980

035242**                MOVE 62 TO C65003-INPUT-ERROR                   L9H03000
035243**                PERFORM D100-CALL-COMMON-ERROR-RTN.             L9H03010

035245**        A160-EXIT.                                              L9H03030

035247**            EXIT.                                               L9H03050
      39

035249**        A162-FIND-NO-OF-PYMT-PER-YR  SECTION.                   L9H03070

035251**            PERFORM A164-FIND-NO-OF-PYMT-PER-YR                 L9H03090
035252**              VARYING  T25XM-SUB FROM 1 BY 1                    L9H03100
035253**              UNTIL    T25XM-SUB > 10    OR                     L9H03110
035254**                T25X-TRAN-PYMT-FREQ = WS-PYMT-FREQ (T25XM-SUB)L9H03120

035256**            IF  T25XM-SUB  > 10                                 L9H03140

035258**                MOVE 1                          TO T25XM-WS-FACTOR L9H03160
035259**            ELSE                                                L9H03170
035260**                MOVE WS-NO-OF-PYMT-PER-YR (T25XM-SUB) TO T25XM-WS-FACTOR. L9H03180

035262**        A162-EXIT.                                              L9H03200

035264**            EXIT.                                               L9H03220

035267**        A164-FIND-NO-OF-PYMT-PER-YR   SECTION.                  L9H03250

035269**        A164-EXIT.                                              L9H03270

035271**            EXIT.                                               L9H03290
     40

035273**        B100-CALC-EFF-INT-RATE  SECTION.                        L9H03310

035275**            IF  T25X-TRAN-INT-RULE = WS-FIXED                   L9H03330

035277**                MOVE 0 TO C62380-WS-BASE-RATE                   L9H03350
035278**            ELSE                                                L9H03360
035279**                PERFORM B110-CALC-BASE-RATE.                    L9H03370

035281**            COMPUTE C62380-EFF-INT-RATE = T25XM-WS-INT-RATE-ADDN + L9H03390
035282**                 (T25X-TRAN-PERC-RATE-FACTOR * C62380-WS-BASE-RATE). L9H03400

035284**            IF  C62380-EFF-INT-RATE > 0                         L9H03420

035286**                PERFORM B200-CHECK-INT-RATE-LIMIT               L9H03440
035287**            ELSE                                                L9H03450
035288**                MOVE 64 TO C65003-INPUT-ERROR                   L9H03460
035289**                PERFORM D100-CALL-COMMON-ERROR-RTN.             L9H03470

035291**        B100-EXIT.                                              L9H03490

035293**            EXIT.                                               L9H03510
     41

035295**        B110-CALC-BASE-RATE  SECTION.                           L9H03530

035297**            MOVE T25X-TRAN-START-DATE    TO  C62000-CALENDAR-DATE. L9H03550
035298**            MOVE WS-FIND-BASE-DATE-RTN   TO  TCB-ACTIVITY.      L9H03560
035299**            PERFORM Z100-CALL-PEM.                              L9H03570

035301**            MOVE C62000-BASE-DATE        TO  C62304-START-DATE-B L9H03590
035302**                                             C62304-END-DATE-B. L9H03600
035303**            MOVE C62080-TRAN-BUS-DAY     TO  C62304-TRAN-BUS-DAY. L9H03610
035304**            MOVE SPACES                  TO  C62304-BASE-RATE-AT-START-IND L9H03620
035305**            MOVE T25X-TRAN-INT-RULE      TO  C62304-INT-RULE.   L9H03630

035307**            MOVE WS-BUILD-BASE-RATE-TBLE-RTN  TO  TCB-ACTIVITY. L9H03650
035308**            PERFORM Z100-CALL-PEM.                              L9H03660

035310**            MOVE C62304-BASE-RATE (1)    TO  C62380-WS-BASE-RATE. L9H03680

035312**        B110-EXIT.                                              L9H03700

035314**            EXIT.                                               L9H03720
     42

035316**        B200-CHECK-INT-RATE-LIMIT  SECTION.                     L9H03740

035318**            MOVE DRI-GET-RULE     TO  C60110-ACTION.            L9H03760
035319**            MOVE 'INTLIMIT'       TO  C60110-DAILY-RULE-ID.     L9H03770
```

```
035320**        MOVE 'SE'            TO  60110-QUALIFIER.           L9H03780
035321**        MOVE WS-ORLI-RTN     TO  TCB-ACTIVITY.              L9H03790
035322**        PERFORM Z100-CALL-PEM.                              L9H03800

035324**        IF  C60110-RESULT = ORI-OK                          L9H03820

035326**            MOVE INTLMT-EFFECT-INT-RATE-MIN TO              L9H03840
035327**                 T25XM-WS-MIN-EFF-INT-RATE                  L9H03850
035328**            MOVE INTLMT-EFFECT-INT-RATE-MAX TO              L9H03860
035329**                 T25XM-WS-MAX-EFF-INT-RATE                  L9H03870
035330**        ELSE                                                L9H03880
035331**            MOVE '900'           TO  C65000-USER-ABEND-CODE L9H03890
035332**            MOVE WS-ABEND-MSG-1  TO  C65000-ABEND-MESSAGE   L9H03900
035333**            PERFORM Z999-ABEND-PROG.                        L9H03910

035335**        IF (C62380-EFF-INT-RATE * 100 ) < T25XM-WS-MIN-EFF-INT-RATE  L9H03930

035337**            MOVE 510    TO  C65012-IN-OVERRIDE-CODE         L9H03950
035338**            MOVE '0'    TO  C65012-IN-OVERRIDE-LEVEL        L9H03960

035340**            PERFORM D200-RECORD-OVERRIDE-MSG.               L9H03980

035342**        IF (C62380-EFF-INT-RATE * 100) > T25XM-WS-MAX-EFF-INT-RATE   L9H04000

035344**            MOVE 511    TO  C65012-IN-OVERRIDE-CODE         L9H04020
035345**            MOVE '0'    TO  C65012-IN-OVERRIDE-LEVEL        L9H04030

035347**            PERFORM D200-RECORD-OVERRIDE-MSG.               L9H04050

035349**    B200-EXIT.                                              L9H04070

035351**        EXIT.                                               L9H04090

035353**    C100-CALC-NO-OF-DAYS  SECTION.                          L9H04110

035355**        IF  T25X-TRAN-INT-ADJ-DATE-X  NUMERIC               L9H04130

035357**            MOVE T25X-TRAN-INT-ADJ-DATE  TO C62010-START-DATE  L9H04150
035358**        ELSE                                                L9H04160
035359**            MOVE T25X-TRAN-START-DATE    TO C62010-START-DATE. L9H04170

035361**        MOVE WS-DAILY                TO C62010-FREQUENCY.   L9H04190
035362**        MOVE T25X-TRAN-FIRST-PDD     TO C62010-END-DATE.    L9H04200

035364**        MOVE WS-CALC-NO-OF-PERIODS-RTN  TO  TCB-ACTIVITY.   L9H04220
035365**        PERFORM Z100-CALL-PEM.                              L9H04230

035367**    C100-EXIT.                                              L9H04250

035369**        EXIT.                                               L9H04270

035371**    D100-CALL-COMMON-ERROR-RTN  SECTION.                    L9H04290

035373**        MOVE WS-ERROR-RTN  TO  TCB-ACTIVITY.                L9H04310
035374**        PERFORM Z100-CALL-PEM.                              L9H04320

035376**    D100-EXIT.                                              L9H04340

035378**        EXIT.                                               L9H04360

035381**    D200-RECORD-OVERRIDE-MSG  SECTION.                      L9H04390

035383**        MOVE WS-RECORD-OVERRIDE-RTN  TO  TCB-ACTIVITY.      L9H04410
035384**        PERFORM Z100-CALL-PEM.                              L9H04420

035386**    D200-EXIT.                                              L9H04440

035388**        EXIT.                                               L9H04460

035390**    Z100-CALL-PEM  SECTION.                                 L9H04480

035392**        CALL 'PEM'  USING  TRANSACTION-CONTROL-BLOCK.       L9H04500

035394**    Z100-EXIT.                                              L9H04520

035396**        EXIT.                                               L9H04540

035399**    Z300-END-PROGRAM  SECTION.                              L9H04570
```

```
035401**        MOVE CA-PEM-END-PROG TO TCB-ACTIVITY.              L9M04590
035402**        PERFORM Z100-CALL-PEM.                             L9M04600

035404**    Z300-EXIT.                                             L9M04620

035406**        EXIT.                                              L9M04640

035409**    Z999-ABEND-PROG SECTION.                               L9M04670

035411**        MOVE WS-CALLING-PGM-ID-62380  TO C65000-CALLING-ACTIVITY.  L9M04690

035413**        MOVE WS-ABEND-TRANS-ACT       TO TCB-ACTIVITY.     L9M04710
035414**        PERFORM Z100-CALL-PEM.                             L9M04720

035416**    Z999-EXIT.                                             L9M04740

035418**        EXIT.                                              L9M04760
```

MEMORY MAP

| | | |
|---|---|---|
| | TGT | 00190 |
| | SAVE AREA | 00190 |
| | SWITCH | 001D8 |
| | TALLY | 001DC |
| | SORT SAVE | 001E0 |
| | ENTRY-SAVE | 001E4 |
| | SORT CORE SIZE | 001E8 |
| | RET CODE | 001EC |
| | SORT RET | 001EE |
| | WORKING CELLS | 001F0 |
| | SORT FILE SIZE | 00320 |
| | SORT MODE SIZE | 00324 |
| | PGT-VN TBL | 00328 |
| | TGT-VN TBL | 0032C |
| | RESERVED | 00330 |
| | LENGTH OF VN TBL | 00334 |
| | LABEL RET | 00336 |
| | RESERVED | 00337 |
| | DBG R14SAVE | 00338 |
| | COBOL INDICATOR | 0033C |
| | A(INIT1) | 00340 |
| | DEBUG TABLE PTR | 00344 |
| | SUBCOM PTR | 00348 |
| | SORT-MESSAGE | 0034C |
| | SYSOUT DDNAME | 00354 |
| | RESERVED | 00355 |
| | COBOL ID | 00356 |
| | COMPILED POINTER | 00358 |
| | COUNT TABLE ADDRESS | 0035C |
| | RESERVED | 00360 |
| | DBG R11SAVE | 00368 |
| | COUNT CHAIN ADDRESS | 0036C |
| | PRBL1 CELL PTR | 00370 |
| | RESERVED | 00374 |
| | TA LENGTH | 00379 |
| | RESERVED | 0037C |
| | PCS LIT PTR | 00384 |
| | DEBUGGING | 00388 |
| | CD FOR INITIAL INPUT | 0038C |
| | OVERFLOW CELLS | 00390 |
| | BL CELLS | 00390 |
| | DECBADR CELLS | 00394 |
| | FIB CELLS | 00394 |
| | TEMP STORAGE | 00398 |
| | TEMP STORAGE-2 | 00388 |
| | TEMP STORAGE-3 | 00388 |
| | TEMP STORAGE-4 | 00388 |
| | BLL CELLS | 00388 |
| | VLC CELLS | 00404 |
| | SBL CELLS | 00404 |
| | INDEX CELLS | 00404 |
| | SUBADR CELLS | 00404 |
| | ONCTL CELLS | 00408 |
| | PFMCTL CELLS | 00408 |
| | PFMSAV CELLS | 00408 |
| | VN CELLS | 00488 |
| | SAVE AREA =2 | 00518 |
| | SAVE AREA =3 | 00518 |
| | XSASW CELLS | 00518 |
| | XSA CELLS | 00518 |
| | PARAM CELLS | 00518 |
| | RPTSAV AREA | 0051C |
| | CHECKPT CTR | 0051C |

LITERAL POOL (HEX)

```
005C8 (LIT+0)    F0F5F8F0  F5F9F0F6  F00001F0  F6F1012C  F0F6F200  0001000A
005E0 (LIT+24)   00000005  001C0000  0000000C  F0F6F410  0CF5F1F0  F5F1F1F2
005F8 (LIT+48)   F5F4C9D5  E3D3C9D4  C9E3F5C5  F9F0F0
```

| | | |
|---|---|---|
| | PGT | 00520 |
| | DEBUG LINKAGE AREA | 00520 |

| | |
|---|---|
| OVERFLOW CELLS | 00520 |
| VIRTUAL CELLS | 00524 |
| PROCEDURE NAME CELLS | 00538 |
| GENERATED NAME CELLS | 00538 |
| DCB ADDRESS CELLS | 00538 |
| VNI CELLS | 00538 |
| LITERALS | 005C8 |
| DISPLAY LITERALS | 00607 |
| PROCEDURE BLOCK CELLS | 00608 |

REGISTER ASSIGNMENT

| | |
|---|---|
| REG 6 | BLL =18 |
| REG 7 | BLL =5 |
| REG 8 | BLL =7 |
| REG 9 | BL =1 |
| REG 10 | BLL =8 |

WORKING-STORAGE STARTS AT LOCATION 000A0 FOR A LENGTH OF 000F0.

48

PROCEDURE BLOCK ASSIGNMENT

PBL = REG 11

PBL =1   STARTS AT LOCATION 00060C  STATEMENT 35080

CONDENSED LISTING

| | | | | | | | | |
|---|---|---|---|---|---|---|---|---|
| 35080 | ENTRY | 00060C | 35099 | PERFORM | 0006A8 | 35101 | IF | 0006C8 |
| 35103 | PERFORM | 0006CC | 35105 | IF | 0006E4 | 35107 | PERFORM | 0006F0 |
| 35109 | PERFORM | 000708 | 35111 | STOP | 000720 | 35115 | EXIT | 000726 |
| 35119 | PERFORM | 000726 | 35121 | IF | 00073E | 35123 | PERFORM | 00074A |
| 35125 | IF | 000762 | 35127 | PERFORM | 00076E | 35129 | IF | 000786 |
| 35132 | PERFORM | 0007A0 | 35134 | IF | 0007B8 | 35137 | PERFORM | 0007D2 |
| 35139 | IF | 0007EA | 35141 | PERFORM | 0007F6 | 35143 | IF | 00080E |
| 35145 | PERFORM | 00081A | 35149 | EXIT | 000832 | 35153 | IF | 000838 |
| 35155 | IF | 000846 | 35157 | MOVE | 00085C | 35158 | PERFORM | 000866 |
| 35162 | EXIT | 00087E | 35167 | IF | 000884 | 35169 | IF | 000892 |
| 35171 | MOVE | 0008A8 | 35172 | PERFORM | 0008B2 | 35176 | EXIT | 0008CA |
| 35181 | IF | 0008D0 | 35184 | IF | 0008EC | 35186 | MOVE | 000902 |
| 35187 | PERFORM | 00090C | 35191 | EXIT | 000924 | 35195 | IF | 00092A |
| 35196 | MOVE | 000930 | 35198 | IF | 000936 | 35200 | MOVE | 000944 |
| 35202 | MOVE | 00095C | 35204 | MOVE | 000970 | 35205 | PERFORM | 00097A |
| 35207 | MOVE | 000992 | 35211 | EXIT | 00099C | 35216 | IF | 0009A2 |
| 35219 | IF | 0009C6 | 35221 | MOVE | 0009DC | 35222 | PERFORM | 0009E6 |
| 35226 | EXIT | 0009FE | 35230 | IF | 000A04 | 35234 | COMPUTE | 000A3A |
| 35237 | COMPUTE | 000A58 | 35240 | IF | 000A76 | 35242 | MOVE | 000A80 |
| 35243 | PERFORM | 000A8A | 35247 | EXIT | 000AA2 | 35251 | PERFORM | 000AA8 |
| 35256 | IF | 000B0A | 35258 | MOVE | 000B16 | 35260 | MOVE | 000B20 |
| 35264 | EXIT | 000B46 | 35271 | EXIT | 000B4C | 35275 | IF | 000B52 |
| 35277 | MOVE | 000B5C | 35279 | PERFORM | 000B6A | 35281 | COMPUTE | 000B82 |
| 35284 | IF | 000BB6 | 35286 | PERFORM | 000BC0 | 35288 | MOVE | 000BDC |
| 35289 | PERFORM | 000BE6 | 35293 | EXIT | 000BFE | 35297 | MOVE | 000C04 |
| 35298 | MOVE | 000C1C | 35299 | PERFORM | 000C26 | 35301 | MOVE | 000C3E |
| 35303 | MOVE | 000C52 | 35304 | MOVE | 000C5C | 35305 | MOVE | 000C68 |
| 35307 | MOVE | 000C6A | 35308 | PERFORM | 000C74 | 35310 | MOVE | 000C8C |
| 35314 | EXIT | 000C9A | 35318 | MOVE | 000CA0 | 35319 | MOVE | 000CAA |
| 35320 | MOVE | 000CB0 | 35321 | MOVE | 000CC0 | 35322 | PERFORM | 000CCA |
| 35324 | IF | 000CE2 | 35326 | MOVE | 000CF0 | 35328 | MOVE | 000CFA |
| 35331 | MOVE | 000D04 | 35332 | MOVE | 000D0E | 35333 | PERFORM | 000D14 |
| 35335 | IF | 000D2C | 35337 | MOVE | 000D46 | 35338 | MOVE | 000D50 |
| 35340 | PERFORM | 000D54 | 35342 | IF | 000D6C | 35344 | MOVE | 000D86 |
| 35345 | MOVE | 000D90 | 35347 | PERFORM | 000D94 | 35351 | EXIT | 000DAC |
| 35355 | IF | 000DB2 | 35357 | MOVE | 000DC0 | 35359 | MOVE | 000DD8 |
| 35361 | MOVE | 000DEC | 35362 | MOVE | 000DF6 | 35364 | MOVE | 000E0A |
| 35365 | PERFORM | 000E14 | 35369 | EXIT | 000E2C | 35373 | MOVE | 000E32 |
| 35374 | PERFORM | 000E3C | 35378 | EXIT | 000E54 | 35383 | MOVE | 000E5A |
| 35384 | PERFORM | 000E64 | 35388 | EXIT | 000E7C | 35392 | CALL | 000E82 |
| 35396 | EXIT | 000EB0 | 35401 | MOVE | 000EB6 | 35402 | PERFORM | 000EC0 |
| 35406 | EXIT | 000ED8 | 35411 | MOVE | 000EDE | 35413 | MOVE | 000EE8 |
| 35414 | PERFORM | 000EF2 | 35418 | EXIT | 000F0A | | | |

50

*STATISTICS*   SOURCE RECORDS = 1264    DATA DIVISION STATEMENTS = 606    PROCEDURE DIVISION STATEMENTS = 133
*OPTIONS IN EFFECT*   SIZE = 786432   BUF = 176128   LINECNT = 54   SPACE1, FLAGW,   SEQ,   SOURCE
*OPTIONS IN EFFECT*   NOOMAP, NOPMAP,   CLIST,   SUPMAP, NOXREF,   SXREF,   LOAD, NODECK, APOST, NOTRUNC, NOFLOW
*OPTIONS IN EFFECT*   TERM,   NUM, NOBATCH, NONAME, COMPILE=01, NOSTATE, NORESIDENT, NODYNAM,   LIB, CSYNTAX
*OPTIONS IN EFFECT*   OPTIMIZE, NOSYMDMP, NOTEST,   VERB,   ZWB, SYST, NOENDJOB, NOLVL
*OPTIONS IN EFFECT*   NOLST , NOFDECK,NOCDECK, LCOL2, L120, NODUMP , NOADV , NOPRINT,
*OPTIONS IN EFFECT*   NOCOUNT, NOVBSUM, NOVBREF, LANGLVL(2)

51

CROSS-REFERENCE DICTIONARY

| DATA NAMES | DEFN | REFERENCE |
|---|---|---|
| CA-PEM-CHECKPOINT | 000310 | |
| CA-PEM-DISABLE-ABEND-EXIT | 000290 | |
| CA-PEM-DUMP-DG-END | 000250 | |
| CA-PEM-DUMP-DG-RETURN | 000230 | |
| CA-PEM-DUMP-TCB-TRACE | 000223 | |
| CA-PEM-DYN-DG-ALOC | 000211 | |
| CA-PEM-DYN-DG-INIT | 000215 | |
| CA-PEM-DYN-DG-REL | 000213 | |
| CA-PEM-ENABLE-ABEND-EXIT | 000270 | |
| CA-PEM-END-PROG | 000207 | 035401 |
| CA-PEM-END-TRANS | 000209 | |
| CA-PEM-NO-OP | 000217 | |

| Name | Col1 | Col2 | Col3 |
|---|---|---|---|
| CA-PEM-TRANS-DUMP-END | 000221 | | |
| CA-PEM-TRANS-DUMP-RETURN | 000219 | | |
| C3J60110 | 010101 | | |
| C3J60300 | 010115 | | |
| C3J62000 | 010170 | | |
| C3J62010 | 010182 | | |
| C3J62011 | 010202 | | |
| C3J62080 | 010224 | | |
| C3J65000 | 010376 | | |
| C3J65003 | 010396 | | |
| C3J65110 | 010443 | | |
| C3J65150 | 010500 | | |
| C3J65251 | 010635 | | |
| C3J65252 | 035009 | | |
| C60110-ACTION | 010103 | 035318 | |
| C60110-DAILY-RULE-ID | 010105 | 035319 | |
| C60110-DATA-GROUP-NO | 010107 | | |
| C60110-QUALIFIER | 010108 | 035320 | |
| C60110-RESULT | 010104 | 035324 | |
| C60110-USER-DATE | 010106 | | |
| C60300-ACTION | 010117 | | |
| C60300-RESULT | 010118 | | |
| C60300-WORK-AREA | 010120 | | |
| C62000-ACTION | 010171 | | |
| C62000-BASE-DATE | 010176 | 035301 | |
| C62000-CALENDAR-DATE | 010174 | 035297 | |
| C62000-RESULT | 010172 | | |
| C62010-ACTION | 010184 | | |
| C62010-END-DATE | 010191 | 035362 | |
| C62010-FREQUENCY | 010189 | 035361 | |
| C62010-NO-OF-PERIOD | 010195 | | |
| C62010-RESULT | 010185 | | |
| C62010-START-DATE | 010190 | 035357 | 035359 |
| C62011-ACTION | 010204 | | |
| C62011-END-DATE | 010215 | 035207 | |
| C62011-FREQUENCY | 010209 | 035195 | |
| C62011-NO-OF-PERIOD | 010211 | 035196 | |
| C62011-RESULT | 010205 | | |
| C62011-START-DATE | 010210 | 035200 | 035202 |
| C62080-ACTION | 010225 | | |
| C62080-APPL-CODE | 010228 | | |
| C62080-BR-BUS-DAY-BACK | 010242 | | |
| C62080-BR-BUS-DAY-CURR | 010240 | | |
| C62080-BR-BUS-DAY-NEXT | 010241 | | |
| C62080-BV01 | 010247 | | |
| C62080-BV01-BR-AREA | 010267 | | |
| C62080-BV01-BR-COMB-1 | 010264 | | |
| C62080-BV01-BR-COMB-2 | 010265 | | |
| C62080-BV01-BR-CPC | 010269 | | |
| C62080-BV01-BR-DATE-POINTER | 010249 | | |
| C62080-BV01-BR-DATE-POINTER-04 | 010255 | | |
| C62080-BV01-BR-DATE-POINTER-05 | 010256 | | |
| C62080-BV01-BR-DATE-POINTER-06 | 010257 | | |
| C62080-BV01-BR-DATE-POINTER-07 | 010258 | | |
| C62080-BV01-BR-DATE-POINTER-08 | 010259 | | |
| C62080-BV01-BR-DATE-POINTER-09 | 010260 | | |
| C62080-BV01-BR-DATE-POINTER-10 | 010261 | | |
| C62080-BV01-BR-DATE-POINTER-3J | 010254 | | |
| C62080-BV01-BR-DATE-POINTER-5E | 010253 | | |
| C62080-BV01-BR-DATE-POINTER-9H | 010252 | | |
| C62080-BV01-BR-DATE-POINTERS | 010248 | | |
| C62080-BV01-BR-DEL-ADV-CODE | 010275 | | |
| C62080-BV01-BR-DEL-ADV-TABLE | 010274 | | |
| C62080-BV01-BR-DISTRICT | 010266 | | |
| C62080-BV01-BR-ICA-FED-COMM | 010277 | | |
| C62080-BV01-BR-ICA-FED-CONS | 010276 | | |
| C62080-BV01-BR-ICA-PROV-COMM | 010279 | | |
| C62080-BV01-BR-ICA-PROV-CONS | 010278 | | |
| C62080-BV01-BR-INT-BASE-DAY | 010280 | | |
| C62080-BV01-BR-LANG-CODE | 010263 | | |
| C62080-BV01-BR-ONLINE-CPC | 010272 | | |
| C62080-BV01-BR-PARENT-TRANSIT | 010273 | | |
| C62080-BV01-BR-PROC-STATUS | 010271 | | |
| C62080-BV01-BR-REGION | 010268 | | |
| C62080-BV01-BR-RESIDENCE-CODE | 010270 | | |
| C62080-BV01-BR-TIME-ZONE | 010262 | | |
| C62080-BV01-BR-TRNASIT-TYPE | 010281 | | |
| C62080-DATE-POINTER | 010289 | | |
| C62080-DATE-POINTER-X | 010288 | | |
| C62080-FILLER | 010230 | | |
| C62080-RESULT | 010226 | | |
| C62080-TRAN-BUS-DAY | 010239 | 035303 | |
| C62080-TRAN-ENTRY-DATE | 010232 | | |
| C62080-TRAN-ENTRY-TIME | 010233 | | |
| C62080-TRAN-ENTRY-TIMESTAMP | 010231 | | |
| C62080-TRAN-PROC-MODE | 010243 | | |
| C62080-TRANSIT | 010229 | | |
| C62304-ACTION | 010311 | | |
| C62304-BASE-RATE | 010332 | 035310 | |
| C62304-BASE-RATE-AT-START-IND | 010322 | 035304 | |
| C62304-BASE-RATE-ENTRY | 010330 | | |
| C62304-BASE-RATE-TABLE | 010328 | | |
| C62304-END-DATE-B | 010319 | 035301 | |
| C62304-END-DATE-X | 010318 | | |
| C62304-FILLER | 010345 | | |
| C62304-INT-RULE | 010326 | 035305 | |
| C62304-NO-OF-DAYS | 010331 | | |
| C62304-NO-OF-ENTRY | 010329 | | |
| C62304-PARAMETER-INFO | 010314 | | |

| | | | | | | | | |
|---|---|---|---|---|---|---|---|---|
| C62304-PERIOD-INFO | 010315 | | | | | | | |
| C62304-QUAL | 010339 | | | | | | | |
| C62304-QUAL-DR-SEQ | 010341 | | | | | | | |
| C62304-QUAL-INT-RULE | 010340 | | | | | | | |
| C62304-RESULT | 010312 | | | | | | | |
| C62304-RULE-INFO | 010325 | | | | | | | |
| C62304-START-DATE-B | 010317 | 035301 | | | | | | |
| C62304-START-DATE-X | 010316 | | | | | | | |
| C62304-TRAN-BUS-DAY | 010320 | 035303 | | | | | | |
| C62304-USE-ALL-BASE-RATES | 010323 | | | | | | | |
| C62304-USE-BASE-RATE-AT-START | 010324 | | | | | | | |
| C62304-WK-DR-DATE | 010344 | | | | | | | |
| C62304-WK-DR-SEQ | 010338 | | | | | | | |
| C62304-WK-END-DATE-B | 010337 | | | | | | | |
| C62304-WK-INDEX-DR | 010335 | | | | | | | |
| C62304-WK-INDEX-RT | 010336 | | | | | | | |
| C62304-WK-SUB | 010343 | | | | | | | |
| C62304-YEAR-BASE | 010333 | | | | | | | |
| C62380-ACTION | 010354 | | | | | | | |
| C62380-EFF-INT-RATE | 010364 | 035281 | 035284 | 035335 | 035342 | | | |
| C62380-FILLER | 010367 | | | | | | | |
| C62380-RESULT | 010355 | | | | | | | |
| C62380-WS-BASE-RATE | 010366 | 035277 | 035281 | 035310 | | | | |
| C65000-ABEND-MESSAGE | 010385 | 035332 | | | | | | |
| C65000-ACTION | 010378 | | | | | | | |
| C65000-APPLICATION-CODE | 010383 | | | | | | | |
| C65000-CALLING-ACTIVITY | 010384 | 035411 | | | | | | |
| C65000-DUMP | 010381 | | | | | | | |
| C65000-DUMP-IND | 010380 | | | | | | | |
| C65000-LANGUAGE-CODE | 010387 | | | | | | | |
| C65000-NO-DUMP | 010382 | | | | | | | |
| C65000-RESULT | 010379 | | | | | | | |
| C65000-TCB-RESULT | 010389 | | | | | | | |
| C65000-USER-ABEND-CODE | 010386 | 035331 | | | | | | |
| C65003-ACTION | 010398 | | | | | | | |
| C65003-APPLICATION-CODE | 010406 | | | | | | | |
| C65003-ERROR-CODE | 010413 | | | | | | | |
| C65003-ERROR-COUNT | 010412 | | | | | | | |
| C65003-ERROR-MESS | 010422 | | | | | | | |
| C65003-ERROR-MESSAGE | 010414 | | | | | | | |
| C65003-ERROR-VAR-1 | 010423 | | | | | | | |
| C65003-ERROR-VAR-2 | 010424 | | | | | | | |
| C65003-ERROR-VAR-3 | 010425 | | | | | | | |
| C65003-INPUT-ERROR | 010404 | 035157 | 035171 | 035186 | 035221 | 035242 | 035288 | |
| C65003-INPUT-ERROR-X | 010403 | | | | | | | |
| C65003-LANGUAGE-CODE | 010408 | | | | | | | |
| C65003-LANGUAGE-CODE-X | 010407 | | | | | | | |
| C65003-RESULT | 010399 | | | | | | | |
| C65003-TXN-BUSINESS-DATE | 010405 | | | | | | | |
| C65003-WORK-AREA | 010418 | | | | | | | |
| C65012-ACTION | 010434 | | | | | | | |
| C65012-FILLER | 010456 | | | | | | | |
| C65012-IN-APPLICATION-CODE | 010447 | | | | | | | |
| C65012-IN-OVERRIDE-CODE | 010437 | 035337 | 035344 | | | | | |
| C65012-IN-OVERRIDE-LEVEL | 010438 | 035338 | 035345 | | | | | |
| C65012-IN-OVERRIDE-VAR-1 | 010440 | | | | | | | |
| C65012-IN-OVERRIDE-VAR-2 | 010441 | | | | | | | |
| C65012-IN-OVERRIDE-VAR-3 | 010442 | | | | | | | |
| C65012-IN-OVERRIDE-VARIABLES | 010443 | | | | | | | |
| C65012-IN-OVERRIDE-VARS | 010439 | | | | | | | |
| C65012-IN-VARS | 010445 | | | | | | | |
| C65012-LANGUAGE-CODE | 010448 | | | | | | | |
| C65012-OVRWARN-CODE | 010453 | | | | | | | |
| C65012-OVRWARN-COUNT | 010450 | | | | | | | |
| C65012-OVRWARN-LEVEL | 010452 | | | | | | | |
| C65012-OVRWARN-LEVEL-HI | 010451 | | | | | | | |
| C65012-OVRWARN-MESSAGE | 010454 | | | | | | | |
| C65012-RESULT | 010435 | | | | | | | |
| C65012-TXN-BUSINESS-DATE | 010446 | | | | | | | |
| C65110-ACTION | 010465 | | | | | | | |
| C65110-DAILY-RULE-OBTAINED | 010470 | | | | | | | |
| C65110-RESULT | 010466 | | | | | | | |
| C65150-TL-AC-LIC-PRODUCED | 010568 | | | | | | | |
| C65150-TL-AC-NO | 010522 | | | | | | | |
| C65150-TL-AC-NO-SGMT | 010521 | | | | | | | |
| C65150-TL-AC-PRODUCED | 010567 | | | | | | | |
| C65150-TL-AC-SGMT | 010523 | | | | | | | |
| C65150-TL-ACCEPT | 010542 | 035101 | 035105 | 035121 | 035125 | 035129 | 035134 | 035139 | 035143 |
| C65150-TL-ACCEPT-REJECT-IND | 010541 | | | | | | | |
| C65150-TL-ACCT-LN-NO | 010516 | | | | | | | |
| C65150-TL-ACCT-NO | 010517 | | | | | | | |
| C65150-TL-ACTION | 010502 | | | | | | | |
| C65150-TL-APPL-ID | 010551 | | | | | | | |
| C65150-TL-APPL-KEY | 010515 | | | | | | | |
| C65150-TL-APPL-KEY1 | 010520 | | | | | | | |
| C65150-TL-APPL-MAINT-INFO | 010608 | | | | | | | |
| C65150-TL-BMP-NAME | 010526 | | | | | | | |
| C65150-TL-CLS-LIC-AC-PRODUCED | 010566 | | | | | | | |
| C65150-TL-CLS-LIC-PRODUCED | 010565 | | | | | | | |
| C65150-TL-CNTL-TOT-DIFF | 010610 | | | | | | | |
| C65150-TL-CO-ID | 010550 | | | | | | | |
| C65150-TL-CORRECTION-IND | 010600 | | | | | | | |
| C65150-TL-FUNC-ID | 010552 | | | | | | | |
| C65150-TL-HOGAN-TCB-DATA | 010548 | | | | | | | |
| C65150-TL-LATE-PAYMENT-IND | 010590 | | | | | | | |
| C65150-TL-LIC | 010562 | | | | | | | |
| C65150-TL-LIC-PRODUCED | 010564 | | | | | | | |
| C65150-TL-LN-NO | 010518 | | | | | | | |
| C65150-TL-LOCALENTRY-DATE | 010620 | | | | | | | |
| C65150-TL-LOCALENTRY-TIME | 010621 | | | | | | | |

```
C65150-TL-LOCALENTRY-TIMSTAMP    010619
C65150-TL-LOG-DATA               010528
C65150-TL-LOG-KEY                010507
C65150-TL-LOG-REC-CYC-ON-REQ     010533
C65150-TL-LOG-REC-ONLINE         010531
C65150-TL-LOG-REC-SCHED-UPDT     010534
C65150-TL-LOG-REC-SECURITY       010532
C65150-TL-LOG-REC-SEM            010530
C65150-TL-LOG-REC-TZ-PARM        010535
C65150-TL-LOG-RECORD-CODE        010529
C65150-TL-LP-OFF                 010591
C65150-TL-LP-ON                  010592
C65150-TL-MAST-DATE-MEMO         010625
C65150-TL-MAST-DATE-REAL         010510
C65150-TL-MAST-TIME-MEMO         010626
C65150-TL-MAST-TIME-REAL         010511
C65150-TL-MAST-TIMESTAMP-MEMO    010624
C65150-TL-MAST-TIMESTAMP-REAL    010509
C65150-TL-MEMO-INJ-CTL-TOTS      010614
C65150-TL-MIRLR-IND              010587
C65150-TL-MIRLR-OFF              010588
C65150-TL-MIRLR-ON               010589
C65150-TL-NO-LIC-PRODUCED        010563
C65150-TL-NON-ESSENTIAL-DATA     010618
C65150-TL-OTHER-BR-ID            010602
C65150-TL-OTHER-BR-ID-BR-BR      010604
C65150-TL-OTHER-BR-ID-HUB-SUB    010605
C65150-TL-OTHER-BR-ID-NONE       010603
C65150-TL-OVERLMT-AC-IND         010583
C65150-TL-OVERLMT-AMT            010585
C65150-TL-OVERLMT-IND            010581
C65150-TL-OVERLMT-LN-OFF-IND     010584
C65150-TL-OVERLMT-NO-IND         010582
C65150-TL-OVERRIDE               010543
C65150-TL-OVERRIDE-IND           010599
C65150-TL-PEM-TRAN-CODE          010549
C65150-TL-PRINT-REQUEST          010598
C65150-TL-REJECT                 010544
C65150-TL-RESULT                 010503
C65150-TL-RNA-INPUT-HEADER       010595
C65150-TL-RPT-CODE               010574
C65150-TL-RPT-CODE-COUNT         010569
C65150-TL-RPT-CODE-IND           010571
C65150-TL-RPT-INFO               010561
C65150-TL-RPT-MESS               010579
C65150-TL-RPT-MESS-COUNT         010570
C65150-TL-RPT-MESS-IND           010576
C65150-TL-SOURCE-TYPE            010553
C65150-TL-TCB-DESTINATION        010558
C65150-TL-TCB-DEVICE-TYPE        010559
C65150-TL-TCB-SOURCE             010557
C65150-TL-TIME-ZONE              010546
C65150-TL-TRACE-NO               010545
  S6

C65150-TL-TRAN-BUS-DAY           010508
C65150-TL-TRAN-BUS-DAY-LN        010623
C65150-TL-TRAN-BUS-DAY-SRC       010622
C65150-TL-TRAN-CODE              010601
C65150-TL-TRAN-FIELDS            010606
C65150-TL-TRAN-IMAGE             010594
C65150-TL-TRAN-INPUT-HEADER      010596
C65150-TL-TRAN-LOG-RECORD        010505
C65150-TL-TRAN-SRC-CODE          010525
C65150-TL-TRAN-TYPE              010536
C65150-TL-TRAN-TYPE-INQ          010537
C65150-TL-TRAN-TYPE-PROP         010539
C65150-TL-TRAN-TYPE-RPT          010540
C65150-TL-TRAN-TYPE-UPDT         010538
C65150-TL-TRANENTRY-DATE         010555
C65150-TL-TRANENTRY-TIME         010556
C65150-TL-TRANENTRY-TIMESTAMP    010554
C65150-TL-TRANSIT-LN             010514
C65150-TL-TRANSIT-LN-X           010513
C65150-TL-TRANSIT-REPORTING      010512
C65150-TL-TRANSIT-SRC            010597
C65251-AC-FILLER                 023000
C65251-AC-KEY                    022000
C65251-AC-NO                     025000
C65251-AC-NO-X                   024000
C65251-AC-SGMT-NO                027000
C65251-AC-SGMT-NO-X              026000
C65251-ACCT-NO                   019000
C65251-ACCT-NO-X                 018000
C65251-ACTION                    010637
C65251-APPL-KEY                  017000
C65251-CORRECTION-IND            015000
C65251-LN-NO                     021000
C65251-LN-NO-X                   020000
C65251-OTHER-BR-ID               028000
C65251-OVERRIDE-IND              014000
C65251-PRINT-REQUEST             013000
C65251-RESULT                    010638
C65251-TEST-CASE-NO              033000
C65251-TEST-DATE                 034000
C65251-TEST-RUN-NO               031000
C65251-TEST-STEP-NO              032000
C65251-TEST-TIME                 035000
C65251-TESTING-INFO              030000
C65251-TRAN-CNTL-BYTE            011000
C65251-TRAN-CODE                 016000   035134
C65251-TRAN-INPUT-HEADER         010640
C65251-TRANSIT-SRC               012000
C65252-ACTION                    035011
C65252-RESULT                    035012
```

| | | | | | | | | | |
|---|---|---|---|---|---|---|---|---|---|
| C65252-TRAN-FIELDS | 035017 | | | | | | | | |
| C65252-TRAN-MEMO-INJ-IND | 035014 | | | | | | | | |
| C65252-TRAN-SRC-CODE | 035015 | | | | | | | | |
| C65252-TRAN-TRANSIT-LN | 035016 | | | | | | | | |
| >/ | | | | | | | | | |
| C9N62304 | 010309 | | | | | | | | |
| C9N62380 | 010352 | | | | | | | | |
| C9N65012 | 010433 | | | | | | | | |
| DAILY-RULE-ACTION-CODES | 000500 | | | | | | | | |
| DAILY-RULE-RESULT-CODES | 005000 | | | | | | | | |
| DRI-GET-NEXT-RULE | 000800 | | | | | | | | |
| DRI-GET-RULE | 000700 | 035310 | | | | | | | |
| DRI-NEXT-RULE-NOT-FOUND | 009000 | | | | | | | | |
| DRI-OK | 007000 | 035324 | | | | | | | |
| DRI-RULE-NOT-CREATED | 010000 | | | | | | | | |
| DRI-RULE-NOT-FOUND | 008000 | | | | | | | | |
| FILLER-1 | 010519 | | | | | | | | |
| FILLER-2 | 010524 | | | | | | | | |
| FILLER-3 | 010628 | | | | | | | | |
| INTLIMIT | 010481 | | | | | | | | |
| INTLMT-EFFECT-INT-RATE | 010485 | | | | | | | | |
| INTLMT-EFFECT-INT-RATE-MAX | 010487 | 035328 | | | | | | | |
| INTLMT-EFFECT-INT-RATE-MIN | 010486 | 035326 | | | | | | | |
| PEM-ACTIVITIES | 000206 | | | | | | | | |
| PEM-COMMON-ACTIVITIES | 000205 | | | | | | | | |
| TCB-ABEND-EXIT | 000170 | | | | | | | | |
| TCB-ABEND-TRANS | 000191 | | | | | | | | |
| TCB-ACTIVITY | 010023 | 035284 | 035298 | 035307 | 035321 | 035364 | 035373 | 035383 | 035401 | 035413 |
| TCB-ALIEN-X | 010090 | | | | | | | | |
| TCB-ALIEN-Y | 010091 | | | | | | | | |
| TCB-ALIEN-Z | 010092 | | | | | | | | |
| TCB-APPL-ID | 010014 | | | | | | | | |
| TCB-BATCH | 010077 | | | | | | | | |
| TCB-BTCH | 010022 | | | | | | | | |
| TCB-CO-ID | 010013 | | | | | | | | |
| TCB-DATA-BASE-FULL | 000183 | | | | | | | | |
| TCB-DATA-GROUP | 010027 | | | | | | | | |
| TCB-DB-NOT-AVAILABLE | 000185 | | | | | | | | |
| TCB-DEADLOCK | 000181 | | | | | | | | |
| TCB-DESTINATION | 010044 | | | | | | | | |
| TCB-DEVICE-TYPE | 010075 | | | | | | | | |
| TCB-EFFECTIVE-DATE | 010074 | | | | | | | | |
| TCB-ENQ | 010038 | | | | | | | | |
| TCB-ENQ-ID | 010039 | | | | | | | | |
| TCB-ENTER | 010047 | | | | | | | | |
| TCB-EOJ-CALL | 010037 | | | | | | | | |
| TCB-ERR | 000096 | | | | | | | | |
| TCB-FAIL | 000130 | | | | | | | | |
| TCB-FAIL-CHECKPOINT | 000189 | | | | | | | | |
| TCB-FULL | 000150 | | | | | | | | |
| TCB-FUNC-ID | 010015 | | | | | | | | |
| TCB-NO-ACT | 000098 | | | | | | | | |
| TCB-NOT-AUTH | 000110 | | | | | | | | |
| TCB-OK | 000094 | | | | | | | | |
| TCB-OK-CHECKPOINT | 000187 | | | | | | | | |
| TCB-ONLINE | 010019 | | | | | | | | |
| TCB-OPERATOR | 010043 | | | | | | | | |
| TCB-PARM-POS | 010028 | | | | | | | | |
| TCB-PFKEY | 010046 | | | | | | | | |
| TCB-PFKEY-NOT-PRESENT | 010072 | | | | | | | | |
| TCB-PF01 | 010048 | | | | | | | | |
| TCB-PF02 | 010049 | | | | | | | | |
| TCB-PF03 | 010050 | | | | | | | | |
| TCB-PF04 | 010051 | | | | | | | | |
| TCB-PF05 | 010052 | | | | | | | | |
| TCB-PF06 | 010053 | | | | | | | | |
| TCB-PF07 | 010054 | | | | | | | | |
| TCB-PF08 | 010055 | | | | | | | | |
| TCB-PF09 | 010056 | | | | | | | | |
| TCB-PF10 | 010057 | | | | | | | | |
| TCB-PF11 | 010058 | | | | | | | | |
| TCB-PF12 | 010059 | | | | | | | | |
| TCB-PF13 | 010060 | | | | | | | | |
| TCB-PF14 | 010061 | | | | | | | | |
| TCB-PF15 | 010062 | | | | | | | | |
| TCB-PF16 | 010063 | | | | | | | | |
| TCB-PF17 | 010064 | | | | | | | | |
| TCB-PF18 | 010065 | | | | | | | | |
| TCB-PF19 | 010066 | | | | | | | | |
| TCB-PF20 | 010067 | | | | | | | | |
| TCB-PF21 | 010068 | | | | | | | | |
| TCB-PF22 | 010069 | | | | | | | | |
| TCB-PF23 | 010070 | | | | | | | | |
| TCB-PF24 | 010071 | | | | | | | | |
| TCB-RESULT | 010024 | | | | | | | | |
| TCB-RESULT-CONSTANTS | 000092 | | | | | | | | |
| TCB-RESULTS | 000093 | | | | | | | | |
| TCB-SOURCE | 010042 | | | | | | | | |
| TCB-SOURCE-TYPE | 010016 | | | | | | | | |
| TCB-SOURCE-TYPE-N | 010017 | | | | | | | | |
| TCB-SYS-DATE | 010041 | | | | | | | | |
| TCB-TERM-DATA | 010045 | | | | | | | | |
| TCB-TIME | 010040 | | | | | | | | |
| TCB-TRANS-NO | 010012 | | | | | | | | |
| TCB-TWX | 010087 | | | | | | | | |
| TCB-USER-AREA-1 | 010029 | | | | | | | | |
| TCB-USER-AREA-2 | 010032 | | | | | | | | |
| TCB-USER-AREA-3 | 010036 | | | | | | | | |
| TCB-USER-CC | 010033 | | | | | | | | |
| TCB-USER-COND | 010031 | | | | | | | | |
| TCB-USER-DATA | 010025 | | | | | | | | |
| TCB-USER-ENVMT | 010035 | | | | | | | | |
| TCB-USER-INFO | 010030 | | | | | | | | |

| | | | | | |
|---|---|---|---|---|---|
| TCB-USER-RESULT | 010034 | | | | |
| TCB-2470-MOD2 | 010088 | | | | |
| TCB-2740-MOD1 | 010089 | | | | |
| TCB-3270-MOD1-PRINTER | 010085 | | | | |
| TCB-3270-MOD2-PRINTER | 010086 | | | | |
| TCB-3270-1 | 010078 | | | | |
| TCB-3270-2 | 010076 | | | | |
| TCB-3600-JP | 010082 | | | | |
| TCB-3600-LP | 010084 | | | | |
| TCB-3600-PB | 010083 | | | | |

59

| | | | | | |
|---|---|---|---|---|---|
| TCB-3604-DS1 | 010079 | | | | |
| TCB-3604-DS3 | 010080 | | | | |
| TCB-3604-DS4 | 010081 | | | | |
| TRANSACTION-CONTROL-BLOCK | 010010 | 035392 | | | |
| TRAN25X | 035026 | | | | |
| TRAN25XW | 010128 | | | | |
| TRAN25XW-WORK-AREA | 010131 | | | | |
| T25X-TRAN-AMORT-RENEW-TERM | 035048 | | | | |
| T25X-TRAN-AMORT-TERM | 035046 | 035237 | | | |
| T25X-TRAN-AMORT-TERM-X | 035047 | 035230 | | | |
| T25X-TRAN-APPL-DATA | 035028 | | | | |
| T25X-TRAN-FIRST-PDD | 035042 | 035155 | 035184 | 035207 | 035362 |
| T25X-TRAN-FIRST-PDD-C | 035037 | | | | |
| T25X-TRAN-FIRST-PDD-D | 035041 | | | | |
| T25X-TRAN-FIRST-PDD-M | 035040 | | | | |
| T25X-TRAN-FIRST-PDD-X | 035036 | 035129 | 035153 | 035181 | |
| T25X-TRAN-FIRST-PDD-Y | 035039 | | | | |
| T25X-TRAN-FIRST-PDD-YMD | 035038 | | | | |
| T25X-TRAN-FREQ-DATE-INFO | 035034 | | | | |
| T25X-TRAN-INT-ADJ-DATE | 035075 | 035169 | 035184 | 035200 | 035357 |
| T25X-TRAN-INT-ADJ-DATE-C | 035070 | | | | |
| T25X-TRAN-INT-ADJ-DATE-D | 035074 | | | | |
| T25X-TRAN-INT-ADJ-DATE-M | 035073 | | | | |
| T25X-TRAN-INT-ADJ-DATE-X | 035069 | 035167 | 035181 | 035198 | 035355 |
| T25X-TRAN-INT-ADJ-DATE-Y | 035072 | | | | |
| T25X-TRAN-INT-ADJ-DATE-YMD | 035071 | | | | |
| T25X-TRAN-INT-METHOD | 035059 | | | | |
| T25X-TRAN-INT-RATE | 035030 | | | | |
| T25X-TRAN-INT-RATE-IND | 035033 | | | | |
| T25X-TRAN-INT-RATE-X | 035029 | | | | |
| T25X-TRAN-INT-RENEW-TERM | 035050 | 035234 | | | |
| T25X-TRAN-INT-RENEW-TERM-X | 035049 | 035230 | | | |
| T25X-TRAN-INT-RULE | 035032 | 035275 | 035305 | | |
| T25X-TRAN-PERC-RATE-FACTOR | 035078 | 035281 | | | |
| T25X-TRAN-PERC-RATE-FACTOR-X | 035077 | | | | |
| T25X-TRAN-PROCEEDS | 035045 | 035219 | | | |
| T25X-TRAN-PROCEEDS-X | 035044 | 035216 | | | |
| T25X-TRAN-PYMT-AMT-REG | 035052 | 035219 | | | |
| T25X-TRAN-PYMT-AMT-REG-X | 035051 | 035216 | | | |
| T25X-TRAN-PYMT-FREQ | 035035 | 035195 | 035251 | | |
| T25X-TRAN-RULE-RATE-INFO | 035031 | | | | |
| T25X-TRAN-RV-FACTOR | 035058 | | | | |
| T25X-TRAN-RV-FACTOR-X | 035057 | | | | |
| T25X-TRAN-START-ADJ-DATE | 035060 | | | | |
| T25X-TRAN-START-DATE | 035067 | 035155 | 035169 | 035202 | 035297 035359 |
| T25X-TRAN-START-DATE-C | 035062 | | | | |
| T25X-TRAN-START-DATE-D | 035066 | | | | |
| T25X-TRAN-START-DATE-M | 035065 | | | | |
| T25X-TRAN-START-DATE-X | 035061 | | | | |
| T25X-TRAN-START-DATE-Y | 035064 | | | | |
| T25X-TRAN-START-DATE-YMD | 035063 | | | | |
| T25X-TRAN-STICKER-PRICE | 035056 | | | | |
| T25X-TRAN-STICKER-PRICE-X | 035055 | | | | |
| T25X-TRAN-STK-PRICE-RV-FACTOR | 035053 | | | | |

60

| | | | | |
|---|---|---|---|---|
| T25XW-FILLER | 010165 | | | |
| T25XW-PROP-AMORT-COSTS | 010137 | | | |
| T25XW-PROP-AMORT-TERM | 010135 | | | |
| T25XW-PROP-INT-ADJ-AMT | 010139 | | | |
| T25XW-PROP-INT-REN-TERM-COSTS | 010138 | | | |
| T25XW-PROP-PROCEEDS-AMT | 010133 | | | |
| T25XW-PROP-PYMT-AMT-REG | 010134 | | | |
| T25XW-SUB | 010152 | 035251 | 035256 | 035260 |
| T25XW-WS-AMORT-TERM | 010143 | 035237 | 035240 | |
| T25XW-WS-ENTRY-HH | 010156 | | | |
| T25XW-WS-ENTRY-MM | 010157 | | | |
| T25XW-WS-ENTRY-SS | 010158 | | | |
| T25XW-WS-ENTRY-TIME | 010153 | | | |
| T25XW-WS-FACTOR | 010141 | 035237 | 035258 | 035260 |
| T25XW-WS-INT-ADJ-AMT | 010160 | | | |
| T25XW-WS-INT-RATE-ADDN | 010142 | 035281 | | |
| T25XW-WS-INT-RENEW-COST | 010159 | | | |
| T25XW-WS-INT-RENEW-TERM | 010144 | 035234 | 035240 | |
| T25XW-WS-MAX-EFF-INT-RATE | 010162 | 035328 | 035342 | |
| T25XW-WS-MIN-EFF-INT-RATE | 010161 | 035326 | 035335 | |
| T25XW-WS-PAYOUT-TERMS | 010163 | | | |
| T25XW-WS-RES-VALUE | 010146 | | | |
| T25XW-WS-RV-INT-ADJ-AMT | 010150 | | | |
| T25XW-WS-RV-INT-COSTS-AMORT | 010148 | | | |
| T25XW-WS-RV-INT-COSTS-RENEW | 010149 | | | |
| T25XW-WS-RV-PYMT-FREQ-INT | 010147 | | | |
| WS-ABEND-MESSAGES | 000085 | | | |
| WS-ABEND-MSG-1 | 000086 | 035332 | | |
| WS-ABEND-TRANS-ACT | 000046 | 035413 | | |
| WS-ACTIVITY-DG-ID | 000023 | | | |
| WS-BUILD-BASE-RATE-TBLE-RTN | 000044 | 035307 | | |
| WS-CALC-NO-OF-PERIODS-RTN | 000040 | 035364 | | |
| WS-CALLING-PGM-ID-62380 | 000052 | 035411 | | |
| WS-DAILY | 000083 | 035361 | | |
| WS-DRLI-RTN | 000036 | 035321 | | |
| WS-ERROR-RTN | 000048 | 035373 | | |

```
WS-FIND-BASE-DATE-RTN            000038   035298
WS-FIND-END-DATE-RTN             000042   035204
WS-FIXED                         000082   035275
WS-NO-OF-PYMT-PER-YR             000079   035268
WS-PYMT-FREQ                     000078   035251
WS-PYMT-FREQ-TABLE               000076
WS-RECORD-OVERRIDE-RTN           000050   035383
WS-TABLE                         000054
WS-WORK-AREA                     000081
 61

PROCEDURE NAMES                  DEFN     REFERENCE

A100-EXIT                        035147
A100-VERIFY-INPUT-CONSISTENCY    035117   035099
A110-EXIT                        035160
A110-VERIFY-FIRST-PDD            035151   035119
A120-CHECK-ADJ-VS-START-DATE     035165   035123
A120-EXIT                        035174
A130-CHECK-INT-ADJ-DATE-VS-PDD   035179   035127
A130-EXIT                        035189
A140-DEFAULT-FIRST-PDD           035193   035132
A140-EXIT                        035209
A150-CHECK-PROCEED-VS-PYMT-AMT   035214   035137
A150-EXIT                        035224
A160-CHECK-AMORT-VS-RENEW-TERM   035228   035145
A160-EXIT                        035245
A162-EXIT                        035262
A162-FIND-NO-OF-PYMT-PER-YR      035249   035141
A164-EXIT                        035269
A164-FIND-NO-OF-PYMT-PER-YR      035267   035251
B100-CALC-EFF-INT-RATE           035273   035103
B100-EXIT                        035291
B110-CALC-BASE-RATE              035295   035279
B110-EXIT                        035312
B200-CHECK-INT-RATE-LIMIT        035316   035284
B200-EXIT                        035349
C100-CALC-NO-OF-DAYS             035353   035107
C100-EXIT                        035367
D100-CALL-COMMON-ERROR-RTN       035371   035158  035172  035187  035222  035243  035289
D100-EXIT                        035376
D200-EXIT                        035386
D200-RECORD-OVERRIDE-MSG         035381   035340  035347
Z100-CALL-PEM                    035390   035205  035299  035308  035322  035365  035374  035384  035402  035414
Z100-EXIT                        035394
Z300-END-PROGRAM                 035399   035109
Z300-EXIT                        035404
Z999-ABEND-PROG                  035409   035333
Z999-EXIT                        035416
000-EXIT                         035113
000-MAINLINE                     035097
 62

CARD   ERROR MESSAGE

IKF1100I-W    1100 SEQUENCE ERRORS IN SOURCE PROGRAM.
```

© 1984 The Royal Bank of Canada
All Rights Reserved.
An Unpublished Work.

APPENDIX C

```
C**********************************************************************   LSE00010
C         FORTRAN SUBROUTINE TO CALCULATE AVERAGE                    *    LSE00020
C         PAYMENT AMOUNT BLENDED LOAN                                *    LSE00030
C                                                                    *    LSE00040
C              A  =  WX-INT-AMT-PR-PAY                               *    LSE00050
C              C  =  WX-FREQ-INT-COMP                                *    LSE00060
C              D  =  WX-DAYS-PR-OUT                                  *    LSE00070
C              F  =  WX-FREQ-PAY-MADE                                *    LSE00080
C              I  =  WX-ANN-NOM-INT-RATE                             *    LSE00090
C              M  =  WX-COMP-DL-INT-RATE                             *    LSE00100
C              N  =  WX-NO-SCH-PAY                                   *    LSE00110
C              O  =  WX-COMP-APP-INT-RATE                            *    LSE00120
C              Z  =  WX-NO-DAYS-BASE-YR                              *    LSE00130
C                                                                    *    LSE00140
C         AVERAGE-PAYMENT-AMOUNT = A * O * (((1 + M) ** D) * ((1 + O) **  LSE00150
C                                 (N - 1)) / (((1 + O) ** N) - 1)    *   LSE00160
C                                                                    *    LSE00170
C**********************************************************************   LSE00180
0001          SUBROUTINE LSE183 (A,D,M,N,O,I,C,F,Z,RESULT)                LSE00190
0002          REAL*8    A,I,M,O,RESULT                                    LSE00200
0003          INTEGER*4 D,N,C,F,Z                                         LSE00210
      C                                                                   LSE00220
0004          CALL LSE186 (I,C,Z,M)                                       LSE00230
      C                                                                   LSE00240
0005          CALL LSE187 (I,C,F,O)                                       LSE00250
      C                                                                   LSE00260
0006          I = (1 + O) ** N - 1                                        LSE00270
0007          IF (I.EQ.0) GO TO 100                                       LSE00280
      C                                                                   LSE00290
0008          RESULT = A * O * (((1 + M) ** D) * ((1 + O) ** (N - 1)) /   LSE00300
```

```
                         1 (((1 + 0) ** N) - 1)
0009                     GO TO 200
              C
0010          100        RESULT = -1
              C
0011          200        RETURN
0012                     END
*OPTIONS IN EFFECT*  ID,EBCDIC,SOURCE,NOLIST,NODECK,LOAD,NOMAP
*OPTIONS IN EFFECT*  NAME = L5E183 , LINECNT =    50
*STATISTICS*  SOURCE STATEMENTS =      12,PROGRAM SIZE =      900
*STATISTICS*  NO DIAGNOSTICS GENERATED
     H96-LEVEL LINKAGE EDITOR OPTIONS SPECIFIED LIST,LET,XREF,LET
              DEFAULT OPTION(S) USED - SIZE=(262144,49152)
IEW0000       SETSSI 484C5297
IEW0000       NAME L5E183(R)
```

CROSS REFERENCE TABLE

| CONTROL SECTION | | | ENTRY | | | | | | | |
|---|---|---|---|---|---|---|---|---|---|---|
| NAME | ORIGIN | LENGTH | NAME | LOCATION | NAME | LOCATION | NAME | LOCATION | NAME | LOCATION |
| L5E183 | 00 | 384 | | | | | | | | |
| IHCFDXPI* | 388 | 140 | FDXPI8 | 388 | | | | | | |
| L5E186 * | 408 | 25A | | | | | | | | |
| IHCFDXPD* | 738 | 1A0 | FDXPD8 | 738 | | | | | | |
| IHCLEXP * | 808 | 288 | DEXP | 808 | | | | | | |
| IHCLLOG * | B60 | 200 | DLOG10 | B60 | DLOG | B78 | | | | |
| IHCFCOMH* | D60 | CF9 | IBCOM8 | D60 | FDIOCS8 | E1C | INTSWTCH | 1A3E | | |
| IHCCOMH2* | 1A60 | 434 | SEQDASD | 1D8A | | | | | | |
| IHCTRCH * | 1E98 | 2D4 | IHCERRM | 1E98 | | | | | | |
| IHCFCVTH* | 2170 | 1190 | ADCON8 | 2170 | FCVAOUTP | 221A | FCVLOUTP | 22AA | FCVZOUTP | 23FA |
| | | | FCVIOUTP | 27A8 | FCVEOUTP | 2CAA | FCVCOUTP | 2EC4 | INT6SWCH | 31A8 |
| IHCFINTH* | 3310 | 39E | ARITH8 | 3310 | ADJSWTCH | 35C8 | | | | |
| IHCFIOSH* | 3680 | CC0 | FIOCS8 | 3680 | | | | | | |
| IHCFIOS2* | 4370 | 420 | | | | | | | | |
| IHCUOPT * | 4790 | 8 | | | | | | | | |
| IHCUATBL* | 4798 | 328 | | | | | | | | |
| L5E187 * | 4AC0 | 25A | | | | | | | | |

| LOCATION | REFERS TO SYMBOL | IN CONTROL SECTION | LOCATION | REFERS TO SYMBOL | IN CONTROL SECTION |
|---|---|---|---|---|---|
| A4 | L5E186 | L5E186 | A8 | L5E187 | L5E187 |
| AC | FDXPI8 | IHCFDXPI | 46C | IBCOM8 | IHCFCOMH |
| 470 | IHCERRM | IHCTRCH | 580 | FDXPD8 | IHCFDXPD |
| 81C | IBCOM8 | IHCFCOMH | 848 | IHCERRM | IHCTRCH |
| 814 | DLOG | IHCLLOG | 818 | DEXP | IHCLEXP |
| A20 | IBCOM8 | IHCFCOMH | D0C | IHCERRM | IHCTRCH |
| D04 | IBCOM8 | IHCFCOMH | D08 | IHCERRM | IHCTRCH |
| E1C | SEQDASD | IHCCOMH2 | 1940 | ADCON8 | IHCFCVTH |
| 1938 | FIOCS8 | IHCFIOSH | 1944 | ARITH8 | IHCFINTH |
| 1948 | FCVEOUTP | IHCFCVTH | 194C | FCVLOUTP | IHCFCVTH |
| 1950 | FCVIOUTP | IHCFCVTH | 1954 | FCVCOUTP | IHCFCVTH |
| 1958 | FCVAOUTP | IHCFCVTH | 195C | FCVZOUTP | IHCFCVTH |
| 1918 | IHCCOMH2 | IHCCOMH2 | 191C | IHCERRM | IHCTRCH |
| 1964 | ADJSWTCH | IHCFINTH | 1960 | IHCUOPT | IHCUOPT |
| 1CE9 | IHCFCOMH | IHCFCOMH | 1CEC | IHCFCOMH | IHCFCOMH |
| 1AA8 | IHCERRM | IHCTRCH | 1AA4 | IBCOM8 | IHCFCOMH |
| 20C0 | IBCOM8 | IHCFCOMH | 2094 | ADCON8 | IHCFCVTH |
| 2090 | FIOCS8 | IHCFIOSH | 316C | IBCOM8 | IHCFCOMH |
| 3168 | IHCERRM | IHCTRCH | 360C | IBCOM8 | IHCFCOMH |
| 3610 | INTSWTCH | IHCFCOMH | 35C4 | INT6SWCH | IHCFCVTH |
| 35C0 | IHCUOPT | IHCUOPT | 3618 | ADCON8 | IHCFCVTH |
| 3614 | FIOCS8 | IHCFIOSH | 37F0 | IHCERRM | IHCTRCH |
| 37F4 | IHCFIOS2 | IHCFIOS2 | 4310 | IHCUATBL | IHCUATBL |
| 431C | IBCOM8 | IHCFCOMH | 4331 | IHCFIOS2 | IHCFIOS2 |
| 4348 | IHCFIOS2 | IHCFIOS2 | 4369 | IHCFIOS2 | IHCFIOS2 |
| 4868 | FDXPD8 | IHCFDXPD | | | |

```
ENTRY ADDRESS             00

TOTAL LENGTH            4020
****L5E183    NOW REPLACED IN DATA SET      AMODE 24
RMODE IS 24
AUTHORIZATION CODE IS           0.
```

```
C************************************************************  L5E00010
C       FORTRAN SUBROUTINE TO CALCULATE                      *  L5E00020
C       COMPOUNDING DAILY INTEREST                           *  L5E00030
C                                                            *  L5E00040
C             I  =  FX-ANN-NOM-INT-RATE                      *  L5E00050
C             C  =  KX-FREQ-INT-COMP                         *  L5E00060
C             Z  =  KX-NO-DAYS-BASE-YR                       *  L5E00070
C                                                            *  L5E00080
C                                                            *  L5E00090
C       COMP-DAILY-INT-RATE = (1 + (I / C)) ** (C / Z) - 1   *  L5E00100
C                                                            *  L5E00110
C************************************************************  L5E00120
0001          SUBROUTINE L5E186 (I,C,Z,RESULT)                  L5E00130
0002          REAL*8     I,RESULT                               L5E00140
0003          INTEGER*4  C,Z                                    L5E00150
       C                                                        L5E00160
0004          IF (C.EQ.0) GO TO 100                             L5E00170
0005          IF (Z.EQ.0) GO TO 100                             L5E00180
       C                                                        L5E00190
0006          RESULT = (1 + (I / C)) ** (FLOAT(C) / FLOAT(Z)) - 1  L5E00200
0007          GO TO 200                                         L5E00210
       C                                                        L5E00220
0008    100   RESULT = -1                                       L5E00230
       C                                                        L5E00240
0009    200   RETURN                                            L5E00250
0010          END                                               L5E00260
*OPTIONS IN EFFECT*  ID,EBCDIC,SOURCE,NOLIST,NODECK,LOAD,NOMAP
*OPTIONS IN EFFECT*  NAME = L5E186  , LINECNT =  50
*STATISTICS*    SOURCE STATEMENTS =    10,PROGRAM SIZE =    602
*STATISTICS*  NO DIAGNOSTICS GENERATED

H96-LEVEL LINKAGE EDITOR OPTIONS SPECIFIED LIST,LET,XREF,LET
        DEFAULT OPTION(S) USED  -  SIZE=(262144,49152)
IEW0000    SETSSI 444C5298
IEW0000    NAME L5E186(R)
```

CROSS REFERENCE TABLE

CONTROL SECTION

| NAME | ORIGIN | LENGTH |
|---|---|---|
| L5E186 | 00 | 25A |
| IHCFDXPD* | 260 | 1A0 |
| IHCLEXP * | 400 | 288 |
| IHCLLOG * | 688 | 200 |
| IHCFCOMH* | 888 | CF9 |
| IHCCOMH2* | 1588 | 434 |
| IHCTRCH * | 19C0 | 2D4 |
| IHCFCVTH* | 1C98 | 119D |
| IHCFINTH* | 2E38 | 39E |
| IHCFIOSH* | 31D8 | CC0 |
| IHCFIOSZ* | 3E98 | 420 |
| IHCUOPT * | 42B8 | 8 |
| IHCUATBL* | 42C0 | 328 |

ENTRY

| NAME | LOCATION | NAME | LOCATION | NAME | LOCATION | NAME | LOCATION |
|---|---|---|---|---|---|---|---|
| FDXPD$ | 260 | | | | | | |
| DEXP | 400 | | | | | | |
| DLOG10 | 688 | DLOG | 6A0 | | | | |
| IBCOM$ | 888 | FDIOCS$ | 944 | INTSWTCH | 1566 | | |
| SEQDASD | 1C82 | | | | | | |
| IHCERRM | 19C0 | | | | | | |
| ADCON$ | 1C98 | FCVAOUTP | 1D42 | FCVLOUTP | 1DD2 | FCVZOUTP | 1F22 |
| FCVIOUTP | 2200 | FCVEOUTP | 27D2 | FCVCOUTP | 29EC | INT6SWCH | 2CD3 |
| ARITH$ | 2E38 | ADJSWTCH | 30F0 | | | | |
| FIOCS$ | 31D8 | | | | | | |

| LOCATION | REFERS TO SYMBOL | IN CONTROL SECTION | LOCATION | REFERS TO SYMBOL | IN CONTROL SECTION |
|---|---|---|---|---|---|
| A8 | FDXPD$ | IHCFDXPD | 344 | IBCOM$ | IHCFCOMH |
| 390 | IHCERRM | IHCTRCH | 33C | DLOG | IHCLLOG |
| 340 | DEXP | IHCLEXP | 548 | IBCOM$ | IHCFCOMH |
| 634 | IHCERRM | IHCTRCH | 82C | IBCOM$ | IHCFCOMH |
| 830 | IHCERRM | IHCTRCH | 944 | SEQDASD | IHCCOMH2 |
| 1468 | ADCON$ | IHCFCVTH | 1460 | FIOCS$ | IHCFIOSH |
| 146C | ARITH$ | IHCFINTH | 1470 | FCVEOUTP | IHCFCVTH |
| 1474 | FCVLOUTP | IHCFCVTH | 1478 | FCVIOUTP | IHCFCVTH |
| 147C | FCVCOUTP | IHCFCVTH | 1480 | FCVAOUTP | IHCFCVTH |
| 1404 | FCVZOUTP | IHCFCVTH | 1440 | IHCCOMH2 | IHCCOMH2 |
| 1444 | IHCERRM | IHCTRCH | 148C | ADJSWTCH | IHCFINTH |
| 1408 | IHCUOPT | IHCUOPT | 1811 | IHCFCOMH | IHCFCOMH |
| 1814 | IHCFCOMH | IHCFCOMH | 1500 | IHCERRM | IHCTRCH |
| 15CC | IBCOM$ | IHCFCOMH | 1800 | IBCOM$ | IHCFCOMH |
| 1BBC | ADCON$ | IHCFCVTH | 1BC0 | FIOCS$ | IHCFIOSH |
| 2C94 | IBCOM$ | IHCFCOMH | 2C90 | IHCERRM | IHCTRCH |
| 3134 | IBCOM$ | IHCFCOMH | 3130 | INTSWTCH | IHCFCOMH |
| 30EC | INT6SWCH | IHCFCVTH | 30E8 | IHCUOPT | IHCUOPT |

|  |  |  |  |  |  |
|---|---|---|---|---|---|
| 3140 | ADCON3 | IHCFCVTH | 313C | FIOCS# | IHCFIOSH |
| 3318 | IHCERRM | IHCTRCH | 331C | IHCFIOS2 | IHCFIOS2 |
| 3E38 | IHCUATBL | IHCUATBL | 3E44 | IDCON8 | IHCFCOMH |
| 3E59 | IHCFIOS2 | IHCFIOS2 | 3E70 | IHCFIOS2 | IHCFIOS2 |
| 3E91 | IHCFIOS2 | IHCFIOS2 |  |  |  |

```
ENTRY ADDRESS           00

TOTAL LENGTH      45E8
****LSE186    NOW REPLACED IN DATA SET     AMODE 24
RMODE IS 24
AUTHORIZATION CODE IS          0.
           C*********************************************************  LSE00010
           C        FORTRAN SUBROUTINE TO CALCULATE                  *  LSE00020
           C        COMPOUNDING PAYMENT INTEREST RATE                *  LSE00030
           C                                                         *  LSE00040
           C            I = MK-ANN-NOM-INT-RATE                      *  LSE00050
           C            C = MK-FREQ-INT-COMP                         *  LSE00060
           C            F = MK-FREQ-PAY-MADE                         *  LSE00070
           C                                                         *  LSE00080
           C        COMP-PYMT-FREQ-INT-RATE = (1 + (I / C)) ** (C / F) - 1 *  LSE00090
           C                                                         *  LSE00100
           C*********************************************************  LSE00110
0001                SUBROUTINE LSE187 (I,C,F,RESULT)                    LSE00120
0002                REAL*8     I,RESULT                                 LSE00130
0003                INTEGER*4  C,F                                      LSE00140
           C                                                            LSE00150
0004                IF (F.EQ.0) GO TO 100                               LSE00160
0005                IF (C.EQ.0) GO TO 100                               LSE00170
           C                                                            LSE00180
0006                RESULT = (1 + (I / C)) ** (FLOAT(C) / FLOAT(F)) - 1  LSE00190
0007                GO TO 200                                           LSE00200
           C                                                            LSE00210
0008                100 RESULT = -1                                     LSE00220
           C                                                            LSE00230
0009                200 RETURN                                          LSE00240
0010                END                                                 LSE00250
*OPTIONS IN EFFECT* ID,EBCDIC,SOURCE,NOLIST,NODECK,LOAD,NOMAP
*OPTIONS IN EFFECT* NAME = LSE187 , LINECNT =     50
*STATISTICS*   SOURCE STATEMENTS =      10,PROGRAM SIZE =      602
*STATISTICS*  NO DIAGNOSTICS GENERATED

H96-LEVEL LINKAGE EDITOR OPTIONS SPECIFIED LIST,LET,XREF,LET
        DEFAULT OPTION(S) USED - SIZE=(262144,49152)
IEW0000    SETSSI 44C5298
IEW0000    NAME LSE187(R)
```

CROSS REFERENCE TABLE

CONTROL SECTION

| NAME | ORIGIN | LENGTH |
|---|---|---|
| LSE187 | 00 | 25A |
| IHCFDXPD* | 260 | 1A0 |
| IHCLEXP * | 400 | 288 |
| IHCLLOG * | 688 | 200 |
| IHCFCOMH* | 888 | CF9 |
| IHCCOMH2* | 1588 | 434 |
| IHCTRCH * | 19C0 | 2D4 |
| IHCFCVTH* | 1C98 | 1190 |
| IHCFINTH* | 2E38 | 39E |
| IHCFIOSH* | 31D8 | CC0 |
| IHCFIOS2* | 3E98 | 420 |
| IHCUOPT * | 42B8 | 8 |
| IHCUATBL* | 42C0 | 328 |

ENTRY

| NAME | LOCATION | NAME | LOCATION | NAME | LOCATION | NAME | LOCATION |
|---|---|---|---|---|---|---|---|
| FDXPD8 | 260 |  |  |  |  |  |  |
| DEXP | 400 |  |  |  |  |  |  |
| DLOG10 | 688 | DLOG | 6A0 |  |  |  |  |
| IBCOM# | 888 | FDIOCS# | 944 | INTSWTCH | 1566 |  |  |
| SEQOASD | 1882 |  |  |  |  |  |  |
| IHCERRM | 19C0 |  |  |  |  |  |  |
| ADCON# | 1C98 | FCVAOUTP | 1D42 | FCVLOUTP | 1D02 | FCVZOUTP | 1F22 |
| FCVIOUTP | 22D0 | FCVEOUTP | 2702 | FCVCOUTP | 29EC | INT6SWCH | 2CD3 |
| ARITH# | 2E38 | ADJSWTCH | 30F0 |  |  |  |  |
| FIOCS# | 31D8 |  |  |  |  |  |  |

| LOCATION | REFERS TO SYMBOL | IN CONTROL SECTION | LOCATION | REFERS TO SYMBOL | IN CONTROL SECTION |
|---|---|---|---|---|---|
| A8 | FDXPD8 | IHCFDXPD | 344 | IDCON8 | IHCFCOMH |
| 390 | IHCERRM | IHCTRCH | 33C | DLOG | IHCLLOG |
| 340 | DEXP | IHCLEXP | 548 | IBCOM# | IHCFCOMH |
| 634 | IHCERRM | IHCTRCH | 82C | IDCON8 | IHCFCOMH |
| 830 | IHCERRM | IHCTRCH | 944 | SEQOASD | IHCCOMH2 |
| 1468 | ADCON3 | IHCFCVTH | 1460 | FIOCS# | IHCFIOSH |
| 146C | ARITH8 | IHCFINTH | 1470 | FCVEOUTP | IHCFCVTH |
| 1474 | FCVLOUTP | IHCFCVTH | 1478 | FCVIOUTP | IHCFCVTH |
| 147C | FCVCOUTP | IHCFCVTH | 1480 | FCVAOUTP | IHCFCVTH |

| | | | | | | |
|---|---|---|---|---|---|---|
| 1484 | FCVZOUTP | IHCFCVTH | | 1440 | IHCCOMH2 | IHCCOMH2 |
| 1444 | IHCERRM | IHCTRCH | | 148C | ADJSWTCH | IHCFINTH |
| 1488 | IHCUOPT | IHCUOPT | | 1811 | IHCFCOMH | IHCFCOMH |
| 1814 | IHCFCOMH | IHCFCOMH | | 1500 | IHCERRM | IHCTRCH |
| 15CC | IBCOMH | IHCFCOMH | | 1888 | IDCCOMH | IHCFCOMH |
| LOCATION | REFERS TO SYMBOL | IN CONTROL SECTION | | LOCATION | REFERS TO SYMBOL | IN CONTROL SECTION |
| 1DDC | ADCOMH | IHCFCVTH | | 1BC0 | FIOCS# | IHCFIOSH |
| 2C94 | IBCOMH | IHCFCOMH | | 2C90 | IHCERRM | IHCTRCH |
| 3134 | ICCOMH | IHCFCOMH | | 3138 | INTSWTCH | IHCFCOMH |
| 30EC | INT&SWCH | IHCFCVTH | | 30E8 | IHCUOPT | IHCUOPT |
| 3140 | ADCCOMH | IHCFCVTH | | 313C | FIOCS# | IHCFIOSH |
| 3318 | IHCERRM | IHCTRCH | | 331C | IHCFIOS2 | IHCFIOS2 |
| 3E38 | IHCUATBL | IHCUATBL | | 3E44 | ICCOMH | IHCFCOMH |
| 3E59 | IHCFIOS2 | IHCFIOS2 | | 3E70 | IHCFIOS2 | IHCFIOS2 |
| 3E91 | IHCFIOS2 | IHCFIOS2 | | | | |
| ENTRY ADDRESS | 00 | | | | | |

TOTAL LENGTH    45E8
\*\*\*\*L5E187   NOW REPLACED IN DATA SET    AMODE 24
RMODE IS 24
AUTHORIZATION CODE IS        0.

© 1984 The Royal Bank of Canada
All Rights Reserved.
An Unpublished Work.

APPENDIX D

```
000100 ID DIVISION.                                                      L5E00010
000200                                                                   L5E00020
000300 PROGRAM-ID.   L5E51600.                                           L5E00030
000400                                                                   L5E00040
000500                                                                   L5E00050
000600                                                                   L5E00060
000700                                                                   L5E00070
000800 DATE-WRITTEN. NOVEMBER/1983.                                      L5E00080
000900 DATE-COMPILED. AUG  1,1984.                                       L5E00090
001200************************************************************      L5E00120
001300*                                                              *   L5E00130
001400*    THIS MODULE PROCESSES THE CLOSE INQUIRY TRANSACTION.     *   L5E00140
001500*    THIS RESULTS IN EITHER A TERMINAL DISPLAY OR PRINTOUT    *   L5E00150
001600*    OF ALL ONLINE HISTORY ITEMS WITHIN THE TIME FRAME        *   L5E00160
001700*    SPECIFIED.                                               *   L5E00170
001800*                                                              *   L5E00180
001900*    MAY 31, 1984 - ADDED 'BUY BACK CAR LOANS' LOGIC  - NLM   *   L5E00190
002000*         CHANGED SECTIONS : 0000, 2000, 5000, 6000, 8000     *   L5E00200
002100*         ADDED SECTIONS   : 5040, 5400, 6700, 6710, 8300,    *   L5E00210
002200*                            8310, 8400, 8500                 *   L5E00220
002300*         CHANGED DATA GROUPS AND ADDED ACTIVITIES AND MAPS.  *   L5E00230
002400************************************************************      L5E00240
002600 ENVIRONMENT DIVISION.                                             L5E00260

002800 DATA DIVISION.                                                    L5E00280

003000 WORKING-STORAGE SECTION.                                          L5E00300

003200 01  WS-ACTIVITIES-COMP.                                           L5E00320
003300     05  FILLER              PIC S9(8) COMP VALUE +51600.          L5E00330
003400     05  FILLER              PIC S9(8) COMP VALUE +51601.          L5E00340
003500     05  FILLER              PIC S9(8) COMP VALUE +51603.          L5E00350
003600     05  FILLER              PIC S9(8) COMP VALUE +60078.          L5E00360
003700     05  FILLER              PIC S9(8) COMP VALUE +60079.          L5E00370
003800     05  FILLER              PIC S9(8) COMP VALUE +60110.          L5E00380
003900     05  FILLER              PIC S9(8) COMP VALUE +61205.          L5E00390
004000     05  FILLER              PIC S9(8) COMP VALUE +61230.          L5E00400
004100     05  FILLER              PIC S9(8) COMP VALUE +61232.          L5E00410
004200     05  FILLER              PIC S9(8) COMP VALUE +61441.          L5E00420
004300     05  FILLER              PIC S9(8) COMP VALUE +62008.          L5E00430
004400     05  FILLER              PIC S9(8) COMP VALUE +62010.          L5E00440
004500     05  FILLER              PIC S9(8) COMP VALUE +62011.          L5E00450
004600     05  FILLER              PIC S9(8) COMP VALUE +62045.          L5E00460
004700     05  FILLER              PIC S9(8) COMP VALUE +62050.          L5E00470
004800     05  FILLER              PIC S9(8) COMP VALUE +62301.          L5E00480
004900     05  FILLER              PIC S9(8) COMP VALUE +62302.          L5E00490
005000     05  FILLER              PIC S9(8) COMP VALUE +62307.          L5E00500
005100     05  FILLER              PIC S9(8) COMP VALUE +64000.          L5E00510
005200     05  FILLER              PIC S9(8) COMP VALUE +64122.          L5E00520
005300     05  FILLER              PIC S9(8) COMP VALUE +64123.          L5E00530
005400     05  FILLER              PIC S9(8) COMP VALUE +64124.          L5E00540
005500     05  FILLER              PIC S9(8) COMP VALUE +64125.          L5E00550
005600     05  FILLER              PIC S9(8) COMP VALUE +64130.          L5E00560
005700     05  FILLER              PIC S9(8) COMP VALUE +64131.          L5E00570
005800     05  FILLER              PIC S9(8) COMP VALUE +64232.          L5E00580
005900     05  FILLER              PIC S9(8) COMP VALUE +65000.          L5E00590
006000     05  FILLER              PIC S9(8) COMP VALUE +65003.          L5E00600
006100     05  FILLER              PIC S9(8) COMP VALUE +65110.          L5E00610

006300 01  WS-ACTIVITIES REDEFINES WS-ACTIVITIES-COMP.                   L5E00630
006400     05  FILLER              PIC XX.                               L5E00640
```

```
006500      05  MS1-ACTIVITY-51600        PIC XX.            LSE00650
006600      05  FILLER                    PIC XX.            LSE00660
006700      05  MS1-ACTIVITY-51601        PIC XX.            LSE00670
006800      05  FILLER                    PIC XX.            LSE00680
006900      05  MS1-ACTIVITY-51603        PIC XX.            LSE00690
007000      05  FILLER                    PIC XX.            LSE00700
007100      05  MS1-ACTIVITY-60078        PIC XX.            LSE00710
007200      05  FILLER                    PIC XX.            LSE00720
007300      05  MS1-ACTIVITY-60079        PIC XX.            LSE00730
007400      05  FILLER                    PIC XX.            LSE00740
007500      05  MS1-ACTIVITY-60110        PIC XX.            LSE00750
007600      05  FILLER                    PIC XX.            LSE00760
007700      05  MS1-ACTIVITY-61205        PIC XX.            LSE00770
007800      05  FILLER                    PIC XX.            LSE00780
007900      05  MS1-ACTIVITY-61230        PIC XX.            LSE00790
008000      05  FILLER                    PIC XX.            LSE00800
008100      05  MS1-ACTIVITY-61232        PIC XX.            LSE00810
008200      05  FILLER                    PIC XX.            LSE00820
008300      05  MS1-ACTIVITY-61441        PIC XX.            LSE00830
008400      05  FILLER                    PIC XX.            LSE00840
008500      05  MS1-ACTIVITY-62008        PIC XX.            LSE00850
008600      05  FILLER                    PIC XX.            LSE00860
008700      05  MS1-ACTIVITY-62010        PIC XX.            LSE00870
008800      05  FILLER                    PIC XX.            LSE00880
008900      05  MS1-ACTIVITY-62011        PIC XX.            LSE00890
009000      05  FILLER                    PIC XX.            LSE00900
009100      05  MS1-ACTIVITY-62045        PIC XX.            LSE00910
009200      05  FILLER                    PIC XX.            LSE00920
009300      05  MS1-ACTIVITY-62050        PIC XX.            LSE00930
009400      05  FILLER                    PIC XX.            LSE00940
009500      05  MS1-ACTIVITY-62301        PIC XX.            LSE00950
009600      05  FILLER                    PIC XX.            LSE00960
009700      05  MS1-ACTIVITY-62302        PIC XX.            LSE00970
009800      05  FILLER                    PIC XX.            LSE00980
009900      05  MS1-ACTIVITY-62307        PIC XX.            LSE00990
010000      05  FILLER                    PIC XX.            LSE01000
010100      05  MS1-ACTIVITY-64000        PIC XX.            LSE01010
010200      05  FILLER                    PIC XX.            LSE01020
010300      05  MS1-ACTIVITY-64122        PIC XX.            LSE01030
010400      05  FILLER                    PIC XX.            LSE01040
010500      05  MS1-ACTIVITY-64123        PIC XX.            LSE01050
010600      05  FILLER                    PIC XX.            LSE01060
010700      05  MS1-ACTIVITY-64124        PIC XX.            LSE01070
010800      05  FILLER                    PIC XX.            LSE01080
010900      05  MS1-ACTIVITY-64125        PIC XX.            LSE01090
011000      05  FILLER                    PIC XX.            LSE01100
011100      05  MS1-ACTIVITY-64130        PIC XX.            LSE01110
011200      05  FILLER                    PIC XX.            LSE01120
011300      05  MS1-ACTIVITY-64131        PIC XX.            LSE01130
011400      05  FILLER                    PIC XX.            LSE01140
011500      05  MS1-ACTIVITY-64232        PIC XX.            LSE01150
011600      05  FILLER                    PIC XX.            LSE01160

011700          05  MS1-ACTIVITY-65000         PIC XX.           LSE01170
011800          05  FILLER                     PIC XX.           LSE01180
011900          05  MS1-ACTIVITY-65003         PIC XX.           LSE01190
012000          05  FILLER                     PIC XX.           LSE01200
012100          05  MS1-DATAGROUP-65110        PIC XX.           LSE01210
012300      01  MS2-CONSTANTS.                                   LSE01230
012400          05  MS2-DATE-NINES             PIC 9(7)    VALUE 9999999. LSE01240
012500          05  MS2-COMPARISON-PARAMETER   PIC 9(5)V99 VALUE 18000.00. LSE01250
012600                                                           LSE01260
012700      01  MS2-ONLINE-AREA.                                 LSE01270
012800          05  MS2-ONLINE                 PIC S9(4) COMP VALUE +0003. LSE01280
012900                                                           LSE01290
013000      COPY P49002D.                                        LSE01300
013001C*000010**** START OF P49002D ***** TCB RESULT CONSTANTS    *****P49002D
013002C*000020*                                                   *P49002D
013003C*000030 01  TCB-RESULT-CONSTANTS.                          P49002D
013004C*000040     05  TCB-RESULTS.                               P49002D
013005C*000050         10  TCB-OK.
013006C*000060             15  FILLER PIC S9(4) COMP VALUE +0000.
013007C*000070         10  TCB-ERR.
013008C*000080             15  FILLER PIC S9(4) COMP VALUE +0001.
013009C*000090         10  TCB-NO-ACT.
013010C*000100             15  FILLER PIC S9(4) COMP VALUE +0002.
013011C*000110         10  TCB-NOT-AUTH.
013012C*000120             15  FILLER PIC S9(4) COMP VALUE +0003.
013013C*000130         10  TCB-FAIL.
013014C*000140             15  FILLER PIC S9(4) COMP VALUE +0004.
013015C*000150         10  TCB-FULL.
013016C*000160             15  FILLER PIC S9(4) COMP VALUE +0005.
013017C*000170         10  TCB-ABEND-EXIT.
013018C*000180             15  FILLER PIC S9(4) COMP VALUE +0006.
013019C*000181         10  TCB-DEADLOCK.                          CC003801
013020C*000182             15  FILLER PIC S9(4) COMP VALUE +0007. CC003801
013021C*000183         10  TCB-DATA-BASE-FULL.                    CC003801
013022C*000184             15  FILLER PIC S9(4) COMP VALUE +0008. CC003801
013023C*000185         10  TCB-DB-NOT-AVAILABLE.                  CC003801
013024C*000186             15  FILLER PIC S9(4) COMP VALUE +0009. CC003801
013025C*000187         10  TCB-OK-CHECKPOINT.                     CC003801
013026C*000188             15  FILLER PIC S9(4) COMP VALUE +0010. CC003801
013027C*000189         10  TCB-FAIL-CHECKPOINT.                   CC003801
013028C*000190             15  FILLER PIC S9(4) COMP VALUE +0011. CC003801
013029C*000191         10  TCB-ABEND-TRANS.                       CC003801
```

```
013030C*000192                    15  FILLER PIC S9(4) COMP VALUE +0012. CC003801
013031C*000193*                                                           *P49002D
013032C*000200***** END OF P49002D ***************************************P49002D
        013200 COPY P49003D.                                               L5E01320
013201C*000010**** START OF P49003D ***** PEM COMMON ACTIVITIES       *****P49003D
013202C*000020*                                                           *P49003D
013203C*000030 01  PEM-COMMON-ACTIVITIES.                                  P49003D
013204C*000040     05  PEM-ACTIVITIES.                                     P49003D
013205C*000050         10  CA-PEM-END-PROG.
013206C*000060                    15  FILLER PIC S9(4) COMP VALUE +0001.
013207C*000070         10  CA-PEM-END-TRANS.
013208C*000080                    15  FILLER PIC S9(4) COMP VALUE +0002.
013209C*000090         10  CA-PEM-DYN-DG-ALOC.
013210C*000100                    15  FILLER PIC S9(4) COMP VALUE +0004.
013211C*000110         10  CA-PEM-DYN-DG-REL.
013212C*000120                    15  FILLER PIC S9(4) COMP VALUE +0005.
013213C*000130         10  CA-PEM-DYN-DG-INIT.
013214C*000140                    15  FILLER PIC S9(4) COMP VALUE +0006.
013215C*000150         10  CA-PEM-NO-OP.
013216C*000160                    15  FILLER PIC S9(4) COMP VALUE +0013.
013217C*000170         10  CA-PEM-TRANS-DUMP-RETURN.
013218C*000180                    15  FILLER PIC S9(4) COMP VALUE +0014.
013219C*000190         10  CA-PEM-TRANS-DUMP-END.
013220C*000200                    15  FILLER PIC S9(4) COMP VALUE +0015.
013221C*000210         10  CA-PEM-DUMP-TCB-TRACE.
013222C*000220                    15  FILLER PIC S9(4) COMP VALUE +0016.
013223C*000230         10  CA-PEM-DUMP-DG-RETURN.
013224C*000240                    15  FILLER PIC S9(4) COMP VALUE +0017.
013225C*000250         10  CA-PEM-DUMP-DG-END.
013226C*000260                    15  FILLER PIC S9(4) COMP VALUE +0018.
013227C*000270         10  CA-PEM-ENABLE-ABEND-EXIT.
013228C*000280                    15  FILLER PIC S9(4) COMP VALUE +0020.
013229C*000290         10  CA-PEM-DISABLE-ABEND-EXIT.
013230C*000300                    15  FILLER PIC S9(4) COMP VALUE +0021.
013231C*000310         10  CA-PEM-CHECKPOINT.
013232C*000320                    15  FILLER PIC S9(4) COMP VALUE +0028.
013233C*000330*                                                           *P49003D
013234C*000340***** END OF P49003D ***************************************P49003D

013400 COPY P490ZZD.                                               L5E01340
013401C*000010*                                                            P490ZZD
013402C*000020*---* START OF P490ZZD *----* PEM ACTION CODES *-------------* P490ZZD
013403C*000030*                                                          * P490ZZD
013404C*000040 01  PEM-DATA-GROUP-ACTION-CODES.                            P490ZZD
013405C*000050     05  DGA-CODE-VALUES.
013406C*000060         10  DGA-NO-OP.
013407C*000070                    15  FILLER PIC S9(4) COMP VALUE +0000.
013408C*000080         10  DGA-READ.
013409C*000090                    15  FILLER PIC S9(4) COMP VALUE +0001.
013410C*000100         10  DGA-WRITE.
013411C*000110                    15  FILLER PIC S9(4) COMP VALUE +0002.
013412C*000120         10  DGA-HOLD-P.
013413C*000130                    15  FILLER PIC S9(4) COMP VALUE +0003.
013414C*000140         10  DGA-ERASE.
013415C*000150                    15  FILLER PIC S9(4) COMP VALUE +0004.
013416C*000160         10  DGA-READ-KEY-GE.
013417C*000170                    15  FILLER PIC S9(4) COMP VALUE +0005.
013418C*000180         10  DGA-READ-KEY-EQ.
013419C*000190                    15  FILLER PIC S9(4) COMP VALUE +0007.
013420C*000200         10  DGA-INSERT-FIRST.
013421C*000210                    15  FILLER PIC S9(4) COMP VALUE +0008.
013422C*000220         10  DGA-READ-LAST-REC.
013423C*000230                    15  FILLER PIC S9(4) COMP VALUE +0009.
013424C*000240         10  DGA-INSERT-LAST.
013425C*000250                    15  FILLER PIC S9(4) COMP VALUE +0010.
013426C*000260         10  DGA-READ-FIRST.
013427C*000270                    15  FILLER PIC S9(4) COMP VALUE +0011.
013428C*000280         10  DGA-INSERT-HERE.
013429C*000290                    15  FILLER PIC S9(4) COMP VALUE +0012.
013430C*000300         10  DGA-END-REQUEST.
013431C*000310                    15  FILLER PIC S9(4) COMP VALUE +0014.
013432C*000320         10  DGA-CLOSE.
013433C*000330                    15  FILLER PIC S9(4) COMP VALUE +0036.
013434C*000340         10  DGA-OPEN-OUTPUT.
013435C*000350                    15  FILLER PIC S9(4) COMP VALUE +0037.
013436C*000360         10  DGA-OPEN-INPUT.
013437C*000370                    15  FILLER PIC S9(4) COMP VALUE +0038.
013438C*000380*                                                          * P490ZZD
013439C*000390*----* END OF P490ZZD *-----------------------------------* P490ZZD

013600 COPY P49023D.                                               L5E01360
013601C*000010*---* START OF P49023D *----* PEM RESULT CODES *-------------* P49023D
013602C*000020*                                                          * P49023D
013603C*000030 01  PEM-DATA-GROUP-RESULT-CODES.                            P49023D
013604C*000040     05  DGR-CODE-VALUES.
013605C*000050         10  DGR-OK.
013606C*000060                    15  FILLER PIC S9(4) COMP VALUE +0000.
013607C*000070         10  DGR-END-DATA.
013608C*000080                    15  FILLER PIC S9(4) COMP VALUE +0001.
013609C*000090         10  DGR-I-O-ERR.
013610C*000100                    15  FILLER PIC S9(4) COMP VALUE +0002.
013611C*000110         10  DGR-NO-FIND.
013612C*000120                    15  FILLER PIC S9(4) COMP VALUE +0007.
013613C*000130         10  DGR-LEN-ERR.
013614C*000140                    15  FILLER PIC S9(4) COMP VALUE +0014.
013615C*000150*                                                          * P49023D
013616C*000160*----* END OF P49023D *-----------------------------------* P49023D
```

```
            013800 COPY C3JDRACT.                                          L5E01380
013801C*000100*                                                            C3J00010
013802C*000200*   THIS COPY BOOK CONTAINS ALL VALID DAILY RULE INTERFACE   C3J00020
013803C*000300*   ACTION CODES.                                            C3J00030
013804C*000400*                                                            C3J00040
013805C*000500 01 DAILY-RULE-ACTION-CODES.                                 C3J00050
013806C*000600                                                             C3J00060
013807C*000700    05  DRI-GET-RULE            PIC XX      VALUE '01'.      C3J00070
013808C*000800    05  DRI-GET-NEXT-RULE       PIC XX      VALUE '02'.      C3J00080
            014000 COPY C3JMRACT.                                          L5E01400
014001C*000100*                                                            C3J00010
014002C*000200*   THIS COPY BOOK CONTAINS ALL VALID MASTER RULE INTERFACE  C3J00020
014003C*000300*   ACTION CODES.                                            C3J00030
014004C*000400*                                                            C3J00040
014005C*000500 01 MASTER-RULE-ACTION-CODES.                                C3J00050
014006C*000600                                                             C3J00060
014007C*000700    05  MRI-GET-RULE.                                        C3J00070
014008C*000800        10  FILLER              PIC S9(4) COMP VALUE +0001.  C3J00080
014009C*000900    05  MRI-GET-NEXT-RULE.                                   C3J00090
014010C*001000        10  FILLER              PIC S9(4) COMP VALUE +0002.  C3J00100
014011C*001100    05  MRI-ADD-RULE.                                        C3J00110
014012C*001200        10  FILLER              PIC S9(4) COMP VALUE +0003.  C3J00120
014013C*001300    05  MRI-UPD-RULE.                                        C3J00130
014014C*001400        10  FILLER              PIC S9(4) COMP VALUE +0004.  C3J00140
014015C*001500    05  MRI-DEL-RULE.                                        C3J00150
014016C*001600        10  FILLER              PIC S9(4) COMP VALUE +0005.  C3J00160
014017C*001700    05  MRI-GET-NEXT-PCD.                                    C3J00170
014018C*001800        10  FILLER              PIC S9(4) COMP VALUE +0006.  C3J00180

014200 COPY C3JDRRES.                                          L5E01420
014201C*001000*                                                            C3J00010
014202C*002000*   THIS COPY BOOK CONTAINS ALL VALID DAILY RULE INTERFACE   C3J00020
014203C*003000*   RESULT CODES.                                            C3J00030
014204C*004000*                                                            C3J00040
014205C*005000 01 DAILY-RULE-RESULT-CODES.                                 C3J00050
014206C*006000                                                             C3J00060
014207C*007000    05  DRI-OK                  PIC XX      VALUE '00'.      C3J00070
014208C*008000    05  DRI-RULE-NOT-FOUND      PIC XX      VALUE '01'.      C3J00080
014209C*009000    05  DRI-NEXT-RULE-NOT-FOUND PIC XX      VALUE '02'.      C3J00090
014210C*010000    05  DRI-RULE-NOT-CREATED    PIC XX      VALUE '03'.      C3J00100

014400 COPY C3JMRRES.                                          L5E01440
014401C*001000*                                                            C3J00010
014402C*002000*   THIS COPY BOOK CONTAINS ALL VALID MASTER RULE INTERFACE  C3J00020
014403C*003000*   RESULT CODES.                                            C3J00030
014404C*004000*                                                            C3J00040
014405C*005000 01 MASTER-RULE-RESULT-CODES.                                C3J00050
014406C*006000                                                             C3J00060
014407C*007000    05  MRI-OK.                                              C3J00070
014408C*008000        10  FILLER              PIC S9(4) COMP VALUE +0000.  C3J00080
014409C*009000    05  MRI-INVALID-ACTION.                                  C3J00090
014410C*010000        10  FILLER              PIC S9(4) COMP VALUE +0001.  C3J00100
014411C*011000    05  MRI-INVALID-EFF-DATE.                                C3J00110
014412C*012000        10  FILLER              PIC S9(4) COMP VALUE +0002.  C3J00120
014413C*013000    05  MRI-DEF-NOT-FOUND.                                   C3J00130
014414C*014000        10  FILLER              PIC S9(4) COMP VALUE +0003.  C3J00140
     C  015000        05  MRI-GROUP-NOT-FOUND.                             C3J00150
     C  016000        10  FILLER              PIC S9(4) COMP VALUE +0004.  C3J00160
     C  017000        05  MRI-SET-NOT-FOUND.                               C3J00170
     C  018000        10  FILLER              PIC S9(4) COMP VALUE +0005.  C3J00180
     C  019000        05  MRI-NEXT-QUAL-NOT-FOUND.                         C3J00190
     C  020000        10  FILLER              PIC S9(4) COMP VALUE +0006.  C3J00200
     C  021000        05  MRI-RULE-ALREADY-EXISTS.                         C3J00210
     C  022000        10  FILLER              PIC S9(4) COMP VALUE +0007.  C3J00220
     C  023000        05  MRI-RULE-DOES-NOT-EXIST.                         C3J00230
     C  024000        10  FILLER              PIC S9(4) COMP VALUE +0008.  C3J00240
     C  025000        05  MRI-RULE-ALREADY-DEL.                            C3J00250
     C  026000        10  FILLER              PIC S9(4) COMP VALUE +0009.  C3J00260
     C  027000        05  MRI-USER-DATA-GRP-NOT-FOUND.                     C3J00270
     C  028000        10  FILLER              PIC S9(4) COMP VALUE +0010.  C3J00280
     C  029000        05  MRI-PCD-DATA-GRP-NOT-FOUND.                      C3J00290
     C  030000        10  FILLER              PIC S9(4) COMP VALUE +0011.  C3J00300
030001C*                   05  MRI-ELEMENT-NOT-FOUND.                      C3J00310
030002C*                   10  FILLER          PIC S9(4) COMP VALUE +0012. C3J00320
     C  031000        05  MRI-SYSTEM-ERROR.                                C3J00330
     C  032000        10  FILLER              PIC S9(4) COMP VALUE +0099.  C3J00340

032002**014600 COPY LNSTATUS.                                              L5E01460
032003C*    *                                                              LNS00010
032004C*    *      DATA GROUP LNSTATUS                                     LNS00020
032005C*    *      LOAN STATUS COPYBOOK                                    LNS00030
032006C*    *                               REVISION DATE : MAY 31 1984    LNS00040
032007C*    *                                                              LNS00050
032008C*       01  LNSTATUS.                                               LNS00060
032009C*                                                                   LNS00070
032010C*           05  LNSTATUS01.                                         LNS00080
032011C*               10  FILLER       PIC X(22) VALUE SPACES.            LNS00090
032012C*           05  LNSTATUS02.                                         LNS00100
032013C*               10  FILLER       PIC XX    VALUE '02'.              LNS00110
032014C*               10  FILLER       PIC X(8)  VALUE 'OPEN'.            LNS00120
032015C*               10  FILLER       PIC X(8)  VALUE 'OUVERT'.          LNS00130
032016C*               10  FILLER       PIC XX    VALUE 'OP'.              LNS00140
032017C*               10  FILLER       PIC XX    VALUE 'OU'.              LNS00150
032018C*           05  LNSTATUS03.                                         LNS00160
032019C*               10  FILLER       PIC XX    VALUE '03'.              LNS00170
```

```
032020C*            10   FILLER          PIC X(8)  VALUE 'ACTIVE'.       LNS00180
032021C*            10   FILLER          PIC X(8)  VALUE 'ACTIF'.        LNS00190
032022C*            10   FILLER          PIC XX    VALUE 'AC'.           LNS00200
032023C*            10   FILLER          PIC XX    VALUE 'AC'.           LNS00210
032024C*       05   LNSTATUS04.                                          LNS00220
032025C*            10   FILLER          PIC XX    VALUE '04'.           LNS00230
032026C*            10   FILLER          PIC X(8)  VALUE 'DELINQ'.       LNS00240
032027C*            10   FILLER          PIC X(8)  VALUE 'SOUFFRAN'.     LNS00250
032028C*            10   FILLER          PIC XX    VALUE 'DL'.           LNS00260
032029C*            10   FILLER          PIC XX    VALUE 'SO'.           LNS00270
032030C*       05   LNSTATUS05.                                          LNS00280
032031C*            10   FILLER          PIC XX    VALUE '05'.           LNS00290
032032C*            10   FILLER          PIC X(8)  VALUE 'NON PROD'.     LNS00300
032033C*            10   FILLER          PIC X(8)  VALUE 'IMPRODUC'.     LNS00310
032034C*            10   FILLER          PIC XX    VALUE 'NP'.           LNS00320
032035C*            10   FILLER          PIC XX    VALUE 'IP'.           LNS00330
032036C*       05   LNSTATUS06.                                          LNS00340
032037C*            10   FILLER          PIC X(22) VALUE SPACES.         LNS00350
032038C*       05   LNSTATUS07.                                          LNS00360
032039C*            10   FILLER          PIC X(22) VALUE SPACES.         LNS00370
032040C*       05   LNSTATUS08.                                          LNS00380
032041C*            10   FILLER          PIC XX    VALUE '08'.           LNS00390
032042C*            10   FILLER          PIC X(8)  VALUE 'CLOSED'.       LNS00400
032043C*            10   FILLER          PIC X(8)  VALUE 'FERME'.        LNS00410
032044C*            10   FILLER          PIC XX    VALUE 'CL'.           LNS00420
032045C*            10   FILLER          PIC XX    VALUE 'FE'.           LNS00430
032046C*       05   LNSTATUS09.                                          LNS00440
032047C*            10   FILLER          PIC X(22) VALUE SPACES.         LNS00450
032048C*       05   LNSTATUS10.                                          LNS00460
032049C*            10   FILLER          PIC XX    VALUE '10'.           LNS00470
032050C*            10   FILLER          PIC X(8)  VALUE 'RESERVED'.     LNS00480
032051C*            10   FILLER          PIC X(8)  VALUE 'RESERVE'.      LNS00490
032052C*            10   FILLER          PIC XX    VALUE 'RS'.           LNS00500
032053C*            10   FILLER          PIC XX    VALUE 'RE'.           LNS00510
032054C*       05   LNSTATUS11.                                          LNS00520
032055C*            10   FILLER          PIC XX    VALUE '11'.           LNS00530
15

032056C*            10   FILLER          PIC X(8)  VALUE 'INCOMPL'.      LNS00540
032057C*            10   FILLER          PIC X(8)  VALUE 'INCOMPLE'.     LNS00550
032058C*            10   FILLER          PIC XX    VALUE 'IN'.           LNS00560
032059C*            10   FILLER          PIC XX    VALUE 'IC'.           LNS00570
032060C*       05   LNSTATUS12.                                          LNS00580
032061C*            10   FILLER          PIC XX    VALUE '12'.           LNS00590
032062C*            10   FILLER          PIC X(8)  VALUE 'PENDING'.      LNS00600
032063C*            10   FILLER          PIC X(8)  VALUE 'EN COURS'.     LNS00610
032064C*            10   FILLER          PIC XX    VALUE 'PD'.           LNS00620
032065C*            10   FILLER          PIC XX    VALUE 'EC'.           LNS00630
032066C*       05   LNSTATUS13.                                          LNS00640
032067C*            10   FILLER          PIC X(22) VALUE SPACES.         LNS00650
032068C*       05   LNSTATUS14.                                          LNS00660
032069C*            10   FILLER          PIC X(22) VALUE SPACES.         LNS00670
032070C*       05   LNSTATUS15.                                          LNS00680
032071C*            10   FILLER          PIC X(22) VALUE SPACES.         LNS00690
032072C*                                                                 LNS00700
032073C*  01   FILLER REDEFINES LNSTATUS.                                LNS00710
032074C*                                                                 LNS00720
032075C*       05   FILLER OCCURS 15.                                    LNS00730
032076C*            10   LNSTATUS-CODE   PIC XX.                         LNS00740
032077C*            10   LNSTATUS-DESC-E PIC X(8).                       LNS00750
032078C*            10   LNSTATUS-DESC-F PIC X(8).                       LNS00760
032079C*            10   LNSTATUS-LIT-E  PIC XX.                         LNS00770
032080C*            10   LNSTATUS-LIT-F  PIC XX.                         LNS00780
16

032082**014800 LINKAGE SECTION.                                          L5E01480

032084**015000 COPY P49000D.                                             L5E01500
032085C*000010**** START OF P49000D ***** TCB ****************************  *
032086C*000020*                                                             *
032087C*000030*   DATA GROUP NUMBER 0001                                    *
032088C*000040*                                                             *
032089C*000050*                                                             *
032090C*000060 01  TRANSACTION-CONTROL-BLOCK.
032091C*000070     05   FILLER          PIC XXXX.
032092C*000080     05   TCB-TRANS-NO    PIC XXXX.                       TPE49001
032093C*000090     05   TCB-CO-ID       PIC XX.                         TPE49002
032094C*000100     05   TCB-APPL-ID     PIC XX.                         TPE49003
032095C*000110     05   TCB-FUNC-ID     PIC XX.                         TPE49004
032096C*000120     05   TCB-SOURCE-TYPE PIC XX.                         TPE49005
032097C*000121     05   TCB-SOURCE-TYPE-N REDEFINES TCB-SOURCE-TYPE
032098C*000122                         PIC S9(4) COMP.
032099C*000123          88   TCB-ONLINE               VALUE +0003
032100C*000124                                              +0005
032101C*000125                                              +0006.
032102C*000126          88   TCB-BTCH                 VALUE +0004.
032103C*000130     05   TCB-ACTIVITY    PIC XX.                         TPE49006
032104C*000140     05   TCB-RESULT      PIC XX.                         TPE49007
032105C*000150     05   TCB-USER-DATA.
032106C*000151          10   FILLER          PIC X(6).
032107C*000152          10   TCB-DATA-GROUP  PIC XX.                    TPE49092
032108C*000153          10   TCB-PARM-POS    PIC XX.                    TPE49103
032109C*000154     05   TCB-USER-AREA-1 REDEFINES TCB-USER-DATA.
032110C*000160          10   TCB-USER-INFO   PIC XXXX.                  TPE49024
032111C*000170          10   TCB-USER-COND   PIC XXX.                   TPE49025
032112C*000180     05   TCB-USER-AREA-2 REDEFINES TCB-USER-DATA.
032113C*000190          10   TCB-USER-CC     PIC XX.                    TPE49017
032114C*000200          10   TCB-USER-RESULT PIC XX.                    TPE49018
032115C*000210          10   TCB-USER-ENVMT  PIC XX.                    TPE49019
032116C*000211     05   TCB-USER-AREA-3 REDEFINES TCB-USER-DATA.
032117C*000212          10   TCB-EOJ-CALL    PIC XXXX.
032118C*000220     05   TCB-ENQ         REDEFINES TCB-USER-DATA.
```

```
032119C*000221          10  TCB-ENQ-ID         PIC X(8).
032120C*000240      05  TCB-TIME               PIC S9(7) COMP-3.              TPE49012
032121C*000250      05  TCB-SYS-DATE           PIC S9(7) COMP-3.              TPE49011
032122C*000260      05  TCB-SOURCE             PIC X(8).                      TPE49013
032123C*000270      05  TCB-OPERATOR           PIC X(20).                     TPE49014
032124C*000280      05  TCB-DESTINATION        PIC X(8).                      TPE49015
032125C*000290      05  TCB-TERM-DATA.
032126C*000300          10  TCB-PFKEY          PIC X.                         TPE49020
032127C*000310              88  TCB-ENTER              VALUE QUOTE.
032128C*000320              88  TCB-PF01               VALUE '1'.
032129C*000330              88  TCB-PF02               VALUE '2'.
032130C*000340              88  TCB-PF03               VALUE '3'.
032131C*000350              88  TCB-PF04               VALUE '4'.
032132C*000360              88  TCB-PF05               VALUE '5'.
032133C*000370              88  TCB-PF06               VALUE '6'.
032134C*000380              88  TCB-PF07               VALUE '7'.
032135C*000390              88  TCB-PF08               VALUE '8'.
     17

032136C*000400              88  TCB-PF09               VALUE '9'.
032137C*000410              88  TCB-PF10               VALUE ':'.
032138C*000420              88  TCB-PF11               VALUE '#'.
032139C*000430              88  TCB-PF12               VALUE '@'.
032140C*000440              88  TCB-PF13               VALUE 'A'.
032141C*000450              88  TCB-PF14               VALUE 'B'.
032142C*000460              88  TCB-PF15               VALUE 'C'.
032143C*000470              88  TCB-PF16               VALUE 'D'.
032144C*000480              88  TCB-PF17               VALUE 'E'.
032145C*000490              88  TCB-PF18               VALUE 'F'.
032146C*000500              88  TCB-PF19               VALUE 'G'.
032147C*000510              88  TCB-PF20               VALUE 'H'.
032148C*000520              88  TCB-PF21               VALUE 'I'.
032149C*000530              88  TCB-PF22               VALUE '¢'.
032150C*000540              88  TCB-PF23               VALUE '.'.
032151C*000550              88  TCB-PF24               VALUE '<'.
032152C*000560              88  TCB-PFKEY-NOT-PRESENT  VALUE LOW-VALUE.
032153C*000570          10  FILLER             PIC XXX.
032154C*000580      05  TCB-EFFECTIVE-DATE     PIC S9(7) COMP-3.              TPE49022
032155C*000590      05  TCB-DEVICE-TYPE        PIC X.                         TPE49023
032156C*000591          88  TCB-3270-2                 VALUE 'A'.
032157C*000592          88  TCB-BATCH                  VALUE 'B'.
032158C*000593          88  TCB-3270-1                 VALUE 'C'.
032159C*000594          88  TCB-3604-DS1               VALUE 'D'.
032160C*000595          88  TCB-3604-DS3               VALUE 'E'.
032161C*000596          88  TCB-3604-DS4               VALUE 'F'.
032162C*000597          88  TCB-3600-JP                VALUE 'G'.
032163C*000598          88  TCB-3600-PB                VALUE 'H'.
032164C*000599          88  TCB-3600-LP                VALUE 'I'.
032165C*000600          88  TCB-3270-MOD1-PRINTER      VALUE 'J'.
032166C*000601          88  TCB-3270-MOD2-PRINTER      VALUE 'K'.
032167C*000602          88  TCB-TWX                    VALUE 'L'.
032168C*000603          88  TCB-2470-MOD2              VALUE 'M'.
032169C*000604          88  TCB-2740-MOD1              VALUE 'N'.
032170C*000605          88  TCB-ALIEN-X                VALUE 'X'.
032171C*000606          88  TCB-ALIEN-Y                VALUE 'Y'.
032172C*000607          88  TCB-ALIEN-Z                VALUE 'Z'.
032173C*000608*                                                       *
032174C*000610***** END OF P49000D ***************************************P49000D
     18

032176**015200 COPY C5E51601.                                                 LSE01520
032177C*                                                                      C5E00010
032178C*    *    DATA GROUP C5E51601              84 05 17  JL                C5E00020
032179C*    *    CONTAINS THE TERMINAL FORMAT OF THE CLOSE INQUIRY            C5E00030
032180C*    *    TRANSACTION (#230).                                          C5E00040
032181C*    *                                                                 C5E00050
032182C*        01  C5E51601.                                                 C5E00060
032183C*            05  C51601-ACTION                  PIC XX.                C5E00070
032184C*            05  C51601-RESULT                  PIC XX.                C5E00080
032185C*            05  C51601-TRAN-TRANSIT-LN-X.                             C5E00090
032186C*                10  C51601-TRAN-TRANSIT-LN     PIC 9(5).              C5E00100
032187C*            05  C51601-TRAN-FIELDS.                                   C5E00110
032188C*                10  C51601-BACKDATE-CODE       PIC X.                 C5E00120
032189C*                10  C51601-CLOSE-DATE-X.                              C5E00130
032190C*                    15  C51601-CLOSE-DATE      PIC 9(6).              C5E00140
032191C*                    15  FILLER REDEFINES C51601-CLOSE-DATE.           C5E00150
032192C*                        20  C51601-CLOSE-DATE-MM   PIC XX.            C5E00160
032193C*                        20  C51601-CLOSE-DATE-DD   PIC XX.            C5E00170
032194C*                        20  C51601-CLOSE-DATE-YY   PIC XX.            C5E00180
032195C*                10  C51601-ODOMETER-READING-X.                        C5E00190
032196C*                    15  C51601-ODOMETER-READING    PIC 9(6).          C5E00200
032197C*                10  FILLER                         PIC X(107).        C5E00210
     19

032199**015400 COPY C5E51609.                                                 LSE01540
032200C*    *                                                                 C5E00010
032201C*    *    C5E51609                             83 09 26                C5E00020
032202C*    *    CLOSE INQUIRY TRANSACTION (#230) WORK AREA                   C5E00030
032203C*    *    (NOTE: ALL FIELDS MUST BE INIT'ED TO SPACES OR               C5E00040
032204C*    *           ZEROES BY HOGAN)                                      C5E00050
032205C*    *                                                                 C5E00060
032206C*        01  C5E51609.                                                 C5E00070
032207C*    *                                                                 C5E00080
032208C*            05  C51609-ACTION                  PIC XX.                C5E00090
032209C*            05  C51609-RESULT                  PIC XX.                C5E00100
032210C*            05  C51609-HS-TIME-WORKAREA        PIC 9(7).              C5E00110
032211C*            05  FILLER REDEFINES C51609-HS-TIME-WORKAREA.             C5E00120
032212C*                10  FILLER                     PIC X.                 C5E00130
032213C*                10  C51609-HS-TIME-HH          PIC 99.                C5E00140
032214C*                10  C51609-HS-TIME-MM          PIC 99.                C5E00150
032215C*                10  C51609-HS-TIME-SS          PIC 99.                C5E00160
```

```
032216C*   *                                                              C5E00170
032217C*   *                                                              C5E00180
032218C*         05  C51609-DISPLAY-AREA.                                  C5E00190
032219C*             10  C51609-HS-BRANCH-PROC-DATE      PIC X(9).         C5E00200
032220C*             10  C51609-HS-SYSTEM-TIME.                            C5E00210
032221C*                 15  C51609-HS-SYS-TIME-DISP-HH  PIC 99.           C5E00220
032222C*                 15  C51609-HS-SYS-COLON1        PIC X.            C5E00230
032223C*                 15  C51609-HS-SYS-TIME-DISP-MM  PIC 99.           C5E00240
032224C*                 15  C51609-HS-SYS-COLON2        PIC X.            C5E00250
032225C*                 15  C51609-HS-SYS-TIME-DISP-SS  PIC 99.           C5E00260
032226C*             10  C51609-HS-ACCOUNT-LN-NO.                          C5E00270
032227C*                 15  C51609-HS-ACCT-NO           PIC 9(8).         C5E00280
032228C*                 15  C51609-HS-ACCT-LN-DASH      PIC X.            C5E00290
032229C*                 15  C51609-HS-LN-NO             PIC 999.          C5E00300
032230C*             10  C51609-HS-SHORTNAME             PIC X(15).        C5E00310
032231C*             10  C51609-HS-LN-OFFICER-NO         PIC 99.           C5E00320
032232C*             10  C51609-HS-LOAN-DESCRIPTION      PIC X(15).        C5E00330
032233C*             10  C51609-HS-LN-STAT-REST-IND.                       C5E00340
032234C*                 15  C51609-HS-LOAN-STATUS       PIC XX.           C5E00350
032235C*                 15  C51609-HS-RESTRAINED-IND    PIC XX.           C5E00360
032236C*             10  C51609-HS-LOAN-CURRENCY         PIC X.            C5E00370
032237C*             10  C51609-HS-OS-BAL            PIC S9(13)V99  COMP-3. C5E00380
032238C*             10  C51609-HS-INT-EARN          PIC S9(13)V99  COMP-3. C5E00390
032239C*             10  C51609-HS-INT-TO-DATE       PIC S9(13)V99  COMP-3. C5E00400
032240C*             10  C51609-HS-NET-CAP           PIC S9(13)V99  COMP-3. C5E00410
032241C*             10  C51609-HS-TERM-REMAIN           PIC 9(5).         C5E00420
032242C*             10  C51609-HS-TERM-REMAINING REDEFINES                C5E00430
032243C*                                             C51609-HS-TERM-REMAIN. C5E00440
032244C*                 15  C51609-HS-TERM-REMAIN-1     PIC X.            C5E00450
032245C*                 15  C51609-HS-TERM-REMAIN-2     PIC X.            C5E00460
032246C*                 15  C51609-HS-TERM-REMAIN-3     PIC X.            C5E00470
032247C*                 15  C51609-HS-TERM-REMAIN-4     PIC X.            C5E00480
032248C*                 15  C51609-HS-TERM-REMAIN-5     PIC X.            C5E00490
032249C*             10  C51609-HS-CLOSING-AMOUNT    PIC S9(13)V99  COMP-3. C5E00500
032250C*             10  C51609-HS-PER-DIEM-INT      PIC S9(13)V99  COMP-3. C5E00510
032251C*             10  C51609-HS-TRAN-EFF-DATE     PIC S9(7)      COMP-3. C5E00520
032252C*             10  C51609-HS-TRAN-BKD-CODE         PIC X.            C5E00530
  20

032253C*             10  C51609-HS-PYMT-DUE-DATE         PIC X(9).         C5E00540
032254C*             10  C51609-HS-EXCESS-KILO-CHARGE PIC S9(9)V99 COMP-3. C5E00550
032255C*                                                                  C5E00560
032256C*                                                                  C5E00570
032257C*   **NOTE : THE DOLLAR AMOUNT FIELDS SHOULD BE 0.00 IF THE AMOUNT  C5E00580
032258C*   *        IS ZERO OR IF THE FIELD HAS NOT BEEN ENTERED.          C5E00590
032259C*                                                                  C5E00600
  21

032261**015600 COPY C3J60110.                                              L5E01560
032262C*000100*                                                            C3J00010
032263C*000200*   THIS DATA GROUP IS USED TO PASS PARAMETERS TO THE        C3J00020
032264C*000300*   DAILY RULES INTERFACE ACTIVITY.                          C3J00030
032265C*000400*                                                            C3J00040
032266C*000500 01  C3J60110.                                               C3J00050
032267C*000600                                                             C3J00060
032268C*000700     05  C60110-ACTION             PIC XX.                   C3J00070
032269C*000800     05  C60110-RESULT             PIC XX.                   C3J00080
032270C*000900     05  C60110-DAILY-RULE-ID      PIC X(8).                 C3J00090
032271C*001000     05  C60110-USER-DATE          PIC S9(7)     COMP-3.     C3J00100
032272C*001100     05  C60110-DATA-GROUP-NO      PIC XX.                   C3J00110
032273C*001200     05  C60110-QUALIFIER          PIC X(11).                C3J00120
  22

032275**015800 COPY C9H61205.                                              L5E01580
032276C*   *                                                              C9H00010
032277C*   *    THIS DATA GROUP IS FOR EDIT ACCOUNT AND LOAN NUMBER       C9H00020
032278C*   *                                                              C9H00030
032279C*     01  C9H61205.                                                 C9H00040
032280C*         05  C61205-ACTION              PIC XX.                   C9H00050
032281C*         05  C61205-RESULT              PIC XX.                   C9H00060
032282C*   *INPUT                                                          C9H00070
032283C*         05  C61205-ACCT-NO-X.                                     C9H00080
032284C*             10  C61205-ACCT-NO         PIC 9(8).                 C9H00090
032285C*         05  C61205-LOAN-NO-X.                                     C9H00100
032286C*             10  C61205-LOAN-NO         PIC 999.                  C9H00110
032287C*         05  C61205-CORRECTION          PIC X.                    C9H00120
032288C*         05  C61205-REG-ACCT-MAND-IND   PIC X.                    C9H00130
032289C*         05  C61205-CORR-ACCT-MAND-IND  PIC X.                    C9H00140
032290C*         05  C61205-REG-LOAN-MAND-IND   PIC X.                    C9H00150
032291C*         05  C61205-CORR-LOAN-MAND-IND  PIC X.                    C9H00160
032292C*   * WORK AREA                                                     C9H00170
032293C*         05  C61205-ACCT-MAND-IND       PIC X.                    C9H00180
032294C*         05  C61205-LOAN-MAND-IND       PIC X.                    C9H00190
  23

032296**016000 COPY C9H61230.                                              L5E01600
032297C*   *                                                              
032298C*   *    DATA GROUP 61230        83 05 12                          
032299C*   *    I/O INTERFACES FOR EDITTING OF BACKDATE CODE              
032300C*   *                                                              
032301C*     01  C9H61230.                                                 
032302C*         05  C61230-ACTION              PIC XX.                   
032303C*         05  C61230-RESULT              PIC XX.                   
032304C*   * INPUT                                                         
032305C*         05  C61230-INPUT-FIELD-AREA-X.                            
032306C*             10  C61230-BACKDATE-CODE   PIC X.                    
032307C*         05  C61230-CORRECTION          PIC X.                    
032308C*         05  C61230-REG-COMMON-AREA.                               
032309C*             10  C61230-REG-MAND-IND    PIC X.                    
```

```
032310C*           05  C61230-CORR-COMMON-AREA.
032311C*               10  C61230-CORR-MAND-IND          PIC X.
032312C*           05  C61230-FIELD-NO                   PIC S999    COMP-3.
032313C*       *   OUTPUT
032314C*           05  C61230-OUTPUT-FIELD-AREA-X.
032315C*               10  C61230-OUT-BACKDATE-CODE      PIC X.
032316C*       *   WORK AREA
032317C*           05  C61230-COMMON-AREA.
032318C*               10  C61230-MAND-IND               PIC X.
032319C*           05  FILLER                            PIC X(20).
    24

032321**016200 COPY C3J61232.                                           L5E01620
032322C*       *                                                        C3J00010
032323C*       *   DATA GROUP 61232                                     C3J00020
032324C*       *   I/O INTERFACES FOR EDITTING OF DATE                  C3J00030
032325C*       *                                                        C3J00040
032326C*       *   IUPUT OF  02(FEB) 31/04(APR) 31/... IS VALID WHEN    C3J00050
032327C*       *   SPEC-EDIT-IND IS "Y    YES"  (OTHERWISE SET TO "N    NO")  C3J00060
032328C*       *                                                        C3J00070
032329C*       01  C3J61232.                                            C3J00080
032330C*           05  C61232-ACTION                    PIC XX.         C3J00090
032331C*           05  C61232-RESULT                    PIC XX.         C3J00100
032332C*       *   INPUT                                                C3J00110
032333C*           05  C61232-INPUT-DATE-X.                             C3J00120
032334C*               10  C61232-IN-CENTURY            PIC X.          C3J00130
032335C*               10  C61232-INPUT-DATE.                           C3J00140
032336C*                   15  C61232-IN-YEAR           PIC XX.         C3J00150
032337C*                   15  C61232-IN-MONTH          PIC XX.         C3J00160
032338C*                   15  C61232-IN-DAY            PIC XX.         C3J00170
032339C*           05  C61232-SPEC-EDIT-IND             PIC X.          C3J00180
032340C*           05  C61232-CORRECTION                PIC X.          C3J00190
032341C*           05  C61232-REG-MAND-IND              PIC X.          C3J00200
032342C*           05  C61232-CORR-MAND-IND             PIC X.          C3J00210
032343C*           05  C61232-FIELD-NO                  PIC S999  COMP-3.  C3J00220
032344C*       *   OUTPUT                                               C3J00230
032345C*           05  C61232-OUT-DATE.                                 C3J00240
032346C*               10  C61232-CENT-YEAR.                            C3J00250
032347C*                   15  C61232-OUT-CENTURY       PIC X.          C3J00260
032348C*                   15  C61232-OUT-YEAR          PIC XX.         C3J00270
032349C*               10  C61232-OUT-MONTH             PIC XX.         C3J00280
032350C*               10  C61232-OUT-DAY               PIC XX.         C3J00290
032351C*           05  C61232-OUT-DATE-NUM REDEFINES C61232-OUT-DATE PIC 9(7).  C3J00300
032352C*       *   WORK AREA                                            C3J00310
032353C*           05  C61232-WS-MAND-IND               PIC X.          C3J00320
032354C*           05  C61232-FILLER                    PIC X(50).      C3J00330
    25

032356**016400 COPY C9H61441.                                           L5E01640
032357C*001000*                                                         C9H00010
032358C*002000*      DATA GROUP 61441             83 09 07  JL           C9H00020
032359C*003000*      I/O INTERFACES FOR VALIDATE TRAN. EFFECTIVE DATE    C9H00030
032360C*004000*                                                         C9H00040
032361C* 04000*      NOTE: CALLING MODULES MUST ENSURE THE DATES ARE    C9H00050
032362C* 04000*            EITHER HIGH VALUES OR NUMERIC                C9H00060
032363C* 04000*                                                         C9H00070
032364C*005000 01 C9H61441.                                             C9H00080
032365C*006000*                                                         C9H00090
032366C*007000        05  C61441-ACTION                PIC XX.          C9H00100
032367C*008000        05  C61441-RESULT                PIC XX.          C9H00110
032368C*009000* INPUT                                                   C9H00120
032369C*010000        05  C61441-IN-TRAN-EFF-DATE-X.                    C9H00130
032370C*011000            10  C61441-IN-TRAN-EFF-DATE   PIC S9(7) COMP-3.  C9H00140
032371C*012000        05  C61441-IN-REV-TRAN-BUS-DATE-X.                C9H00150
032372C*013000            10  C61441-IN-REV-TRAN-BUS-DATE PIC S9(7) COMP-3.  C9H00160
032373C*014000        05  C61441-IN-ISSUE-DATE         PIC S9(7) COMP-3.  C9H00170
032374C*015000* OUTPUT/UPDATE                                           C9H00180
032375C*016000*      NONE                                               C9H00190
032376C*017000* WORK AREA                                               C9H00200
032377C*018000        05  C61441-WS-DATE               PIC S9(7) COMP-3.  C9H00210
032378C*              05  FILLER                       PIC X(20).       C9H00220
    26

032380**016600 COPY C3J62008.                                           L5E01660
032381C*000010*      Data group 62008                                   C3J00010
032382C*000020*      convert calendar date to output format.            C3J00020
032383C*000030                                                          C3J00030
032384C*000040 01 C3J62008.                                             C3J00040
032385C*000050                                                          C3J00050
032386C*000060       05  C62008-ACTION                 PIC XX.          C3J00060
032387C*000070       05  C62008-RESULT                 PIC XX.          C3J00070
032388C*000100                                                          C3J00080
032389C*000110* INPUT:                                                  C3J00090
032390C*000120                                                          C3J00100
032391C*000120       05  C62008-CALENDAR-DATE          PIC S9(7) COMP-3.  C3J00110
032392C*000200                                                          C3J00120
032393C*000210* OUTPUT:                                                 C3J00130
032394C*000220                                                          C3J00140
032395C*000230       05  C62008-DATE-DISPLAY-FORMAT    PIC X(9).        C3J00150
    27

032397**016800 COPY C3J62010.                                           L5E01680
032398C*000010*      Data group 62010                                   C3J00010
032399C*000020*      find the number of full periods between two given dates.  C3J00020
032400C*000030                                                          C3J00030
032401C*000040 01 C3J62010.                                             C3J00040
032402C*000050                                                          C3J00050
032403C*000060       05  C62010-ACTION                 PIC XX.          C3J00060
032404C*000070       05  C62010-RESULT                 PIC XX.          C3J00070
```

```
032405C*000080                                                        C3J00080
032406C*000100* INPUT:                                                C3J00090
032407C*000110                                                        C3J00100
032408C*000120      05  C62010-FREQUENCY         PIC 99.               C3J00110
032409C*000120      05  C62010-START-DATE        PIC S9(7) COMP-3.     C3J00120
032410C*000120      05  C62010-END-DATE          PIC S9(7) COMP-3.     C3J00130
032411C*000130                                                        C3J00140
032412C*000200* OUTPUT:                                               C3J00150
032413C*000210                                                        C3J00160
032414C*000220      05  C62010-NO-OF-PERIOD      PIC S9(4) COMP.       C3J00170
     28

032416**017000 COPY C3J62011.                                         L5E01700
032417C*000010*       Data group 62011                                C3J00010
032418C*000020*       find end date by giving the start date and the number  C3J00020
032419C*000020*       of periods.                                     C3J00030
032420C*000030                                                        C3J00040
032421C*000040  01  C3J62011.                                         C3J00050
032422C*000050                                                        C3J00060
032423C*000060      05  C62011-ACTION            PIC XX.               C3J00070
032424C*000070      05  C62011-RESULT            PIC XX.               C3J00080
032425C*000080                                                        C3J00090
032426C*000100* INPUT:                                                C3J00100
032427C*000110                                                        C3J00110
032428C*000120      05  C62011-FREQUENCY         PIC XX.               C3J00120
032429C*000120      05  C62011-START-DATE        PIC S9(7) COMP-3.     C3J00130
032430C*000130      05  C62011-NO-OF-PERIOD      PIC S9(4) COMP.       C3J00140
032431C*000200                                                        C3J00150
032432C*000210* OUTPUT:                                               C3J00160
032433C*000220                                                        C3J00170
032434C*000230      05  C62011-END-DATE          PIC S9(7) COMP-3.     C3J00180
     29

032436**017200 COPY C3J62080.                                         L5E01720
032437C*                                                              C3J00010
032438C*     *      DATA GROUP 62080              83/09/15             C3J00020
032439C*     *      STORE TRANSACTION BUSINESS DAY DATE AND            C3J00030
032440C*     *      THE COMMON PROCESSING DAILY RULE FOR THE BRANCH OF C3J00040
032441C*     *      ACCOUNT (TRANSIT-LN)                               C3J00050
032442C*     *                                                        C3J00060
032443C*       01  C3J62080.                                          C3J00070
032444C*           05  C62080-ACTION             PIC XX.               C3J00080
032445C*           05  C62080-RESULT             PIC XX.               C3J00090
032446C*     * INPUT                                                   C3J00100
032447C*           05  C62080-APPL-CODE          PIC X(2).             C3J00110
032448C*           05  C62080-TRANSIT            PIC 9(5).             C3J00120
032449C*           05  C62080-FILLER             PIC X(8).             C3J00130
032450C*           05  C62080-TRAN-ENTRY-TIMESTAMP.                    C3J00140
032451C*               10  C62080-TRAN-ENTRY-DATE  PIC S9(7) COMP-3. C3J00150
032452C*               10  C62080-TRAN-ENTRY-TIME  PIC S9(7) COMP-3. C3J00160
032453C*     *     MEMO-INJ-IND                 (FROM C3J65252)        C3J00170
032454C*     *     SOURCE-TYPE                  (FROM TCB)             C3J00180
032455C*                                                              C3J00190
032456C*     * OUTPUT/UPDATE                                           C3J00200
032457C*                                                              C3J00210
032458C*           05  C62080-TRAN-BUS-DAY       PIC S9(7) COMP-3.     C3J00220
032459C*           05  C62080-BR-BUS-DAY-CURR    PIC S9(7) COMP-3.     C3J00230
032460C*           05  C62080-BR-BUS-DAY-NEXT    PIC S9(7) COMP-3.     C3J00240
032461C*           05  C62080-BR-BUS-DAY-BACK    PIC S9(7) COMP-3.     C3J00250
032462C*           05  C62080-TRAN-PROC-MODE     PIC X.                C3J00260
032463C*     *                                                        C3J00270
032464C*     * COMMON BRANCH VARIABLES (BV01)                          C3J00280
032465C*     *                                                        C3J00290
032466C*           05  C62080-BV01.                                    C3J00300
032467C*               10  C62080-BV01-BR-DATE-POINTERS.                C3J00310
032468C*                   15  C62080-BV01-BR-DATE-POINTER  OCCURS 10 TIMES   C3J00320
032469C*                                            PIC S9(3) COMP-3.  C3J00330
032470C*               10  FILLER REDEFINES C62080-BV01-BR-DATE-POINTERS.  C3J00340
032471C*                   15  C62080-BV01-BR-DATE-POINTER-9H PIC S9(3) COMP-3. C3J00350
032472C*                   15  C62080-BV01-BR-DATE-POINTER-5E PIC S9(3) COMP-3. C3J00360
032473C*                   15  C62080-BV01-BR-DATE-POINTER-3J PIC S9(3) COMP-3. C3J00370
032474C*                   15  C62080-BV01-BR-DATE-POINTER-04 PIC S9(3) COMP-3. C3J00380
032475C*                   15  C62080-BV01-BR-DATE-POINTER-05 PIC S9(3) COMP-3. C3J00390
032476C*                   15  C62080-BV01-BR-DATE-POINTER-06 PIC S9(3) COMP-3. C3J00400
032477C*                   15  C62080-BV01-BR-DATE-POINTER-07 PIC S9(3) COMP-3. C3J00410
032478C*                   15  C62080-BV01-BR-DATE-POINTER-08 PIC S9(3) COMP-3. C3J00420
032479C*                   15  C62080-BV01-BR-DATE-POINTER-09 PIC S9(3) COMP-3. C3J00430
032480C*                   15  C62080-BV01-BR-DATE-POINTER-10 PIC S9(3) COMP-3. C3J00440
032481C*               10  C62080-BV01-BR-TIME-ZONE   PIC 9(2).        C3J00450
032482C*               10  C62080-BV01-BR-LANG-CODE   PIC 9.           C3J00460
032483C*               10  C62080-BV01-BR-COMB-1.                     C3J00470
032484C*                   15  C62080-BV01-BR-COMB-2.                 C3J00480
032485C*                       20  C62080-BV01-BR-DISTRICT  PIC 9(2). C3J00490
032486C*                       20  C62080-BV01-BR-AREA      PIC 9(2). C3J00500
032487C*                   15  C62080-BV01-BR-REGION        PIC 9(2). C3J00510
032488C*               10  C62080-BV01-BR-CPC              PIC 9(5).  C3J00520
032489C*               10  C62080-BV01-BR-RESIDENCE-CODE   PIC 9(4).  C3J00530
     30

032490C*           10  C62080-BV01-BR-PROC-STATUS     PIC X.          C3J00540
032491C*           10  C62080-BV01-BR-ONLINE-CPC      PIC X.          C3J00550
032492C*           10  C62080-BV01-BR-PARENT-TRANSIT  PIC 9(5).       C3J00560
032493C*           10  C62080-BV01-BR-DEL-ADV-TABLE.                  C3J00570
032494C*               15  C62080-BV01-BR-DEL-ADV-CODE  PIC 9 OCCURS 3 TIMES. C3J00580
032495C*           10  C62080-BV01-BR-ICA-FED-CONS    PIC 9(7).       C3J00590
032496C*           10  C62080-BV01-BR-ICA-FED-COMM    PIC 9(7).       C3J00600
032497C*           10  C62080-BV01-BR-ICA-PROV-CONS   PIC 9(7).       C3J00610
032498C*           10  C62080-BV01-BR-ICA-PROV-COMM   PIC 9(7).       C3J00620
032499C*           10  C62080-BV01-BR-INT-BASE-DAY    PIC 99.         C3J00630
032500C*           10  C62080-BV01-BR-TRNASIT-TYPE    PIC X.          C3J00640
032501C*           10  FILLER                         PIC X(221).     C3J00650
```

```
032502C*    *                                                        C3J00660
032503C*    *       ICA = INT-CHG-ACCT                               C3J00670
032504C*    *                                                        C3J00680
032505C*    * WORK FIELDS:                                           C3J00690
032506C*    *                                                        C3J00700
032507C*         05  C62080-DATE-POINTER-X.                          C3J00710
032508C*             10  C62080-DATE-POINTER      PIC 999.           C3J00720
032509C*         05  FILLER                       PIC X(20).         C3J00730
     31

032511**017400 COPY C9H62081.                                        L5E01740
032512C*    *                                                        C9H00010
032513C*    *       DATA GROUP 62081          83/09/15                C9H00020
032514C*    *       STORE TRANSACTION BUSINESS DAY DATE AND           C9H00030
032515C*    *       THE COMMON PROCESSING DAILY RULE FOR THE BRANCH OF C9H00040
032516C*    *       SOURCE (TRANSIT-SRC)                              C9H00050
032517C*    *                                                         C9H00060
032518C*       01  C9H62081.                                          C9H00070
032519C*           05  C62081-ACTION               PIC XX.            C9H00080
032520C*           05  C62081-RESULT               PIC XX.            C9H00090
032521C*    * INPUT                                                   C9H00100
032522C*           05  C62081-APPL-CODE            PIC X(2).          C9H00110
032523C*           05  C62081-TRANSIT              PIC 9(5).          C9H00120
032524C*           05  C62081-FILLER               PIC X(8).          C9H00130
032525C*           05  C62081-TRAN-ENTRY-TIMESTAMP.                   C9H00140
032526C*               10  C62081-TRAN-ENTRY-DATE  PIC S9(7) COMP-3.  C9H00150
032527C*               10  C62081-TRAN-ENTRY-TIME  PIC S9(7) COMP-3.  C9H00160
032528C*    *      MEMO-INJ-IND                (FROM C9H65252)        C9H00170
032529C*    *      SOURCE-TYPE                 (FROM TCB)             C9H00180
032530C*    *                                                         C9H00190
032531C*    * OUTPUT/UPDATE                                           C9H00200
032532C*    *                                                         C9H00210
032533C*           05  C62081-TRAN-BUS-DAY         PIC S9(7) COMP-3.  C9H00220
032534C*           05  C62081-BR-BUS-DAY-CURR      PIC S9(7) COMP-3.  C9H00230
032535C*           05  C62081-BR-BUS-DAY-NEXT      PIC S9(7) COMP-3.  C9H00240
032536C*           05  C62081-BR-BUS-DAY-BACK      PIC S9(7) COMP-3.  C9H00250
032537C*           05  C62081-TRAN-PROC-MODE       PIC X.             C9H00260
032538C*    *                                                         C9H00270
032539C*    * COMMON BRANCH VARIABLES (BV01)                          C9H00280
032540C*    *                                                         C9H00290
032541C*           05  C62081-BV01.                                   C9H00300
032542C*               10  C62081-BV01-BR-DATE-POINTERS.              C9H00310
032543C*                   15  C62081-BV01-BR-DATE-POINTER  OCCURS 10 TIMES C9H00320
032544C*                                               PIC S9(3) COMP-3. C9H00330
032545C*               10  FILLER REDEFINES C62081-BV01-BR-DATE-POINTERS. C9H00340
032546C*                   15  C62081-BV01-BR-DATE-POINTER-9H PIC S9(3) COMP-3. C9H00350
032547C*                   15  C62081-BV01-BR-DATE-POINTER-5E PIC S9(3) COMP-3. C9H00360
032548C*                   15  C62081-BV01-BR-DATE-POINTER-3J PIC S9(3) COMP-3. C9H00370
032549C*                   15  C62081-BV01-BR-DATE-POINTER-04 PIC S9(3) COMP-3. C9H00380
032550C*                   15  C62081-BV01-BR-DATE-POINTER-05 PIC S9(3) COMP-3. C9H00390
032551C*                   15  C62081-BV01-BR-DATE-POINTER-06 PIC S9(3) COMP-3. C9H00400
032552C*                   15  C62081-BV01-BR-DATE-POINTER-07 PIC S9(3) COMP-3. C9H00410
032553C*                   15  C62081-BV01-BR-DATE-POINTER-08 PIC S9(3) COMP-3. C9H00420
032554C*                   15  C62081-BV01-BR-DATE-POINTER-09 PIC S9(3) COMP-3. C9H00430
032555C*                   15  C62081-BV01-BR-DATE-POINTER-10 PIC S9(3) COMP-3. C9H00440
032556C*               10  C62081-BV01-BR-TIME-ZONE     PIC 9(2).     C9H00450
032557C*               10  C62081-BV01-BR-LANG-CODE     PIC 9.        C9H00460
032558C*               10  C62081-BV01-BR-COMB-1.                     C9H00470
032559C*                   15  C62081-BV01-BR-COMB-2.                 C9H00480
032560C*                       20  C62081-BV01-BR-DISTRICT  PIC 9(2). C9H00490
032561C*                       20  C62081-BV01-BR-AREA      PIC 9(2). C9H00500
032562C*                   15  C62081-BV01-BR-REGION        PIC 9(2). C9H00510
032563C*               10  C62081-BV01-BR-CPC               PIC 9(5). C9H00520
032564C*               10  C62081-BV01-BR-RESIDENCE-CODE    PIC 9(4). C9H00530
     32

032565C*               10  C62081-BV01-BR-PROC-STATUS      PIC X.     C9H00540
032566C*               10  C62081-BV01-BR-ONLINE-CPC       PIC X.     C9H00550
032567C*               10  C62081-BV01-BR-PARENT-TRANSIT   PIC 9(5).  C9H00560
032568C*               10  C62081-BV01-BR-DEL-ADV-TABLE.              C9H00570
032569C*                   15  C62081-BV01-BR-DEL-ADV-CODE  PIC 9 OCCURS 3 TIMES. C9H00580
032570C*               10  C62081-BV01-BR-ICA-FED-CONS     PIC 9(7).  C9H00590
032571C*               10  C62081-BV01-BR-ICA-FED-COMM     PIC 9(7).  C9H00600
032572C*               10  C62081-BV01-BR-ICA-PROV-CONS    PIC 9(7).  C9H00610
032573C*               10  C62081-BV01-BR-ICA-PROV-COMM    PIC 9(7).  C9H00620
032574C*               10  C62081-BV01-BR-INT-BASE-DAY     PIC 99.    C9H00630
032575C*               10  C62081-BV01-BR-TRANSIT-TYPE     PIC X.     C9H00640
032576C*               10  FILLER                          PIC X(221). C9H00650
032577C*    *                                                         C9H00660
032578C*    *       ICA = INT-CHG-ACCT                                C9H00670
032579C*    *                                                         C9H00680
032580C*    * WORK FIELDS:                                            C9H00690
032581C*    *                                                         C9H00700
032582C*         05  C62081-DATE-POINTER-X.                           C9H00710
032583C*             10  C62081-DATE-POINTER       PIC 999.           C9H00720
032584C*         05  FILLER                        PIC X(20).         C9H00730
     33

032586**017600 COPY C9H62301.                                        L5E01760
032587C*    *       DATA GROUP  62301                                 C9H00010
032588C*    *       DATA GROUP USED TO CALCULATE TOTAL INTEREST DUE   C9H00020
032589C*    *                                                         C9H00030
032590C*       01  C9H62301.                                          C9H00040
032591C*    *                                                         C9H00050
032592C*           05  C62301-ACTION               PIC XX.            C9H00060
032593C*           05  C62301-RESULT               PIC XX.            C9H00070
032594C*    *** INPUT                                                 C9H00080
032595C*           05  C62301-PARAMETER-INFO.                         C9H00090
032596C*               10  C62301-PERIOD-INFO.                        C9H00100
032597C*                   15  C62301-START-DATE   PIC S9(7)  COMP-3. C9H00110
032598C*                   15  C62301-END-DATE     PIC S9(7)  COMP-3. C9H00120
```

```
032599C*            10 C62301-TRAN-BUS-DAY              PIC S9(7)       COMP-3.C9H00130
032600C*            10 C62301-BASE-RATE-AT-START-IND    PIC X.                  C9H00140
032601C*               88 C62301-USE-ALL-BASE-RATES     VALUE ' '.              C9H00150
032602C*               88 C62301-USE-BASE-RATE-AT-START VALUE '1'.              C9H00160
032603C*            10 C62301-LN-INFO.                                          C9H00170
032604C*               15 C62301-OS-BAL                 PIC S9(13)V99  COMP-3.C9H00180
032605C*            10 C62301-RATE-SPREAD-TABLE.                                C9H00190
032606C*               15 C62301-RATE-SPREAD-ENTRY  OCCURS 9 TIMES.             C9H00200
032607C*                  20 C62301-RATE-EFF-DATE-B     PIC S9(8)      COMP.    C9H00210
032608C*                  20 C62301-INT-RULE            PIC 9(2).               C9H00220
032609C*                  20 C62301-INT-RATE-MULT       PIC S9V9(6)    COMP-3.C9H00230
032610C*                  20 C62301-INT-RATE-ADDN       PIC S9V9(8)    COMP-3.C9H00240
032611C*                  20 C62301-MR-AMT-X.                                   C9H00250
032612C*                     25 C62301-MR-AMT           PIC S9(13)V99  COMP-3.C9H00260
032613C*         *** OUTPUT                                                     C9H00270
032614C*            05 C62301-INT-RESULT                PIC S9(11)V9(7) COMP-3.C9H00280
032615C*         *** WORK AREA                                                  C9H00290
032616C*            05 C62301-WK-INDEX                  PIC S9(4)      COMP.    C9H00300
032617C*            05 C62301-WK-START-DATE-B           PIC S9(8)      COMP.    C9H00310
032618C*            05 C62301-WK-END-DATE-B             PIC S9(8)      COMP.    C9H00320
032619C*            05 C62301-WK-OS-BAL                 PIC S9(13)V99  COMP-3.C9H00330
032620C*            05 C62301-FILLER                    PIC X(50).              C9H00340
     34

032622**017800 COPY C9H62302.                                                   LSE01780
032623C*    *       DATA GROUP   62302                                          C9H00010
032624C*    *       DATA GROUP USED TO BUILD RATE SPREAD TABLE                  C9H00020
032625C*    *                                                                   C9H00030
032626C*      01 C9H62302.                                                      C9H00040
032627C*    *                                                                   C9H00050
032628C*            05 C62302-ACTION                    PIC XX.                 C9H00060
032629C*            05 C62302-RESULT                    PIC XX.                 C9H00070
032630C*         *** INPUT                                                      C9H00080
032631C*            05 C62302-PARAMETER-INFO.                                   C9H00090
032632C*               10 C62302-UPD-INQ-IND            PIC X.                  C9H00100
032633C*                  88 C62302-UPDATE              VALUE 'U'.              C9H00110
032634C*                  88 C62302-INQUIRY             VALUE 'I'.              C9H00120
032635C*               10 C62302-END-DATE               PIC S9(7)      COMP-3.C9H00130
032636C*    *                                                                   C9H00140
032637C*    *         RMO AND MMO DATA GROUPS                                   C9H00150
032638C*    *                                                                   C9H00160
032639C*         *** OUTPUT                                                     C9H00170
032640C*            05 C62302-REAL-RATE-SPREAD-TABLE.                           C9H00180
032641C*               10 C62302-REAL-RATE-ENTRY  OCCURS 9 TIMES.               C9H00190
032642C*                  15 C62302-REAL-RATE-EFF-DATE-B PIC S9(8)    COMP. C9H00200
032643C*                  15 C62302-REAL-INT-RULE       PIC 9(2).               C9H00210
032644C*                  15 C62302-REAL-INT-RATE-MULT  PIC S9V9(6)   COMP-3.C9H00220
032645C*                  15 C62302-REAL-INT-RATE-ADDN  PIC S9V9(8)   COMP-3.C9H00230
032646C*                  15 C62302-REAL-MR-AMT         PIC S9(13)V99 COMP-3.C9H00240
032647C*            05 C62302-MEMO-RATE-SPREAD-TABLE.                           C9H00250
032648C*               10 C62302-MEMO-RATE-ENTRY  OCCURS 9 TIMES.               C9H00260
032649C*                  15 C62302-MEMO-RATE-EFF-DATE-B PIC S9(8)    COMP. C9H00270
032650C*                  15 C62302-MEMO-INT-RULE       PIC 9(2).               C9H00280
032651C*                  15 C62302-MEMO-INT-RATE-MULT  PIC S9V9(6)   COMP-3.C9H00290
032652C*                  15 C62302-MEMO-INT-RATE-ADDN  PIC S9V9(8)   COMP-3.C9H00300
032653C*                  15 C62302-MEMO-MR-AMT         PIC S9(13)V99 COMP-3.C9H00310
032654C*         *** WORK AREA                                                  C9H00320
032655C*            05 C62302-WK-INDEX                  PIC S9(4)     COMP.    C9H00330
032656C*            05 C62302-WK-DATE-C                 PIC S9(7)     COMP-3.C9H00340
032657C*            05 C62302-FILLER                    PIC X(50).              C9H00350
     35

032659**018000 COPY C9H62307.                                                   LSE01800
032660C*    *       DATA GROUP   62307                                          C9H00010
032661C*    *       DATA GROUP USED TO ROUND OFF INTEREST RESULTS               C9H00020
032662C*    *                                                                   C9H00030
032663C*      01 C9H62307.                                                      C9H00040
032664C*    *                                                                   C9H00050
032665C*            05 C62307-ACTION                    PIC XX.                 C9H00060
032666C*            05 C62307-RESULT                    PIC XX.                 C9H00070
032667C*         *** INPUT                                                      C9H00080
032668C*            05 C62307-IN-INT-RESULT             PIC S9(11)V9(7) COMP-3.C9H00090
032669C*         *** OUTPUT                                                     C9H00100
032670C*            05 C62307-OUT-INT-RESULT            PIC S9(11)V99  COMP-3.C9H00110
     36

032672**018200 COPY C9H64000.                                                   LSE01820
032673C*001000*                                                                 C9H00010
032674C*002000*           D A T A   G R O U P   64000                           C9H00020
032675C*003000*                                                                 C9H00030
032676C*004000* 3600 DISPLAY OUTPUT INTERFACE PARAMETERS.                       C9H00040
032677C*005000*                                         REVISION: JAN 25 84     C9H00050
032678C*006000*                                                                 C9H00060
032679C*007000 01 C9H64000.                                                     C9H00070
032680C*008000                                                                  C9H00080
032681C*009000     05 C64000-ACTION                     PIC XX.                 C9H00090
032682C*010000     05 C64000-RESULT                     PIC XX.                 C9H00100
032683C*011000*                                                                 C9H00110
032684C*012000* I N P U T                                                       C9H00120
032685C*013000*                                                                 C9H00130
032686C*014000     05 C64000-DISPLAY-ACTIVITY-E         PIC XX.                 C9H00140
032687C*015000     05 C64000-DISPLAY-ACTIVITY-F         PIC XX.                 C9H00150
032688C*016000     05 C64000-LANGUAGE-CODE              PIC X.                  C9H00160
032689C*017000     05 C64000-PRINT-LN-MESS-IND          PIC X.                  C9H00170
032690C*018000     05 C64000-PRINT-BRCH-MESS-IND        PIC X.                  C9H00180
032691C*019000     05 C64000-CALL-TYPE-IND              PIC X.                  C9H00190
032692C*020000*                                                                 C9H00200
032693C*021000* WORK-AREA                                                       C9H00210
032694C*022000*                                                                 C9H00220
032695C*023000     05 C64000-FILLER                     PIC X(120).             C9H00230
```

```
032697**018400 COPY C9H64232.                                              L5E01840
032698C*    *                                                              C9H00010
032699C*    *      DATA GROUP 64232                    83 02 21            C9H00020
032700C*    *      I/O INTERFACE FOR WRITING TRANSACTION LOG RECORD (REAL/MEMO) C9H00030
032701C*    *      (THE BMP COUNT KEY IS USED ONLY WHEN THE CALLING PROGRAM IS  C9H00040
032702C*    *       BMP)                                                   C9H00050
032703C*    *                                                              C9H00060
032704C*    01  C9H64232.                                                  C9H00070
032705C*    *                                                              C9H00080
032706C*        05  C64232-ACTION              PIC XX.                     C9H00090
032707C*        05  C64232-RESULT              PIC XX.                     C9H00100
032708C*    *  INPUT                                                       C9H00110
032709C*        05  C64232-BMP-COUNT-KEY       PIC 9.                      C9H00120
032710C*        05  C64232-TRAN-TYPE           PIC X.                      C9H00130
032711C*            88  C64232-TRAN-TYPE-INQ            VALUE 'I'.         C9H00140
032712C*            88  C64232-TRAN-TYPE-UPD            VALUE 'U'.         C9H00150
032713C*            88  C64232-TRAN-TYPE-PROP           VALUE 'P'.         C9H00160
032714C*            88  C64232-TRAN-TYPE-RPT            VALUE 'R'.         C9H00170
032715C*        05  C64232-LOG-IND             PIC X.                      C9H00180
032716C*            88  C64232-LOG-IND-MANDATORY        VALUE 'M'.         C9H00190
032717C*            88  C64232-LOG-IND-OPTIONAL         VALUE 'O'.         C9H00200
032718C*        05  C64232-FILL-COMMON-IND     PIC X.                      C9H00210
032719C*            88  C64232-FILL-COMMON-YES          VALUE 'Y'.         C9H00220
032720C*            88  C64232-FILL-COMMON-NO           VALUE 'N'.         C9H00230
032721C*    *  OUTPUT                                                      C9H00240
032722C*    *     NONE                                                     C9H00250
032723C*    *  WORK AREA                                                   C9H00260
032724C*        05  C64232-ONLINE-KEY.                                     C9H00270
032725C*            10  C64232-ONLINE-KEY1     PIC X(6).                   C9H00280
032726C*            10  C64232-ONLINE-KEY2     PIC 99.                     C9H00290
032727C*    *                                                              C9H00300
032728C*        05  C64232-BMP-KEY.                                        C9H00310
032729C*            10  C64232-BMP-KEY1        PIC X(5).                   C9H00320
032730C*            10  C64232-BMP-KEY2        PIC 99.                     C9H00330
032731C*            10  C64232-BMP-KEY3        PIC 9.                      C9H00340
032732C*    *                                                              C9H00350
032733C*        05  C64232-HS-PROC-MODE        PIC X.                      C9H00360
032734C*    *                                                              C9H00370
032735C*        05  C64232-FILLER              PIC X(14).                  C9H00380

032737**018600 COPY C3J65000.                                              L5E01860
032738C*    *                                                              00001000
032739C*    *       D A T A   G R O U P   65000                            00002000
032740C*    *                                                              00003000
032741C*    *  THIS DATA GROUP CONTAINS ABEND MODULE INTERFACE PARAMETERS. 00004000
032742C*    *     TOTAL 66 BYTES.                                          00005000
032743C*    *                                                              00006000
032744C*    01  C3J65000.                                                  00007000
032745C*    *                                                              00008000
032746C*        05  C65000-ACTION              PIC XX.                     00009000
032747C*        05  C65000-RESULT              PIC XX.                     00010000
032748C*        05  C65000-DUMP-IND            PIC X.                      00011000
032749C*            88  C65000-DUMP                     VALUE 'Y'.         00012000
032750C*            88  C65000-NO-DUMP                  VALUE 'N'.         00013000
032751C*        05  C65000-APPLICATION-CODE    PIC XX.                     00014000
032752C*        05  C65000-CALLING-ACTIVITY    PIC XX.                     00015000
032753C*        05  C65000-ABEND-MESSAGE       PIC X(50).                  00016000
032754C*        05  C65000-USER-ABEND-CODE     PIC XXX.                    00017000
032755C*        05  C65000-LANGUAGE-CODE       PIC X.                      00018000
032756C*        05  FILLER                     PIC X.                      00019000
032757C*        05  C65000-TCB-RESULT          PIC XX.                     00020000

032759**018800 COPY C3J65003.                                              L5E01880
032760C*    *       Data group 65003                                       C3J00010
032761C*    *       record error codes and messages.                       C3J00020
032762C*    *                                   REVISION: MAY 17 83        C3J00030
032763C*    *                                                              C3J00040
032764C*    01  C3J65003.                                                  C3J00050
032765C*    *                                                              C3J00060
032766C*        05  C65003-ACTION              PIC XX.                     C3J00070
032767C*        05  C65003-RESULT              PIC XX.                     C3J00080
032768C*    *                                                              C3J00090
032769C*   *INPUT:                                                         C3J00100
032770C*    *                                                              C3J00110
032771C*        05  C65003-INPUT-ERROR-X.                                  C3J00120
032772C*            10  C65003-INPUT-ERROR     PIC 999.                    C3J00130
032773C*        05  C65003-TXN-BUSINESS-DATE   PIC S9(7) COMP-3.           C3J00140
032774C*        05  C65003-APPLICATION-CODE    PIC XX.                     C3J00150
032775C*        05  C65003-LANGUAGE-CODE-X.                                C3J00160
032776C*            10  C65003-LANGUAGE-CODE   PIC 9.                      C3J00170
032777C*    *                                                              C3J00180
032778C*   *OUTPUT/UPDATE:                                                 C3J00190
032779C*    *                                                              C3J00200
032780C*        05  C65003-ERROR-COUNT         PIC S999 COMP-3.            C3J00210
032781C*        05  C65003-ERROR-CODE          PIC S999 COMP-3 OCCURS 10.  C3J00220
032782C*        05  C65003-ERROR-MESSAGE       PIC X(40)       OCCURS 10.  C3J00230
032783C*    *                                                              C3J00240
032784C*   **WORK-AREA                                                     C3J00250
032785C*    *                                                              C3J00260
032786C*        05  C65003-WORK-AREA           PIC X(50).                  C3J00270
032787C*    *                                                              C3J00280
032788C*   *ADDITIONAL INPUT                                               C3J00290
032789C*    *                                                              C3J00300
032790C*        05  C65003-ERROR-MESS          PIC X(40).                  C3J00310
032791C*        05  C65003-ERROR-VAR-1         PIC X(20).                  C3J00320
032792C*        05  C65003-ERROR-VAR-2         PIC X(20).                  C3J00330
032793C*        05  C65003-ERROR-VAR-3         PIC X(20).                  C3J00340
```

```
032795**019000 COPY C3J65110.                                      L5E01900
032796C*    *   DATA GROUP 65110 * * * * * * * * * * * * * * * * * *C3J00010
032797C*    *                                                      C3J00020
032798C*    *   FOR STORAGE OF DAILY RULES RETRIEVED FROM DATA BASE. C3J00030
032799C*    *                                                      C3J00040
032800C*        01  C3J65110.                                      C3J00050
032801C*                                                           C3J00060
032802C*            05  C65110-ACTION              PIC XX.         C3J00070
032803C*            05  C65110-RESULT              PIC XX.         C3J00080
032804C*                                                           C3J00090
032805C*    *   OUTPUT:                                            C3J00100
032806C*                                                           C3J00110
032807C*            05  C65110-DAILY-RULE-OBTAINED  PIC X(1150).   C3J00120
032808C*    *                                                      C3J00130
032809C*    *                                                      C3J00140
032810C*    * * * END OF 65110 * * * * * * * * * * * * * * * * * **C3J00150

032812**019200 COPY LNDESC01.                                      L5E01920
032813C*    *                                                      LND00010
032814C*    *                     LNDESC01                         LND00020
032815C*    *   LOAN DESCRIPTION VARIABLES - 01 CONSUMER LOANS DAILY RULE LND00030
032816C*    *   QUALIFIER - LOAN DESCRIPTION CODE (6 BYTES  POSN 1 - 6) LND00040
032817C*    *                                                      LND00050
032818C*        01  LNDESC01 REDEFINES C3J65110.                   LND00060
032819C*                                                           LND00070
032820C*            05  FILLER                     PIC X(4).        LND00080
032821C*            05  LNDESC01-DESC-ENG          PIC X(15).       LND00090
032822C*            05  LNDESC01-DESC-FR           PIC X(15).       LND00100
032823C*            05  LNDESC01-LITERAL-ENG       PIC X(6).        LND00110
032824C*            05  LNDESC01-LITERAL-FR        PIC X(6).        LND00120
032825C*    *                                                      LND00130
032826C*            05  LNDESC01-LD1TABLE.                         LND00140
032827C*                                                           LND00150
032828C*                10  LD1TABLE-INT-PYMT-DUE-DATE-DD  PIC 99.  LND00160
032829C*                10  LD1TABLE-IO-PYMT-FREQ          PIC 99.  LND00170
032830C*                10  LD1TABLE-INT-RATE-ADDN         PIC S9V9(8) LND00180
032831C*                                                   COMP-3. LND00190
032832C*                10  LD1TABLE-MAX-DAYS-PYMT         PIC 99.  LND00200
032833C*                10  LD1TABLE-MAX-YR                PIC 99.  LND00210
032834C*                10  LD1TABLE-MAX-AMT               PIC S9(13)V99 LND00220
032835C*                                                   COMP-3. LND00230
032836C*                10  LD1TABLE-OMTC-ACTIVITY-OPEN    PIC XX.  LND00240
032837C*                10  LD1TABLE-GROUP                 PIC XX.  LND00250
032838C*                10  LD1TABLE-OMTC-ACTIVITY-TSFR    PIC XX.  LND00260
032839C*                10  LD1TABLE-OMTC-ACTIVITY-CONV    PIC XX.  LND00270
032840C*                10  LD1TABLE-INT-RULE-ALLOWED-GRP.          LND00280
032841C*                    15  LD1TABLE-INT-RULE-ALLOW-TBL-X.      LND00290
032842C*                        20  LD1TABLE-INT-RULE-ALLOW-TBL  OCCURS 50. LND00300
032843C*                            25  LD1TABLE-INT-RULE-ALLOW  PIC 9(2). LND00310
032844C*                10  LD1TABLE-MAX-ISSUE-DAYS.                LND00320
032845C*                    15  LD1TABLE-MAX-ISSUE-DAYS-BACK PIC 99. LND00330
032846C*                    15  LD1TABLE-MAX-ISSUE-DAYS-FWD  PIC 99. LND00340
032847C*                10  LD1TABLE-EFFECT-INT-RATE.               LND00350
032848C*                    15  LD1TABLE-EFFECT-INT-RATE-MAX PIC 99. LND00360
032849C*                    15  LD1TABLE-EFFECT-INT-RATE-MIN PIC 99. LND00370
032850C*                10  LD1TABLE-DEFAULT-CREDIT-GROUP  PIC 9.   LND00380
032851C*                10  LD1TABLE-GL-ACCT-NO.                    LND00390
032852C*                    15  LD1TABLE-GL-ACCT-ORDINARY-X.        LND00400
032853C*                        20  LD1TABLE-GL-ACCT-ORDINARY  PIC 9(7). LND00410
032854C*                    15  LD1TABLE-GL-ACCT-NON-PROD-X.        LND00420
032855C*                        20  LD1TABLE-GL-ACCT-NON-PROD  PIC 9(7). LND00430
032856C*                    15  LD1TABLE-GL-ACCT-WRITEOFF-X.        LND00440
032857C*                        20  LD1TABLE-GL-ACCT-WRITEOFF  PIC 9(7). LND00450
032858C*                10  LD1TABLE-GL-INT-ACCT-NO.                LND00460
032859C*                    15  LD1TABLE-GL-INT-ORDINARY-X.         LND00470
032860C*                        20  LD1TABLE-GL-INT-ORDINARY   PIC 9(7). LND00480
032861C*                    15  LD1TABLE-GL-INT-NON-PROD-X.         LND00490
032862C*                        20  LD1TABLE-GL-INT-NON-PROD   PIC 9(7). LND00500
032863C*                    15  LD1TABLE-GL-INT-ACCRUED-X.          LND00510
032864C*                        20  LD1TABLE-GL-INT-ACCRUED    PIC 9(7). LND00520
032865C*                    15  LD1TABLE-GL-INT-RESERVED-X.         LND00530

032866C*                        20  LD1TABLE-GL-INT-RESERVED   PIC 9(7). LND00540

032868**019400 COPY APPLV01.                                       L5E01940
032869C*    *                                                      APP00010
032870C*    *                     APPLV01                          APP00020
032871C*    *   APPLICATION VARIABLES 01 DAILY RULE                APP00030
032872C*    *   QUALIFIER - APPLICATION CODE (2 BYTES  POSN 1 - 2) APP00040
032873C*    *                                                      APP00050
032874C*    *   CHANGED INT-MIN-CHG-AMT - MAY 9/84 - D. LEGRAND    APP00060
032875C*    *                                                      APP00070
032876C*    *                                                      APP00080
032877C*        01  APPLV01 REDEFINES C3J65110.                    APP00090
032878C*    *                                                      APP00100
032879C*            05  APPLV01-ACTION             PIC X(2).        APP00110
032880C*            05  APPLV01-RESULT             PIC X(2).        APP00120
032881C*    *                                                      APP00130
032882C*            05  APPLV01-SHDATES.                           APP00140
032883C*                10  SHDATES-CURRENT        PIC S9(7)  COMP-3. APP00150
032884C*                10  SHDATES-NEXT           PIC S9(7)  COMP-3. APP00160
032885C*    *                                                      APP00170
032886C*            05  APPLV01-DBSPLITS.                          APP00180
032887C*                10  DBSPLITS-NO-OF-DB-AREAS  PIC 9.         APP00190
032888C*                10  DBSPLITS-SPLITS.                       APP00200
```

```
032889C*                15    FILLER                     OCCURS 5 TIMES.  APP00210
032890C*                20    DBSPLITS-DB-AREA-SPLITS    PIC X(8).        APP00220
032891C*       *                                                          APP00230
032892C*          05  APPLV01-TRANACT.                                    APP00240
032893C*            10   TRANACT-TIME.                                    APP00250
032894C*               15    TRANACT-HOURS              PIC 99.           APP00260
032895C*               15    TRANACT-MINUTES            PIC 99.           APP00270
032896C*       *                                                          APP00280
032897C*          05  APPLV01-TLIMIT.                                     APP00290
032898C*            10   TLIMIT-RESERVED-LOAN-PERIOD    PIC S9(5)  COMP-3. APP00300
032899C*            10   TLIMIT-CLOSED-LOAN-PERIOD      PIC S9(5)  COMP-3. APP00310
032900C*       *                                                          APP00320
032901C*          05  APPLV01-APPL-CUTOFF-TIME-REC.                       APP00330
032902C*            10   APPLV01-FILLER                 PIC XX.           APP00340
032903C*            10   APPLV01-APPL-CUTOFF-TZ         OCCURS 10 TIMES.  APP00350
032904C*               15  APPLV01-CUTOFF-CPC-DATE-BR   PIC S9(7) COMP-3. APP00360
032905C*               15  APPLV01-CUTOFF-CPC-TIME-BR   PIC S9(4) COMP.   APP00370
032906C*               15  APPLV01-CUTOFF-CPC-DATE-ATM  PIC S9(7) COMP-3. APP00380
032907C*               15  APPLV01-CUTOFF-CPC-TIME-ATM  PIC S9(4) COMP.   APP00390
032908C*       *                                                          APP00400
032909C*            10   APPLV01-APPL-CUTOFF-ACTIVY-ATM PIC XX.           APP00410
032910C*            10   APPLV01-APPL-CUTOFF-ACTIVY-BR  PIC XX.           APP00420
032911C*       *                                                          APP00430
032912C*          05  APPLV01-LOGGING-START-START.                        APP00440
032913C*            10   APPLV01-LOG-START.                               APP00450
032914C*               15  APPLV01-LOG-START-DATE       PIC S9(7) COMP-3. APP00460
032915C*               15  APPLV01-LOG-START-TIME       PIC S9(7) COMP-3. APP00470
032916C*            10   APPLV01-LOG-END.                                 APP00480
032917C*               15  APPLV01-LOG-END-DATE         PIC S9(7) COMP-3. APP00490
032918C*               15  APPLV01-LOG-END-TIME         PIC S9(7) COMP-3. APP00500
032919C*       *                                                          APP00510
032920C*          05  APPLV01-NOAREAS                  PIC S9(3) COMP-3.  APP00520
032921C*       *                                                          APP00530

032922C*          05  APPLV01-AC-EXPIRY-WARN-DAYS      PIC 99.            APP00540
032923C*       *                                                          APP00550
032924C*          05  APPLV01-GL-SUSP-ACCTS.                              APP00560
032925C*            10   APPLV01-GL-SUSP-ACCT-CDN       PIC S9(7) COMP-3. APP00570
032926C*            10   APPLV01-GL-SUSP-ACCT-US        PIC S9(7) COMP-3. APP00580
032927C*       *                                                          APP00590
032928C*          05  APPLV01-NC-DET-STMNT-DAYS        PIC S9(3) COMP-3.  APP00600
032929C*       *                                                          APP00610
032930C*          05  APPLV01-INT-RENEWAL-WARN-DAYS    PIC 99.            APP00620
032931C*       *                                                          APP00630
032932C*          05  APPLV01-INT-HILO-RATES.                             APP00640
032933C*            10   APPLV01-INT-HI-RATE            PIC S999V9(8)    APP00650
032934C*                                                           COMP-3. APP00660
032935C*            10   APPLV01-INT-LO-RATE            PIC S999V9(8)    APP00670
032936C*                                                           COMP-3. APP00680
032937C*       *                                                          APP00690
032938C*          05  APPLV01-INT-MIN-CHG-AMT          PIC S999V99 COMP-3. APP00700

032940**019600 COPY C3J65150.                                            LSE01960
032941C*       *                                                          C3J00010
032942C*       *                                                          C3J00020
032943C*       *  DATA GROUP 65150              REVISION DATE: 83/09/27   C3J00030
032944C*       *  THE TRANSACTION LOG RECORD    (FOR REAL AND MEMO LOG DB) C3J00040
032945C*       *  AND THE                                                 C3J00050
032946C*       *  BATCH DAILY REAL TRANSACTION LOG (FOR DAILY REAL LOG DB) C3J00060
032947C*       *                                                          C3J00070
032948C*       *  THIS COPYBOOK IS IDENTICAL TO C5E65152 EXCEPT FOR THE   C3J00080
032949C*       *  FIRST 10 BYTES                                          C3J00090
032950C*       *                                                          C3J00100
032951C*         01  C3J65150.                                            C3J00110
032952C*       *                                                          C3J00120
032953C*          05  C65150-TL-ACTION                 PIC XX.            C3J00130
032954C*          05  C65150-TL-RESULT                 PIC XX.            C3J00140
032955C*       *                                                          C3J00150
032956C*          05  C65150-TL-TRAN-LOG-RECORD.                          C3J00160
032957C*       *                                                          C3J00170
032958C*            10   C65150-TL-LOG-KEY.                               C3J00180
032959C*               15  C65150-TL-TRAN-BUS-DAY       PIC S9(7) COMP-3. C3J00190
032960C*               15  C65150-TL-MAST-TIMESTAMP-REAL.                 C3J00200
032961C*                 20  C65150-TL-MAST-DATE-REAL   PIC S9(7) COMP-3. C3J00210
032962C*                 20  C65150-TL-MAST-TIME-REAL   PIC S9(7) COMP-3. C3J00220
032963C*               15  C65150-TL-TRANSIT-REPORTING  PIC X(5).         C3J00230
032964C*               15  C65150-TL-TRANSIT-LN-X.                        C3J00240
032965C*                 20  C65150-TL-TRANSIT-LN       PIC 9(5).         C3J00250
032966C*               15  C65150-TL-APPL-KEY.                            C3J00260
032967C*                 20  C65150-TL-ACCT-LN-NO.                        C3J00270
032968C*                   25  C65150-TL-ACCT-NO        PIC X(8).         C3J00280
032969C*                   25  C65150-TL-LN-NO          PIC X(3).         C3J00290
032970C*                 20  FILLER-1                   PIC X(4).         C3J00300
032971C*               15  C65150-TL-APPL-KEY1 REDEFINES C65150-TL-APPL-KEY. C3J00310
032972C*                 20  C65150-TL-AC-NO-SGMT.                        C3J00320
032973C*                   25  C65150-TL-AC-NO          PIC X(7).         C3J00330
032974C*                   25  C65150-TL-AC-SGMT        PIC X(3).         C3J00340
032975C*                 20  FILLER-2                   PIC X(5).         C3J00350
032976C*               15  C65150-TL-TRAN-SRC-CODE      PIC X.            C3J00360
032977C*               15  C65150-TL-BMP-NAME           PIC X(8).         C3J00370
032978C*       *                                                          C3J00380
032979C*            10   C65150-TL-LOG-DATA.                              C3J00390
032980C*               15  C65150-TL-LOG-RECORD-CODE    PIC X.            C3J00400
032981C*                 88  C65150-TL-LOG-REC-SEM      VALUE '0'.        C3J00410
032982C*                 88  C65150-TL-LOG-REC-ONLINE   VALUE '1'.        C3J00420
032983C*                 88  C65150-TL-LOG-REC-SECURITY VALUE '2'.        C3J00430
032984C*                 88  C65150-TL-LOG-REC-CYC-ON-REQ VALUE '3'.      C3J00440
032985C*                 88  C65150-TL-LOG-REC-SCHED-UPDT VALUE '5'.      C3J00450
032986C*                 88  C65150-TL-LOG-REC-TZ-PARM  VALUE 'T'.        C3J00460
```

```
032987C*           15  C65150-TL-TRAN-TYPE                PIC X.             C3J00470
032988C*               88  C65150-TL-TRAN-TYPE-INQ         VALUE 'I'.        C3J00480
032989C*               88  C65150-TL-TRAN-TYPE-UPDT        VALUE 'U'.        C3J00490
032990C*               88  C65150-TL-TRAN-TYPE-PROP        VALUE 'P'.        C3J00500
032991C*               88  C65150-TL-TRAN-TYPE-RPT         VALUE 'R'.        C3J00510
032992C*           15  C65150-TL-ACCEPT-REJECT-IND        PIC X.             C3J00520
032993C*               88  C65150-TL-ACCEPT                VALUE 'A'.        C3J00530
     46

032994C*               88  C65150-TL-OVERRIDE              VALUE 'O'.        C3J00540
032995C*               88  C65150-TL-REJECT                VALUE 'R'.        C3J00550
032996C*           15  C65150-TL-TRACE-NO                 PIC S9(7) COMP-3.  C3J00560
032997C*           15  C65150-TL-TIME-ZONE                PIC 99.            C3J00570
032998C*       *                                                             C3J00580
032999C*           15  C65150-TL-HOGAN-TCB-DATA.                             C3J00590
033000C*               20  C65150-TL-PEM-TRAN-CODE.                          C3J00600
033001C*                   25  C65150-TL-CO-ID            PIC XX.            C3J00610
033002C*                   25  C65150-TL-APPL-ID          PIC XX.            C3J00620
033003C*                   25  C65150-TL-FUNC-ID          PIC XX.            C3J00630
033004C*                   25  C65150-TL-SOURCE-TYPE      PIC XX.            C3J00640
033005C*               20  C65150-TL-TRANENTRY-TIMESTAMP.                    C3J00650
033006C*                   25  C65150-TL-TRANENTRY-DATE   PIC S9(7) COMP-3.  C3J00660
033007C*                   25  C65150-TL-TRANENTRY-TIME   PIC S9(7) COMP-3.  C3J00670
033008C*               20  C65150-TL-TCB-SOURCE           PIC X(8).          C3J00680
033009C*               20  C65150-TL-TCB-DESTINATION      PIC X(8).          C3J00690
033010C*               20  C65150-TL-TCB-DEVICE-TYPE      PIC X.             C3J00700
033011C*       *                                                             C3J00710
033012C*           15  C65150-TL-RPT-INFO.                                   C3J00720
033013C*               20  C65150-TL-LIC                  PIC X.             C3J00730
033014C*                   88  C65150-TL-NO-LIC-PRODUCED       VALUE '0'.    C3J00740
033015C*                   88  C65150-TL-LIC-PRODUCED          VALUE '1'.    C3J00750
033016C*                   88  C65150-TL-CLS-LIC-PRODUCED      VALUE '2'.    C3J00760
033017C*                   88  C65150-TL-CLS-LIC-AC-PRODUCED   VALUE '3'.    C3J00770
033018C*                   88  C65150-TL-AC-PRODUCED           VALUE '4'.    C3J00780
033019C*                   88  C65150-TL-AC-LIC-PRODUCED       VALUE '5'.    C3J00790
033020C*               20  C65150-TL-RPT-CODE-COUNT       PIC S9    COMP-3.  C3J00800
033021C*               20  C65150-TL-RPT-MESS-COUNT       PIC S9    COMP-3.  C3J00810
033022C*               20  C65150-TL-RPT-CODE-IND         OCCURS 3 TIMES     C3J00820
033023C*                                                  PIC X.             C3J00830
033024C*       * valid entries are F (forecast) U (unpostable) E (exception) C3J00840
033025C*               20  C65150-TL-RPT-CODE             OCCURS 3 TIMES     C3J00850
033026C*                                                  PIC S999 COMP-3.   C3J00860
033027C*               20  C65150-TL-RPT-MESS-IND         OCCURS 3 TIMES     C3J00870
033028C*                                                  PIC X.             C3J00880
033029C*       * valid entries are F (forecast) U (unpostable) E (exception) C3J00890
033030C*               20  C65150-TL-RPT-MESS             OCCURS 3 TIMES     C3J00900
033031C*                                                  PIC X(60).         C3J00910
033032C*               20  C65150-TL-OVERLMT-IND          PIC X.             C3J00920
033033C*                   88  C65150-TL-OVERLMT-NO-IND        VALUE '0'.    C3J00930
033034C*                   88  C65150-TL-OVERLMT-AC-IND        VALUE '1'.    C3J00940
033035C*                   88  C65150-TL-OVERLMT-LN-OFF-IND    VALUE '2'.    C3J00950
033036C*               20  C65150-TL-OVERLMT-AMT          PIC S9(13)V99      C3J00960
033037C*                                                        COMP-3.      C3J00970
033038C*               20  C65150-TL-MIRLR-IND            PIC X.             C3J00980
033039C*                   88  C65150-TL-MIRLR-OFF             VALUE '0'.    C3J00990
033040C*                   88  C65150-TL-MIRLR-ON              VALUE '1'.    C3J01000
033041C*               20  C65150-TL-LATE-PAYMENT-IND     PIC X.             C3J01010
033042C*                   88  C65150-TL-LP-OFF                VALUE '0'.    C3J01020
033043C*                   88  C65150-TL-LP-ON                 VALUE '1'.    C3J01030
033044C*       *                                                             C3J01040
033045C*           15  C65150-TL-TRAN-IMAGE.                                 C3J01050
033046C*               20  C65150-TL-RNA-INPUT-HEADER     PIC X(9).          C3J01060
033047C*               20  C65150-TL-TRAN-INPUT-HEADER.                      C3J01070
     47

033048C*                   25  C65150-TL-TRANSIT-SRC      PIC X(5).          C3J01080
033049C*                   25  C65150-TL-PRINT-REQUEST    PIC X.             C3J01090
033050C*                   25  C65150-TL-OVERRIDE-IND     PIC X.             C3J01100
033051C*                   25  C65150-TL-CORRECTION-IND   PIC X.             C3J01110
033052C*                   25  C65150-TL-TRAN-CODE        PIC X(3).          C3J01120
033053C*                   25  C65150-TL-OTHER-BR-ID      PIC X.             C3J01130
033054C*                       88  C65150-TL-OTHER-BR-ID-NONE    VALUE '0'.  C3J01140
033055C*                       88  C65150-TL-OTHER-BR-ID-BR-BR   VALUE '1'.  C3J01150
033056C*                       88  C65150-TL-OTHER-BR-ID-HUB-SUB VALUE '2'.  C3J01160
033057C*               20  C65150-TL-TRAN-FIELDS          PIC X(120).        C3J01170
033058C*       *                                                             C3J01180
033059C*           15  C65150-TL-APPL-MAINT-INFO          PIC X(120).        C3J01190
033060C*       *                                                             C3J01200
033061C*           15  C65150-TL-CNTL-TOT-DIFF            OCCURS 10 TIMES    C3J01210
033062C*                                                  PIC S9(13)V99      C3J01220
033063C*                                                        COMP-3.      C3J01230
033064C*       *                                                             C3J01240
033065C*           15  C65150-TL-MEMO-INJ-CTL-TOTS        OCCURS 10 TIMES    C3J01250
033066C*                                                  PIC S9(13)V99      C3J01260
033067C*                                                        COMP-3.      C3J01270
033068C*       *                                                             C3J01280
033069C*       10  C65150-TL-NON-ESSENTIAL-DATA.                             C3J01290
033070C*           15  C65150-TL-LOCALENTRY-TIMSTAMP.                        C3J01300
033071C*               20  C65150-TL-LOCALENTRY-DATE      PIC S9(7) COMP-3.  C3J01310
033072C*               20  C65150-TL-LOCALENTRY-TIME      PIC S9(7) COMP-3.  C3J01320
033073C*           15  C65150-TL-TRAN-BUS-DAY-SRC         PIC S9(7) COMP-3.  C3J01330
033074C*           15  C65150-TL-TRAN-BUS-DAY-LN          PIC S9(7) COMP-3.  C3J01340
033075C*           15  C65150-TL-MAST-TIMESTAMP-MEMO.                        C3J01350
033076C*               20  C65150-TL-MAST-DATE-MEMO       PIC S9(7) COMP-3.  C3J01360
033077C*               20  C65150-TL-MAST-TIME-MEMO       PIC S9(7) COMP-3.  C3J01370
033078C*       *                                                             C3J01380
033079C*       10  FILLER-3                               PIC X(65).         C3J01390
     48

033081**019800 COPY C3J65250.                                          LSE01980
```

```
033082C*    *                                                      C3J00010
033083C*    *       DATA GROUP 65250                               C3J00020
033084C*    *       RNA INPUT HEADER                               C3J00030
033085C*    *                                                      C3J00040
033086C*        01  C3J65250.                                      C3J00050
033087C*    *                                                      C3J00060
033088C*            05  C65250-ACTION              PIC XX.         C3J00070
033089C*            05  C65250-RESULT              PIC XX.         C3J00080
033090C*    *                                                      C3J00090
033091C*            05  C65250-RNA-INPUT-HEADER.                   C3J00100
033092C*                10  C65250-HEADER-LENGTH   PIC X.          C3J00110
033093C*                10  C65250-MESSAGE-TYPE    PIC X.          C3J00120
033094C*                10  C65250-MK-STN-ID       PIC X.          C3J00130
033095C*                10  C65250-DISPLAY-CLASS   PIC X.          C3J00140
033096C*                10  C65250-PRINT-CLASS     PIC X.          C3J00150
033097C*                10  C65250-REJECT-CODE     PIC X.          C3J00160
033098C*                10  C65250-ITERATION-COUNT PIC X.          C3J00170
033099C*                10  C65250-SEQUENCE-NO     PIC XX.         C3J00180
 49

033101**020000 COPY C3J65251.                                      L5E02000
033102C*001000*                                                    C3J00010
033103C*002000*     DATA GROUP 65251                               C3J00020
033104C*003000*     TRANSACTION APPLICATION INPUT HEADER           C3J00030
033105C*004000*                                                    C3J00040
033106C*005000 01  C3J65251.                                       C3J00050
033107C*006000*                                                    C3J00060
033108C*007000     05  C65251-ACTION              PIC XX.          C3J00070
033109C*008000     05  C65251-RESULT              PIC XX.          C3J00080
033110C*009000*                                                    C3J00090
033111C*010000     05  C65251-TRAN-INPUT-HEADER.                   C3J00100
033112C*011000         10  C65251-TRAN-CNTL-BYTE  PIC X.           C3J00110
033113C*012000         10  C65251-TRANSIT-SRC     PIC X(5).        C3J00120
033114C*013000         10  C65251-PRINT-REQUEST   PIC X.           C3J00130
033115C*014000         10  C65251-OVERRIDE-IND    PIC X.           C3J00140
033116C*015000         10  C65251-CORRECTION-IND  PIC X.           C3J00150
033117C*016000         10  C65251-TRAN-CODE       PIC X(3).        C3J00160
033118C*017000         10  C65251-APPL-KEY.                        C3J00170
033119C*018000             15  C65251-ACCT-NO-X.                   C3J00180
033120C*019000                 20  C65251-ACCT-NO PIC 9(8).        C3J00190
033121C*020000             15  C65251-LN-NO-X.                     C3J00200
033122C*021000                 20  C65251-LN-NO   PIC 9(3).        C3J00210
033123C*022000         10  C65251-AC-KEY REDEFINES C65251-APPL-KEY. C3J00220
033124C*023000             15  C65251-AC-FILLER   PIC X.           C3J00230
033125C*024000             15  C65251-AC-NO-X.                     C3J00240
033126C*025000                 20  C65251-AC-NO   PIC 9(7).        C3J00250
033127C*026000             15  C65251-AC-SGMT-NO-X.                C3J00260
033128C*027000                 20  C65251-AC-SGMT-NO PIC 9(3).     C3J00270
033129C*028000         10  C65251-OTHER-BR-ID     PIC X.           C3J00280
033130C*029000*                                                    C3J00290
033131C*030000         10  C65251-TESTING-INFO.                    C3J00300
033132C*031000             15  C65251-TEST-RUN-NO    PIC 9(4).     C3J00310
033133C*032000             15  C65251-TEST-STEP-NO   PIC 9(3).     C3J00320
033134C*033000             15  C65251-TEST-CASE-NO   PIC 9(4).     C3J00330
    C  034000             15  C65251-TEST-DATE      PIC 9(7).     C3J00340
    C  035000             15  C65251-TEST-TIME      PIC 9(6).     C3J00350
 50

035002**020200 COPY C3J65252.                                      L5E02020
035003C*    *                                                      C3J00010
035004C*    *       DATA GROUP 65252                               C3J00020
035005C*    *       STANDARD TRANSACTION FIELDS                    C3J00030
035006C*    *       (IF TRANSACTION IS BR-TO-BR THEN FIELD "TRANSIT-LN" C3J00040
035007C*    *        MAY BE UPDATED BY L9H62050)                   C3J00050
035008C*    *                                                      C3J00060
035009C*        01  C3J65252.                                      C3J00070
035010C*    *                                                      C3J00080
035011C*          05  C65252-ACTION              PIC XX.           C3J00090
035012C*          05  C65252-RESULT              PIC XX.           C3J00100
035013C*    *                                                      C3J00110
035014C*          05  C65252-TRAN-MEMO-INJ-IND   PIC X.            C3J00120
035015C*          05  C65252-TRAN-SRC-CODE       PIC X.            C3J00130
035016C*          05  C65252-TRAN-TRANSIT-LN     PIC X(5).         C3J00140
035017C*          05  C65252-TRAN-FIELDS         PIC X(120).       C3J00150
 51

035019**020400 COPY TRAN230.                                       L5E02040
035020C*    *                                                      TRA00010
035021C*    *       DATA GROUP TRAN230              84 05 17  JL   TRA00020
035022C*    *       REDEFINES DATA GROUP C3J65252 AND              TRA00030
035023C*    *       CONTAINS THE CLOSE INQUIRY DATA FOR TRANSACTION 230  TRA00040
035024C*    *                                 CREATION DATE : SEPT 26 1983  TRA00050
035025C*    *                                                      TRA00060
035026C*       01  TRAN230 REDEFINES C3J65252.                     TRA00070
035027C*          05  FILLER                     PIC X(11).        TRA00080
035028C*          05  T230-TRAN-FIELDS.                            TRA00090
035029C*              10  T230-TRAN-BACKDATE-CODE-X  PIC X.        TRA00100
035030C*              10  T230-TRAN-CLOSING-DATE-X.                TRA00110
035031C*                  15  T230-TRAN-CLOSING-DATE    PIC 9(7).  TRA00120
035032C*                  15  FILLER REDEFINES T230-TRAN-CLOSING-DATE. TRA00130
035033C*                      20  T230-TRAN-CLOSING-DATE-C   PIC X.  TRA00140
035034C*                      20  T230-TRAN-CLOSING-DATE-YY  PIC XX. TRA00150
035035C*                      20  T230-TRAN-CLOSING-DATE-MM  PIC XX. TRA00160
035036C*                      20  T230-TRAN-CLOSING-DATE-DD  PIC XX. TRA00170
035037C*              10  T230-TRAN-ODOMETER-READING-X.            TRA00180
035038C*                  15  T230-TRAN-ODOMETER-READING  PIC 9(6). TRA00190
035039C*              10  T230-HS-INDEX              PIC S9(4) COMP. TRA00200
035040C*              10  T230-HS-ALLOWED-KILO       PIC 9(6).     TRA00210
035041C*              10  T230-HS-EXCESS-KILO-CHARGE PIC S9(9)V99 COMP. TRA00220
035042C*              10  T230-FILLER                PIC X(92).    TRA00230
```

```
035043C*    *                                                            TRA00240
035044C*    *  FIELD 1   T230-TRAN-BACKDATE-CODE                         TRA00250
035045C*    *  FIELD 2   T230-TRAN-CLOSING-DATE                          TRA00260
035046C*    *  FIELD 3   T230-TRAN-ODOMETER-READING                      TRA00270
035047C*    *                                                            TRA00280
      52

035049**020600 COPY C3J65253.                                            L5E02060
035050C*    *                                                            C3J00010
035051C*    *        DATA GROUP 65253                                    C3J00020
035052C*    *        RNA OUTPUT HEADER                                   C3J00030
035053C*    *                                                            C3J00040
035054C*    01  C3J65253.                                                C3J00050
035055C*    *                                                            C3J00060
035056C*        05  C65253-ACTION              PIC XX.                   C3J00070
035057C*        05  C65253-RESULT              PIC XX.                   C3J00080
035058C*    *                                                            C3J00090
035059C*        05  C65253-RNA-OUTPUT-HEADER.                            C3J00100
035060C*            10  C65253-HEADER-LENGTH   PIC X.                    C3J00110
035061C*            10  C65253-MESSAGE-TYPE    PIC X.                    C3J00120
035062C*            10  C65253-HK-STN-ID       PIC X.                    C3J00130
035063C*            10  C65253-DISPLAY-CLASS   PIC X.                    C3J00140
035064C*            10  C65253-PRINT-CLASS     PIC X.                    C3J00150
035065C*            10  C65253-REJECT-CODE     PIC X.                    C3J00160
035066C*            10  C65253-ITERATION-COUNT PIC X.                    C3J00170
035067C*            10  C65253-LAST-BUFFER-IND PIC X.                    C3J00180
035068C*            10  C65253-SEQUENCE-NO     PIC XX.                   C3J00190
      53

035070**020800 COPY C3J65254.                                            L5E02080
035071C*    *                                                            C3J00010
035072C*    *        DATA GROUP 65254                                    C3J00020
035073C*    *        TRANSACTION APPLICATION OUTPUT HEADER               C3J00030
035074C*    *                                                            C3J00040
035075C*    01  C3J65254.                                                C3J00050
035076C*    *                                                            C3J00060
035077C*        05  C65254-ACTION              PIC XX.                   C3J00070
035078C*        05  C65254-RESULT              PIC XX.                   C3J00080
035079C*    *                                                            C3J00090
035080C*        05  C65254-TRAN-APPL-OUTPUT-HEADER.                      C3J00100
035081C*            10  C65254-OVERRIDE-LEVEL-IND  PIC X.                C3J00110
035082C*            10  C65254-CLEAR-SCREEN-IND    PIC X.                C3J00120

035084**021000 COPY C5E65440.                                            L5E02100
035085C*    *  DATA GROUP    65440                                       C5E00010
035086C*    *  REAL MASTER ACCOUNT LOAN INFORMATION                      C5E00020
035087C*    *  THIS IS THE ROOT SEGMENT OF LOANS DB                      C5E00030
035088C*    *                             REVISION DATE - 84/05/28 BY JL C5E00040
035089C*    *                                                            C5E00050
035090C*    01  C5E65440.                                                C5E00060
035091C*    *                                                            C5E00070
035092C*        05  C65440-RM0-ACTION          PIC XX.                   C5E00080
035093C*        05  C65440-RM0-RESULT          PIC XX.                   C5E00090
035094C*    *                                                            C5E00100
035095C*        05  C65440-RM0-ROOT-SEG.                                 C5E00110
035096C*            10  C65440-RM0-ROOT-KEY.                             C5E00120
035097C*                15  C65440-RM0-ACCT-LN-NO.                       C5E00130
035098C*                    20  C65440-RM0-ACCT-NO    PIC 9(8).          C5E00140
035099C*                    20  C65440-RM0-LN-NO      PIC 9(3).          C5E00150
035100C*            10  C65440-RM0-ROOT-DATA.                            C5E00160
035101C*    *                                                            C5E00170
035102C*                15  C65440-RM0-TECH-INFO.                        C5E00180
035103C*                    20  C65440-RM0-MEMO-EXIST-IND  PIC X.        C5E00190
035104C*                    20  FILLER                     PIC X.        C5E00200
035105C*                        FILLER USED TO MATCH C65470-RM0          C5E00210
035106C*                    20  C65440-RM0-DLQ-EXIST-IND   PIC X.        C5E00220
035107C*                    20  C65440-RM0-INS-EXIST-IND   PIC X.        C5E00230
035108C*                    20  C65440-RM0-AUG-EXIST-IND   PIC X.        C5E00240
035109C*                    20  C65440-RM0-HIST-EARLIEST-DATE PIC S9(7) COMP-3.C5E00250
035110C*                    20  C65440-RM0-HIST-NO-TRAN    PIC S9(3)  COMP-3.C5E00260
035111C*                    20  C65440-RM0-DATE-LAST-MAINT PIC S9(7)  COMP-3.C5E00270
035112C*                    20  C65440-RM0-DATE-LAST-FIN   PIC S9(7)  COMP-3.C5E00280
035113C*    *                                                            C5E00290
035114C*                15  C65440-RM0-KEY-OTHER-DBS.                    C5E00300
035115C*                    20  C65440-RM0-TRANSIT-LN      PIC 9(5).     C5E00310
035116C*                    20  C65440-RM0-LN-OFFICER-NO   PIC X(2).     C5E00320
035117C*                    20  C65440-RM0-LN-CREDIT-GROUP PIC X.        C5E00330
035118C*                    20  C65440-RM0-CLIENT-NO       PIC S9(9) COMP-3.C5E00340
035119C*                    20  C65440-RM0-AC-NO           PIC 9(7).     C5E00350
035120C*                    20  C65440-RM0-AC-SGMT         PIC 9(3).     C5E00360
035121C*                    20  C65440-RM0-LN-DESC         PIC X(6).     C5E00370
035122C*    *                                                            C5E00380
035123C*                15  C65440-RM0-CUST-INFO.                        C5E00390
035124C*                    20  C65440-RM0-CUST-IND        PIC XX.       C5E00400
035125C*                    20  C65440-RM0-SHORTNAME       PIC X(15).    C5E00410
035126C*                    20  C65440-RM0-LANG-CODE       PIC X.        C5E00420
035127C*    *                                                            C5E00430
035128C*                15  C65440-RM0-LN-BASIC-INFO.                    C5E00440
035129C*                    20  C65440-RM0-ISSUE-DATE      PIC S9(7)  COMP-3.C5E00450
035130C*                    20  C65440-RM0-TSFR-DATE       PIC S9(7)  COMP-3.C5E00460
035131C*                    20  C65440-RM0-CONV-DATE       PIC S9(7)  COMP-3.C5E00470
035132C*                    20  C65440-RM0-MATURITY-DATE   PIC S9(7)  COMP-3.C5E00480
035133C*                    20  C65440-RM0-AMORT-TERM-ORG  PIC S9(3)  COMP-3.C5E00490
035134C*                    20  C65440-RM0-PROCEEDS-ORG    PIC S9(13)V99 COMP-3.C5E00500
035135C*                    20  C65440-RM0-CURRENCY        PIC X.        C5E00510
035136C*                    20  C65440-RM0-LN-PLAN         PIC X.        C5E00520
035137C*                    20  C65440-RM0-LN-SERVICE      PIC X.        C5E00530
```

```
035138C*         20  C65440-RMO-LN-NOTE              PIC X.                C5E00540
035139C*         20  C65440-RMO-GUARANTOR            PIC X(4).             C5E00550
035140C*         20  C65440-RMO-INS-CODE             PIC X.                C5E00560
035141C*         20  C65440-RMO-PREFER-RATE-OPT      PIC X.                C5E00570
035142C*         20  C65440-RMO-PURPOSE              PIC X(3).             C5E00580
035143C*         20  C65440-RMO-SUB-PURPOSE          PIC X(3).             C5E00590
035144C*         20  C65440-RMO-LN-CLASS             PIC X(3).             C5E00600
035145C*    *                                                              C5E00610
035146C*     15  C65440-RMO-COLA-SEC-INFO.                                 C5E00620
035147C*         20  C65440-RMO-COLA-CODE            PIC X(3).             C5E00630
035148C*         20  C65440-RMO-COLA-VALUE           PIC S9(13)   COMP-3.  C5E00640
035149C*         20  C65440-RMO-COLA-REVAL-DATE      PIC S9(7)    COMP-3.  C5E00650
035150C*    *                                                              C5E00660
035151C*     15  C65440-RMO-INT-RENEWAL-INFO.                              C5E00670
035152C*         20  C65440-RMO-INT-TERM             PIC S9(3)    COMP-3.  C5E00680
035153C*         20  C65440-RMO-INT-ADJ-DATE         PIC S9(7)    COMP-3.  C5E00690
035154C*         20  C65440-RMO-INT-ADJ-AMT          PIC S9(7)V99 COMP-3.  C5E00700
035155C*         20  C65440-RMO-INT-RENEW-DATE       PIC S9(7)    COMP-3.  C5E00710
035156C*         20  C65440-RMO-INT-RENEW-DATE-LAST  PIC S9(7)    COMP-3.  C5E00720
035157C*         20  C65440-RMO-RENEW-AMT-LAST       PIC S9(13)V99 COMP-3. C5E00730
035158C*    *                                                              C5E00740
035159C*     15  C65440-RMO-LN-STATUS-INFO.                                C5E00750
035160C*         20  C65440-RMO-LN-STATUS            PIC X(2).             C5E00760
035161C*         20  C65440-RMO-RESTRAINED-IND       PIC X.                C5E00770
035162C*    *                                                              C5E00780
035163C*     15  C65440-RMO-MESSAGES-INFO.                                 C5E00790
035164C*         20  C65440-RMO-LN-MESSAGE-INFO.                           C5E00800
035165C*             25  C65440-RMO-LN-MSG-IND       OCCURS 9 TIMES        C5E00810
035166C*                                             PIC X.                C5E00820
035167C*         20  C65440-RMO-BR-MSG-LEVEL-INFO.                         C5E00830
035168C*             25  C65440-RMO-BR-MSG-LEVEL     OCCURS 9 TIMES        C5E00840
035169C*                                             PIC X.                C5E00850
035170C*         20  C65440-RMO-BR-MSG-HI-LEVEL      PIC X.                C5E00860
035171C*         20  C65440-RMO-DIARY-MSG-DUE-DATE   PIC S9(7)    COMP-3.  C5E00870
035172C*    *                                                              C5E00880
035173C*     15  C65440-RMO-INT-RATE-INFO.                                 C5E00890
035174C*         20  C65440-RMO-MR-OCCUR-IND         PIC 9.                C5E00900
035175C*         20  C65440-RMO-RATE-EFF-DATE-C      PIC S9(7)    COMP-3.  C5E00910
035176C*         20  C65440-RMO-RATE-EFF-DATE-B      PIC S9(8)    COMP.    C5E00920
035177C*         20  C65440-RMO-INT-RULE             PIC X(2).             C5E00930
035178C*         20  C65440-RMO-INT-RATE-MULT        PIC S9V9(6)  COMP-3.  C5E00940
035179C*         20  C65440-RMO-INT-RATE-ADDN        PIC S9V9(8)  COMP-3.  C5E00950
035180C*    *                                                              C5E00960
035181C*     15  C65440-RMO-BACKDATE-INFO.                                 C5E00970
035182C*         20  C65440-RMO-BKD-CREA-DATE        PIC S9(7)    COMP-3.  C5E00980
035183C*         20  C65440-RMO-BKD-OS-BAL           PIC S9(13)V99 COMP-3. C5E00990
035184C*         20  C65440-RMO-BKD-INT-COL          PIC S9(11)V99 COMP-3. C5E01000
035185C*         20  C65440-RMO-BKD-INT-RATE         PIC S9V9(8)  COMP-3.  C5E01010
035186C*         20  C65440-RMO-BKD-INT-EARN-LIPOD   PIC S9(11)V99 COMP-3. C5E01020
035187C*    *                                                              C5E01030
035188C*     15  C65440-RMO-PYMT-INFO.                                     C5E01040
035189C*         20  C65440-RMO-PYMT-CHG-TYPE        PIC X.                C5E01050
035190C*         20  C65440-RMO-PYMT-CHG-BANK        PIC 9(3).             C5E01060
035191C*         20  C65440-RMO-PYMT-CHG-TRANSIT     PIC 9(5).             C5E01070
035192C*         20  C65440-RMO-PYMT-CHG-ACCT        PIC 9(7).             C5E01080
035193C*         20  C65440-RMO-PYMT-CHG-SYST        PIC X.                C5E01090
035194C*         20  C65440-RMO-PYMT-FREQ            PIC X(2).             C5E01100
035195C*         20  C65440-RMO-PYMT-DUE-DATE        PIC S9(7)    COMP-3.  C5E01110
035196C*         20  C65440-RMO-PYMT-DUE-DATE-DELAY  PIC S9(7)    COMP-3.  C5E01120
035197C*         20  C65440-RMO-PYMT-AMT-MULT        PIC S9V99    COMP-3.  C5E01130
035198C*         20  C65440-RMO-PYMT-AMT-MIN         PIC S9(13)V99 COMP-3. C5E01140
035199C*         20  C65440-RMO-PYMT-AMT-REG REDEFINES                     C5E01150
035200C*             C65440-RMO-PYMT-AMT-MIN         PIC S9(13)V99 COMP-3. C5E01160
035201C*         20  C65440-RMO-PYMT-AMT-PARTIAL     PIC S9(13)V99 COMP-3. C5E01170
035202C*         20  C65440-RMO-PYMT-TO-SKIP         PIC S9       COMP-3.  C5E01180
035203C*    *                                                              C5E01190
035204C*     15  C65440-RMO-INT-INFO.                                      C5E01200
035205C*         20  C65440-RMO-INT-METHOD           PIC X(2).             C5E01210
035206C*         20  C65440-RMO-INT-CAP-IND          PIC X.                C5E01220
035207C*         20  C65440-RMO-LICD                 PIC S9(7)    COMP-3.  C5E01230
035208C*         20  C65440-RMO-INT-COL              PIC S9(11)V99 COMP-3. C5E01240
035209C*         20  C65440-RMO-INT-COL-YTD-CAL      PIC S9(9)V99 COMP-3.  C5E01250
035210C*         20  C65440-RMO-INT-EARN             PIC S9(11)V9(7)       C5E01260
035211C*                                                          COMP-3. C5E01270
035212C*         20  C65440-RMO-INT-EARN-MAX         PIC S9(7)V99 COMP-3.  C5E01280
035213C*         20  C65440-RMO-LIPOD                PIC S9(7)    COMP-3.  C5E01290
035214C*         20  C65440-RMO-INT-EARN-LIPOD       PIC S9(11)V99 COMP-3. C5E01300
035215C*    *                                                              C5E01310
035216C*     15  C65440-RMO-OS-BAL-INFO.                                   C5E01320
035217C*         20  C65440-RMO-OS-BAL               PIC S9(13)V99 COMP-3. C5E01330
035218C*         20  C65440-RMO-OS-BAL-REDUCED-DATE  PIC S9(7)    COMP-3.  C5E01340
035219C*    *                                                              C5E01350
035220C*     15  C65440-RMO-OS-BAL-STATS.                                  C5E01360
035221C*         20  C65440-RMO-OS-BAL-HI            PIC S9(13)   COMP-3.  C5E01370
035222C*         20  C65440-RMO-OS-BAL-LO            PIC S9(13)   COMP-3.  C5E01380
035223C*         20  C65440-RMO-OS-BAL-HI-DATE       PIC S9(7)    COMP-3.  C5E01390
035224C*         20  C65440-RMO-OS-BAL-LO-DATE       PIC S9(7)    COMP-3.  C5E01400
035225C*         20  FILLER                          PIC X(18).            C5E01410
035226C*         20  C65440-RMO-OS-BAL-ACCUM-M       PIC S9(15)   COMP-3.  C5E01420
035227C*         20  C65440-RMO-OS-BAL-DATE-ACCUM    PIC S9(7)    COMP-3.  C5E01430
035228C*         20  FILLER                          PIC X(24).            C5E01440
035229C*    *                                                              C5E01450
035230C*     15  C65440-RMO-PYMT-STATS.                                    C5E01460
035231C*         20  C65440-RMO-DATE-LAST-PAYMENT    PIC S9(7)    COMP-3.  C5E01470
035232C*         20  C65440-RMO-PYMT-TOT-RECVD       PIC S9(5)    COMP-3.  C5E01480
035233C*         20  C65440-RMO-PYMT-TOT-SKIPPED     PIC S9(3)    COMP-3.  C5E01490
035234C*         20  C65440-RMO-PYMT-TOT-DELAYED     PIC S9(3)    COMP-3.  C5E01500
```

```
035235C*           20  C65440-RM0-PYMT-TOT-WAIVED      PIC S9(3)      COMP-3.C5E01510
035236C*    *                                                               C5E01520
035237C*           15  C65440-RM0-DLQ-INFO.                                  C5E01530
035238C*           20  C65440-RM0-DLQ-CTR-LT-15        PIC S9(3)      COMP-3.C5E01540
035239C*           20  C65440-RM0-DLQ-TOT-DAYS-LT-15   PIC S9(3)      COMP-3.C5E01550
035240C*           20  C65440-RM0-DLQ-START-DATE       PIC S9(7)      COMP-3.C5E01560
035241C*           20  C65440-RM0-IO-UNC-INT-ST-DATE   PIC S9(7)      COMP-3.C5E01570
035242C*    *                                                               C5E01580
035243C*           15  C65440-RM0-RETURNED-ITEMS.                            C5E01590
035244C*           20  C65440-RM0-PYMT-RETRY-CTR       PIC S9         COMP-3.C5E01600
035245C*           20  C65440-RM0-IO-PYMT-RETRY-CTR    PIC S9         COMP-3.C5E01610
```

57

```
035246C*    *                                                               C5E01620
035247C*           15  C65440-RM0-REPORTING-INFO.                            C5E01630
035248C*           20  C65440-RM0-DET-STMT-FREQ        PIC X(2).             C5E01640
035249C*           20  C65440-RM0-DET-STMT-DUE-DATE    PIC S9(7)      COMP-3.C5E01650
035250C*           20  C65440-RM0-DET-STMT-DATE-PREV   PIC S9(7)      COMP-3.C5E01660
035251C*           20  C65440-RM0-SUM-INT-COL          PIC S9(11)V99  COMP-3.C5E01670
035252C*           20  C65440-RM0-SUM-INT-EARN-LIPDD   PIC S9(11)V99  COMP-3.C5E01680
035253C*           20  C65440-RM0-SUM-OS-BAL           PIC S9(13)V99  COMP-3.C5E01690
035254C*           20  C65440-RM0-SUM-TOT-DISB         PIC S9(13)V99  COMP-3.C5E01700
035255C*           20  C65440-RM0-INH-SUM-STMT-IND     PIC X.                C5E01710
035256C*           20  C65440-RM0-DLQ-ADVICE-IND-1     PIC X.                C5E01720
035257C*           20  C65440-RM0-DLQ-ADVICE-IND-2     PIC X.                C5E01730
035258C*           20  C65440-RM0-DLQ-ADVICE-IND-3     PIC X.                C5E01740
035259C*    *                                                               C5E01750
035260C*           15  C65440-RM0-MISC-INFO.                                 C5E01760
035261C            20  C65440-RM0-BANK-CODE-FIELD      PIC X(16).            C5E01770
035262C*           20  C65440-RM0-BUS-SEG-CODE         PIC XXX.              C5E01780
035263C*           20  C65440-RM0-REN-RED-RATE-IND     PIC X.                C5E01790
035264C*           20  FILLER                          PIC X(20).            C5E01800
035265C*           20  C65440-RM0-FEE-EXIST-IND        PIC X.                C5E01810
035266C*           20  C65440-RM0-LN-PLAN-DTL          PIC XX.               C5E01820
035267C*           20  C65440-RM0-LN-ACTIVATE-DATE     PIC S9(7)      COMP-3.C5E01830
035268C*           20  C65440-RM0-IO-PYMT-DUE-DATE     PIC S9(7)      COMP-3.C5E01840
035269C*           20  C65440-RM0-FILLER-DATE-1        PIC S9(7)      COMP-3.C5E01850
035270C*           20  C65440-RM0-FILLER-DATE-2        PIC S9(7)      COMP-3.C5E01860
035271C*           20  C65440-RM0-FILLER-DATE-3        PIC S9(7)      COMP-3.C5E01870
035272C*           20  FILLER                          PIC X(85).            C5E01880
035273C*           20  C65440-RM0-RESI-EXIST-IND       PIC X.                C5E01890
035274C*           20  C65440-RM0-SIN                  PIC S9(9)      COMP-3.C5E01900
```

58

```
035276**021200 COPY C5E65443.                                                LSE02120
035277C*    *  DATA GROUP  65443                                            C5E00010
035278C*    *  REAL MASTER ACCOUNT LOAN INFORMATION                          C5E00020
035279C*    *  THIS IS THE FUTURE DATA SEGMENT OF LOANS DB                   C5E00030
035280C*    *  SEGMENT KEY IS "I "  - FOR INSURANCE INFO                     C5E00040
035281C*    *  SEGMENT KEY IS "F "  - FOR FEES INFO                          C5E00050
035282C*    *  SEGMENT KEY IS "A "  - FOR AUGMENT INFO                       C5E00060
035283C*    *  SEGMENT KEY IS "R "  - FOR RESIDUAL INFO                      C5E00070
035284C*    *                            REVISION DATE - 04/05/17 BY JL C5E00080
035285C*    *                                                               C5E00090
035286C*    01  C5E65443.                                                   C5E00100
035287C*    *                                                               C5E00110
035288C*           05  C65443-RM3-ACTION               PIC XX.              C5E00120
035289C*           05  C65443-RM3-RESULT               PIC XX.              C5E00130
035290C*    *                                                               C5E00140
035291C*           05  C65443-RM3-FUTURE-SEG.                                C5E00150
035292C*           10  C65443-RM3-FUTURE-KEY.                                C5E00160
035293C*           15  C65443-RM3-SEG-KEY              PIC X(5).             C5E00170
035294C*    *                                                               C5E00180
035295C*    *                                                               C5E00190
035296C*    *             "I "  - FOR INSURANCE                              C5E00200
035297C*    *                                                               C5E00210
035298C*    *                                                               C5E00220
035299C*           10  C65443-RM3-FUTURE-DATA-I.                             C5E00230
035300C*    *                                                               C5E00240
035301C*           15  C65443-RM3-INS-INFO.                                  C5E00250
035302C*           20  C65443-RM3-INS-LIMIT            PIC S9(9)      COMP-3.C5E00260
035303C*           20  C65443-RM3-INS-COL-METHOD       PIC X.                C5E00270
035304C*           20  C65443-RM3-INS-RISK-TYPE        PIC X.                C5E00280
035305C*           20  C65443-RM3-INS-EARN             PIC S9(7)V99   COMP-3.C5E00290
035306C*           20  C65443-RM3-INS-COL              PIC S9(7)V99   COMP-3.C5E00300
035307C*           20  FILLER                          PIC X(28).            C5E00310
035308C*    *                                                               C5E00320
035309C*    *                                                               C5E00330
035310C*    *             "F "  - FOR FEES                                   C5E00340
035311C*    *                                                               C5E00350
035312C*    *                                                               C5E00360
035313C*           10  C65443-RM3-FUTURE-DATA-F REDEFINES                    C5E00370
035314C*               C65443-RM3-FUTURE-DATA-I.                             C5E00380
035315C*    *                                                               C5E00390
035316C*           15  C65443-RM3-FEES-INFO.                                 C5E00400
035317C*           20  C65443-RM3-FEE-EARN             PIC S9(9)V99   COMP-3.C5E00410
035318C*           20  C65443-RM3-FEE-COL              PIC S9(9)V99   COMP-3.C5E00420
035319C*           20  FILLER                          PIC X(33).            C5E00430
035320C*    *                                                               C5E00440
035321C*    *                                                               C5E00450
035322C*    *             "A "  - FOR AUGMENT INFO                           C5E00460
035323C*    *                                                               C5E00470
035324C*    *                                                               C5E00480
035325C*           10  C65443-RM3-FUTURE-DATA-A REDEFINES                    C5E00490
035326C*               C65443-RM3-FUTURE-DATA-I.                             C5E00500
035327C*    *                                                               C5E00510
035328C*           15  C65443-RM3-AUG-INFO.                                  C5E00520
035329C*           20  C65443-RM3-TOT-DISB             PIC S9(13)V99  COMP-3.C5E00530
```

```
035330C*           20    C65443-RM3-AUG-DATE-LAST      PIC S9(7)        COMP-3.C5E00540
035331C*           20    C65443-RM3-SCHD-AUG-AMT       PIC S9(13)V99    COMP-3.C5E00550
035332C*           20    C65443-RM3-SCHD-AUG-DUE-DATE  PIC S9(7)        COMP-3.C5E00560
035333C*           20    FILLER                        PIC X(21).               C5E00570
035334C*                                                                        C5E00580
035335C*      *                                                                 C5E00590
035336C*      *          "R  " - FOR RESIDUAL INFO                              C5E00600
035337C*      *                                                                 C5E00610
035338C*      *                                                                 C5E00620
035339C*           10    C65443-RM3-FUTURE-DATA-R REDEFINES                     C5E00630
035340C*                      C65443-RM3-FUTURE-DATA-I.                         C5E00640
035341C*      *                                                                 C5E00650
035342C*           15    C65443-RM3-RESIDUAL-INFO.                              C5E00660
035343C*               20    C65443-RM3-RESI-DATE       PIC S9(7)       COMP-3.C5E00670
035344C*               20    C65443-RM3-RESI-ORIG-PRICE PIC S9(9)V99    COMP-3.C5E00680
035345C*               20    C65443-RM3-RESI-AMT        PIC S9(9)V99    COMP-3.C5E00690
035346C*               20    C65443-RM3-SERIAL-NO       PIC X(18).              C5E00700
035347C*               20    FILLER                     PIC X(11).              C5E00710

035349**021400 COPY C5E65480.                                                   L5E02140
035350C*      *   DATA GROUP    65480                                           C5E00010
035351C*      *   WORK MASTER ACCOUNT LOAN INFORMATION                          C5E00020
035352C*      *   THIS IS THE ROOT SEGMENT OF LOANS DB                          C5E00030
035353C*      *                                  REVISION DATE - 84/05/28 BY JL C5E00040
035354C*      *                                                                 C5E00050
035355C*          01    C5E65480.                                               C5E00060
035356C*      *                                                                 C5E00070
035357C*           05    C65480-MM0-ACTION             PIC XX.                  C5E00080
035358C*           05    C65480-MM0-RESULT             PIC XX.                  C5E00090
035359C*      *                                                                 C5E00100
035360C*           05    C65480-MM0-ROOT-SEG.                                   C5E00110
035361C*               10   C65480-MM0-ROOT-KEY.                                C5E00120
035362C*                 15   C65480-MM0-ACCT-LN-NO.                            C5E00130
035363C*                    20   C65480-MM0-ACCT-NO    PIC 9(8).                C5E00140
035364C*                    20   C65480-MM0-LN-NO      PIC 9(3).                C5E00150
035365C*               10   C65480-MM0-ROOT-DATA.                               C5E00160
035366C*      *                                                                 C5E00170
035367C*                 15   C65480-MM0-TECH-INFO.                             C5E00180
035368C*                    20   C65480-MM0-REAL.                               C5E00190
035369C*                      25   C65480-MM0-MEMO-EXIST-IND  PIC X.            C5E00200
035370C*                      25   FILLER                     PIC X.            C5E00210
035371C*                    20   C65480-MM0-MEMO  REDEFINES C65480-MM0-REAL.    C5E00220
035372C*                      25   C65480-MM0-MEMO-TRAN-CTR PIC S9(3)  COMP-3.C5E00230
035373C*                    20   C65480-MM0-DLQ-EXIST-IND   PIC X.              C5E00240
035374C*                    20   C65480-MM0-INS-EXIST-IND   PIC X.              C5E00250
035375C*                    20   C65480-MM0-AUG-EXIST-IND   PIC X.              C5E00260
035376C*                    20   C65480-MM0-HIST-EARLIEST-DATE PIC S9(7) COMP-3.C5E00270
035377C*                    20   C65480-MM0-HIST-NO-TRAN    PIC S9(3)  COMP-3.C5E00280
035378C*                    20   C65480-MM0-DATE-LAST-MAINT PIC S9(7)  COMP-3.C5E00290
035379C*                    20   C65480-MM0-DATE-LAST-FIN   PIC S9(7)  COMP-3.C5E00300
035380C*      *                                                                 C5E00310
035381C*                 15   C65480-MM0-KEY-OTHER-DBS.                         C5E00320
035382C*                    20   C65480-MM0-TRANSIT-LN      PIC 9(5).           C5E00330
035383C*                    20   C65480-MM0-LN-OFFICER-NO   PIC X(2).           C5E00340
035384C*                    20   C65480-MM0-LN-CREDIT-GROUP PIC X.              C5E00350
035385C*                    20   C65480-MM0-CLIENT-NO       PIC S9(9) COMP-3.C5E00360
035386C*                    20   C65480-MM0-AC-NO           PIC 9(7).           C5E00370
035387C*                    20   C65480-MM0-AC-SGMT         PIC 9(3).           C5E00380
035388C*                    20   C65480-MM0-LN-DESC         PIC X(6).           C5E00390
035389C*      *                                                                 C5E00400
035390C*                 15   C65480-MM0-CUST-INFO.                             C5E00410
035391C*                    20   C65480-MM0-CUST-IND        PIC XX.             C5E00420
035392C*                    20   C65480-MM0-SHORTNAME       PIC X(15).          C5E00430
035393C*                    20   C65480-MM0-LANG-CODE       PIC X.              C5E00440
035394C*      *                                                                 C5E00450
035395C*                 15   C65480-MM0-LN-BASIC-INFO.                         C5E00460
035396C*                    20   C65480-MM0-ISSUE-DATE      PIC S9(7)  COMP-3.C5E00470
035397C*                    20   C65480-MM0-TSFR-DATE       PIC S9(7)  COMP-3.C5E00480
035398C*                    20   C65480-MM0-CONV-DATE       PIC S9(7)  COMP-3.C5E00490
035399C*                    20   C65480-MM0-MATURITY-DATE   PIC S9(7)  COMP-3.C5E00500
035400C*                    20   C65480-MM0-AMORT-TERM-ORG  PIC S9(3)  COMP-3.C5E00510
035401C*                    20   C65480-MM0-PROCEEDS-ORG    PIC S9(13)V99 COMP-3.C5E00520
035402C*                    20   C65480-MM0-CURRENCY        PIC X.              C5E00530

035403C*           20   C65480-MM0-LN-PLAN              PIC X.                  C5E00540
035404C*           20   C65480-MM0-LN-SERVICE           PIC X.                  C5E00550
035405C*           20   C65480-MM0-LN-NOTE              PIC X.                  C5E00560
035406C*           20   C65480-MM0-GUARANTOR            PIC X(4).               C5E00570
035407C*           20   C65480-MM0-INS-CODE             PIC X.                  C5E00580
035408C*           20   C65480-MM0-PREFER-RATE-OPT      PIC X.                  C5E00590
035409C*           20   C65480-MM0-PURPOSE              PIC X(3).               C5E00600
035410C*           20   C65480-MM0-SUB-PURPOSE          PIC X(3).               C5E00610
035411C*           20   C65480-MM0-LN-CLASS             PIC X(3).               C5E00620
035412C*      *                                                                 C5E00630
035413C*           15   C65480-MM0-COLA-SEC-INFO.                               C5E00640
035414C*               20   C65480-MM0-COLA-CODE        PIC X(3).               C5E00650
035415C*               20   C65480-MM0-COLA-VALUE       PIC S9(13)     COMP-3.C5E00660
035416C*               20   C65480-MM0-COLA-REVAL-DATE  PIC S9(7)      COMP-3.C5E00670
035417C*      *                                                                 C5E00680
035418C*           15   C65480-MM0-INT-RENEWAL-INFO.                            C5E00690
035419C*               20   C65480-MM0-INT-TERM         PIC S9(3)      COMP-3.C5E00700
035420C*               20   C65480-MM0-INT-ADJ-DATE     PIC S9(7)      COMP-3.C5E00710
035421C*               20   C65480-MM0-INT-ADJ-AMT      PIC S9(7)V99   COMP-3.C5E00720
035422C*               20   C65480-MM0-INT-RENEW-DATE   PIC S9(7)      COMP-3.C5E00730
035423C*               20   C65480-MM0-INT-RENEW-DATE-LAST PIC S9(7)   COMP-3.C5E00740
035424C*               20   C65480-MM0-RENEW-AMT-LAST   PIC S9(13)V99  COMP-3.C5E00750
035425C*      *                                                                 C5E00760
```

```
035426C*        15  C65480-MM0-LN-STATUS-INFO.                              C5E00770
035427C*            20  C65480-MM0-LN-STATUS          PIC X(2).             C5E00780
035428C*            20  C65480-MM0-RESTRAINED-IND     PIC X.                C5E00790
035429C*    *                                                               C5E00800
035430C*        15  C65480-MM0-MESSAGES-INFO.                               C5E00810
035431C*            20  C65480-MM0-LN-MESSAGE-INFO.                         C5E00820
035432C*                25  C65480-MM0-LN-MSG-IND     OCCURS 9 TIMES        C5E00830
035433C*                                              PIC X.                C5E00840
035434C*            20  C65480-MM0-BR-MSG-LEVEL-INFO.                       C5E00850
035435C*                25  C65480-MM0-BR-MSG-LEVEL   OCCURS 9 TIMES        C5E00860
035436C*                                              PIC X.                C5E00870
035437C*            20  C65480-MM0-BR-MSG-HI-LEVEL    PIC X.                C5E00880
035438C*            20  C65480-MM0-DIARY-MSG-DUE-DATE PIC S9(7)   COMP-3.C5E00890
035439C*    *                                                               C5E00900
035440C*        15  C65480-MM0-INT-RATE-INFO.                               C5E00910
035441C*            20  C65480-MM0-MR-OCCUR-IND       PIC 9.                C5E00920
035442C*            20  C65480-MM0-RATE-EFF-DATE-C    PIC S9(7)   COMP-3.C5E00930
035443C*            20  C65480-MM0-RATE-EFF-DATE-B    PIC S9(8)   COMP.   C5E00940
035444C*            20  C65480-MM0-INT-RULE           PIC X(2).             C5E00950
035445C*            20  C65480-MM0-INT-RATE-MULT      PIC S9V9(6) COMP-3.C5E00960
035446C*            20  C65480-MM0-INT-RATE-ADDN      PIC S9V9(8) COMP-3.C5E00970
035447C*    *                                                               C5E00980
035448C*        15  C65480-MM0-BACKDATE-INFO.                               C5E00990
035449C*            20  C65480-MM0-BKD-CREA-DATE      PIC S9(7)   COMP-3.C5E01000
035450C*            20  C65480-MM0-BKD-OS-BAL         PIC S9(13)V99 COMP-3.C5E01010
035451C*            20  C65480-MM0-BKD-INT-COL        PIC S9(11)V99 COMP-3.C5E01020
035452C*            20  C65480-MM0-BKD-INT-RATE       PIC S9V9(8) COMP-3.C5E01030
035453C*            20  C65480-MM0-BKD-INT-EARN-LIPDD PIC S9(11)V99 COMP-3.C5E01040
035454C*    *                                                               C5E01050
035455C*        15  C65480-MM0-PYMT-INFO.                                   C5E01060
035456C*            20  C65480-MM0-PYMT-CHG-TYPE      PIC X.                C5E01070

035457C*            20  C65480-MM0-PYMT-CHG-BANK      PIC 9(3).             C5E01080
035458C*            20  C65480-MM0-PYMT-CHG-TRANSIT   PIC 9(5).             C5E01090
035459C*            20  C65480-MM0-PYMT-CHG-ACCT      PIC 9(7).             C5E01100
035460C*            20  C65480-MM0-PYMT-CHG-SYST      PIC X.                C5E01110
035461C*            20  C65480-MM0-PYMT-FREQ          PIC X(2).             C5E01120
035462C*            20  C65480-MM0-PYMT-DUE-DATE      PIC S9(7)   COMP-3.C5E01130
035463C*            20  C65480-MM0-PYMT-DUE-DATE-DELAY PIC S9(7)  COMP-3.C5E01140
035464C*            20  C65480-MM0-PYMT-AMT-MULT      PIC S9V99   COMP-3.C5E01150
035465C*            20  C65480-MM0-PYMT-AMT-MIN       PIC S9(13)V99 COMP-3.C5E01160
035466C*            20  C65480-MM0-PYMT-AMT-REG REDEFINES                   C5E01170
035467C*                C65480-MM0-PYMT-AMT-MIN       PIC S9(13)V99 COMP-3.C5E01180
035468C*            20  C65480-MM0-PYMT-AMT-PARTIAL   PIC S9(13)V99 COMP-3.C5E01190
035469C*            20  C65480-MM0-PYMT-TO-SKIP       PIC S9      COMP-3.C5E01200
035470C*    *                                                               C5E01210
035471C*        15  C65480-MM0-INT-INFO.                                    C5E01220
035472C*            20  C65480-MM0-INT-METHOD         PIC X(2).             C5E01230
035473C*            20  C65480-MM0-INT-CAP-IND        PIC X.                C5E01240
035474C*            20  C65480-MM0-LICD               PIC S9(7)   COMP-3.C5E01250
035475C*            20  C65480-MM0-INT-COL            PIC S9(11)V99 COMP-3.C5E01260
035476C*            20  C65480-MM0-INT-COL-YTD-CAL    PIC S9(9)V99  COMP-3.C5E01270
035477C*            20  C65480-MM0-INT-EARN           PIC S9(11)V9(7)       C5E01280
035478C*                                                            COMP-3.C5E01290
035479C*            20  C65480-MM0-INT-EARN-MAX       PIC S9(7)V99  COMP-3.C5E01300
035480C*            20  C65480-MM0-LIPDD              PIC S9(7)     COMP-3.C5E01310
035481C*            20  C65480-MM0-INT-EARN-LIPDD     PIC S9(11)V99 COMP-3.C5E01320
035482C*    *                                                               C5E01330
035483C*        15  C65480-MM0-OS-BAL-INFO.                                 C5E01340
035484C*            20  C65480-MM0-OS-BAL             PIC S9(13)V99 COMP-3.C5E01350
035485C*            20  C65480-MM0-OS-BAL-REDUCED-DATE PIC S9(7)    COMP-3.C5E01360
035486C*    *                                                               C5E01370
035487C*        15  C65480-MM0-OS-BAL-STATS.                                C5E01380
035488C*            20  C65480-MM0-OS-BAL-HI          PIC S9(13)  COMP-3.C5E01390
035489C*            20  C65480-MM0-OS-BAL-LO          PIC S9(13)  COMP-3.C5E01400
035490C*            20  C65480-MM0-OS-BAL-HI-DATE     PIC S9(7)   COMP-3.C5E01410
035491C*            20  C65480-MM0-OS-BAL-LO-DATE     PIC S9(7)   COMP-3.C5E01420
035492C*            20  FILLER                        PIC X(18).            C5E01430
035493C*            20  C65480-MM0-OS-BAL-ACCUM-M     PIC S9(15)  COMP-3.C5E01440
035494C*            20  C65480-MM0-OS-BAL-DATE-ACCUM  PIC S9(7)   COMP-3.C5E01450
035495C*            20  FILLER                        PIC X(24).            C5E01460
035496C*    *                                                               C5E01470
035497C*        15  C65480-MM0-PYMT-STATS.                                  C5E01480
035498C*            20  C65480-MM0-DATE-LAST-PYMT     PIC S9(7)   COMP-3.C5E01490
035499C*            20  C65480-MM0-PYMT-TOT-RECVD     PIC S9(5)   COMP-3.C5E01500
035500C*            20  C65480-MM0-PYMT-TOT-SKIPPED   PIC S9(3)   COMP-3.C5E01510
035501C*            20  C65480-MM0-PYMT-TOT-DELAYED   PIC S9(3)   COMP-3.C5E01520
035502C*            20  C65480-MM0-PYMT-TOT-WAIVED    PIC S9(3)   COMP-3.C5E01530
035503C*    *                                                               C5E01540
035504C*        15  C65480-MM0-DLQ-INFO.                                    C5E01550
035505C*            20  C65480-MM0-DLQ-CTR-LT-15      PIC S9(3)   COMP-3.C5E01560
035506C*            20  C65480-MM0-DLQ-TOT-DAYS-LT-15 PIC S9(3)   COMP-3.C5E01570
035507C*            20  C65480-MM0-DLQ-START-DATE     PIC S9(7)   COMP-3.C5E01580
035508C*            20  C65480-MM0-IO-UNC-INT-ST-DATE PIC S9(7)   COMP-3.C5E01590
035509C*    *                                                               C5E01600
035510C*        15  C65480-MM0-RETURNED-ITEMS.                              C5E01610

035511C*            20  C65480-MM0-PYMT-RETRY-CTR     PIC S9      COMP-3.C5E01620
035512C*            20  C65480-MM0-IO-PYMT-RETRY-CTR  PIC S9      COMP-3.C5E01630
035513C*    *                                                               C5E01640
035514C*        15  C65480-MM0-REPORTING-INFO.                              C5E01650
035515C*            20  C65480-MM0-DET-STMT-FREQ      PIC X(2).             C5E01660
035516C*            20  C65480-MM0-DET-STMT-DUE-DATE  PIC S9(7)   COMP-3.C5E01670
035517C*            20  C65480-MM0-DET-STMT-DATE-PREV PIC S9(7)   COMP-3.C5E01680
035518C*            20  C65480-MM0-SUM-INT-COL        PIC S9(11)V99 COMP-3.C5E01690
035519C*            20  C65480-MM0-SUM-INT-EARN-LIPDD PIC S9(11)V99 COMP-3.C5E01700
035520C*            20  C65480-MM0-SUM-OS-BAL         PIC S9(13)V99 COMP-3.C5E01710
035521C*            20  C65480-MM0-SUM-TOT-DISB       PIC S9(13)V99 COMP-3.C5E01720
035522C*            20  C65480-MM0-INH-SUM-STMT-IND   PIC X.                C5E01730
```

```
035523C            20   C65480-MM0-DLQ-ADVICE-IND-1    PIC X.                C5E01740
035524C*           20   C65480-MM0-DLQ-ADVICE-IND-2    PIC X.                C5E01750
035525C*           20   C65480-MM0-DLQ-ADVICE-IND-3    PIC X.                C5E01760
035526C*      *                                                              C5E01770
035527C*           15   C65480-MM0-MISC-INFO.                                C5E01780
035528C*           20   C65480-MM0-BANK-CODE-FIELD     PIC X(16).            C5E01790
035529C*           20   C65480-MM0-BUS-SEG-CODE        PIC XXX.              C5E01800
035530C*           20   C65480-MM0-REN-RED-RATE-IND    PIC X.                C5E01810
035531C*           20   FILLER                         PIC X(20).            C5E01820
035532C*           20   C65480-MM0-FEE-EXIST-IND       PIC X.                C5E01830
035533C*           20   C65480-MM0-LN-PLAN-DTL         PIC XX.               C5E01840
035534C*           20   C65480-MM0-LN-ACTIVATE-DATE    PIC S9(7)   COMP-3.   C5E01850
035535C*           20   C65480-MM0-IO-PYMT-DUE-DATE    PIC S9(7)   COMP-3.   C5E01860
035536C*           20   C65480-MM0-FILLER-DATE-1       PIC S9(7)   COMP-3.   C5E01870
035537C*           20   C65480-MM0-FILLER-DATE-2       PIC S9(7)   COMP-3.   C5E01880
035538C*           20   C65480-MM0-FILLER-DATE-3       PIC S9(7)   COMP-3.   C5E01890
035539C*           20   FILLER                         PIC X(85).            C5E01900
035540C*           20   C65480-MM0-RESI-EXIST-IND      PIC X.                C5E01910
035541C*           20   C65480-MM0-SIN                 PIC S9(9)   COMP-3.   C5E01920

035543**021600 COPY C5E65483.                                                LSE02160
035544C*      *  DATA GROUP   65483                                          C5E00010
035545C*      *  WORK MASTER ACCOUNT LOAN INFORMATION                        C5E00020
035546C*      *  THIS IS THE FUTURE DATA SEGMENT OF LOANS DB                 C5E00030
035547C*      *  SEGMENT KEY IS "I   " - FOR INSURANCE INFO                  C5E00040
035548C*      *  SEGMENT KEY IS "F   " - FOR FEES INFO                       C5E00050
035549C*      *  SEGMENT KEY IS "A   " - FOR AUGMENT INFO                    C5E00060
035550CA      *  SEGMENT KEY IS "R   " - FOR RESIDUAL INFO                   C5E00070
035551C*      *                            REVISION DATE - 84/05/17 BY JL    C5E00080
035552C*      *                                                              C5E00090
035553C*      01 C5E65483.                                                   C5E00100
035554C*      *                                                              C5E00110
035555C*           05   C65483-MM3-ACTION              PIC XX.               C5E00120
035556C*           05   C65483-MM3-RESULT              PIC XX.               C5E00130
035557C*      *                                                              C5E00140
035558C*           05   C65483-MM3-FUTURE-SEG.                               C5E00150
035559C*           10   C65483-MM3-FUTURE-KEY.                               C5E00160
035560C*           15   C65483-MM3-SEG-KEY             PIC X(5).             C5E00170
035561C*      *                                                              C5E00180
035562C*      *                                                              C5E00190
035563C*      *              "I  " - FOR INSURANCE                           C5E00200
035564C*      *                                                              C5E00210
035565C*      *                                                              C5E00220
035566C*           10   C65483-MM3-FUTURE-DATA-I.                            C5E00230
035567C*      *                                                              C5E00240
035568C*           15   C65483-MM3-INS-INFO.                                 C5E00250
035569C*           20   C65483-MM3-INS-LIMIT           PIC S9(9)   COMP-3.   C5E00260
035570C*           20   C65483-MM3-INS-COL-METHOD      PIC X.                C5E00270
035571C*           20   C65483-MM3-INS-RISK-TYPE       PIC X.                C5E00280
035572C*           20   C65483-MM3-INS-EARN            PIC S9(7)V99 COMP-3.  C5E00290
035573C*           20   C65483-MM3-INS-COL             PIC S9(7)V99 COMP-3.  C5E00300
035574C*           20   FILLER                         PIC X(28).            C5E00310
035575C*      *                                                              C5E00320
035576C*      *                                                              C5E00330
035577C*      *              "F  " - FOR FEES                                C5E00340
035578C*      *                                                              C5E00350
035579C*      *                                                              C5E00360
035580C*           10   C65483-MM3-FUTURE-DATA-F REDEFINES                   C5E00370
035581C*                     C65483-MM3-FUTURE-DATA-I.                       C5E00380
035582C*      *                                                              C5E00390
035583C*           15   C65483-MM3-FEES-INFO.                                C5E00400
035584C*           20   C65483-MM3-FEE-EARN            PIC S9(9)V99 COMP-3.  C5E00410
035585C*           20   C65483-MM3-FEE-COL             PIC S9(9)V99 COMP-3.  C5E00420
035586C*           20   FILLER                         PIC X(33).            C5E00430
035587C*      *                                                              C5E00440
035588C*      *                                                              C5E00450
035589C*      *              "A  " - FOR AUGMENT INFO                       C5E00460
035590C*      *                                                              C5E00470
035591C*      *                                                              C5E00480
035592C*           10   C65483-MM3-FUTURE-DATA-A REDEFINES                   C5E00490
035593C*                     C65483-MM3-FUTURE-DATA-I.                       C5E00500
035594C*      *                                                              C5E00510
035595C*           15   C65483-MM3-AUG-INFO.                                 C5E00520
035596C*           20   C65483-MM3-TOT-DISB            PIC S9(13)V99 COMP-3. C5E00530

035597C*           20   C65483-MM3-AUG-DATE-LAST       PIC S9(7)   COMP-3.   C5E00540
035598C*           20   C65483-MM3-SCHD-AUG-AMT        PIC S9(13)V99 COMP-3. C5E00550
035599C*           20   C65483-MM3-SCHD-AUG-DUE-DATE   PIC S9(7)   COMP-3.   C5E00560
035600C*           20   FILLER                         PIC X(21).            C5E00570
035601C*      *                                                              C5E00580
035602C*      *                                                              C5E00590
035603C*      *              "R  " - FOR RESIDUAL INFO                      C5E00600
035604C*      *                                                              C5E00610
035605C*      *                                                              C5E00620
035606C*           10   C65483-MM3-FUTURE-DATA-R REDEFINES                   C5E00630
035607C*                     C65483-MM3-FUTURE-DATA-I.                       C5E00640
035608C*      *                                                              C5E00650
035609C*           15   C65483-MM3-RESIDUAL-INFO.                            C5E00660
035610C*           20   C65483-MM3-RESI-DATE           PIC S9(7)   COMP-3.   C5E00670
035611C*           20   C65483-MM3-RESI-ORIG-PRICE     PIC S9(9)V99 COMP-3.  C5E00680
035612C*           20   C65483-MM3-RESI-AMT            PIC S9(9)V99 COMP-3.  C5E00690
035613C*           20   C65483-MM3-SERIAL-NO           PIC X(18).            C5E00700
035614C*           20   FILLER                         PIC X(11).            C5E00710

035616**021800 PROCEDURE DIVISION USING TRANSACTION-CONTROL-BLOCK            LSE02180
035617**021900                  C5E51601                                     LSE02190
035618**022000                  C5E51609                                     LSE02200
```

```
035619**022100                     C3J60110                              LSE02210
035620**022200                     C9H61205                              LSE02220
035621**022300                     C9H61230                              LSE02230
035622**022400                     C3J61232                              LSE02240
035623**022500                     C9H61441                              LSE02250
035624**022600                     C3J62008                              LSE02260
035625**022700                     C3J62010                              LSE02270
035626**022800                     C3J62011                              LSE02280
035627**022900                     C3J62080                              LSE02290
035628**023000                     C9H62081                              LSE02300
035629**023100                     C9H62301                              LSE02310
035630**023200                     C9H62302                              LSE02320
035631**023300                     C9H62307                              LSE02330
035632**023400                     C9H64000                              LSE02340
035633**023500                     C9H64232                              LSE02350
035634**023600                     C3J65000                              LSE02360
035635**023700                     C3J65003                              LSE02370
035636**023800                     C3J65110                              LSE02380
035637**023900                     C3J65150                              LSE02390
035638**024000                     C3J65250                              LSE02400
035639**024100                     C3J65251                              LSE02410
035640**024200                     C3J65252                              LSE02420
035641**024300                     C3J65253                              LSE02430
035642**024400                     C3J65254                              LSE02440
035643**024500                     C5E65440                              LSE02450
035644**024600                     C5E65443                              LSE02460
035645**024700                     C5E65480                              LSE02470
035646**024800                     C5E65483.                             LSE02480
     67

035648**025000*****************************************                 LSE02500
035649**025100*                                        *                 LSE02510
035650**025200*       MAIN-LINE PROCESSING             *                 LSE02520
035651**025300*                                        *                 LSE02530
035652**025400*****************************************                 LSE02540
035653**025500*                                                          LSE02550
035654**025600 0000-MAINLINE.                                            LSE02560
035655**025700*                                                          LSE02570
035656**025800     PERFORM 1000-ALLOCATE-DG-51601     THRU 1000-EXIT.LSE02580
035657**025900*                                                          LSE02590
035658**026000     PERFORM 2000-DEBLOCK-INPUT-MAP     THRU 2000-EXIT.LSE02600
035659**026100*                                                          LSE02610
035660**026200     PERFORM 3000-INIT-ONE-ONLINE       THRU 3000-EXIT.LSE02620
035661**026300*                                                          LSE02630
035662**026400     PERFORM 4000-INIT-ONLINE-TRANS     THRU 4000-EXIT.LSE02640
035663**026500*                                                          LSE02650
035664**026600     IF C65150-TL-ACCEPT                                   LSE02660
035665**026700       PERFORM 5000-EDITS-INDEPENDENT-OF-LN THRU 5000-EXIT LSE02670
035666**026800       IF C65150-TL-ACCEPT                                 LSE02680
035667**026900         PERFORM 5100-VERIFY-LOAN-PRESENCE THRU 5100-EXIT LSE02690
035668**027000         IF C65150-TL-ACCEPT                               LSE02700
035669**027100           PERFORM 5200-VALIDATE-TRAN-EFF-DATE THRU 5200-EXIT LSE02710
035670**027200           IF C65150-TL-ACCEPT                             LSE02720
035671**027300             PERFORM 5300-VERIFY-LOAN-STATUS THRU 5300-EXIT LSE02730
035672**027400             IF C65150-TL-ACCEPT                           LSE02740
035673**027500               PERFORM 5400-VERIFY-BBCL-FIELDS             LSE02750
035674**027600                                        THRU 5400-EXIT LSE02760
035675**027700               IF C65150-TL-ACCEPT                         LSE02770
035676**027800                 PERFORM 6000-PROCESS-CLOSE-INQUIRY        LSE02780
035677**027900                                        THRU 6000-EXIT.LSE02790
035678**028000*                                                          LSE02800
035679**028100     PERFORM 7000-LOG-TRANSACTION       THRU 7000-EXIT.LSE02810
035680**028200*                                                          LSE02820
035681**028300     PERFORM 8000-DISPLAY-CLOSE-INQUIRY THRU 8000-EXIT.LSE02830
035682**028400*                                                          LSE02840
035683**028500*    TESTING INFORMATION                                   LSE02850
035684**028600*    _____                                   LSE02860
035685**028700*                                                          LSE02870
035686**028800*    MOVE 0230                          TO TCB-TRANS-NO.   LSE02880
035687**028900*    MOVE CA-PEM-TRANS-DUMP-RETURN      TO TCB-ACTIVITY.   LSE02890
035688**029000*    PERFORM 9000-CALL-PEM              THRU 9000-EXIT.    LSE02900
035689**029100*                                                          LSE02910
035690**029200*    _____                                   LSE02920
035691**029300*                                                          LSE02930
035692**029400     MOVE CA-PEM-END-PROG               TO TCB-ACTIVITY.   LSE02940
035693**029500     PERFORM 9000-CALL-PEM              THRU 9000-EXIT.    LSE02950
035694**029600     STOP RUN.                                             LSE02960
035695**029700*                                                          LSE02970
035696**029800 0000-EXIT.                                                LSE02980
035697**029900     EXIT.                                                 LSE02990
     68

035699**030100 1000-ALLOCATE-DG-51601.                                   LSE03010
035700**030200*                                                          LSE03020
035701**030300     MOVE MS1-ACTIVITY-51601            TO TCB-ACTIVITY.   LSE03030
035702**030400     PERFORM 9000-CALL-PEM              THRU 9000-EXIT.    LSE03040
035703**030500*                                                          LSE03050
035704**030600 1000-EXIT.                                                LSE03060
035705**030700     EXIT.                                                 LSE03070
     69

035707**030900*                                                          LSE03090
035708**031000 2000-DEBLOCK-INPUT-MAP.                                   LSE03100
035709**031100*                                                          LSE03110
035710**031200     MOVE MS1-ACTIVITY-51603            TO TCB-ACTIVITY.   LSE03120
035711**031300     PERFORM 9000-CALL-PEM              THRU 9000-EXIT.    LSE03130
035712**031400*                                                          LSE03140
035713**031500     MOVE C51601-TRAN-TRANSIT-LN  TO C65252-TRAN-TRANSIT-LN. LSE03150
035714**031600     MOVE C51601-BACKDATE-CODE   TO T230-TRAN-BACKDATE-CODE-X. LSE03160
035715**031700     MOVE C51601-CLOSE-DATE-MM   TO T230-TRAN-CLOSING-DATE-MM. LSE03170
```

```
035716**031800      MOVE C51601-CLOSE-DATE-DD      TO T230-TRAN-CLOSING-DATE-DD.    L5E03180
035717**031900      MOVE C51601-CLOSE-DATE-YY      TO T230-TRAN-CLOSING-DATE-YY.    L5E03190
035718**032000      MOVE C51601-ODOMETER-READING TO T230-TRAN-ODOMETER-READING-X.   L5E03200
035719**032100*                                                                    L5E03210
035720**032200  2000-EXIT.                                                         L5E03220
035721**032300      EXIT.                                                          L5E03230
    70

035723**032500  3000-INIT-ONE-ONLINE.                                              L5E03250
035724**032600*                                                                    L5E03260
035725**032700      MOVE MS1-ACTIVITY-62045        TO TCB-ACTIVITY.                 L5E03270
035726**032800      PERFORM 9000-CALL-PEM          THRU 9000-EXIT.                  L5E03280
035727**032900*                                                                    L5E03290
035728**033000  3000-EXIT.                                                         L5E03300
035729**033100      EXIT.                                                          L5E03310
    71

035731**033300  4000-INIT-ONLINE-TRANS.                                            L5E03330
035732**033400*                                                                    L5E03340
035733**033500      MOVE MS2-ONLINE                TO TCB-SOURCE-TYPE-N.            L5E03350
035734**033600*                                                                    L5E03360
035735**033700      MOVE MS1-ACTIVITY-62050        TO TCB-ACTIVITY.                 L5E03370
035736**033800      PERFORM 9000-CALL-PEM          THRU 9000-EXIT.                  L5E03380
035737**033900*                                                                    L5E03390
035738**034000  4000-EXIT.                                                         L5E03400
035739**034100      EXIT.                                                          L5E03410
    72

035741**034300  5000-EDITS-INDEPENDENT-OF-LM.                                      L5E03430
035742**034400*                                                                    L5E03440
035743**034500      PERFORM 5010-VERIFY-CORR-IND           THRU 5010-EXIT.         L5E03450
035744**034600      PERFORM 5020-EDIT-ACCT-LN-NO           THRU 5020-EXIT.         L5E03460
035745**034700      PERFORM 5030-VAL-BKD-CODE-CLOSING-DATE THRU 5030-EXIT.         L5E03470
035746**034800      PERFORM 5040-VERIFY-ODOMETER-READING   THRU 5040-EXIT.         L5E03480
035747**034900*                                                                    L5E03490
035748**035000*                                                                    L5E03500
035749**035100  5000-EXIT.                                                         L5E03510
035750**035200      EXIT.                                                          L5E03520
    73

035752**035400  5010-VERIFY-CORR-IND.                                              L5E03540
035753**035500*                                                                    L5E03550
035754**035600      IF C65251-CORRECTION-IND       = 'C'                            L5E03560
035755**035700          MOVE 827                   TO C65003-INPUT-ERROR            L5E03570
    035800          PERFORM 8600-REJECT-RTN        THRU 8600-EXIT.                  L5E03580
    035900*                                                                         L5E03590
    036000  5010-EXIT.                                                              L5E03600
    036100      EXIT.                                                               L5E03610
    74

036300  5020-EDIT-ACCT-LN-NO.                                                   L5E03630
    036400*                                                                         L5E03640
    036500      MOVE C65251-ACCT-NO-X         TO C61205-ACCT-NO-X.                  L5E03650
    036600      MOVE C65251-LN-NO-X           TO C61205-LOAN-NO-X.                  L5E03660
    036700      MOVE C65251-CORRECTION-IND    TO C61205-CORRECTION.                 L5E03670
    036800      MOVE 'M'                      TO C61205-REG-ACCT-MAND-IND           L5E03680
    036900                                       C61205-CORR-ACCT-MAND-IND          L5E03690
    037000                                       C61205-REG-LOAN-MAND-IND           L5E03700
    037100                                       C61205-CORR-LOAN-MAND-IND.         L5E03710
    037200      MOVE '00'                     TO C61205-ACTION.                     L5E03720
    037300*                                                                         L5E03730
    037400      MOVE MS1-ACTIVITY-61205       TO TCB-ACTIVITY.                      L5E03740
    037500      PERFORM 9000-CALL-PEM         THRU 9000-EXIT.                       L5E03750
    037600*                                                                         L5E03760
    037700  5020-EXIT.                                                              L5E03770
    037800      EXIT.                                                               L5E03780
    75

038000  5030-VAL-BKD-CODE-CLOSING-DATE.                                         L5E03800
    038100*                                                                         L5E03810
    038200      IF T230-TRAN-BACKDATE-CODE-X    NOT = HIGH-VALUES AND               L5E03820
    038300         T230-TRAN-CLOSING-DATE-X     NOT = HIGH-VALUES                   L5E03830
    038400          MOVE 269                     TO C65003-INPUT-ERROR              L5E03840
    038500          PERFORM 8600-REJECT-RTN                THRU 8600-EXIT           L5E03850
    038600      ELSE                                                                L5E03860
    038700          IF T230-TRAN-BACKDATE-CODE-X    = HIGH-VALUES AND               L5E03870
    038800             T230-TRAN-CLOSING-DATE-X     = HIGH-VALUES                   L5E03880
    038900              MOVE '1'                 TO C51609-MS-TRAN-BKD-CODE         L5E03890
    039000              MOVE C62080-TRAN-BUS-DAY TO C51609-MS-TRAN-EFF-DATE         L5E03900
    039100          ELSE                                                            L5E03910
    039200              IF T230-TRAN-BACKDATE-CODE-X = HIGH-VALUES                  L5E03920
    039300                  PERFORM 5032-VAL-CLOSING-DATE    THRU 5032-EXIT         L5E03930
    039400              ELSE                                                        L5E03940
    039500                  PERFORM 5034-VAL-BACKDATE-CODE   THRU 5034-EXIT.        L5E03950
    039600*                                                                         L5E03960
    039700*                                                                         L5E03970
    039800  5030-EXIT.                                                              L5E03980
    039900      EXIT.                                                               L5E03990

040100  5032-VAL-CLOSING-DATE.                                                  L5E04010
    040200*                                                                         L5E04020
    040300      MOVE T230-TRAN-CLOSING-DATE-X    TO C61232-INPUT-DATE-X.            L5E04030
    040400      MOVE C65251-CORRECTION-IND      TO C61232-CORRECTION.              L5E04040
    040500      MOVE '0'                         TO C61232-REG-MAND-IND.            L5E04050
```

```
040600          MOVE 'O'                        TO  C61232-CORR-MAND-IND.    L5E04060
040700          MOVE 'N'                        TO  C61232-SPEC-EDIT-IND.    L5E04070
040800          MOVE 002                        TO  C61232-FIELD-NO.         L5E04080
040900*                                                                      L5E04090
041000          MOVE MS1-ACTIVITY-61232         TO  TCB-ACTIVITY.            L5E04100
041100          PERFORM 9000-CALL-PEM         THRU  9000-EXIT.               L5E04110
041200*                                                                      L5E04120
041300          IF C65150-TL-ACCEPT                                          L5E04130
041400              MOVE C61232-OUT-CENTURY     TO  T230-TRAN-CLOSING-DATE-C L5E04140
041500              MOVE T230-TRAN-CLOSING-DATE TO  C51609-HS-TRAN-EFF-DATE. L5E04150
041600                                                                      L5E04160
041700          MOVE '1'                        TO  C51609-HS-TRAN-BKD-CODE. L5E04170
041800*                                                                      L5E04180
041900      5032-EXIT.                                                      L5E04190
042000          EXIT.                                                       L5E04200

042200      5034-VAL-BACKDATE-CODE.                                         L5E04220
042300*                                                                      L5E04230
042400          MOVE T230-TRAN-BACKDATE-CODE-X  TO  C61230-BACKDATE-CODE.    L5E04240
042500          MOVE 'N'                        TO  C61230-CORRECTION.       L5E04250
042600          MOVE 'O'                        TO  C61230-REG-MAND-IND.     L5E04260
042700          MOVE 'O'                        TO  C61230-CORR-MAND-IND.    L5E04270
042800          MOVE 001                        TO  C61230-FIELD-NO.         L5E04280
042900*                                                                      L5E04290
043000          MOVE MS1-ACTIVITY-61230         TO  TCB-ACTIVITY.            L5E04300
043100          PERFORM 9000-CALL-PEM         THRU  9000-EXIT.               L5E04310
043200*                                                                      L5E04320
043300          IF C65150-TL-ACCEPT                                          L5E04330
043400              MOVE C61230-OUTPUT-FIELD-AREA-X                          L5E04340
043500                                          TO  C51609-HS-TRAN-BKD-CODE  L5E04350
043600              IF C51609-HS-TRAN-BKD-CODE   =  '1'                      L5E04360
043700                  MOVE C62080-TRAN-BUS-DAY                             L5E04370
043800                                          TO  C51609-HS-TRAN-EFF-DATE  L5E04380
043900              ELSE                                                     L5E04390
044000                  MOVE C62080-BR-BUS-DAY-BACK                          L5E04400
044100                                          TO  C51609-HS-TRAN-EFF-DATE. L5E04410
044200*                                                                      L5E04420
044300      5034-EXIT.                                                      L5E04430
044400          EXIT.                                                       L5E04440

044600      5040-VERIFY-ODOMETER-READING.                                   L5E04460
044700*                                                                      L5E04470
044800          IF T230-TRAN-ODOMETER-READING-X  NOT =  HIGH-VALUES          L5E04480
044900              IF T230-TRAN-ODOMETER-READING-X  NOT  NUMERIC            L5E04490
045000                  MOVE 803                TO  C65003-INPUT-ERROR       L5E04500
045100                  PERFORM 8600-REJECT-RTN THRU  8600-EXIT.             L5E04510
045200*                                                                      L5E04520
045300*                                                                      L5E04530
045400      5040-EXIT.                                                      L5E04540
045500          EXIT.                                                       L5E04550

045700      5100-VERIFY-LOAN-PRESENCE.                                      L5E04570
045800*                                                                      L5E04580
045900          MOVE DGA-READ-KEY-EQ            TO  C65440-RMO-ACTION.       L5E04590
046000          MOVE C65251-ACCT-NO             TO  C65440-RMO-ACCT-NO.      L5E04600
046100          MOVE C65251-LN-NO               TO  C65440-RMO-LN-NO.        L5E04610
046200*                                                                      L5E04620
046300          MOVE MS1-ACTIVITY-60078         TO  TCB-ACTIVITY.            L5E04630
046400          PERFORM 9000-CALL-PEM         THRU  9000-EXIT.               L5E04640
046500*                                                                      L5E04650
046600          IF C65480-MMO-RESULT           NOT =  DGR-OK                 L5E04660
046700              MOVE 099                    TO  C65003-INPUT-ERROR       L5E04670
046800              PERFORM 8600-REJECT-RTN   THRU  8600-EXIT.               L5E04680
046900*                                                                      L5E04690
047000      5100-EXIT.                                                      L5E04700
047100          EXIT                                                        L5E04710

047300*                                                                      L5E04730
047400      5200-VALIDATE-TRAN-EFF-DATE.                                    L5E04740
047500*                                                                      L5E04750
047600          IF C51609-HS-TRAN-EFF-DATE     =  C65480-MMO-LICD    OR      L5E04760
047700                                         >  C65480-MMO-LICD            L5E04770
047800              MOVE C51609-HS-TRAN-EFF-DATE                             L5E04780
047900                                          TO  C61441-IN-TRAN-EFF-DATE  L5E04790
048000              MOVE SPACES                                              L5E04800
048100                                          TO  C61441-IN-REV-TRAN-BUS-DATE-X L5E04810
048200              MOVE C65480-MMO-ISSUE-DATE  TO  C61441-IN-ISSUE-DATE     L5E04820
048300                                                                      L5E04830
048400              MOVE MS1-ACTIVITY-61441     TO  TCB-ACTIVITY             L5E04840
048500              PERFORM 9000-CALL-PEM     THRU  9000-EXIT                L5E04850
048600          ELSE                                                        L5E04860
048700              MOVE 013                    TO  C65003-INPUT-ERROR       L5E04870
048800              PERFORM 8600-REJECT-RTN   THRU  8600-EXIT.               L5E04880
048900*                                                                      L5E04890
049000      5200-EXIT.                                                      L5E04900
049100          EXIT.                                                       L5E04910

049300      5300-VERIFY-LOAN-STATUS.                                        L5E04930
049400*                                                                      L5E04940
049500          IF C65480-MMO-LN-STATUS        =  '03'          OR           L5E04950
049600                                         =  '04'          OR           L5E04960
049700                                         =  '05'                       L5E04970
049800              NEXT SENTENCE                                            L5E04980
049900          ELSE                                                        L5E04990
```

```
050000        MOVE 089                    TO C65003-INPUT-ERROR       LSE05000
050100        PERFORM 5310-GET-LNSTATUS-VARIABLE    THRU 5310-EXIT    LSE05010
050200        PERFORM 8600-REJECT-RTN              THRU 8600-EXIT.   LSE05020
050300*                                                               LSE05030
050400 5300-EXIT.                                                     LSE05040
050500        EXIT.                                                   LSE05050

050700 5310-GET-LNSTATUS-VARIABLE.                                    LSE05070
050800*                                                               LSE05080
050900        PERFORM 5320-DUMMY-ROUTINE   THRU 5320-EXIT             LSE05090
051000            VARYING T230-HS-INDEX    FROM 1 BY 1                LSE05100
051100            UNTIL   T230-HS-INDEX    > 15           OR          LSE05110
051200            C65480-HM0-LN-STATUS = LNSTATUS-CODE (T230-HS-INDEX). LSE05120
051300*                                                               LSE05130
051400        IF C65480-HM0-LN-STATUS  = LNSTATUS-CODE (T230-HS-INDEX) LSE05140
051500            IF C62081-BV01-BR-LANG-CODE    = '1'                LSE05150
051600                MOVE LNSTATUS-DESC-E (T230-HS-INDEX)            LSE05160
051700                                    TO C65003-ERROR-VAR-1       LSE05170
051800            ELSE                                                LSE05180
051900                MOVE LNSTATUS-DESC-F (T230-HS-INDEX)            LSE05190
052000                                    TO C65003-ERROR-VAR-1.      LSE05200
052100*                                                               LSE05210
052200 5310-EXIT.                                                     LSE05220
052300        EXIT.                                                   LSE05230

052500 5320-DUMMY-ROUTINE.                                            LSE05250
052600*                                                               LSE05260
052700****************** FOR T230-HS-INDEX ******************         LSE05270
052800*                                                               LSE05280
052900*                                                               LSE05290
053000 5320-EXIT.                                                     LSE05300
053100        EXIT.                                                   LSE05310

053300 5400-VERIFY-BBCL-FIELDS.                                       LSE05330
053400*                                                               LSE05340
053500        IF T230-TRAN-ODOMETER-READING-X   NOT = HIGH-VALUES     LSE05350
053600            IF C65480-HM0-RESI-EXIST-IND     = 'Y'              LSE05360
053700                NEXT SENTENCE                                   LSE05370
053800            ELSE                                                LSE05380
053900                MOVE 803              TO C65003-INPUT-ERROR     LSE05390
054000                PERFORM 8600-REJECT-RTN    THRU 8600-EXIT.      LSE05400
054100*                                                               LSE05410
054200 5400-EXIT.                                                     LSE05420
054300        EXIT.                                                   LSE05430

054500 6000-PROCESS-CLOSE-INQUIRY.                                    LSE05450
054600*                                                               LSE05460
054700        MOVE ZEROS                  TO C51609-HS-NET-CAP.       LSE05470
054800*                                                               LSE05480
054900        PERFORM 6100-DETERMINE-OS-BAL-NET-CAP    THRU 6100-EXIT.LSE05490
055000*                                                               LSE05500
055100        PERFORM 6200-CALCULATE-CLOSING-INT       THRU 6200-EXIT.LSE05510
055200*                                                               LSE05520
055300        PERFORM 6300-DET-AMORT-TERM-REMAINING    THRU 6300-EXIT.LSE05530
055400*                                                               LSE05540
055500        PERFORM 6400-DETERMINE-LOAN-DESC         THRU 6400-EXIT.LSE05550
055600*                                                               LSE05560
055700        PERFORM 6500-DETERMINE-CLOSING-AMT       THRU 6500-EXIT.LSE05570
055800*                                                               LSE05580
055900        PERFORM 6600-DET-PER-DIEM-INT-AMOUNT     THRU 6600-EXIT.LSE05590
056000*                                                               LSE05600
056100        PERFORM 6700-CALC-EXCESS-BBCL-CHARGE     THRU 6700-EXIT.LSE05610
056200*                                                               LSE05620
056300 6000-EXIT.                                                     LSE05630
056400        EXIT.                                                   LSE05640

056600 6100-DETERMINE-OS-BAL-NET-CAP.                                 LSE05660
056700*                                                               LSE05670
056800        MOVE C65480-HM0-OS-BAL        TO  C51609-HS-OS-BAL.     LSE05680
056900*                                                               LSE05690
057000        IF C65480-HM0-INT-CAP-IND       = '2'                   LSE05700
057100*                                                               LSE05710
057200            COMPUTE C51609-HS-NET-CAP  = 0 -                    LSE05720
057300            (C65480-HM0-INT-EARN-LIPDD + C65480-HM0-INT-COL)    LSE05730
057400                                                                LSE05740
057500            COMPUTE C51609-HS-OS-BAL  = C65480-HM0-OS-BAL +     LSE05750
057600                (0                    - C51609-HS-NET-CAP).     LSE05760
057700*                                                               LSE05770
057800*                                                               LSE05780
057900 6100-EXIT.                                                     LSE05790
058000        EXIT.                                                   LSE05800

058200 6200-CALCULATE-CLOSING-INT.                                    LSE05820
058300*                                                               LSE05830
058400        MOVE 'I'                    TO C62302-UPD-INQ-IND.      LSE05840
058500        MOVE C51609-HS-TRAN-EFF-DATE TO C62302-END-DATE.        LSE05850
058600*                                                               LSE05860
058700        MOVE HS1-ACTIVITY-62302     TO TCB-ACTIVITY.            LSE05870
058800        PERFORM 9000-CALL-PEM       THRU 9000-EXIT.             LSE05880
058900*                                                               LSE05890
059000        IF C65480-HM0-LICD          < C51609-HS-TRAN-EFF-DATE   LSE05900
```

```
059100         PERFORM 6210-UPDATE-INTEREST   THRU 6210-EXIT.        LSE05910
059200*                                                              LSE05920
059300         MOVE C65480-MMO-INT-EARN       TO C62307-IN-INT-RESULT. LSE05930
059400         MOVE MS1-ACTIVITY-62307        TO TCB-ACTIVITY.        LSE05940
059500         PERFORM 9000-CALL-PEM          THRU 9000-EXIT.         LSE05950
059600         MOVE C62307-OUT-INT-RESULT     TO C51609-MS-INT-EARN.  LSE05960
059700*                                                              LSE05970
059800         PERFORM 6220-VERIFY-INT-EARN   THRU 6220-EXIT.         LSE05980
059900*                                                              LSE05990
060000 6200-EXIT.                                                    LSE06000
060100     EXIT.                                                     LSE06010

060300 6210-UPDATE-INTEREST.                                         LSE06030
060400*                                                              LSE06040
060500         MOVE C65480-MMO-LICD           TO C62301-START-DATE.  LSE06050
060600         MOVE C51609-MS-TRAN-EFF-DATE   TO C62301-END-DATE.    LSE06060
060700         MOVE SPACES                    TO C62301-BASE-RATE-AT-START-IND.LSE06070
060800         MOVE C62080-TRAN-BUS-DAY       TO C62301-TRAN-BUS-DAY. LSE06080
060900         MOVE C51609-MS-OS-BAL          TO C62301-OS-BAL.      LSE06090
061000         MOVE C62302-MEMO-RATE-SPREAD-TABLE                    LSE06100
061100                                        TO C62301-RATE-SPREAD-TABLE.LSE06110
061200         MOVE MS1-ACTIVITY-62301        TO TCB-ACTIVITY.       LSE06120
061300         PERFORM 9000-CALL-PEM          THRU 9000-EXIT.        LSE06130
061400*                                                              LSE06140
061500         ADD C62301-INT-RESULT          TO C65480-MMO-INT-EARN. LSE06150
061600         MOVE C51609-MS-TRAN-EFF-DATE   TO C65480-MMO-LICD.    LSE06160
061700*                                                              LSE06170
061800*                                                              LSE06180
061900 6210-EXIT.                                                    LSE06190
062000     EXIT.                                                     LSE06200

062200 6220-VERIFY-INT-EARN.                                         LSE06220
062300*                                                              LSE06230
062400         MOVE DRI-GET-RULE              TO C60110-ACTION.      LSE06240
062500         MOVE 'APPLV01'                 TO C60110-DAILY-RULE-ID. LSE06250
062600         MOVE MS1-DATAGROUP-65110       TO C60110-DATA-GROUP-NO. LSE06260
062700         MOVE C62080-APPL-CODE          TO C60110-QUALIFIER.   LSE06270
062800*                                                              LSE06280
062900         MOVE MS1-ACTIVITY-60110        TO TCB-ACTIVITY.       LSE06290
063000         PERFORM 9000-CALL-PEM          THRU 9000-EXIT.        LSE06300
063100*                                                              LSE06310
063200         IF C60110-RESULT               NOT = DRI-OK           LSE06320
063300             MOVE '900'                 TO C65000-USER-ABEND-CODE LSE06330
063400             MOVE 'DAILY RULE ERROR'    TO C65000-ABEND-MESSAGE LSE06340
063500             PERFORM 9900-SYSTEM-ABEND  THRU 9900-EXIT.        LSE06350
063600*                                                              LSE06360
063700         IF (0 - C51609-MS-INT-EARN)    < APPLV01-INT-MIN-CHG-AMT LSE06370
063800             COMPUTE C51609-MS-INT-EARN = (0 -                 LSE06380
063900                                          APPLV01-INT-MIN-CHG-AMT). LSE06390
064000*                                                              LSE06400
064100         IF C65480-MMO-INT-EARN-MAX     NOT = 0 -              LSE06410
064200             IF (0 - C51609-MS-INT-EARN) > (0 -                LSE06420
064300                                           C65480-MMO-INT-EARN-MAX) LSE06430
064400                 MOVE C65480-MMO-INT-EARN-MAX                  LSE06440
064500                                        TO C51609-MS-INT-EARN. LSE06450
064600*                                                              LSE06460
064700         COMPUTE C51609-MS-INT-TO-DATE  = 0 - (C51609-MS-INT-EARN + LSE06470
064800                                          C65480-MMO-INT-COL). LSE06480
064900*                                                              LSE06490
065000 6220-EXIT.                                                    LSE06500
065100     EXIT.                                                     LSE06510

065300 6300-DET-AMORT-TERM-REMAINING.                                LSE06530
065400*                                                              LSE06540
065500         IF C65480-MMO-AMORT-TERM-ORG   = 0                    LSE06550
065600             MOVE ' N/A'                TO C51609-MS-TERM-REMAININGLSE06560
065700         ELSE                                                  LSE06570
065800             PERFORM 6310-SET-START-DATE THRU 6310-EXIT        LSE06580
065900             MOVE C51609-MS-TRAN-EFF-DATE TO C62010-END-DATE   LSE06590
066000             MOVE '04'                  TO C62010-FREQUENCY    LSE06600
066100*                                                              LSE06610
066200             MOVE MS1-ACTIVITY-62010    TO TCB-ACTIVITY        LSE06620
066300             PERFORM 9000-CALL-PEM      THRU 9000-EXIT         LSE06630
066400*                                                              LSE06640
066500             COMPUTE C51609-MS-TERM-REMAIN =                   LSE06650
066600                 (C65480-MMO-AMORT-TERM-ORG - C62010-NO-OF-PERIOD) LSE06660
066700*                                                              LSE06670
066800*        EDIT TERM-REMAINING FIELD FOR DISPLAY PURPOSES.       LSE06680
066900*                                                              LSE06690
067000             IF C51609-MS-TERM-REMAIN-1 NOT = 0                LSE06700
067100                 NEXT SENTENCE                                 LSE06710
067200             ELSE                                              LSE06720
067300                 MOVE SPACES            TO C51609-MS-TERM-REMAIN-1 LSE06730
067400                 IF C51609-MS-TERM-REMAIN-2 NOT = 0            LSE06740
067500                     NEXT SENTENCE                             LSE06750
067600                 ELSE                                          LSE06760
067700                     MOVE SPACES        TO C51609-MS-TERM-REMAIN-2 LSE06770
067800                     IF C51609-MS-TERM-REMAIN-3 NOT = 0        LSE06780
067900                         NEXT SENTENCE                         LSE06790
068000                     ELSE                                      LSE06800
068100                         MOVE SPACES    TO C51609-MS-TERM-REMAIN-3 LSE06810
068200                         IF C51609-MS-TERM-REMAIN-4 NOT = 0    LSE06820
068300                             NEXT SENTENCE                     LSE06830
068400                         ELSE                                  LSE06840
068500                             MOVE SPACES TO C51609-MS-TERM-REMAIN-4. LSE06850
068600*                                                              LSE06860
068700 6300-EXIT.                                                    LSE06870
068800     EXIT.                                                     LSE06880
```

```
069000 6310-SET-START-DATE.                                              LSE06900
069100*                                                                  LSE06910
069200      IF C65480-MM0-INT-ADJ-DATE       = MS2-DATE-NINES            LSE06920
069300         MOVE C65480-MM0-ISSUE-DATE   TO  C62010-START-DATE        LSE06930
069400      ELSE                                                         LSE06940
069500         MOVE C65480-MM0-INT-ADJ-DATE TO  C62010-START-DATE.       LSE06950
069600*                                                                  LSE06960
069700*                                                                  LSE06970
069800 6310-EXIT.                                                        LSE06980
069900      EXIT.                                                        LSE06990

070100 6400-DETERMINE-LOAN-DESC.                                         LSE07010
070200*                                                                  LSE07020
070300      MOVE DRI-GET-RULE               TO C60110-ACTION.            LSE07030
070400      MOVE 'LNDESC01'                 TO C60110-DAILY-RULE-ID.     LSE07040
070500      MOVE C65480-MM0-LN-DESC         TO C60110-QUALIFIER.         LSE07050
070600*                                                                  LSE07060
070700      MOVE MS1-ACTIVITY-60110         TO TCB-ACTIVITY.             LSE07070
070800      PERFORM 9000-CALL-PEM           THRU 9000-EXIT.              LSE07080
070900*                                                                  LSE07090
071000      IF C60110-RESULT                NOT = DRI-OK                 LSE07100
071100         MOVE '900'                   TO C65000-USER-ABEND-CODE    LSE07110
071200         MOVE 'DR LNDESC01 NOT FOUND' TO C65000-ABEND-MESSAGE      LSE07120
071300         PERFORM 9900-SYSTEM-ABEND    THRU 9900-EXIT               LSE07130
071400      ELSE                                                         LSE07140
071500         IF C62081-BV01-BR-LANG-CODE = '1'                         LSE07150
071600            MOVE LNDESC01-DESC-ENG TO C51609-MS-LOAN-DESCRIPTION   LSE07160
071700         ELSE                                                      LSE07170
071800            MOVE LNDESC01-DESC-FR  TO C51609-MS-LOAN-DESCRIPTION.  LSE07180
071900*                                                                  LSE07190
072000 6400-EXIT.                                                        LSE07200
072100      EXIT.                                                        LSE07210

072300 6500-DETERMINE-CLOSING-AMT.                                       LSE07230
072400*                                                                  LSE07240
072500      COMPUTE C51609-MS-CLOSING-AMOUNT = (0 - C65480-MM0-OS-BAL).  LSE07250
072600*                                                                  LSE07260
072700      COMPUTE C51609-MS-CLOSING-AMOUNT = C51609-MS-CLOSING-AMOUNT  LSE07270
072800                                       + C51609-MS-INT-TO-DATE.    LSE07280
072900*                                                                  LSE07290
073000 6500-EXIT.                                                        LSE07300
073100      EXIT.                                                        LSE07310

073300 6600-DET-PER-DIEM-INT-AMOUNT.                                     LSE07330
073400*                                                                  LSE07340
073500      MOVE C51609-MS-TRAN-EFF-DATE    TO C62011-START-DATE.        LSE07350
073600      MOVE 10                         TO C62011-FREQUENCY.         LSE07360
073700      MOVE 1                          TO C62011-NO-OF-PERIOD.      LSE07370
073800*                                                                  LSE07380
073900      MOVE MS1-ACTIVITY-62011         TO TCB-ACTIVITY.             LSE07390
074000      PERFORM 9000-CALL-PEM           THRU 9000-EXIT.              LSE07400
074100*                                                                  LSE07410
074200      MOVE C62011-END-DATE            TO C62301-END-DATE.          LSE07420
074300      MOVE C51609-MS-TRAN-EFF-DATE    TO C62301-START-DATE.        LSE07430
074400      MOVE C51609-MS-OS-BAL           TO C62301-OS-BAL.            LSE07440
074500      MOVE C62080-TRAN-BUS-DAY        TO C62301-TRAN-BUS-DAY.      LSE07450
074600      MOVE SPACES              TO C62301-BASE-RATE-AT-START-IND.   LSE07460
074700      MOVE C62302-MEMO-RATE-SPREAD-TABLE                           LSE07470
074800                               TO C62301-RATE-SPREAD-TABLE.        LSE07480
074900      MOVE MS1-ACTIVITY-62301         TO TCB-ACTIVITY.             LSE07490
075000      PERFORM 9000-CALL-PEM           THRU 9000-EXIT.              LSE07500
075100*                                                                  LSE07510
075200      MOVE C62301-INT-RESULT          TO C62307-IN-INT-RESULT.     LSE07520
075300      MOVE MS1-ACTIVITY-62307         TO TCB-ACTIVITY.             LSE07530
075400      PERFORM 9000-CALL-PEM           THRU 9000-EXIT.              LSE07540
075500*                                                                  LSE07550
075600      MOVE C62307-OUT-INT-RESULT      TO C51609-MS-PER-DIEM-INT.   LSE07560
075700*                                                                  LSE07570
075800*                                                                  LSE07580
075900 6600-EXIT.                                                        LSE07590
076000      EXIT.                                                        LSE07600

076200 6700-CALC-EXCESS-BBCL-CHARGE.                                     LSE07620
076300                                                                   LSE07630
076301**    **                                                           LSE07640
076302**    **     PROGRAM LINES 76500 TO 76600 PERFORM THE FUNCTION DEPICTED LSE07650
076303**    **  BY BLOCK 110, FIGURE 5 OF THE BUSINESS SYSTEM FLOW CHART  LSE07660
076304**    **  PATENT APPLICATION. THE MAXIMUM ALLOWABLE KILOMETERS A    LSE07670
076305**    **  CLIENT MAY DRIVE PRIOR TO ANY CHARGES BEING ASSESSED IS NOW LSE07680
076306**    **  COMPUTED. CURRENT BANK POLICY ALLOWS A CLIENT 24,000 KILO- LSE07690
076307**    **  METERS PER YEAR.                                          LSE07700
076308**    **                                                            LSE07710
076309**    **     WHEN MULTIPLIED BY THE OPTION TERM APPLICABLE TO A BUY LSE07720
076310**    **  BACK CAR LOAN, BEING ONE OF THREE OR FOUR YEARS, THE RESULT LSE07730
076311**    **  IS A TOTAL MAXIMUM ALLOWABLE KILOMETERS OF 72,000 OR 96,000 LSE07740
076312**    **  ABOVE WHICH A CLIENT WOULD PAY EXCESS CHARGES. THE OPTION LSE07750
076313**    **  TERM IS DEFINED TO THE SYSTEM AS THE ORIGINAL AMORTIZATION LSE07760
076314**    **  TERM IN MONTHS.                                           LSE07770
076315**    **                                                            LSE07780
076316**                                                                  LSE07790
        076400      IF T230-TRAN-ODOMETER-READING-X      NOT = HIGH-VALUES LSE07800
```

```
076500          COMPUTE T230-MS-ALLOWED-KILO        =           L5E07810
076600              ((C65480-MM0-AMORT-TERM-ORG / 12) * 24000)  L5E07820
076700          PERFORM 6710-SET-EXCESS-KILO-CHARGE THRU 6710-EXIT. L5E07830
076800*                                                         L5E07840
076900  6700-EXIT.                                              L5E07850
077000      EXIT.                                               L5E07860

077200  6710-SET-EXCESS-KILO-CHARGE.                    L5E07880
        077300                                                  L5E07890
077301**    **                                                  L5E07900
077302**    **      PROGRAM LINES 77400 TO 78600 PERFORM THE FUNCTIONS DEPICTED L5E07910
077303**    **  BY BLOCKS 120 AND 130, FIGURE 5 OF THE BUSINESS SYSTEM FLOW L5E07920
077304**    **  CHART PATENT APPLICATION. THE EXCESS KILOMETERS DRIVEN BY L5E07930
077305**    **  THE CLIENT WHERE APPLICABLE, ARE COMPUTED BY SUBTRACTING L5E07940
077306**    **  THE MAXIMUM ALLOWED KILOMETERS FROM THE ODOMETER READING. L5E07950
077307**    **                                                  L5E07960
077308**                                                        L5E07970
        077400      IF T230-TRAN-ODOMETER-READING   = T230-MS-ALLOWED-KILO  OR L5E07980
        077500                                      < T230-MS-ALLOWED-KILO L5E07990
        077600          MOVE 0                      TO T230-MS-EXCESS-KILO-CHARGE L5E08000
        077700      ELSE                                        L5E08010
        077800          MOVE DGA-READ-KEY-EQ        TO C65443-RM3-ACTION L5E08020
        077900          MOVE 'R'                    TO C65443-RM3-SEG-KEY L5E08030
        078000          MOVE MS1-ACTIVITY-60079     TO TCB-ACTIVITY L5E08040
        078100          PERFORM 9000-CALL-PEM       THRU 9000-EXIT L5E08050
        078200*                                                 L5E08060
        078300          IF C65483-MM3-RESULT        NOT = DGR-OK L5E08070
        078400              MOVE '928'              TO C65000-USER-ABEND-CODE L5E08080
        078500              MOVE 'LNS MASTER DB ERROR' TO C65000-ABEND-MESSAGE L5E08090
        078600              PERFORM 9900-SYSTEM-ABEND   THRU 9900-EXIT L5E08100
        078700          ELSE                                    L5E08110
078701**    **                                                  L5E08120
078702**    **      PROGRAM LINES 78800 TO 79400 DETERMINE THE ACTUAL CHARGES L5E08130
078703**    **  ASSESSED TO THE CLIENT, DEPICTED BY BLOCKS 140, 170, AND L5E08140
078704**    **  180, FIGURE 5 OF THE BUSINESS FLOW CHART. IF THE CAR STICKER L5E08150
078705**    **  PRICE IS LESS THAN $18,000, REPRESENTED AS "MS2-COMPARISON- L5E08160
078706**    **  PARAMETER" IN THE PROGRAM, CHARGES ARE COMPUTED ON THE BASIS L5E08170
078707**    **  OF $0.04 PER EXCESS KILOMETER. IF THE CAR STICKER PRICE IS L5E08180
078708**    **  GREATER THAN OR EQUAL TO $18,000 THE CHARGES ARE COMPUTED L5E08190
078709**    **  ON THE BASIS OF $0.07 PER EXCESS KILOMETER.    L5E08200
078710**    **                                                  L5E08210
078711**                                                        L5E08220
        078800              IF C65483-MM3-RESI-ORIG-PRICE       L5E08230
        078900                      < MS2-COMPARISON-PARAMETER L5E08240
        079000                  COMPUTE T230-MS-EXCESS-KILO-CHARGE = 0.04 * L5E08250
        079100                  (T230-TRAN-ODOMETER-READING - T230-MS-ALLOWED-KILO) L5E08260
        079200              ELSE                                L5E08270
        079300                  COMPUTE T230-MS-EXCESS-KILO-CHARGE = 0.07 * L5E08280
        079400                  (T230-TRAN-ODOMETER-READING - T230-MS-ALLOWED-KILO). L5E08290
        079500*                                                 L5E08300
        079600  6710-EXIT.                                      L5E08310
        079700      EXIT.                                       L5E08320

079900  7000-LOG-TRANSACTION.                           L5E08340
        080000*                                                 L5E08350
        080100      MOVE '1'                        TO C65150-TL-LOG-RECORD-CODE. L5E08360
        080200      MOVE ZEROS                      TO C64232-ACTION. L5E08370
        080300      MOVE 'I'                        TO C64232-TRAN-TYPE. L5E08380
        080400      MOVE '0'                        TO C64232-LOG-IND. L5E08390
        080500      MOVE 'Y'                        TO C64232-FILL-COMMON-IND. L5E08400
        080600*                                                 L5E08410
        080700      MOVE MS1-ACTIVITY-64232         TO TCB-ACTIVITY. L5E08420
        080800      PERFORM 9000-CALL-PEM           THRU 9000-EXIT. L5E08430
        080900*                                                 L5E08440
        081000  7000-EXIT.                                      L5E08450
        081100      EXIT.                                       L5E08460

081300  8000-DISPLAY-CLOSE-INQUIRY.                     L5E08480
        081400*                                                 L5E08490
        081500      PERFORM 8100-SET-UP-BASIC-SCREEN-INFO    THRU 8100-EXIT. L5E08500
        081600*                                                 L5E08510
        081700      MOVE 'N'                        TO C65254-CLEAR-SCREEN-IND. L5E08520
        081800*                                                 L5E08530
        081900      IF C65150-TL-ACCEPT                         L5E08540
        082000          PERFORM 8200-DISPLAY-BASIC-SCREEN    THRU 8200-EXIT L5E08550
        082100          IF T230-TRAN-ODOMETER-READING-X = HIGH-VALUES L5E08560
        082200              MOVE 'L'                TO C64202-CALL-TYPE-IND L5E08570
        082300              PERFORM 8300-DISPLAY-SECOND-SCREEN THRU 8300-EXIT L5E08580
        082400          ELSE                                    L5E08590
        082500              PERFORM 8300-DISPLAY-SECOND-SCREEN THRU 8300-EXIT L5E08600
        082600              PERFORM 8400-DISPLAY-BBCL-SCREEN  THRU 8400-EXIT L5E08610
        082700      ELSE                                        L5E08620
        082800          PERFORM 8500-SET-REJECT-SCREEN       THRU 8500-EXIT. L5E08630
        082900*                                                 L5E08640
        083000  8000-EXIT.                                      L5E08650
        083100      EXIT.                                       L5E08660

083300  8100-SET-UP-BASIC-SCREEN-INFO.                  L5E08680
        083400*                                                 L5E08690
        083500      PERFORM 8110-SET-TRAN-DATE-AND-TIME     THRU 8110-EXIT. L5E08700
        083600      PERFORM 8120-SET-ACCT-LN-LNOFF-SHNAME   THRU 8120-EXIT. L5E08710
        083700      PERFORM 8130-SET-RESTIND-LNCURR-LNSTAT  THRU 8130-EXIT. L5E08720
        083800*                                                 L5E08730
        083900      MOVE 'N'                        TO C65254-CLEAR-SCREEN-IND. L5E08740
        084000*                                                 L5E08750
```

```
084100*                                                             L5E08760
084200 8100-EXIT.                                                   L5E08770
084300      EXIT.                                                   L5E08780

084500 8110-SET-TRAN-DATE-AND-TIME.                                 L5E08800
084600*                                                             L5E08810
084700      MOVE C65150-TL-LOCALENTRY-DATE TO C62008-CALENDAR-DATE. L5E08820
084800      MOVE MS1-ACTIVITY-62008       TO  TCB-ACTIVITY.         L5E08830
084900      PERFORM 9000-CALL-PEM        THRU 9000-EXIT.            L5E08840
085000      MOVE C62008-DATE-DISPLAY-FORMAT                         L5E08850
085100                                  TO C51609-MS-BRANCH-PROC-DATE. L5E08860
085200*                                                             L5E08870
085300      MOVE C65150-TL-LOCALENTRY-TIME TO C51609-MS-TIME-WORKAREA. L5E08880
085400      MOVE C51609-MS-TIME-HH       TO C51609-MS-SYS-TIME-DISP-HH. L5E08890
085500      MOVE C51609-MS-TIME-MM       TO C51609-MS-SYS-TIME-DISP-MM. L5E08900
085600      MOVE C51609-MS-TIME-SS       TO C51609-MS-SYS-TIME-DISP-SS. L5E08910
085700      MOVE ':'                     TO C51609-MS-SYS-COLON1.   L5E08920
085800      MOVE ':'                     TO C51609-MS-SYS-COLON2.   L5E08930
085900*                                                             L5E08940
086000*                                                             L5E08950
086100 8110-EXIT.                                                   L5E08960
086200      EXIT.                                                   L5E08970

086400 8120-SET-ACCT-LN-LNOFF-SHNAME.                               L5E08990
086500*                                                             L5E09000
086600      MOVE C65480-MM0-ACCT-NO      TO C51609-MS-ACCT-NO.      L5E09010
086700      MOVE '-'                     TO C51609-MS-ACCT-LN-DASH. L5E09020
086800      MOVE C65480-MM0-LN-NO        TO C51609-MS-LN-NO.        L5E09030
086900*                                                             L5E09040
087000      MOVE C65480-MM0-LN-OFFICER-NO TO C51609-MS-LN-OFFICER-NO. L5E09050
087100*                                                             L5E09060
087200      MOVE C65480-MM0-SHORTNAME    TO C51609-MS-SHORTNAME.    L5E09070
087300*                                                             L5E09080
087400*                                                             L5E09090
087500 8120-EXIT.                                                   L5E09100
087600      EXIT.                                                   L5E09110

087800 8130-SET-RESTIND-LNCURR-LNSTAT.                              L5E09130
087900*                                                             L5E09140
088000      IF C65480-MM0-RESTRAINED-IND  = '1'                     L5E09150
088100          MOVE '/R'                TO C51609-MS-RESTRAINED-IND L5E09160
088200      ELSE                                                    L5E09170
088300          MOVE SPACES              TO C51609-MS-RESTRAINED-IND. L5E09180
088400*                                                             L5E09190
088500      IF C65480-MM0-CURRENCY        = '1'                     L5E09200
088600          MOVE SPACES              TO C51609-MS-LOAN-CURRENCY L5E09210
088700      ELSE                                                    L5E09220
088800          MOVE 'U'                 TO C51609-MS-LOAN-CURRENCY. L5E09230
088900*                                                             L5E09240
089000      PERFORM 8131-DUMMY-ROUTINE   THRU 8131-EXIT             L5E09250
089100          VARYING T230-MS-INDEX    FROM 1 BY 1                L5E09260
089200          UNTIL T230-MS-INDEX      > 15              OR       L5E09270
089300          C65480-MM0-LN-STATUS     = LNSTATUS-CODE (T230-MS-INDEX). L5E09280
089400*                                                             L5E09290
089500      IF C65480-MM0-LN-STATUS      = LNSTATUS-CODE (T230-MS-INDEX) L5E09300
089600          IF C62081-BV01-BR-LANG-CODE = '1'                   L5E09310
089700              MOVE LNSTATUS-LIT-E (T230-MS-INDEX)             L5E09320
089800                                  TO C51609-MS-LOAN-STATUS    L5E09330
089900          ELSE                                                L5E09340
090000              MOVE LNSTATUS-LIT-F (T230-MS-INDEX)             L5E09350
090100                                  TO C51609-MS-LOAN-STATUS.   L5E09360
090200*                                                             L5E09370
090300 8130-EXIT.                                                   L5E09380
090400      EXIT.                                                   L5E09390

090600 8131-DUMMY-ROUTINE.                                          L5E09410
090700*                                                             L5E09420
090800*****************   FOR T230-MS-INDEX  ********************   L5E09430
090900*                                                             L5E09440
091000 8131-EXIT.                                                   L5E09450
091100      EXIT.                                                   L5E09460

091300 8200-DISPLAY-BASIC-SCREEN.                                   L5E09480
091400*                                                             L5E09490
091500      MOVE MS1-ACTIVITY-64122      TO C64000-DISPLAY-ACTIVITY-E. L5E09500
091600      MOVE MS1-ACTIVITY-64124      TO C64000-DISPLAY-ACTIVITY-F. L5E09510
091700      MOVE 'N'                     TO C64000-CALL-TYPE-IND.   L5E09520
091800      MOVE 'Y'                     TO C64000-PRINT-LN-MESS-IND L5E09530
091900                                      C64000-PRINT-BRCH-MESS-IND. L5E09540
092000*                                                             L5E09550
092100      IF C65251-PRINT-REQUEST       = 'P'                     L5E09560
092200          MOVE '0'                 TO C65253-DISPLAY-CLASS    L5E09570
092300          MOVE '1'                 TO C65253-PRINT-CLASS      L5E09580
092400      ELSE                                                    L5E09590
092500          MOVE 'A'                 TO C65253-DISPLAY-CLASS    L5E09600
092600          MOVE '0'                 TO C65253-PRINT-CLASS.     L5E09610
092700*                                                             L5E09620
092800      MOVE MS1-ACTIVITY-64000      TO TCB-ACTIVITY.           L5E09630
092900      PERFORM 9000-CALL-PEM        THRU 9000-EXIT.            L5E09640
093000*                                                             L5E09650
093100 8200-EXIT.                                                   L5E09660
093200      EXIT.                                                   L5E09670
```

```
093400 8300-DISPLAY-SECOND-SCREEN.                                      L5E09690
093500*                                                                 L5E09700
093600     PERFORM 8310-SET-PYMT-DUE-DATE       THRU 8310-EXIT.         L5E09710
093700*                                                                 L5E09720
093800     MOVE 'N'                   TO C64000-PRINT-LN-MESS-IND       L5E09730
093900                                   C64000-PRINT-BRCH-MESS-IND.    L5E09740
094000                                                                  L5E09750
094100     MOVE MS1-ACTIVITY-64123    TO C64000-DISPLAY-ACTIVITY-E.     L5E09760
094200     MOVE MS1-ACTIVITY-64125    TO C64000-DISPLAY-ACTIVITY-F.     L5E09770
094300*                                                                 L5E09780
094400     MOVE MS1-ACTIVITY-64000    TO TCB-ACTIVITY.                  L5E09790
094500     PERFORM 9000-CALL-PEM      THRU 9000-EXIT.                   L5E09800
094600*                                                                 L5E09810
094700 8300-EXIT.                                                       L5E09820
094800     EXIT.                                                        L5E09830

095000 8310-SET-PYMT-DUE-DATE.                                          L5E09850
095100*                                                                 L5E09860
095200     IF C65480-MMO-PYMT-DUE-DATE    = MS2-DATE-NINES               L5E09870
095300         MOVE '    N/A'          TO C51609-MS-PYMT-DUE-DATE       L5E09880
095400     ELSE                                                         L5E09890
095500         MOVE C65480-MMO-PYMT-DUE-DATE TO C62008-CALENDAR-DATE    L5E09900
095600         MOVE MS1-ACTIVITY-62008        TO TCB-ACTIVITY           L5E09910
095700         PERFORM 9000-CALL-PEM          THRU 9000-EXIT            L5E09920
095800         MOVE C62008-DATE-DISPLAY-FORMAT                          L5E09930
095900                                 TO C51609-MS-PYMT-DUE-DATE.      L5E09940
096000*                                                                 L5E09950
096100 8310-EXIT.                                                       L5E09960
096200     EXIT.                                                        L5E09970

096400 8400-DISPLAY-BBCL-SCREEN.                                        L5E09990
096500*                                                                 L5E10000
096600     MOVE T230-MS-EXCESS-KILO-CHARGE                              L5E10010
096700                                TO C51609-MS-EXCESS-KILO-CHARGE.  L5E10020
096800*                                                                 L5E10030
096900     MOVE 'L'                   TO C64000-CALL-TYPE-IND.          L5E10040
097000*                                                                 L5E10050
097100     MOVE MS1-ACTIVITY-64130    TO C64000-DISPLAY-ACTIVITY-E.     L5E10060
097200     MOVE MS1-ACTIVITY-64131    TO C64000-DISPLAY-ACTIVITY-F.     L5E10070
097300*                                                                 L5E10080
097400     MOVE MS1-ACTIVITY-64000    TO TCB-ACTIVITY.                  L5E10090
097500     PERFORM 9000-CALL-PEM      THRU 9000-EXIT.                   L5E10100
097600*                                                                 L5E10110
097700 8400-EXIT.                                                       L5E10120
097800     EXIT.                                                        L5E10130

098000 8500-SET-REJECT-SCREEN.                                          L5E10150
098100*                                                                 L5E10160
098200     MOVE 'L'                   TO C64000-CALL-TYPE-IND.          L5E10170
098300     MOVE 'N'                   TO C64000-PRINT-LN-MESS-IND.      L5E10180
098400     MOVE 'N'                   TO C64000-PRINT-BRCH-MESS-IND.    L5E10190
098500*                                                                 L5E10200
098600     MOVE '0'                   TO C65253-PRINT-CLASS.            L5E10210
098700     MOVE 'A'                   TO C65253-DISPLAY-CLASS.          L5E10220
098800*                                                                 L5E10230
098900     MOVE MS1-ACTIVITY-64000    TO TCB-ACTIVITY.                  L5E10240
099000     PERFORM 9000-CALL-PEM      THRU 9000-EXIT.                   L5E10250
099100*                                                                 L5E10260
099200 8500-EXIT.                                                       L5E10270
099300     EXIT.                                                        L5E10280

099500 8600-REJECT-RTN.                                                 L5E10300
099600*                                                                 L5E10310
099700     MOVE MS1-ACTIVITY-65003    TO TCB-ACTIVITY.                  L5E10320
099800     PERFORM 9000-CALL-PEM      THRU 9000-EXIT.                   L5E10330
099900*                                                                 L5E10340
100000 8600-EXIT.                                                       L5E10350
100100     EXIT.                                                        L5E10360

100300*****************************************************
100400*                                                    *
100500*       GENERAL CALL TO HOGAN                        *
100600*                                                    *
100700*****************************************************

100900 9000-CALL-PEM.

101100     CALL 'PEM' USING TRANSACTION-CONTROL-BLOCK.

101300 9000-EXIT.
101400     EXIT.

101600 9900-SYSTEM-ABEND.
101700*
101800     MOVE 'Y'                   TO C65000-DUMP-IND.
101900     MOVE MS1-ACTIVITY-51600    TO C65000-CALLING-ACTIVITY.
102000     MOVE MS1-ACTIVITY-65000    TO TCB-ACTIVITY.
```

```
102100      PERFORM 9000-CALL-PEM    THRU 9000-EXIT.
102200*     SKIP1
102300  9900-EXIT.
102400      EXIT.
```
111

```
                 MEMORY MAP

TGT                    00330

SAVE AREA                  00330
       SWITCH                     00378
       TALLY                      0037C
       SORT SAVE                  00380
       ENTRY-SAVE                 00384
       SORT CORE SIZE             00388
       RET CODE                   0038C
       SORT RET                   0038E
       WORKING CELLS              00390
       SORT FILE SIZE             004C0
       SORT MODE SIZE             004C4
       PGT-VN TBL                 004C8
       TGT-VN TBL                 004CC
       RESERVED                   004D0
       LENGTH OF VN TBL           004D4
       LABEL RET                  004D6
       RESERVED                   004D7
       DBG R14SAVE                004D8
       COBOL INDICATOR            004DC
       A(INIT1)                   004E0
       DEBUG TABLE PTR            004E4
       SUBCOM PTR                 004E8
       SORT-MESSAGE               004EC
       SYSOUT DDNAME              004F4
       RESERVED                   004F5
       COBOL ID                   004F6
       COMPILED POINTER           004F8
       COUNT TABLE ADDRESS        004FC
       RESERVED                   00500
       DBG R11SAVE                00508
       COUNT CHAIN ADDRESS        0050C
       PRBL1 CELL PTR             00510
       RESERVED                   00514
       TA LENGTH                  00519
       RESERVED                   0051C
       PCS LIT PTR                00524
       DEBUGGING                  00528
       CD FOR INITIAL INPUT       0052C
       OVERFLOW CELLS             00530
       BL CELLS                   00530
       DECBADR CELLS              00534
       FIB CELLS                  00534
       TEMP STORAGE               00538
       TEMP STORAGE-2             00558
       TEMP STORAGE-3             00558
       TEMP STORAGE-4             00558
       BLL CELLS                  00558
       VLC CELLS                  005E0
```

```
L5E10380
L5E10390
L5E10400     113
L5E10410
L5E10420
             PROCEDURE BLOCK ASSIGNMENT
L5E10440
             PBL = REG 11
L5E10460
             PBL =1    STARTS AT LOCATION 000AB4   STATEMENT 35616
L5E10480     PBL =2    STARTS AT LOCATION 0018FE   STATEMENT 70800
L5E10490

L5E10510
L5E10520
L5E10530
L5E10540
L5E10550
L5E10560
L5E10570
L5E10580
L5E10590
```
112

```
       SBL CELLS                  005E0
       INDEX CELLS                005E0
       SUBADR CELLS               005E0
       ONCTL CELLS                005E8
       PFMCTL CELLS               005E8
       PFMSAV CELLS               005E8
       VN CELLS                   0072C
       SAVE AREA =2               0088C
       SAVE AREA =3               0088C
       XSASM CELLS                0088C
       XSA CELLS                  0088C
       PARAM CELLS                0088C
       RPTSAV AREA                00890
       CHECKPT CTR                00890
```

```
LITERAL POOL (HEX)

00A10 (LIT+0)     F8F2F7F2  F6F9002C  001CF8F0  F3F0F9F9  F0F1F3F0  F8F90001
00A28 (LIT+24)    000FF060  00000016  00000000  0000000C  F0F4012C  24000C00
00A40 (LIT+48)    00000000  0000004C  7CF0F0F0  F5C1D7D7  D3E5F0F1  F9F0F0C4
00A58 (LIT+72)    C1C9D3E8  40D9E4D3  C540C5D9  D9D60940  40D561C1  D3D5C4C5
00A70 (LIT+96)    E2C3F0F1  C4D94D0D3 D5C4C5E2  C3F0F140  D5D6E340  C6D6E4D5
00A88 (LIT+120)   C4F1F0F9  F2F6D3D5  E240D4C1  E2E3C5D9  40C4C240  C5D9D9D6
00AA0 (LIT+144)   D961D940  40404040  40D561C1
```

```
                        PGT                  00890
              DEBUG LINKAGE AREA             00890
              OVERFLOW CELLS                 00890
              VIRTUAL CELLS                  00894
              PROCEDURE NAME CELLS           008AC
              GENERATED NAME CELLS           008AC
              DCB ADDRESS CELLS              008AC
              VNI CELLS                      008AC
              LITERALS                       00A10
              DISPLAY LITERALS               00AAC
              PROCEDURE BLOCK CELLS          00AAC

REGISTER ASSIGNMENT

REG 6      BLL =5
    REG 7      BLL =27
    REG 8      BL  =1
    REG 9      BLL =32
    REG 10     BLL =3

WORKING-STORAGE STARTS AT LOCATION 000A0 FOR A LENGTH OF 002BC.
114
```

```
                                        CONDENSED LISTING

35616  ENTRY    000AB4        35656  PERFORM  0008C4        35658  PERFORM  000BE0
35660  PERFORM  0008FC        35662  PERFORM  000C18        35664  IF       000C34
35665  PERFORM  000C44        35666  IF       000C5C        35667  PERFORM  000C6C
35668  IF       000C84        35669  PERFORM  000C94        35670  IF       000CAC
35671  PERFORM  000CBC        35672  IF       000CD4        35673  PERFORM  000CE4
35675  IF       000CFC        35676  PERFORM  000D0C        35679  PERFORM  000D24
35681  PERFORM  000D44        35692  MOVE     000D64        35693  PERFORM  000D6A
35694  STOP     000D8A        35697  EXIT     000D90        35701  MOVE     000D90
35702  PERFORM  000D96        35705  EXIT     000DB6        35710  MOVE     000DC0
35711  PERFORM  000DC6        35713  MOVE     000DE2        35714  MOVE     000DEC
35715  MOVE     000DF2        35716  MOVE     000DF8        35717  MOVE     000DFE
35718  MOVE     000E04        35721  EXIT     000E0A        35725  MOVE     000E14
35726  PERFORM  000E1A        35729  EXIT     000E36        35733  MOVE     000E40
35735  MOVE     000E46        35736  PERFORM  000E4C        35739  EXIT     000E68
35743  PERFORM  000E72        35744  PERFORM  000E8A        35745  PERFORM  000EA6
35746  PERFORM  000EC2        35750  EXIT     000EDE        35754  IF       000EE8
35755  MOVE     000EF4        35800  PERFORM  000EFE        36100  EXIT     000F1A
36500  MOVE     000F24        36600  MOVE     000F32        36700  MOVE     000F38
36800  MOVE     000F3E        37200  MOVE     000F4E        37400  MOVE     000F54
37500  PERFORM  000F5A        37800  EXIT     000F76        38200  IF       000F80
38400  MOVE     000F9A        38500  PERFORM  000FA4        38700  IF       000FC8
38900  MOVE     000FE2        39000  MOVE     000FE6        39200  IF       000FF4
39300  PERFORM  000FFC        39500  PERFORM  00101C        39900  EXIT     001034
40300  MOVE     00103E        40400  MOVE     001048        40500  MOVE     001052
40600  MOVE     001056        40700  MOVE     00105A        40800  MOVE     00105E
41000  MOVE     001064        41100  PERFORM  00106A        41300  IF       001086
41400  MOVE     001096        41500  MOVE     0010A0        41700  MOVE     0010B4
42000  EXIT     0010B8        42400  MOVE     0010BE        42500  MOVE     0010C8
42600  MOVE     0010CC        42700  MOVE     0010D0        42800  MOVE     0010D4
43000  MOVE     0010DA        43100  PERFORM  0010E0        43300  IF       0010FC
43400  MOVE     00110C        43600  IF       00111C        43700  MOVE     00111E
44000  MOVE     00112C        44400  EXIT     001136        44800  IF       00113C
44900  IF       00114E        45000  MOVE     00115C        45100  PERFORM  001166
45500  EXIT     001182        45900  MOVE     00118C        46000  MOVE     001196
46100  MOVE     0011A4        46300  MOVE     0011AE        46400  PERFORM  0011B4
46600  IF       0011D0        46700  MOVE     0011DE        46800  PERFORM  0011E8
47100  EXIT     001204        47600  IF       0012DE        47800  MOVE     001222
48000  MOVE     00122C        48200  MOVE     001236        48400  MOVE     00123C
48500  PERFORM  001242        48700  MOVE     001266        48800  PERFORM  001270
49100  EXIT     00128C        49500  IF       001296        50000  MOVE     0012B8
50100  PERFORM  0012C2        50200  PERFORM  0012DA        50500  EXIT     0012FA
50900  PERFORM  001304        51400  IF       00136A        51500  IF       001392
51600  MOVE     00139E        51900  MOVE     0013D0        52300  EXIT     0013FE
53100  EXIT     001404        53500  IF       00140A        53600  IF       00141C
53900  MOVE     001428        54000  PERFORM  001432        54300  EXIT     00144E
54700  MOVE     001458        54900  PERFORM  00145E        55100  PERFORM  001476
55300  PERFORM  001492        55500  PERFORM  0014AE        55700  PERFORM  0014CA
55900  PERFORM  0014EA        56100  PERFORM  00150A        56400  EXIT     00152A
56800  MOVE     001534        57000  IF       00153A        57200  COMPUTE  001542
57500  COMPUTE  001560        58000  EXIT     00157E        58400  MOVE     001584
58500  MOVE     00158C        58700  MOVE     001592        58800  PERFORM  001598
59000  IF       0015B4        59100  PERFORM  0015C2        59300  MOVE     0015DA
115

59400  MOVE     0015E4        59500  PERFORM  0015EA        59600  MOVE     00160A
59800  PERFORM  001614        60100  EXIT     001630        60500  MOVE     00163A
60600  MOVE     001644        60700  MOVE     00164A        60800  MOVE     00164E
60900  MOVE     001658        61000  MOVE     00165E        61200  MOVE     001668
61300  PERFORM  00166E        61500  ADD      00168A        61600  MOVE     001698
62000  EXIT     00169E        62400  MOVE     0016A8        62500  MOVE     0016B2
62600  MOVE     0016BC        62700  MOVE     0016C2        62900  MOVE     0016D6
63000  PERFORM  0016DC        63200  IF       0016F8        63300  MOVE     00170A
63400  MOVE     001714        63500  PERFORM  001724        63700  IF       001740
63800  COMPUTE  00175E        64100  IF       001770        64200  IF       00177A
```

| | | | | | | | | | |
|---|---|---|---|---|---|---|---|---|---|
| 64400 | MOVE | 00179C | 64700 | COMPUTE | 0017A2 | 65100 | EXIT | 0017C0 |
| 65500 | IF | 0017C6 | 65600 | MOVE | 0017D0 | 65800 | PERFORM | 0017DA |
| 65900 | MOVE | 0017F2 | 66000 | MOVE | 0017FC | 66200 | MOVE | 001802 |
| 66300 | PERFORM | 001808 | 66500 | COMPUTE | 001828 | 67000 | IF | 00184A |
| 67300 | MOVE | 00185A | 67400 | IF | 00185E | 67700 | MOVE | 00186A |
| 67800 | IF | 00186E | 68100 | MOVE | 00187A | 68200 | IF | 00187E |
| 68500 | MOVE | 00188A | 68800 | EXIT | 00188E | 69200 | IF | 001894 |
| 69300 | MOVE | 0018A4 | 69500 | MOVE | 0018B2 | 69900 | EXIT | 0018BC |
| 70300 | MOVE | 0018C2 | 70400 | MOVE | 0018CC | 70500 | MOVE | 0018D2 |
| 70700 | MOVE | 0018E2 | 70800 | PERFORM | 0018E8 | 71000 | IF | 001904 |
| 71100 | MOVE | 001916 | 71200 | MOVE | 001920 | 71300 | PERFORM | 001930 |
| 71500 | IF | 001950 | 71600 | MOVE | 00195C | 71800 | MOVE | 00196A |
| 72100 | EXIT | 001974 | 72500 | COMPUTE | 00197A | 72700 | COMPUTE | 00198C |
| 73100 | EXIT | 001992 | 73500 | MOVE | 001998 | 73600 | MOVE | 0019A2 |
| 73700 | MOVE | 0019A8 | 73900 | MOVE | 0019B4 | 74000 | PERFORM | 0019B4 |
| 74200 | MOVE | 0019CC | 74300 | MOVE | 0019DA | 74400 | MOVE | 0019E0 |
| 74500 | MOVE | 0019E6 | 74600 | MOVE | 0019F0 | 74700 | MOVE | 0019F4 |
| 74900 | MOVE | 0019FE | 75000 | PERFORM | 001A04 | 75200 | MOVE | 001A20 |
| 75300 | MOVE | 001A2E | 75400 | PERFORM | 001A34 | 75600 | MOVE | 001A50 |
| 76000 | EXIT | 001A5A | 76400 | IF | 001A64 | 76500 | COMPUTE | 001A76 |
| 76700 | PERFORM | 001A98 | 77000 | EXIT | 001AB0 | 77400 | IF | 001ABA |
| 77600 | MOVE | 001AE6 | 77800 | MOVE | 001AF0 | 77900 | MOVE | 001AFA |
| 78000 | MOVE | 001B08 | 78100 | PERFORM | 001B0E | 78300 | IF | 001B26 |
| 78400 | MOVE | 001B38 | 78500 | MOVE | 001B42 | 78600 | PERFORM | 001B52 |
| 78800 | IF | 001B72 | 79000 | COMPUTE | 001B86 | 79300 | COMPUTE | 001BB0 |
| 79700 | EXIT | 001BD6 | 80100 | MOVE | 001BDC | 80200 | MOVE | 001BE4 |
| 80300 | MOVE | 001BF2 | 80400 | MOVE | 001BF6 | 80500 | MOVE | 001BFA |
| 80700 | MOVE | 001BFE | 80800 | PERFORM | 001C04 | 81100 | EXIT | 001C1C |
| 81500 | PERFORM | 001C26 | 81700 | MOVE | 001C3E | 81900 | IF | 001C46 |
| 82000 | PERFORM | 001C56 | 82100 | IF | 001C6E | 82200 | MOVE | 001C84 |
| 82300 | PERFORM | 001C8C | 82500 | PERFORM | 001CAC | 82600 | PERFORM | 001CC4 |
| 82800 | PERFORM | 001CE8 | 83100 | EXIT | 001D00 | 83500 | PERFORM | 001D0A |
| 83600 | PERFORM | 001D22 | 83700 | PERFORM | 001D3E | 83900 | MOVE | 001D5A |
| 84300 | EXIT | 001D62 | 84700 | MOVE | 001D6C | 84800 | MOVE | 001D7A |
| 84900 | PERFORM | 001D80 | 85000 | MOVE | 001D98 | 85300 | MOVE | 001DA2 |
| 85400 | MOVE | 001DB0 | 85500 | MOVE | 001DBA | 85600 | MOVE | 001DC4 |
| 85700 | MOVE | 001DCE | 85800 | MOVE | 001DD2 | 86200 | EXIT | 001DD6 |
| 86600 | MOVE | 001DE0 | 86700 | MOVE | 001DEA | 86800 | MOVE | 001DEE |
| 87000 | MOVE | 001DF8 | 87200 | MOVE | 001E02 | 87600 | EXIT | 001E08 |
| 88000 | IF | 001E0E | 88100 | MOVE | 001E16 | 88300 | MOVE | 001E20 |
| 88500 | IF | 001E2A | 88600 | MOVE | 001E32 | 88800 | MOVE | 001E3A |
| 89000 | PERFORM | 001E3E | 89500 | IF | 001EA4 | 89600 | IF. | 001ECC |
| 89700 | MOVE | 001ED8 | 90000 | MOVE | 001EFC | 90400 | EXIT | 001F1C |
| 91100 | EXIT | 001F22 | 91500 | MOVE | 001F28 | 91600 | MOVE | 001F32 |

116

| | | | | | | | | | |
|---|---|---|---|---|---|---|---|---|---|
| 91700 | MOVE | 001F38 | 91800 | MOVE | 001F3C | 92100 | IF | 001F44 |
| 92200 | MOVE | 001F50 | 92300 | MOVE | 001F58 | 92500 | MOVE | 001F60 |
| 92600 | MOVE | 001F68 | 92800 | MOVE | 001F6C | 92900 | PERFORM | 001F72 |
| 93200 | EXIT | 001F8A | 93600 | PERFORM | 001F94 | 93800 | MOVE | 001FAC |
| 94100 | MOVE | 001FB8 | 94200 | MOVE | 001FBE | 94400 | MOVE | 001FC4 |
| 94500 | PERFORM | 001FCA | 94800 | EXIT | 001FE6 | 95200 | IF | 001FF0 |
| 95300 | MOVE | 002000 | 95500 | MOVE | 00200A | 95600 | MOVE | 002014 |
| 95700 | PERFORM | 00201A | 95800 | MOVE | 002032 | 96200 | EXIT | 00203C |
| 96600 | MOVE | 002046 | 96900 | MOVE | 00205C | 97100 | MOVE | 002064 |
| 97200 | MOVE | 00206A | 97400 | MOVE | 002070 | 97500 | PERFORM | 002076 |
| 97800 | EXIT | 00208E | 98200 | MOVE | 002098 | 98300 | MOVE | 0020A0 |
| 98400 | MOVE | 0020A4 | 98600 | MOVE | 0020A8 | 98700 | MOVE | 0020B0 |
| 98900 | MOVE | 0020B4 | 99000 | PERFORM | 0020BA | 99300 | EXIT | 0020D2 |
| 99700 | MOVE | 0020DC | 99800 | PERFORM | 0020E2 | 100100 | EXIT | 0020FA |
| 101100 | CALL | 002104 | 101400 | EXIT | 00212E | 101800 | MOVE | 002134 |
| 101900 | MOVE | 00213C | 102000 | MOVE | 002142 | 102100 | PERFORM | 002148 |
| 102400 | EXIT | 002160 | | | | | | |

117

*STATISTICS*  SOURCE RECORDS = 2926   DATA DIVISION STATEMENTS = 1442   PROCEDURE DIVISION STATEMENTS = 392
*OPTIONS IN EFFECT*  SIZE = 786432  BUF = 176128  LINECNT = 54  SPACE1, FLAGW, SEQ, SOURCE
*OPTIONS IN EFFECT*  NODMAP, NOPMAP, CLIST, SUPMAP, NOXREF, SXREF, LOAD, NODECK, APOST, NOTRUNC, NOFLOW
*OPTIONS IN EFFECT*  TERM, NUM, NOBATCH, NONAME, COMPILE=01, NOSTATE, NORESIDENT, NODYNAM, LIB, CSYNTAX
*OPTIONS IN EFFECT*  OPTIMIZE, NOSYMDMP, NOTEST, VERB, ZWB, SYST, NOENDJOB, NOLVL
*OPTIONS IN EFFECT*  NOLST , NOFDECK,NOCDECK, LCOL2, L120, NODUMP , NOADV , NOPRINT,
*OPTIONS IN EFFECT*  NOCOUNT, NOVBSUM, NOVBREF, LANGLVL(2)

118

CROSS-REFERENCE DICTIONARY

| DATA NAMES | DEFN | REFERENCE |
|---|---|---|
| APPLV01 | 032877 | |
| APPLV01-AC-EXPIRY-WARN-DAYS | 032922 | |
| APPLV01-ACTION | 032879 | |
| APPLV01-APPL-CUTOFF-ACTIVY-ATM | 032909 | |
| APPLV01-APPL-CUTOFF-ACTIVY-BR | 032910 | |
| APPLV01-APPL-CUTOFF-TIME-REC | 032901 | |
| APPLV01-APPL-CUTOFF-TZ | 032903 | |
| APPLV01-CUTOFF-CPC-DATE-ATM | 032906 | |
| APPLV01-CUTOFF-CPC-DATE-BR | 032904 | |
| APPLV01-CUTOFF-CPC-TIME-ATM | 032907 | |
| APPLV01-CUTOFF-CPC-TIME-BR | 032905 | |
| APPLV01-DBSPLITS | 032886 | |
| APPLV01-FILLER | 032902 | |
| APPLV01-GL-SUSP-ACCT-CDN | 032925 | |
| APPLV01-GL-SUSP-ACCT-US | 032926 | |
| APPLV01-GL-SUSP-ACCTS | 032924 | |
| APPLV01-INT-HI-RATE | 032933 | |
| APPLV01-INT-HILO-RATES | 032932 | |
| APPLV01-INT-LO-RATE | 032935 | |
| APPLV01-INT-MIN-CHG-AMT | 032938 | 063700  063800 |

| | | | | | | |
|---|---|---|---|---|---|---|
| APPLV01-INT-RENEWAL-WARN-DAYS | 032930 | | | | | |
| APPLV01-LOG-END | 032916 | | | | | |
| APPLV01-LOG-END-DATE | 032917 | | | | | |
| APPLV01-LOG-END-TIME | 032918 | | | | | |
| APPLV01-LOG-START | 032913 | | | | | |
| APPLV01-LOG-START-DATE | 032914 | | | | | |
| APPLV01-LOG-START-TIME | 032915 | | | | | |
| APPLV01-LOGGING-START-START | 032912 | | | | | |
| APPLV01-NC-DET-STMNT-DAYS | 032928 | | | | | |
| APPLV01-NOAREAS | 032920 | | | | | |
| APPLV01-RESULT | 032880 | | | | | |
| APPLV01-SHDATES | 032882 | | | | | |
| APPLV01-TLIMIT | 032897 | | | | | |
| APPLV01-TRANACT | 032892 | | | | | |
| CA-PEM-CHECKPOINT | 013231 | | | | | |
| CA-PEM-DISABLE-ABEND-EXIT | 013229 | | | | | |
| CA-PEM-DUMP-DG-END | 013225 | | | | | |
| CA-PEM-DUMP-DG-RETURN | 013223 | | | | | |
| CA-PEM-DUMP-TCB-TRACE | 013221 | | | | | |
| CA-PEM-DYN-DG-ALOC | 013209 | | | | | |
| CA-PEM-DYN-DG-INIT | 013213 | | | | | |
| CA-PEM-DYN-DG-REL | 013211 | | | | | |
| CA-PEM-ENABLE-ABEND-EXIT | 013227 | | | | | |
| CA-PEM-END-PROG | 013205 | 035692 | | | | |
| CA-PEM-END-TRANS | 013207 | | | | | |
| CA-PEM-NO-OP | 013215 | | | | | |
| CA-PEM-TRANS-DUMP-END | 013219 | | | | | |
| CA-PEM-TRANS-DUMP-RETURN | 013217 | | | | | |

119

| | | | | | | |
|---|---|---|---|---|---|---|
| C3J60110 | 032266 | | | | | |
| C3J61232 | 032329 | | | | | |
| C3J62008 | 032384 | | | | | |
| C3J62010 | 032401 | | | | | |
| C3J62011 | 032421 | | | | | |
| C3J62080 | 032443 | | | | | |
| C3J65000 | 032744 | | | | | |
| C3J65003 | 032764 | | | | | |
| C3J65110 | 032800 | | | | | |
| C3J65150 | 032951 | | | | | |
| C3J65250 | 033086 | | | | | |
| C3J65251 | 033106 | | | | | |
| C3J65252 | 035009 | | | | | |
| C3J65253 | 035054 | | | | | |
| C3J65254 | 035075 | | | | | |
| C5E51601 | 032182 | | | | | |
| C5E51609 | 032206 | | | | | |
| C5E65440 | 035090 | | | | | |
| C5E65443 | 035286 | | | | | |
| C5E65480 | 035355 | | | | | |
| C5E65483 | 035553 | | | | | |
| C51601-ACTION | 032183 | | | | | |
| C51601-BACKDATE-CODE | 032188 | 035714 | | | | |
| C51601-CLOSE-DATE | 032190 | | | | | |
| C51601-CLOSE-DATE-DD | 032193 | 035716 | | | | |
| C51601-CLOSE-DATE-MM | 032192 | 035715 | | | | |
| C51601-CLOSE-DATE-X | 032189 | | | | | |
| C51601-CLOSE-DATE-YY | 032194 | 035717 | | | | |
| C51601-ODOMETER-READING | 032196 | 035718 | | | | |
| C51601-ODOMETER-READING-X | 032195 | | | | | |
| C51601-RESULT | 032184 | | | | | |
| C51601-TRAN-FIELDS | 032187 | | | | | |
| C51601-TRAN-TRANSIT-LN | 032186 | 035713 | | | | |
| C51601-TRAN-TRANSIT-LN-X | 032185 | | | | | |
| C51609-ACTION | 032208 | | | | | |
| C51609-DISPLAY-AREA | 032218 | | | | | |
| C51609-RESULT | 032209 | | | | | |
| C51609-HS-ACCOUNT-LN-NO | 032226 | | | | | |
| C51609-HS-ACCT-LN-DASH | 032228 | 086700 | | | | |
| C51609-HS-ACCT-NO | 032227 | 086600 | | | | |
| C51609-HS-BRANCH-PROC-DATE | 032219 | 085000 | | | | |
| C51609-HS-CLOSING-AMOUNT | 032249 | 072500 | 072700 | | | |
| C51609-HS-EXCESS-KILO-CHARGE | 032254 | 096600 | | | | |
| C51609-HS-INT-EARN | 032238 | 059600 | 063700 | 063800 | 064200 | 064400 | 064700 |
| C51609-HS-INT-TO-DATE | 032239 | 064700 | 072700 | | | |
| C51609-HS-LN-NO | 032229 | 086800 | | | | |
| C51609-HS-LN-OFFICER-NO | 032231 | 087000 | | | | |
| C51609-HS-LN-STAT-REST-IND | 032233 | | | | | |
| C51609-HS-LOAN-CURRENCY | 032236 | 088600 | 088800 | | | |
| C51609-HS-LOAN-DESCRIPTION | 032232 | 071600 | 071800 | | | |
| C51609-HS-LOAN-STATUS | 032234 | 089700 | 090000 | | | |
| C51609-HS-NET-CAP | 032240 | 054700 | 057200 | 057500 | | |
| C51609-HS-OS-BAL | 032237 | 056800 | 057500 | 060900 | 074400 | |
| C51609-HS-PER-DIEM-INT | 032250 | 075600 | | | | |

120

| | | | |
|---|---|---|---|
| C51609-HS-PYMT-DUE-DATE | 032253 | 095300 | 095800 |
| C51609-HS-RESTRAINED-IND | 032235 | 088100 | 088300 |
| C51609-HS-SHORTNAME | 032230 | 087200 | |
| C51609-HS-SYS-COLON1 | 032222 | 085700 | |
| C51609-HS-SYS-COLON2 | 032224 | 085800 | |
| C51609-HS-SYS-TIME-DISP-HH | 032221 | 085400 | |
| C51609-HS-SYS-TIME-DISP-MM | 032223 | 085500 | |
| C51609-HS-SYS-TIME-DISP-SS | 032225 | 085600 | |
| C51609-HS-SYSTEM-TIME | 032220 | | |
| C51609-HS-TERM-REMAIN | 032241 | 066500 | |
| C51609-HS-TERM-REMAIN-1 | 032244 | 067000 | 067300 |
| C51609-HS-TERM-REMAIN-2 | 032245 | 067400 | 067700 |
| C51609-HS-TERM-REMAIN-3 | 032246 | 067800 | 068100 |
| C51609-HS-TERM-REMAIN-4 | 032247 | 068200 | 068500 |
| C51609-HS-TERM-REMAIN-5 | 032248 | | |

| Name | | | | | | | | | | |
|---|---|---|---|---|---|---|---|---|---|---|
| C51609-HS-TERM-REMAINING | 032242 | 065600 | | | | | | | | |
| C51609-HS-TIME-HH | 032213 | 085400 | | | | | | | | |
| C51609-HS-TIME-MM | 032214 | 085500 | | | | | | | | |
| C51609-HS-TIME-SS | 032215 | 085600 | | | | | | | | |
| C51609-HS-TIME-WORKAREA | 032210 | 085300 | | | | | | | | |
| C51609-HS-TRAN-BKD-CODE | 032252 | 038900 | 041700 | 043400 | 043600 | | | | | |
| C51609-HS-TRAN-EFF-DATE | 032251 | 039000 | 041500 | 043700 | 044000 | 047600 | 047800 | 058500 | 059000 | 060600 | 061600 |
| | | 065900 | 073500 | 074300 | | | | | | |
| C60110-ACTION | 032268 | 062400 | 070300 | | | | | | | |
| C60110-DAILY-RULE-ID | 032270 | 062500 | 070400 | | | | | | | |
| C60110-DATA-GROUP-NO | 032272 | 062600 | | | | | | | | |
| C60110-QUALIFIER | 032273 | 062700 | 070500 | | | | | | | |
| C60110-RESULT | 032269 | 063200 | 071000 | | | | | | | |
| C60110-USER-DATE | 032271 | | | | | | | | | |
| C61205-ACCT-MAND-IND | 032293 | | | | | | | | | |
| C61205-ACCT-NO | 032284 | | | | | | | | | |
| C61205-ACCT-NO-X | 032283 | 036500 | | | | | | | | |
| C61205-ACTION | 032280 | 037200 | | | | | | | | |
| C61205-CORR-ACCT-MAND-IND | 032289 | 036800 | | | | | | | | |
| C61205-CORR-LOAN-MAND-IND | 032291 | 036800 | | | | | | | | |
| C61205-CORRECTION | 032287 | 036700 | | | | | | | | |
| C61205-LOAN-MAND-IND | 032294 | | | | | | | | | |
| C61205-LOAN-NO | 032286 | | | | | | | | | |
| C61205-LOAN-NO-X | 032285 | 036600 | | | | | | | | |
| C61205-REG-ACCT-MAND-IND | 032288 | 036800 | | | | | | | | |
| C61205-REG-LOAN-MAND-IND | 032290 | 036800 | | | | | | | | |
| C61205-RESULT | 032281 | | | | | | | | | |
| C61230-ACTION | 032302 | | | | | | | | | |
| C61230-BACKDATE-CODE | 032306 | 042400 | | | | | | | | |
| C61230-COMMON-AREA | 032317 | | | | | | | | | |
| C61230-CORR-COMMON-AREA | 032310 | | | | | | | | | |
| C61230-CORR-MAND-IND | 032311 | 042700 | | | | | | | | |
| C61230-CORRECTION | 032307 | 042500 | | | | | | | | |
| C61230-FIELD-NO | 032312 | 042800 | | | | | | | | |
| C61230-INPUT-FIELD-AREA-X | 032305 | | | | | | | | | |
| C61230-MAND-IND | 032318 | | | | | | | | | |
| C61230-OUT-BACKDATE-CODE | 032315 | | | | | | | | | |
| C61230-OUTPUT-FIELD-AREA-X | 032314 | 043400 | | | | | | | | |
| C61230-REG-COMMON-AREA | 032308 | | | | | | | | | |

121

| Name | | |
|---|---|---|
| C61230-REG-MAND-IND | 032309 | 042600 |
| C61230-RESULT | 032303 | |
| C61232-ACTION | 032330 | |
| C61232-CENT-YEAR | 032346 | |
| C61232-CORR-MAND-IND | 032342 | 040600 |
| C61232-CORRECTION | 032340 | 040400 |
| C61232-FIELD-NO | 032343 | 040800 |
| C61232-FILLER | 032354 | |
| C61232-IN-CENTURY | 032334 | |
| C61232-IN-DAY | 032338 | |
| C61232-IN-MONTH | 032337 | |
| C61232-IN-YEAR | 032336 | |
| C61232-INPUT-DATE | 032335 | |
| C61232-INPUT-DATE-X | 032333 | 040300 |
| C61232-OUT-CENTURY | 032347 | 041400 |
| C61232-OUT-DATE | 032345 | |
| C61232-OUT-DATE-NUM | 032351 | |
| C61232-OUT-DAY | 032350 | |
| C61232-OUT-MONTH | 032349 | |
| C61232-OUT-YEAR | 032348 | |
| C61232-REG-MAND-IND | 032341 | 040500 |
| C61232-RESULT | 032331 | |
| C61232-SPEC-EDIT-IND | 032339 | 040700 |
| C61232-HS-MAND-IND | 032353 | |
| C61441-ACTION | 032366 | |
| C61441-IN-ISSUE-DATE | 032373 | 048200 |
| C61441-IN-REV-TRAN-BUS-DATE | 032372 | |
| C61441-IN-REV-TRAN-BUS-DATE-X | 032371 | 048000 |
| C61441-IN-TRAN-EFF-DATE | 032370 | 047800 |
| C61441-IN-TRAN-EFF-DATE-X | 032369 | |
| C61441-RESULT | 032367 | |
| C61441-HS-DATE | 032377 | |
| C62008-ACTION | 032386 | |
| C62008-CALENDAR-DATE | 032391 | 084700 095500 |
| C62008-DATE-DISPLAY-FORMAT | 032395 | 085000 095800 |
| C62008-RESULT | 032387 | |
| C62010-ACTION | 032403 | |
| C62010-END-DATE | 032410 | 065900 |
| C62010-FREQUENCY | 032408 | 066000 |
| C62010-NO-OF-PERIOD | 032414 | 066500 |
| C62010-RESULT | 032404 | |
| C62010-START-DATE | 032409 | 069300 069500 |
| C62011-ACTION | 032423 | |
| C62011-END-DATE | 032434 | 074200 |
| C62011-FREQUENCY | 032428 | 073600 |
| C62011-NO-OF-PERIOD | 032430 | 073700 |
| C62011-RESULT | 032424 | |
| C62011-START-DATE | 032429 | 073500 |
| C62080-ACTION | 032444 | |
| C62080-APPL-CODE | 032447 | 062700 |
| C62080-BR-BUS-DAY-BACK | 032461 | 044000 |
| C62080-BR-BUS-DAY-CURR | 032459 | |
| C62080-BR-BUS-DAY-NEXT | 032460 | |
| C62080-BV01 | 032466 | |

122

| Name | |
|---|---|
| C62080-BV01-BR-AREA | 032486 |
| C62080-BV01-BR-COMB-1 | 032483 |
| C62080-BV01-BR-COMB-2 | 032484 |
| C62080-BV01-BR-CPC | 032488 |

```
C62080-BV01-BR-DATE-POINTER            032468
C62080-BV01-BR-DATE-POINTER-04         032474
C62080-BV01-BR-DATE-POINTER-05         032475
C62080-BV01-BR-DATE-POINTER-06         032476
C62080-BV01-BR-DATE-POINTER-07         032477
C62080-BV01-BR-DATE-POINTER-08         032478
C62080-BV01-BR-DATE-POINTER-09         032479
C62080-BV01-BR-DATE-POINTER-10         032480
C62080-BV01-BR-DATE-POINTER-3J         032473
C62080-BV01-BR-DATE-POINTER-5E         032472
C62080-BV01-BR-DATE-POINTER-9H         032471
C62080-BV01-BR-DATE-POINTERS           032467
C62080-BV01-BR-DEL-ADV-CODE            032494
C62080-BV01-BR-DEL-ADV-TABLE           032493
C62080-BV01-BR-DISTRICT                032485
C62080-BV01-BR-ICA-FED-COMM            032496
C62080-BV01-BR-ICA-FED-CONS            032495
C62080-BV01-BR-ICA-PROV-COMM           032498
C62080-BV01-BR-ICA-PROV-CONS           032497
C62080-BV01-BR-INT-BASE-DAY            032499
C62080-BV01-BR-LANG-CODE               032482
C62080-BV01-BR-ONLINE-CPC              032491
C62080-BV01-BR-PARENT-TRANSIT          032492
C62080-BV01-BR-PROC-STATUS             032490
C62080-BV01-BR-REGION                  032487
C62080-BV01-BR-RESIDENCE-CODE          032489
C62080-BV01-BR-TIME-ZONE               032481
C62080-BV01-BR-TRNASIT-TYPE            032500
C62080-DATE-POINTER                    032508
C62080-DATE-POINTER-X                  032507
C62080-FILLER                          032449
C62080-RESULT                          032445
C62080-TRAN-BUS-DAY                    032458   039000  043700  060800  074500
C62080-TRAN-ENTRY-DATE                 032451
C62080-TRAN-ENTRY-TIME                 032452
C62080-TRAN-ENTRY-TIMESTAMP            032450
C62080-TRAN-PROC-MODE                  032462
C62080-TRANSIT                         032448
C62081-ACTION                          032519
C62081-APPL-CODE                       032522
C62081-BR-BUS-DAY-BACK                 032536
C62081-BR-BUS-DAY-CURR                 032534
C62081-BR-BUS-DAY-NEXT                 032535
C62081-BV01                            032541
C62081-BV01-BR-AREA                    032561
C62081-BV01-BR-COMB-1                  032558
C62081-BV01-BR-COMB-2                  032559
C62081-BV01-BR-CPC                     032563
C62081-BV01-BR-DATE-POINTER            032543
C62081-BV01-BR-DATE-POINTER-04         032549

C62081-BV01-BR-DATE-POINTER-05         032550
C62081-BV01-BR-DATE-POINTER-06         032551
C62081-BV01-BR-DATE-POINTER-07         032552
C62081-BV01-BR-DATE-POINTER-08         032553
C62081-BV01-BR-DATE-POINTER-09         032554
C62081-BV01-BR-DATE-POINTER-10         032555
C62081-BV01-BR-DATE-POINTER-3J         032548
C62081-BV01-BR-DATE-POINTER-5E         032547
C62081-BV01-BR-DATE-POINTER-9H         032546
C62081-BV01-BR-DATE-POINTERS           032542
C62081-BV01-BR-DEL-ADV-CODE            032569
C62081-BV01-BR-DEL-ADV-TABLE           032568
C62081-BV01-BR-DISTRICT                032560
C62081-BV01-BR-ICA-FED-COMM            032571
C62081-BV01-BR-ICA-FED-CONS            032570
C62081-BV01-BR-ICA-PROV-COMM           032573
C62081-BV01-BR-ICA-PROV-CONS           032572
C62081-BV01-BR-INT-BASE-DAY            032574
C62081-BV01-BR-LANG-CODE               032557   051500  071500  089600
C62081-BV01-BR-ONLINE-CPC              032566
C62081-BV01-BR-PARENT-TRANSIT          032567
C62081-BV01-BR-PROC-STATUS             032565
C62081-BV01-BR-REGION                  032562
C62081-BV01-BR-RESIDENCE-CODE          032564
C62081-BV01-BR-TIME-ZONE               032556
C62081-BV01-BR-TRANSIT-TYPE            032575
C62081-DATE-POINTER                    032583
C62081-DATE-POINTER-X                  032582
C62081-FILLER                          032524
C62081-RESULT                          032520
C62081-TRAN-BUS-DAY                    032533
C62081-TRAN-ENTRY-DATE                 032526
C62081-TRAN-ENTRY-TIME                 032527
C62081-TRAN-ENTRY-TIMESTAMP            032525
C62081-TRAN-PROC-MODE                  032537
C62081-TRANSIT                         032523
C62301-ACTION                          032592
C62301-BASE-RATE-AT-START-IND          032600   060700  074600
C62301-END-DATE                        032598   060600  074200
C62301-FILLER                          032620
C62301-INT-RATE-ADDN                   032610
C62301-INT-RATE-MULT                   032609
C62301-INT-RESULT                      032614   061500  075200
C62301-INT-RULE                        032608
C62301-LN-INFO                         032603
C62301-MR-AMT                          032612
C62301-MR-AMT-X                        032611
C62301-OS-BAL                          032604   060900  074400
C62301-PARAMETER-INFO                  032595
C62301-PERIOD-INFO                     032596
```

| | | | | | |
|---|---|---|---|---|---|
| C62301-RATE-EFF-DATE-B | 032607 | | | | |
| C62301-RATE-SPREAD-ENTRY | 032606 | | | | |
| C62301-RATE-SPREAD-TABLE | 032605 | 061000 | 074700 | | |
| C62301-RESULT | 032593 | | | | |
| 124 | | | | | |
| C62301-START-DATE | 032597 | 060500 | 074300 | | |
| C62301-TRAN-BUS-DAY | 032599 | 060800 | 074500 | | |
| C62301-USE-ALL-BASE-RATES | 032601 | | | | |
| C62301-USE-BASE-RATE-AT-START | 032602 | | | | |
| C62301-WK-END-DATE-B | 032618 | | | | |
| C62301-WK-INDEX | 032616 | | | | |
| C62301-WK-OS-BAL | 032619 | | | | |
| C62301-WK-START-DATE-B | 032617 | | | | |
| C62302-ACTION | 032628 | | | | |
| C62302-END-DATE | 032635 | 058500 | | | |
| C62302-FILLER | 032657 | | | | |
| C62302-INQUIRY | 032634 | | | | |
| C62302-MEMO-INT-RATE-ADDN | 032652 | | | | |
| C62302-MEMO-INT-RATE-MULT | 032651 | | | | |
| C62302-MEMO-INT-RULE | 032650 | | | | |
| C62302-MEMO-MR-AMT | 032653 | | | | |
| C62302-MEMO-RATE-EFF-DATE-B | 032649 | | | | |
| C62302-MEMO-RATE-ENTRY | 032648 | | | | |
| C62302-MEMO-RATE-SPREAD-TABLE | 032647 | 061000 | 074700 | | |
| C62302-PARAMETER-INFO | 032631 | | | | |
| C62302-REAL-INT-RATE-ADDN | 032645 | | | | |
| C62302-REAL-INT-RATE-MULT | 032644 | | | | |
| C62302-REAL-INT-RULE | 032643 | | | | |
| C62302-REAL-MR-AMT | 032646 | | | | |
| C62302-REAL-RATE-EFF-DATE-B | 032642 | | | | |
| C62302-REAL-RATE-ENTRY | 032641 | | | | |
| C62302-REAL-RATE-SPREAD-TABLE | 032640 | | | | |
| C62302-RESULT | 032629 | | | | |
| C62302-UPD-INQ-IND | 032632 | 058400 | | | |
| C62302-UPDATE | 032633 | | | | |
| C62302-WK-DATE-C | 032656 | | | | |
| C62302-WK-INDEX | 032655 | | | | |
| C62307-ACTION | 032665 | | | | |
| C62307-IN-INT-RESULT | 032668 | 059300 | 075200 | | |
| C62307-OUT-INT-RESULT | 032670 | 059600 | 075600 | | |
| C62307-RESULT | 032666 | | | | |
| C64000-ACTION | 032681 | | | | |
| C64000-CALL-TYPE-IND | 032691 | 082200 | 091700 | 096900 | 098200 |
| C64000-DISPLAY-ACTIVITY-E | 032686 | 091500 | 094100 | 097100 | |
| C64000-DISPLAY-ACTIVITY-F | 032687 | 091600 | 094200 | 097200 | |
| C64000-FILLER | 032695 | | | | |
| C64000-LANGUAGE-CODE | 032688 | | | | |
| C64000-PRINT-BRCH-MESS-IND | 032690 | 091800 | 093800 | 098400 | |
| C64000-PRINT-LN-MESS-IND | 032689 | 091800 | 093800 | 098300 | |
| C64000-RESULT | 032682 | | | | |
| C64232-ACTION | 032706 | 080200 | | | |
| C64232-BMP-COUNT-KEY | 032709 | | | | |
| C64232-BMP-KEY | 032728 | | | | |
| C64232-BMP-KEY1 | 032729 | | | | |
| C64232-BMP-KEY2 | 032730 | | | | |
| C64232-BMP-KEY3 | 032731 | | | | |
| C64232-FILL-COMMON-IND | 032718 | 080500 | | | |
| C64232-FILL-COMMON-NO | 032720 | | | | |
| C64232-FILL-COMMON-YES | 032719 | | | | |
| C64232-FILLER | 032735 | | | | |
| C64232-LOG-IND | 032715 | 080400 | | | |
| C64232-LOG-IND-MANDATORY | 032716 | | | | |
| C64232-LOG-IND-OPTIONAL | 032717 | | | | |
| C64232-ONLINE-KEY | 032724 | | | | |
| C64232-ONLINE-KEY1 | 032725 | | | | |
| C64232-ONLINE-KEY2 | 032726 | | | | |
| C64232-RESULT | 032707 | | | | |
| C64232-TRAN-TYPE | 032710 | 080300 | | | |
| C64232-TRAN-TYPE-INQ | 032711 | | | | |
| C64232-TRAN-TYPE-PROP | 032713 | | | | |
| C64232-TRAN-TYPE-RPT | 032714 | | | | |
| C64232-TRAN-TYPE-UPD | 032712 | | | | |
| C64232-WS-PROC-MODE | 032733 | | | | |
| C65000-ABEND-MESSAGE | 032753 | 063400 | 071200 | 078500 | |
| C65000-ACTION | 032746 | | | | |
| C65000-APPLICATION-CODE | 032751 | | | | |
| C65000-CALLING-ACTIVITY | 032752 | 101900 | | | |
| C65000-DUMP | 032749 | | | | |
| C65000-DUMP-IND | 032748 | 101800 | | | |
| C65000-LANGUAGE-CODE | 032755 | | | | |
| C65000-NO-DUMP | 032750 | | | | |
| C65000-RESULT | 032747 | | | | |
| C65000-TCB-RESULT | 032757 | | | | |
| C65000-USER-ABEND-CODE | 032754 | 063300 | 071100 | 078400 | |
| C65003-ACTION | 032766 | | | | |
| C65003-APPLICATION-CODE | 032774 | | | | |
| C65003-ERROR-CODE | 032781 | | | | |
| C65003-ERROR-COUNT | 032780 | | | | |
| C65003-ERROR-MESS | 032790 | | | | |
| C65003-ERROR-MESSAGE | 032782 | | | | |
| C65003-ERROR-VAR-1 | 032791 | 051600 | 051900 | | |
| C65003-ERROR-VAR-2 | 032792 | | | | |
| C65003-ERROR-VAR-3 | 032793 | | | | |

| Name | | | | | | | | | |
|---|---|---|---|---|---|---|---|---|---|
| C65003-INPUT-ERROR | 032772 | 035755 | 038400 | 045000 | 046700 | 048700 | 050000 | 053900 | |
| C65003-INPUT-ERROR-X | 032771 | | | | | | | | |
| C65003-LANGUAGE-CODE | 032774 | | | | | | | | |
| C65003-LANGUAGE-CODE-X | 032775 | | | | | | | | |
| C65003-RESULT | 032767 | | | | | | | | |
| C65003-TXN-BUSINESS-DATE | 032773 | | | | | | | | |
| C65003-WORK-AREA | 032786 | | | | | | | | |
| C65110-ACTION | 032802 | | | | | | | | |
| C65110-DAILY-RULE-OBTAINED | 032807 | | | | | | | | |
| C65110-RESULT | 032803 | | | | | | | | |
| C65150-TL-AC-LIC-PRODUCED | 033019 | | | | | | | | |
| C65150-TL-AC-NO | 032973 | | | | | | | | |
| C65150-TL-AC-NO-SGHT | 032972 | | | | | | | | |
| C65150-TL-AC-PRODUCED | 033018 | | | | | | | | |
| C65150-TL-AC-SGHT | 032974 | | | | | | | | |
| C65150-TL-ACCEPT | 032993 | 035664 | 035666 | 035668 | 035670 | 035672 | 035675 | 041300 | 043300 | 081900 |
| C65150-TL-ACCEPT-REJECT-IND | 032992 | | | | | | | | |
| C65150-TL-ACCT-LN-NO | 032967 | | | | | | | | |
| C65150-TL-ACCT-NO | 032968 | | | | | | | | |
| C65150-TL-ACTION | 032953 | | | | | | | | |

126

| Name | Num1 | Num2 |
|---|---|---|
| C65150-TL-APPL-ID | 033002 | |
| C65150-TL-APPL-KEY | 032966 | |
| C65150-TL-APPL-KEY1 | 032971 | |
| C65150-TL-APPL-MAINT-INFO | 033059 | |
| C65150-TL-BMP-NAME | 032977 | |
| C65150-TL-CLS-LIC-AC-PRODUCED | 033017 | |
| C65150-TL-CLS-LIC-PRODUCED | 033016 | |
| C65150-TL-CNTL-TOT-DIFF | 033061 | |
| C65150-TL-CO-ID | 033001 | |
| C65150-TL-CORRECTION-IND | 033051 | |
| C65150-TL-FUNC-ID | 033003 | |
| C65150-TL-HOGAN-TCB-DATA | 032999 | |
| C65150-TL-LATE-PAYMENT-IND | 033041 | |
| C65150-TL-LIC | 033013 | |
| C65150-TL-LIC-PRODUCED | 033015 | |
| C65150-TL-LN-NO | 032969 | |
| C65150-TL-LOCALENTRY-DATE | 033071 | 084700 |
| C65150-TL-LOCALENTRY-TIME | 033072 | 085300 |
| C65150-TL-LOCALENTRY-TIMSTAMP | 033070 | |
| C65150-TL-LOG-DATA | 032979 | |
| C65150-TL-LOG-KEY | 032958 | |
| C65150-TL-LOG-REC-CYC-ON-REQ | 032984 | |
| C65150-TL-LOG-REC-ONLINE | 032982 | |
| C65150-TL-LOG-REC-SCHED-UPDT | 032985 | |
| C65150-TL-LOG-REC-SECURITY | 032983 | |
| C65150-TL-LOG-REC-SEM | 032981 | |
| C65150-TL-LOG-REC-TZ-PARM | 032986 | |
| C65150-TL-LOG-RECORD-CODE | 032980 | 080100 |
| C65150-TL-LP-OFF | 033042 | |
| C65150-TL-LP-ON | 033043 | |
| C65150-TL-MAST-DATE-MEMO | 033076 | |
| C65150-TL-MAST-DATE-REAL | 032961 | |
| C65150-TL-MAST-TIME-MEMO | 033077 | |
| C65150-TL-MAST-TIME-REAL | 032962 | |
| C65150-TL-MAST-TIMESTAMP-MEMO | 033075 | |
| C65150-TL-MAST-TIMESTAMP-REAL | 032960 | |
| C65150-TL-MEMO-INJ-CTL-TOTS | 033065 | |
| C65150-TL-MIRLR-IND | 033038 | |
| C65150-TL-MIRLR-OFF | 033039 | |
| C65150-TL-MIRLR-ON | 033040 | |
| C65150-TL-NO-LIC-PRODUCED | 033014 | |
| C65150-TL-NON-ESSENTIAL-DATA | 033069 | |
| C65150-TL-OTHER-BR-ID | 033053 | |
| C65150-TL-OTHER-BR-ID-BR-BR | 033055 | |
| C65150-TL-OTHER-BR-ID-HUB-SUB | 033056 | |
| C65150-TL-OTHER-BR-ID-NONE | 033054 | |
| C65150-TL-OVERLMT-AC-IND | 033034 | |
| C65150-TL-OVERLMT-AMT | 033036 | |
| C65150-TL-OVERLMT-IND | 033032 | |
| C65150-TL-OVERLMT-LN-OFF-IND | 033035 | |
| C65150-TL-OVERLMT-NO-IND | 033033 | |
| C65150-TL-OVERRIDE | 032994 | |
| C65150-TL-OVERRIDE-IND | 033050 | |
| C65150-TL-PEM-TRAN-CODE | 033000 | |

127

| Name | Num |
|---|---|
| C65150-TL-PRINT-REQUEST | 033049 |
| C65150-TL-REJECT | 032995 |
| C65150-TL-RESULT | 032954 |
| C65150-TL-RNA-INPUT-HEADER | 033046 |
| C65150-TL-RPT-CODE | 033025 |
| C65150-TL-RPT-CODE-COUNT | 033020 |
| C65150-TL-RPT-CODE-IND | 033022 |
| C65150-TL-RPT-INFO | 033012 |
| C65150-TL-RPT-MESS | 033030 |
| C65150-TL-RPT-MESS-COUNT | 033021 |
| C65150-TL-RPT-MESS-IND | 033027 |
| C65150-TL-SOURCE-TYPE | 033004 |
| C65150-TL-TCB-DESTINATION | 033009 |
| C65150-TL-TCB-DEVICE-TYPE | 033010 |
| C65150-TL-TCB-SOURCE | 033008 |
| C65150-TL-TIME-ZONE | 032997 |
| C65150-TL-TRACE-NO | 032996 |
| C65150-TL-TRAN-BUS-DAY | 032959 |
| C65150-TL-TRAN-BUS-DAY-LN | 033074 |
| C65150-TL-TRAN-BUS-DAY-SRC | 033073 |
| C65150-TL-TRAN-CODE | 033052 |
| C65150-TL-TRAN-FIELDS | 033057 |
| C65150-TL-TRAN-IMAGE | 033045 |

| | | | | |
|---|---|---|---|---|
| C65150-TL-TRAN-INPUT-HEADER | 033047 | | | |
| C65150-TL-TRAN-LOG-RECORD | 032956 | | | |
| C65150-TL-TRAN-SRC-CODE | 032976 | | | |
| C65150-TL-TRAN-TYPE | 032987 | | | |
| C65150-TL-TRAN-TYPE-INQ | 032988 | | | |
| C65150-TL-TRAN-TYPE-PROP | 032990 | | | |
| C65150-TL-TRAN-TYPE-RPT | 032991 | | | |
| C65150-TL-TRAN-TYPE-UPDT | 032989 | | | |
| C65150-TL-TRANENTRY-DATE | 033006 | | | |
| C65150-TL-TRANENTRY-TIME | 033007 | | | |
| C65150-TL-TRANENTRY-TIMESTAMP | 033005 | | | |
| C65150-TL-TRANSIT-LN | 032965 | | | |
| C65150-TL-TRANSIT-LN-X | 032964 | | | |
| C65150-TL-TRANSIT-REPORTING | 032963 | | | |
| C65150-TL-TRANSIT-SRC | 033048 | | | |
| C65250-ACTION | 033088 | | | |
| C65250-DISPLAY-CLASS | 033095 | | | |
| C65250-HEADER-LENGTH | 033092 | | | |
| C65250-ITERATION-COUNT | 033098 | | | |
| C65250-MESSAGE-TYPE | 033093 | | | |
| C65250-PRINT-CLASS | 033096 | | | |
| C65250-REJECT-CODE | 033097 | | | |
| C65250-RESULT | 033089 | | | |
| C65250-RNA-INPUT-HEADER | 033091 | | | |
| C65250-SEQUENCE-NO | 033099 | | | |
| C65250-WK-STN-ID | 033094 | | | |
| C65251-AC-FILLER | 033124 | | | |
| C65251-AC-KEY | 033123 | | | |
| C65251-AC-NO | 033126 | | | |
| C65251-AC-NO-X | 033125 | | | |
| C65251-AC-SGMT-NO | 033128 | | | |

128

| | | | | |
|---|---|---|---|---|
| C65251-AC-SGMT-NO-X | 033127 | | | |
| C65251-ACCT-NO | 033120 | 046000 | | |
| C65251-ACCT-NO-X | 033119 | 036500 | | |
| C65251-ACTION | 033108 | | | |
| C65251-APPL-KEY | 033118 | | | |
| C65251-CORRECTION-IND | 033116 | 035734 | 036700 | 040400 |
| C65251-LN-NO | 033122 | 046100 | | |
| C65251-LN-NO-X | 033121 | 036600 | | |
| C65251-OTHER-BR-ID | 033129 | | | |
| C65251-OVERRIDE-IND | 033115 | | | |
| C65251-PRINT-REQUEST | 033114 | 092100 | | |
| C65251-RESULT | 033109 | | | |
| C65251-TEST-CASE-NO | 033134 | | | |
| C65251-TEST-DATE | 034000 | | | |
| C65251-TEST-RUN-NO | 033132 | | | |
| C65251-TEST-STEP-NO | 033133 | | | |
| C65251-TEST-TIME | 035000 | | | |
| C65251-TESTING-INFO | 033131 | | | |
| C65251-TRAN-CNTL-BYTE | 033112 | | | |
| C65251-TRAN-CODE | 033117 | | | |
| C65251-TRAN-INPUT-HEADER | 033111 | | | |
| C65251-TRANSIT-SRC | 033113 | | | |
| C65252-ACTION | 035011 | | | |
| C65252-RESULT | 035012 | | | |
| C65252-TRAN-FIELDS | 035017 | | | |
| C65252-TRAN-MEMO-INJ-IND | 035014 | | | |
| C65252-TRAN-SRC-CODE | 035015 | | | |
| C65252-TRAN-TRANSIT-LN | 035016 | 035713 | | |
| C65253-ACTION | 035056 | | | |
| C65253-DISPLAY-CLASS | 035063 | 092200 | 092500 | 098700 |
| C65253-HEADER-LENGTH | 035060 | | | |
| C65253-ITERATION-COUNT | 035066 | | | |
| C65253-LAST-BUFFER-IND | 035067 | | | |
| C65253-MESSAGE-TYPE | 035061 | | | |
| C65253-PRINT-CLASS | 035064 | 092300 | 092600 | 098600 |
| C65253-REJECT-CODE | 035065 | | | |
| C65253-RESULT | 035057 | | | |
| C65253-RNA-OUTPUT-HEADER | 035059 | | | |
| C65253-SEQUENCE-NO | 035068 | | | |
| C65253-WK-STN-ID | 035062 | | | |
| C65254-ACTION | 035077 | | | |
| C65254-CLEAR-SCREEN-IND | 035082 | 081700 | 083900 | |
| C65254-OVERRIDE-LEVEL-IND | 035081 | | | |
| C65254-RESULT | 035078 | | | |
| C65254-TRAN-APPL-OUTPUT-HEADER | 035080 | | | |
| C65440-RMO-AC-NO | 035119 | | | |
| C65440-RMO-AC-SGMT | 035120 | | | |
| C65440-RMO-ACCT-LN-NO | 035097 | | | |
| C65440-RMO-ACCT-NO | 035098 | 046000 | | |
| C65440-RMO-ACTION | 035092 | 045900 | | |
| C65440-RMO-AMORT-TERM-ORG | 035133 | | | |
| C65440-RMO-AUG-EXIST-IND | 035108 | | | |
| C65440-RMO-BACKDATE-INFO | 035181 | | | |
| C65440-RMO-BANK-CODE-FIELD | 035261 | | | |

| | |
|---|---|
| C65440-RMO-BKD-CREA-DATE | 035182 |
| C65440-RMO-BKD-INT-COL | 035184 |
| C65440-RMO-BKD-INT-EARN-LIPDD | 035186 |
| C65440-RMO-BKD-INT-RATE | 035185 |
| C65440-RMO-BKD-OS-BAL | 035183 |
| C65440-RMO-BR-MSG-HI-LEVEL | 035170 |
| C65440-RMO-BR-MSG-LEVEL | 035168 |
| C65440-RMO-BR-MSG-LEVEL-INFO | 035167 |
| C65440-RMO-BUS-SEG-CODE | 035262 |
| C65440-RMO-CLIENT-NO | 035118 |
| C65440-RMO-COLA-CODE | 035147 |
| C65440-RMO-COLA-REVAL-DATE | 035149 |

| | |
|---|---|
| C65440-RM0-COLA-SEC-INFO | 035146 |
| C65440-RM0-COLA-VALUE | 035148 |
| C65440-RM0-CONV-DATE | 035131 |
| C65440-RM0-CURRENCY | 035135 |
| C65440-RM0-CUST-IND | 035124 |
| C65440-RM0-CUST-INFO | 035123 |
| C65440-RM0-DATE-LAST-FIN | 035112 |
| C65440-RM0-DATE-LAST-MAINT | 035111 |
| C65440-RM0-DATE-LAST-PAYMENT | 035231 |
| C65440-RM0-DET-STMT-DATE-PREV | 035250 |
| C65440-RM0-DET-STMT-DUE-DATE | 035249 |
| C65440-RM0-DET-STMT-FREQ | 035248 |
| C65440-RM0-DIARY-MSG-DUE-DATE | 035171 |
| C65440-RM0-DLQ-ADVICE-IND-1 | 035256 |
| C65440-RM0-DLQ-ADVICE-IND-2 | 035257 |
| C65440-RM0-DLQ-ADVICE-IND-3 | 035258 |
| C65440-RM0-DLQ-CTR-LT-15 | 035238 |
| C65440-RM0-DLQ-EXIST-IND | 035106 |
| C65440-RM0-DLQ-INFO | 035237 |
| C65440-RM0-DLQ-START-DATE | 035240 |
| C65440-RM0-DLQ-TOT-DAYS-LT-15 | 035239 |
| C65440-RM0-FEE-EXIST-IND | 035265 |
| C65440-RM0-FILLER-DATE-1 | 035269 |
| C65440-RM0-FILLER-DATE-2 | 035270 |
| C65440-RM0-FILLER-DATE-3 | 035271 |
| C65440-RM0-GUARANTOR | 035139 |
| C65440-RM0-HIST-EARLIEST-DATE | 035109 |
| C65440-RM0-HIST-NO-TRAN | 035110 |
| C65440-RM0-INH-SUM-STMT-IND | 035255 |
| C65440-RM0-INS-CODE | 035140 |
| C65440-RM0-INS-EXIST-IND | 035107 |
| C65440-RM0-INT-ADJ-AMT | 035154 |
| C65440-RM0-INT-ADJ-DATE | 035153 |
| C65440-RM0-INT-CAP-IND | 035206 |
| C65440-RM0-INT-COL | 035208 |
| C65440-RM0-INT-COL-YTD-CAL | 035209 |
| C65440-RM0-INT-EARN | 035210 |
| C65440-RM0-INT-EARN-LIPDD | 035214 |
| C65440-RM0-INT-EARN-MAX | 035212 |
| C65440-RM0-INT-INFO | 035204 |
| C65440-RM0-INT-METHOD | 035205 |
| C65440-RM0-INT-RATE-ADDN | 035179 |
| | |
| C65440-RM0-INT-RATE-INFO | 035173 |
| C65440-RM0-INT-RATE-MULT | 035178 |
| C65440-RM0-INT-RENEW-DATE | 035155 |
| C65440-RM0-INT-RENEW-DATE-LAST | 035156 |
| C65440-RM0-INT-RENEWAL-INFO | 035151 |
| C65440-RM0-INT-RULE | 035177 |
| C65440-RM0-INT-TERM | 035152 |
| C65440-RM0-IO-PYMT-DUE-DATE | 035268 |
| C65440-RM0-IO-PYMT-RETRY-CTR | 035245 |
| C65440-RM0-IO-UNC-INT-ST-DATE | 035241 |
| C65440-RM0-ISSUE-DATE | 035129 |
| C65440-RM0-KEY-OTHER-DBS | 035114 |
| C65440-RM0-LANG-CODE | 035126 |
| C65440-RM0-LICD | 035207 |
| C65440-RM0-LIPDD | 035213 |
| C65440-RM0-LN-ACTIVATE-DATE | 035267 |
| C65440-RM0-LN-BASIC-INFO | 035128 |
| C65440-RM0-LN-CLASS | 035144 |
| C65440-RM0-LN-CREDIT-GROUP | 035117 |
| C65440-RM0-LN-DESC | 035121 |
| C65440-RM0-LN-MESSAGE-INFO | 035164 |
| C65440-RM0-LN-MSG-IND | 035165 |
| C65440-RM0-LN-NO | 035099   046100 |
| C65440-RM0-LN-NOTE | 035138 |
| C65440-RM0-LN-OFFICER-NO | 035116 |
| C65440-RM0-LN-PLAN | 035136 |
| C65440-RM0-LN-PLAN-DTL | 035266 |
| C65440-RM0-LN-SERVICE | 035137 |
| C65440-RM0-LN-STATUS | 035160 |
| C65440-RM0-LN-STATUS-INFO | 035159 |
| C65440-RM0-MATURITY-DATE | 035132 |
| C65440-RM0-MEMO-EXIST-IND | 035103 |
| C65440-RM0-MESSAGES-INFO | 035163 |
| C65440-RM0-MISC-INFO | 035260 |
| C65440-RM0-MR-OCCUR-IND | 035174 |
| C65440-RM0-OS-BAL | 035217 |
| C65440-RM0-OS-BAL-ACCUM-M | 035226 |
| C65440-RM0-OS-BAL-DATE-ACCUM | 035227 |
| C65440-RM0-OS-BAL-HI | 035221 |
| C65440-RM0-OS-BAL-HI-DATE | 035223 |
| C65440-RM0-OS-BAL-INFO | 035216 |
| C65440-RM0-OS-BAL-LO | 035222 |
| C65440-RM0-OS-BAL-LO-DATE | 035224 |
| C65440-RM0-OS-BAL-REDUCED-DATE | 035218 |
| C65440-RM0-OS-BAL-STATS | 035220 |
| C65440-RM0-PREFER-RATE-OPT | 035141 |
| C65440-RM0-PROCEEDS-ORG | 035134 |
| C65440-RM0-PURPOSE | 035142 |
| C65440-RM0-PYMT-AMT-MIN | 035198 |
| C65440-RM0-PYMT-AMT-MULT | 035197 |
| C65440-RM0-PYMT-AMT-PARTIAL | 035201 |
| C65440-RM0-PYMT-AMT-REG | 035199 |
| C65440-RM0-PYMT-CHG-ACCT | 035192 |
| C65440-RM0-PYMT-CHG-BANK | 035190 |
| | |
| C65440-RM0-PYMT-CHG-SYST | 035193 |
| C65440-RM0-PYMT-CHG-TRANSIT | 035191 |
| C65440-RM0-PYMT-CHG-TYPE | 035189 |
| C65440-RM0-PYMT-DUE-DATE | 035195 |

| | | | | |
|---|---|---|---|---|
| C65440-RM0-PYMT-DUE-DATE DELAY | 035196 | | | |
| C65440-RM0-PYMT-FREQ | 035194 | | | |
| C65440-RM0-PYMT-INFO | 035188 | | | |
| C65440-RM0-PYMT-RETRY-CTR | 035244 | | | |
| C65440-RM0-PYMT-STATS | 035230 | | | |
| C65440-RM0-PYMT-TO-SKIP | 035202 | | | |
| C65440-RM0-PYMT-TOT-DELAYED | 035234 | | | |
| C65440-RM0-PYMT-TOT-RECVD | 035232 | | | |
| C65440-RM0-PYMT-TOT-SKIPPED | 035233 | | | |
| C65440-RM0-PYMT-TOT-WAIVED | 035235 | | | |
| C65440-RM0-RATE-EFF-DATE-B | 035176 | | | |
| C65440-RM0-RATE-EFF-DATE-C | 035175 | | | |
| C65440-RM0-REN-RED-RATE-IND | 035263 | | | |
| C65440-RM0-RENEW-AMT-LAST | 035157 | | | |
| C65440-RM0-REPORTING-INFO | 035247 | | | |
| C65440-RM0-RESI-EXIST-IND | 035273 | | | |
| C65440-RM0-RESTRAINED-IND | 035161 | | | |
| C65440-RM0-RESULT | 035093 | | | |
| C65440-RM0-RETURNED-ITEMS | 035243 | | | |
| C65440-RM0-ROOT-DATA | 035100 | | | |
| C65440-RM0-ROOT-KEY | 035096 | | | |
| C65440-RM0-ROOT-SEG | 035095 | | | |
| C65440-RM0-SHORTNAME | 035125 | | | |
| C65440-RM0-SIN | 035274 | | | |
| C65440-RM0-SUB-PURPOSE | 035143 | | | |
| C65440-RM0-SUM-INT-COL | 035251 | | | |
| C65440-RM0-SUM-INT-EARN-LIPDD | 035252 | | | |
| C65440-RM0-SUM-OS-BAL | 035253 | | | |
| C65440-RM0-SUM-TOT-DISB | 035254 | | | |
| C65440-RM0-TECH-INFO | 035102 | | | |
| C65440-RM0-TRANSIT-LN | 035115 | | | |
| C65440-RM0-TSFR-DATE | 035130 | | | |
| C65443-RM3-ACTION | 035288 | 077800 | | |
| C65443-RM3-AUG-DATE-LAST | 035330 | | | |
| C65443-RM3-AUG-INFO | 035328 | | | |
| C65443-RM3-FEE-COL | 035318 | | | |
| C65443-RM3-FEE-EARN | 035317 | | | |
| C65443-RM3-FEES-INFO | 035316 | | | |
| C65443-RM3-FUTURE-DATA-A | 035325 | | | |
| C65443-RM3-FUTURE-DATA-F | 035313 | | | |
| C65443-RM3-FUTURE-DATA-I | 035299 | | | |
| C65443-RM3-FUTURE-DATA-R | 035339 | | | |
| C65443-RM3-FUTURE-KEY | 035292 | | | |
| C65443-RM3-FUTURE-SEG | 035291 | | | |
| C65443-RM3-INS-COL | 035306 | | | |
| C65443-RM3-INS-COL-METHOD | 035303 | | | |
| C65443-RM3-INS-EARN | 035305 | | | |
| C65443-RM3-INS-INFO | 035301 | | | |
| C65443-RM3-INS-LIMIT | 035302 | | | |
| C65443-RM3-INS-RISK-TYPE | 035304 | | | |
| C65443-RM3-RESI-AMT | 035345 | | | |
| C65443-RM3-RESI-DATE | 035343 | | | |
| C65443-RM3-RESI-ORIG-PRICE | 035344 | | | |
| C65443-RM3-RESIDUAL-INFO | 035342 | | | |
| C65443-RM3-RESULT | 035289 | | | |
| C65443-RM3-SCHD-AUG-AMT | 035331 | | | |
| C65443-RM3-SCHD-AUG-DUE-DATE | 035332 | | | |
| C65443-RM3-SEG-KEY | 035293 | 077900 | | |
| C65443-RM3-SERIAL-NO | 035346 | | | |
| C65443-RM3-TOT-DISB | 035329 | | | |
| C65480-MM0-AC-NO | 035386 | | | |
| C65480-MM0-AC-SGMT | 035387 | | | |
| C65480-MM0-ACCT-LN-NO | 035362 | | | |
| C65480-MM0-ACCT-NO | 035363 | 086600 | | |
| C65480-MM0-ACTION | 035357 | | | |
| C65480-MM0-AMORT-TERM-ORG | 035400 | 065500 | 066500 | 076500 |
| C65480-MM0-AUG-EXIST-IND | 035375 | | | |
| C65480-MM0-BACKDATE-INFO | 035448 | | | |
| C65480-MM0-BANK-CODE-FIELD | 035528 | | | |
| C65480-MM0-BKD-CREA-DATE | 035449 | | | |
| C65480-MM0-BKD-INT-COL | 035451 | | | |
| C65480-MM0-BKD-INT-EARN-LIPDD | 035453 | | | |
| C65480-MM0-BKD-INT-RATE | 035452 | | | |
| C65480-MM0-BKD-OS-BAL | 035450 | | | |
| C65480-MM0-BR-MSG-HI-LEVEL | 035437 | | | |
| C65480-MM0-BR-MSG-LEVEL | 035435 | | | |
| C65480-MM0-BR-MSG-LEVEL-INFO | 035434 | | | |
| C65480-MM0-BUS-SEG-CODE | 035529 | | | |
| C65480-MM0-CLIENT-NO | 035385 | | | |
| C65480-MM0-COLA-CODE | 035414 | | | |
| C65480-MM0-COLA-REVAL-DATE | 035416 | | | |
| C65480-MM0-COLA-SEC-INFO | 035413 | | | |
| C65480-MM0-COLA-VALUE | 035415 | | | |
| C65480-MM0-CONV-DATE | 035398 | | | |
| C65480-MM0-CURRENCY | 035402 | 088500 | | |
| C65480-MM0-CUST-IND | 035391 | | | |
| C65480-MM0-CUST-INFO | 035390 | | | |
| C65480-MM0-DATE-LAST-FIN | 035379 | | | |
| C65480-MM0-DATE-LAST-MAINT | 035378 | | | |
| C65480-MM0-DATE-LAST-PYMT | 035498 | | | |
| C65480-MM0-DET-STMT-DATE-PREV | 035517 | | | |
| C65480-MM0-DET-STMT-DUE-DATE | 035516 | | | |
| C65480-MM0-DET-STMT-FREQ | 035515 | | | |
| C65480-MM0-DIARY-MSG-DUE-DATE | 035438 | | | |
| C65480-MM0-DLQ-ADVICE-IND-1 | 035523 | | | |
| C65480-MM0-DLQ-ADVICE-IND-2 | 035524 | | | |
| C65480-MM0-DLQ-ADVICE-IND-3 | 035525 | | | |
| C65480-MM0-DLQ-CTR-LT-15 | 035505 | | | |
| C65480-MM0-DLQ-EXIST-IND | 035373 | | | |
| C65480-MM0-DLQ-INFO | 035504 | | | |

| | | | | | |
|---|---|---|---|---|---|
| C65480-MM0-DLQ-START-DATE | 035507 | | | | |
| C65480-MM0-DLQ-TOT-DAYS-LT-15 | 035506 | | | | |
| C65480-MM0-FEE-EXIST-IND | 035532 | | | | |
| C65480-MM0-FILLER-DATE-1 | 035536 | | | | |
| C65480-MM0-FILLER-DATE-2 | 035537 | | | | |
| C65480-MM0-FILLER-DATE-3 | 035538 | | | | |
| C65480-MM0-GUARANTOR | 035406 | | | | |
| C65480-MM0-HIST-EARLIEST-DATE | 035376 | | | | |
| C65480-MM0-HIST-NO-TRAN | 035377 | | | | |
| C65480-MM0-INH-SUM-STMT-IND | 035522 | | | | |
| C65480-MM0-INS-CODE | 035407 | | | | |
| C65480-MM0-INS-EXIST-IND | 035374 | | | | |
| C65480-MM0-INT-ADJ-AMT | 035421 | | | | |
| C65480-MM0-INT-ADJ-DATE | 035420 | 069200 | 069500 | | |
| C65480-MM0-INT-CAP-IND | 035473 | 057000 | | | |
| C65480-MM0-INT-COL | 035475 | 057200 | 064700 | | |
| C65480-MM0-INT-COL-YTD-CAL | 035476 | | | | |
| C65480-MM0-INT-EARN | 035477 | 059300 | 061500 | | |
| C65480-MM0-INT-EARN-LIPDD | 035481 | 057200 | | | |
| C65480-MM0-INT-EARN-MAX | 035479 | 064100 | 064200 | 064400 | |
| C65480-MM0-INT-INFO | 035471 | | | | |
| C65480-MM0-INT-METHOD | 035472 | | | | |
| C65480-MM0-INT-RATE-ADDN | 035446 | | | | |
| C65480-MM0-INT-RATE-INFO | 035440 | | | | |
| C65480-MM0-INT-RATE-MULT | 035445 | | | | |
| C65480-MM0-INT-RENEW-DATE | 035422 | | | | |
| C65480-MM0-INT-RENEW-DATE-LAST | 035423 | | | | |
| C65480-MM0-INT-RENEWAL-INFO | 035418 | | | | |
| C65480-MM0-INT-RULE | 035444 | | | | |
| C65480-MM0-INT-TERM | 035419 | | | | |
| C65480-MM0-IO-PYMT-DUE-DATE | 035535 | | | | |
| C65480-MM0-IO-PYMT-RETRY-CTR | 035512 | | | | |
| C65480-MM0-IO-UNC-INT-ST-DATE | 035508 | | | | |
| C65480-MM0-ISSUE-DATE | 035396 | 048200 | 069300 | | |
| C65480-MM0-KEY-OTHER-OBS | 035381 | | | | |
| C65480-MM0-LANG-CODE | 035393 | | | | |
| C65480-MM0-LICD | 035474 | 047600 | 059000 | 060500 | 061600 |
| C65480-MM0-LIPDD | 035480 | | | | |
| C65480-MM0-LN-ACTIVATE-DATE | 035534 | | | | |
| C65480-MM0-LN-BASIC-INFO | 035395 | | | | |
| C65480-MM0-LN-CLASS | 035411 | | | | |
| C65480-MM0-LN-CREDIT-GROUP | 035384 | | | | |
| C65480-MM0-LN-DESC | 035388 | 070500 | | | |
| C65480-MM0-LN-MESSAGE-INFO | 035431 | | | | |
| C65480-MM0-LN-MSG-IND | 035432 | | | | |
| C65480-MM0-LN-NO | 035364 | 086800 | | | |
| C65480-MM0-LN-NOTE | 035405 | | | | |
| C65480-MM0-LN-OFFICER-NO | 035383 | 087000 | | | |
| C65480-MM0-LN-PLAN | 035403 | | | | |
| C65480-MM0-LN-PLAN-DTL | 035533 | | | | |
| C65480-MM0-LN-SERVICE | 035404 | | | | |
| C65480-MM0-LN-STATUS | 035427 | 049500 | 050900 | 051400 | 089000 089500 |
| C65480-MM0-LN-STATUS-INFO | 035426 | | | | |
| C65480-MM0-MATURITY-DATE | 035399 | | | | |
| C65480-MM0-MEMO | 035371 | | | | |
| C65480-MM0-MEMO-EXIST-IND | 035369 | | | | |
| C65480-MM0-MEMO-TRAN-CTR | 035372 | | | | |
| C65480-MM0-MESSAGES-INFO | 035430 | | | | |

134

| | | | | |
|---|---|---|---|---|
| C65480-MM0-MISC-INFO | 035527 | | | |
| C65480-MM0-MR-OCCUR-IND | 035441 | | | |
| C65480-MM0-OS-BAL | 035484 | 056800 | 057500 | 072500 |
| C65480-MM0-OS-BAL-ACCUM-M | 035493 | | | |
| C65480-MM0-OS-BAL-DATE-ACCUM | 035494 | | | |
| C65480-MM0-OS-BAL-HI | 035488 | | | |
| C65480-MM0-OS-BAL-HI-DATE | 035490 | | | |
| C65480-MM0-OS-BAL-INFO | 035483 | | | |
| C65480-MM0-OS-BAL-LO | 035489 | | | |
| C65480-MM0-OS-BAL-LO-DATE | 035491 | | | |
| C65480-MM0-OS-BAL-REDUCED-DATE | 035485 | | | |
| C65480-MM0-OS-BAL-STATS | 035487 | | | |
| C65480-MM0-PREFER-RATE-OPT | 035408 | | | |
| C65480-MM0-PROCEEDS-ORG | 035401 | | | |
| C65480-MM0-PURPOSE | 035409 | | | |
| C65480-MM0-PYMT-AMT-MIN | 035465 | | | |
| C65480-MM0-PYMT-AMT-MULT | 035464 | | | |
| C65480-MM0-PYMT-AMT-PARTIAL | 035468 | | | |
| C65480-MM0-PYMT-AMT-REG | 035466 | | | |
| C65480-MM0-PYMT-CHG-ACCT | 035459 | | | |
| C65480-MM0-PYMT-CHG-BANK | 035457 | | | |
| C65480-MM0-PYMT-CHG-SYST | 035460 | | | |
| C65480-MM0-PYMT-CHG-TRANSIT | 035458 | | | |
| C65480-MM0-PYMT-CHG-TYPE | 035456 | | | |
| C65480-MM0-PYMT-DUE-DATE | 035462 | 095200 | 095500 | |
| C65480-MM0-PYMT-DUE-DATE-DELAY | 035463 | | | |
| C65480-MM0-PYMT-FREQ | 035461 | | | |
| C65480-MM0-PYMT-INFO | 035455 | | | |
| C65480-MM0-PYMT-RETRY-CTR | 035511 | | | |
| C65480-MM0-PYMT-STATS | 035497 | | | |
| C65480-MM0-PYMT-TO-SKIP | 035469 | | | |
| C65480-MM0-PYMT-TOT-DELAYED | 035501 | | | |
| C65480-MM0-PYMT-TOT-RECVD | 035499 | | | |
| C65480-MM0-PYMT-TOT-SKIPPED | 035500 | | | |
| C65480-MM0-PYMT-TOT-WAIVED | 035502 | | | |
| C65480-MM0-RATE-EFF-DATE-B | 035443 | | | |
| C65480-MM0-RATE-EFF-DATE-C | 035442 | | | |
| C65480-MM0-REAL | 035368 | | | |
| C65480-MM0-REN-RED-RATE-IND | 035530 | | | |
| C65480-MM0-RENEW-AMT-LAST | 035424 | | | |

| | | | |
|---|---|---|---|
| C65480-MM0-REPORTING-INFO | 035514 | | |
| C65480-MM0-RESI-EXIST-IND | 035540 | 053600 | |
| C65480-MM0-RESTRAINED-IND | 035428 | 088000 | |
| C65480-MM0-RESULT | 035358 | 046600 | |
| C65480-MM0-RETURNED-ITEMS | 035510 | | |
| C65480-MM0-ROOT-DATA | 035365 | | |
| C65480-MM0-ROOT-KEY | 035361 | | |
| C65480-MM0-ROOT-SEG | 035360 | | |
| C65480-MM0-SHORTNAME | 035392 | 087200 | |
| C65480-MM0-SIN | 035541 | | |
| C65480-MM0-SUB-PURPOSE | 035410 | | |
| C65480-MM0-SUM-INT-COL | 035518 | | |
| C65480-MM0-SUM-INT-EARN-LIPOD | 035519 | | |
| C65480-MM0-SUM-OS-BAL | 035520 | | |

135

| | | | |
|---|---|---|---|
| C65480-MM0-SUM-TOT-DISB | 035521 | | |
| C65480-MM0-TECH-INFO | 035367 | | |
| C65480-MM0-TRANSIT-LN | 035382 | | |
| C65480-MM0-TSFR-DATE | 035397 | | |
| C65483-MM3-ACTION | 035555 | | |
| C65483-MM3-AUG-DATE-LAST | 035597 | | |
| C65483-MM3-AUG-INFO | 035595 | | |
| C65483-MM3-FEE-COL | 035585 | | |
| C65483-MM3-FEE-EARN | 035584 | | |
| C65483-MM3-FEES-INFO | 035583 | | |
| C65483-MM3-FUTURE-DATA-A | 035592 | | |
| C65483-MM3-FUTURE-DATA-F | 035580 | | |
| C65483-MM3-FUTURE-DATA-I | 035566 | | |
| C65483-MM3-FUTURE-DATA-R | 035606 | | |
| C65483-MM3-FUTURE-KEY | 035559 | | |
| C65483-MM3-FUTURE-SEG | 035558 | | |
| C65483-MM3-INS-COL | 035573 | | |
| C65483-MM3-INS-COL-METHOD | 035570 | | |
| C65483-MM3-INS-EARN | 035572 | | |
| C65483-MM3-INS-INFO | 035568 | | |
| C65483-MM3-INS-LIMIT | 035569 | | |
| C65483-MM3-INS-RISK-TYPE | 035571 | | |
| C65483-MM3-RESI-AMT | 035612 | | |
| C65483-MM3-RESI-DATE | 035610 | | |
| C65483-MM3-RESI-ORIG-PRICE | 035611 | 078800 | |
| C65483-MM3-RESIDUAL-INFO | 035609 | | |
| C65483-MM3-RESULT | 035556 | 078300 | |
| C65483-MM3-SCHD-AUG-AMT | 035598 | | |
| C65483-MM3-SCHD-AUG-DUE-DATE | 035599 | | |
| C65483-MM3-SEG-KEY | 035560 | | |
| C65483-MM3-SERIAL-NO | 035613 | | |
| C65483-MM3-TOT-DISB | 035596 | | |
| C9H61205 | 032279 | | |
| C9H61230 | 032301 | | |
| C9H61441 | 032364 | | |
| C9H62081 | 032518 | | |
| C9H62301 | 032590 | | |
| C9H62302 | 032626 | | |
| C9H62307 | 032663 | | |
| C9H64000 | 032679 | | |
| C9H64232 | 032704 | | |
| DAILY-RULE-ACTION-CODES | 013805 | | |
| DAILY-RULE-RESULT-CODES | 014205 | | |
| DBSPLITS-DB-AREA-SPLITS | 032890 | | |
| DBSPLITS-NO-OF-DB-AREAS | 032887 | | |
| DBSPLITS-SPLITS | 032888 | | |
| DGA-CLOSE | 013432 | | |
| DGA-CODE-VALUES | 013405 | | |
| DGA-END-REQUEST | 013430 | | |
| DGA-ERASE | 013414 | | |
| DGA-HOLD-P | 013412 | | |
| DGA-INSERT-FIRST | 013420 | | |
| DGA-INSERT-HERE | 013428 | | |
| DGA-INSERT-LAST | 013424 | | |

136

| | | | |
|---|---|---|---|
| DGA-NO-OP | 013406 | | |
| DGA-OPEN-INPUT | 013436 | | |
| DGA-OPEN-OUTPUT | 013434 | | |
| DGA-READ | 013408 | | |
| DGA-READ-FIRST | 013426 | | |
| DGA-READ-KEY-EQ | 013418 | 045900 | 077800 |
| DGA-READ-KEY-GE | 013416 | | |
| DGA-READ-LAST-REC | 013422 | | |
| DGA-WRITE | 013410 | | |
| DGR-CODE-VALUES | 013604 | | |
| DGR-END-DATA | 013607 | | |
| DGR-I-O-ERR | 013609 | | |
| DGR-LEN-ERR | 013613 | | |
| DGR-NO-FIND | 013611 | | |
| DGR-OK | 013605 | 046600 | 078300 |
| DRI-GET-NEXT-RULE | 013808 | | |
| DRI-GET-RULE | 013807 | 062400 | 070300 |
| DRI-NEXT-RULE-NOT-FOUND | 014209 | | |
| DRI-OK | 014207 | 063200 | 071000 |
| DRI-RULE-NOT-CREATED | 014210 | | |
| DRI-RULE-NOT-FOUND | 014208 | | |
| FILLER-1 | 032970 | | |
| FILLER-2 | 032975 | | |
| FILLER-3 | 033079 | | |
| LD1TABLE-DEFAULT-CREDIT-GROUP | 032850 | | |
| LD1TABLE-EFFECT-INT-RATE | 032847 | | |
| LD1TABLE-EFFECT-INT-RATE-MAX | 032848 | | |
| LD1TABLE-EFFECT-INT-RATE-MIN | 032849 | | |

| Name | Code | | | | | | | | | |
|---|---|---|---|---|---|---|---|---|---|---|
| LD1TABLE-GL-ACCT-NO | 032851 | | | | | | | | | |
| LD1TABLE-GL-ACCT-NON-PROD | 032855 | | | | | | | | | |
| LD1TABLE-GL-ACCT-NON-PROD-X | 032854 | | | | | | | | | |
| LD1TABLE-GL-ACCT-ORDINARY | 032853 | | | | | | | | | |
| LD1TABLE-GL-ACCT-ORDINARY-X | 032852 | | | | | | | | | |
| LD1TABLE-GL-ACCT-WRITEOFF | 032857 | | | | | | | | | |
| LD1TABLE-GL-ACCT-WRITEOFF-X | 032856 | | | | | | | | | |
| LD1TABLE-GL-INT-ACCRUED | 032864 | | | | | | | | | |
| LD1TABLE-GL-INT-ACCRUED-X | 032863 | | | | | | | | | |
| LD1TABLE-GL-INT-ACCT-NO | 032858 | | | | | | | | | |
| LD1TABLE-GL-INT-NON-PROD | 032862 | | | | | | | | | |
| LD1TABLE-GL-INT-NON-PROD-X | 032861 | | | | | | | | | |
| LD1TABLE-GL-INT-ORDINARY | 032840 | | | | | | | | | |
| LD1TABLE-GL-INT-ORDINARY-X | 032859 | | | | | | | | | |
| LD1TABLE-GL-INT-RESERVED | 032866 | | | | | | | | | |
| LD1TABLE-GL-INT-RESERVED-X | 032865 | | | | | | | | | |
| LD1TABLE-GROUP | 032837 | | | | | | | | | |
| LD1TABLE-INT-PYMT-DUE-DATE-DD | 032828 | | | | | | | | | |
| LD1TABLE-INT-RATE-ADDN | 032830 | | | | | | | | | |
| LD1TABLE-INT-RULE-ALLOW | 032843 | | | | | | | | | |
| LD1TABLE-INT-RULE-ALLOW-TBL | 032842 | | | | | | | | | |
| LD1TABLE-INT-RULE-ALLOW-TBL-X | 032841 | | | | | | | | | |
| LD1TABLE-INT-RULE-ALLOWED-GRP | 032840 | | | | | | | | | |
| LD1TABLE-IO-PYMT-FREQ | 032829 | | | | | | | | | |
| LD1TABLE-MAX-AMT | 032834 | | | | | | | | | |
| LD1TABLE-MAX-DAYS-PYMT | 032832 | | | | | | | | | |

137

| Name | Code | | | | | | | | | |
|---|---|---|---|---|---|---|---|---|---|---|
| LD1TABLE-MAX-ISSUE-DAYS | 032844 | | | | | | | | | |
| LD1TABLE-MAX-ISSUE-DAYS-BACK | 032845 | | | | | | | | | |
| LD1TABLE-MAX-ISSUE-DAYS-FWD | 032846 | | | | | | | | | |
| LD1TABLE-MAX-YR | 032833 | | | | | | | | | |
| LD1TABLE-OMTC-ACTIVITY-CONV | 032839 | | | | | | | | | |
| LD1TABLE-OMTC-ACTIVITY-OPEN | 032836 | | | | | | | | | |
| LD1TABLE-OMTC-ACTIVITY-TSFR | 032838 | | | | | | | | | |
| LNDESC01 | 032818 | | | | | | | | | |
| LNDESC01-DESC-ENG | 032821 | 071600 | | | | | | | | |
| LNDESC01-DESC-FR | 032822 | 071800 | | | | | | | | |
| LNDESC01-LD1TABLE | 032826 | | | | | | | | | |
| LNDESC01-LITERAL-ENG | 032823 | | | | | | | | | |
| LNDESC01-LITERAL-FR | 032824 | | | | | | | | | |
| LNSTATUS | 032008 | | | | | | | | | |
| LNSTATUS-CODE | 032076 | 050900 | 051400 | 089000 | 089500 | | | | | |
| LNSTATUS-DESC-E | 032077 | 051600 | | | | | | | | |
| LNSTATUS-DESC-F | 032078 | 051900 | | | | | | | | |
| LNSTATUS-LIT-E | 032079 | 089700 | | | | | | | | |
| LNSTATUS-LIT-F | 032080 | 090000 | | | | | | | | |
| LNSTATUS01 | 032010 | | | | | | | | | |
| LNSTATUS02 | 032012 | | | | | | | | | |
| LNSTATUS03 | 032018 | | | | | | | | | |
| LNSTATUS04 | 032024 | | | | | | | | | |
| LNSTATUS05 | 032030 | | | | | | | | | |
| LNSTATUS06 | 032036 | | | | | | | | | |
| LNSTATUS07 | 032038 | | | | | | | | | |
| LNSTATUS08 | 032040 | | | | | | | | | |
| LNSTATUS09 | 032044 | | | | | | | | | |
| LNSTATUS10 | 032048 | | | | | | | | | |
| LNSTATUS11 | 032054 | | | | | | | | | |
| LNSTATUS12 | 032060 | | | | | | | | | |
| LNSTATUS13 | 032066 | | | | | | | | | |
| LNSTATUS14 | 032068 | | | | | | | | | |
| LNSTATUS15 | 032070 | | | | | | | | | |
| MASTER-RULE-ACTION-CODES | 014005 | | | | | | | | | |
| MASTER-RULE-RESULT-CODES | 014405 | | | | | | | | | |
| MRI-ADD-RULE | 014011 | | | | | | | | | |
| MRI-DEF-NOT-FOUND | 014413 | | | | | | | | | |
| MRI-DEL-RULE | 014015 | | | | | | | | | |
| MRI-ELEMENT-NOT-FOUND | 030001 | | | | | | | | | |
| MRI-GET-NEXT-PCD | 014017 | | | | | | | | | |
| MRI-GET-NEXT-RULE | 014009 | | | | | | | | | |
| MRI-GET-RULE | 014007 | | | | | | | | | |
| MRI-GROUP-NOT-FOUND | 015000 | | | | | | | | | |
| MRI-INVALID-ACTION | 014409 | | | | | | | | | |
| MRI-INVALID-EFF-DATE | 014411 | | | | | | | | | |
| MRI-NEXT-QUAL-NOT-FOUND | 019000 | | | | | | | | | |
| MRI-OK | 014407 | | | | | | | | | |
| MRI-PCD-DATA-GRP-NOT-FOUND | 029000 | | | | | | | | | |
| MRI-RULE-ALREADY-DEL | 025000 | | | | | | | | | |
| MRI-RULE-ALREADY-EXISTS | 021000 | | | | | | | | | |
| MRI-RULE-DOES-NOT-EXIST | 023000 | | | | | | | | | |
| MRI-SET-NOT-FOUND | 017000 | | | | | | | | | |
| MRI-SYSTEM-ERROR | 031000 | | | | | | | | | |
| MRI-UPD-RULE | 014013 | | | | | | | | | |
| MRI-USER-DATA-GRP-NOT-FOUND | 027000 | | | | | | | | | |
| PEM-ACTIVITIES | 013204 | | | | | | | | | |
| PEM-COMMON-ACTIVITIES | 013203 | | | | | | | | | |
| PEM-DATA-GROUP-ACTION-CODES | 013404 | | | | | | | | | |
| PEM-DATA-GROUP-RESULT-CODES | 013603 | | | | | | | | | |
| SHDATES-CURRENT | 032883 | | | | | | | | | |
| SHDATES-NEXT | 032884 | | | | | | | | | |
| TCB-ABEND-EXIT | 013017 | | | | | | | | | |
| TCB-ABEND-TRANS | 013029 | | | | | | | | | |
| TCB-ACTIVITY | 032103 | 035692 | 035701 | 035710 | 035725 | 035735 | 037400 | 041000 | 043000 | 046300 | 048400 |
| | | 058700 | 059400 | 061200 | 062900 | 066200 | 070700 | 073900 | 074900 | 075300 | 078000 |
| | | 080700 | 084800 | 092800 | 094400 | 095600 | 097400 | 098900 | 099700 | 102000 | |
| TCB-ALIEN-X | 032170 | | | | | | | | | |
| TCB-ALIEN-Y | 032171 | | | | | | | | | |
| TCB-ALIEN-Z | 032172 | | | | | | | | | |
| TCB-APPL-ID | 032094 | | | | | | | | | |
| TCB-BATCH | 032157 | | | | | | | | | |

| | | | | | |
|---|---|---|---|---|---|
| TCB-BTCH | 032102 | | | | |
| TCB-CO-ID | 032093 | | | | |
| TCB-DATA-BASE-FULL | 013021 | | | | |
| TCB-DATA-GROUP | 032107 | | | | |
| TCB-DB-NOT-AVAILABLE | 013023 | | | | |
| TCB-DEADLOCK | 013019 | | | | |
| TCB-DESTINATION | 032124 | | | | |
| TCB-DEVICE-TYPE | 032155 | | | | |
| TCB-EFFECTIVE-DATE | 032154 | | | | |
| TCB-ENQ | 032118 | | | | |
| TCB-ENQ-ID | 032119 | | | | |
| TCB-ENTER | 032127 | | | | |
| TCB-EOJ-CALL | 032117 | | | | |
| TCB-ERR | 013007 | | | | |
| TCB-FAIL | 013013 | | | | |
| TCB-FAIL-CHECKPOINT | 013027 | | | | |
| TCB-FULL | 013015 | | | | |
| TCB-FUNC-ID | 032095 | | | | |
| TCB-NO-ACT | 013009 | | | | |
| TCB-NOT-AUTH | 013011 | | | | |
| TCB-OK | 013005 | | | | |
| TCB-OK-CHECKPOINT | 013025 | | | | |
| TCB-ONLINE | 032099 | | | | |
| TCB-OPERATOR | 032123 | | | | |
| TCB-PARM-POS | 032108 | | | | |
| TCB-PFKEY | 032126 | | | | |
| TCB-PFKEY-NOT-PRESENT | 032152 | | | | |
| TCB-PF01 | 032128 | | | | |
| TCB-PF02 | 032129 | | | | |
| TCB-PF03 | 032130 | | | | |
| TCB-PF04 | 032131 | | | | |
| TCB-PF05 | 032132 | | | | |
| TCB-PF06 | 032133 | | | | |
| TCB-PF07 | 032134 | | | | |
| TCB-PF08 | 032135 | | | | |
| TCB-PF09 | 032136 | | | | |

139

| | | | | | |
|---|---|---|---|---|---|
| TCB-PF10 | 032137 | | | | |
| TCB-PF11 | 032138 | | | | |
| TCB-PF12 | 032139 | | | | |
| TCB-PF13 | 032140 | | | | |
| TCB-PF14 | 032141 | | | | |
| TCB-PF15 | 032142 | | | | |
| TCB-PF16 | 032143 | | | | |
| TCB-PF17 | 032144 | | | | |
| TCB-PF18 | 032145 | | | | |
| TCB-PF19 | 032146 | | | | |
| TCB-PF20 | 032147 | | | | |
| TCB-PF21 | 032148 | | | | |
| TCB-PF22 | 032149 | | | | |
| TCB-PF23 | 032150 | | | | |
| TCB-PF24 | 032151 | | | | |
| TCB-RESULT | 032104 | | | | |
| TCB-RESULT-CONSTANTS | 013003 | | | | |
| TCB-RESULTS | 013004 | | | | |
| TCB-SOURCE | 032122 | | | | |
| TCB-SOURCE-TYPE | 032096 | | | | |
| TCB-SOURCE-TYPE-N | 032097 | 035733 | | | |
| TCB-SYS-DATE | 032121 | | | | |
| TCB-TERM-DATA | 032125 | | | | |
| TCB-TIME | 032120 | | | | |
| TCB-TRANS-NO | 032092 | | | | |
| TCB-TMX | 032167 | | | | |
| TCB-USER-AREA-1 | 032109 | | | | |
| TCB-USER-AREA-2 | 032112 | | | | |
| TCB-USER-AREA-3 | 032116 | | | | |
| TCB-USER-CC | 032113 | | | | |
| TCB-USER-COND | 032111 | | | | |
| TCB-USER-DATA | 032105 | | | | |
| TCB-USER-ENVMT | 032115 | | | | |
| TCB-USER-INFO | 032110 | | | | |
| TCB-USER-RESULT | 032114 | | | | |
| TCB-2470-M002 | 032168 | | | | |
| TCB-2740-M001 | 032169 | | | | |
| TCB-3270-M001-PRINTER | 032165 | | | | |
| TCB-3270-M002-PRINTER | 032166 | | | | |
| TCB-3270-1 | 032158 | | | | |
| TCB-3270-2 | 032156 | | | | |
| TCB-3600-JP | 032162 | | | | |
| TCB-3600-LP | 032164 | | | | |
| TCB-3600-PB | 032163 | | | | |
| TCB-3604-0S1 | 032159 | | | | |
| TCB-3604-0S3 | 032160 | | | | |
| TCB-3604-0S4 | 032161 | | | | |
| TLIMIT-CLOSED-LOAN-PERIOD | 032899 | | | | |
| TLIMIT-RESERVED-LOAN-PERIOD | 032898 | | | | |
| TRANACT-HOURS | 032894 | | | | |
| TRANACT-MINUTES | 032895 | | | | |
| TRANACT-TIME | 032893 | | | | |
| TRANSACTION-CONTROL-BLOCK | 032090 | 101100 | | | |
| TRAN230 | 035026 | | | | |
| T230-FILLER | 035042 | | | | |
| T230-TRAN-BACKDATE-CODE-X | 035029 | 035714 | 038200 | 038700 | 039200 042400 |
| T230-TRAN-CLOSING-DATE | 035031 | 041500 | | | |
| T230-TRAN-CLOSING-DATE-C | 035033 | 041400 | | | |
| T230-TRAN-CLOSING-DATE-DD | 035036 | 035716 | | | |
| T230-TRAN-CLOSING-DATE-MM | 035035 | 035715 | | | |
| T230-TRAN-CLOSING-DATE-X | 035030 | 038200 | 038700 | 040300 | |
| T230-TRAN-CLOSING-DATE-YY | 035034 | 035717 | | | |

| | | | | | | | |
|---|---|---|---|---|---|---|---|
| T230-TRAN-FIELDS | 035028 | | | | | | |
| T230-TRAN-ODOMETER-READING | 035038 | 077400 | 079000 | 079300 | | | |
| T230-TRAN-ODOMETER-READING-X | 035037 | 035718 | 044800 | 044900 | 053500 | 076400 | 082100 |
| T230-MS-ALLOWED-KILO | 035040 | 076500 | 077400 | 079000 | 079300 | | |
| T230-MS-EXCESS-KILO-CHARGE | 035041 | 077600 | 079000 | 079300 | 096600 | | |
| T230-MS-INDEX | 035039 | 050900 | 051400 | 051600 | 051900 | 089000 | 089500 | 089700 | 090000 |
| MS-ACTIVITIES | 006300 | | | | | | |
| MS-ACTIVITIES-COMP | 003200 | | | | | | |
| MS1-ACTIVITY-51600 | 006500 | 101900 | | | | | |
| MS1-ACTIVITY-51601 | 006700 | 035701 | | | | | |
| MS1-ACTIVITY-51603 | 006900 | 035710 | | | | | |
| MS1-ACTIVITY-60078 | 007100 | 046300 | | | | | |
| MS1-ACTIVITY-60079 | 007300 | 078000 | | | | | |
| MS1-ACTIVITY-60110 | 007500 | 062900 | 070700 | | | | |
| MS1-ACTIVITY-61205 | 007700 | 037400 | | | | | |
| MS1-ACTIVITY-61230 | 007900 | 043000 | | | | | |
| MS1-ACTIVITY-61232 | 008100 | 041000 | | | | | |
| MS1-ACTIVITY-61441 | 008300 | 048400 | | | | | |
| MS1-ACTIVITY-62008 | 008500 | 084800 | 095600 | | | | |
| MS1-ACTIVITY-62010 | 008700 | 066200 | | | | | |
| MS1-ACTIVITY-62011 | 008900 | 073900 | | | | | |
| MS1-ACTIVITY-62045 | 009100 | 035725 | | | | | |
| MS1-ACTIVITY-62050 | 009300 | 035735 | | | | | |
| MS1-ACTIVITY-62301 | 009500 | 061200 | 074900 | | | | |
| MS1-ACTIVITY-62302 | 009700 | 058700 | | | | | |
| MS1-ACTIVITY-62307 | 009900 | 059400 | 075300 | | | | |
| MS1-ACTIVITY-64000 | 010100 | 092800 | 094400 | 097400 | 098900 | | |
| MS1-ACTIVITY-64122 | 010300 | 091500 | | | | | |
| MS1-ACTIVITY-64123 | 010500 | 094100 | | | | | |
| MS1-ACTIVITY-64124 | 010700 | 091600 | | | | | |
| MS1-ACTIVITY-64125 | 010900 | 094200 | | | | | |
| MS1-ACTIVITY-64130 | 011100 | 097100 | | | | | |
| MS1-ACTIVITY-64131 | 011300 | 097200 | | | | | |
| MS1-ACTIVITY-64232 | 011500 | 080700 | | | | | |
| MS1-ACTIVITY-65000 | 011700 | 102000 | | | | | |
| MS1-ACTIVITY-65003 | 011900 | 099700 | | | | | |
| MS1-DATAGROUP-65110 | 012100 | 062600 | | | | | |
| MS2-COMPARISON-PARAMETER | 012500 | 078800 | | | | | |
| MS2-CONSTANTS | 012300 | | | | | | |
| MS2-DATE-NINES | 012400 | 069200 | 095200 | | | | |
| MS2-ONLINE | 012800 | 035733 | | | | | |
| MS2-ONLINE-AREA | 012700 | | | | | | |

141

| PROCEDURE NAMES | DEFN | REFERENCE |
|---|---|---|
| 0000-EXIT | 035696 | |
| 0000-MAINLINE | 035654 | |
| 1000-ALLOCATE-DG-51601 | 035699 | 035656 |
| 1000-EXIT | 035704 | 035656 |
| 2000-DEBLOCK-INPUT-MAP | 035708 | 035658 |
| 2000-EXIT | 035720 | 035658 |
| 3000-EXIT | 035728 | 035660 |
| 3000-INIT-ONE-ONLINE | 035723 | 035660 |
| 4000-EXIT | 035738 | 035662 |
| 4000-INIT-ONLINE-TRANS | 035731 | 035662 |
| 5000-EDITS-INDEPENDENT-OF-LM | 035741 | 035665 |
| 5000-EXIT | 035749 | 035665 |
| 5010-EXIT | 036000 | 035743 |
| 5010-VERIFY-CORR-IND | 035752 | 035743 |
| 5020-EDIT-ACCT-LN-NO | 036300 | 035744 |
| 5020-EXIT | 037700 | 035744 |
| 5030-EXIT | 039800 | 035745 |
| 5030-VAL-BKD-CODE-CLOSING-DATE | 038000 | 035745 |
| 5032-EXIT | 041900 | 039300 |
| 5032-VAL-CLOSING-DATE | 040100 | 039300 |
| 5034-EXIT | 044300 | 039500 |
| 5034-VAL-BACKDATE-CODE | 042200 | 039500 |
| 5040-EXIT | 045400 | 035746 |
| 5040-VERIFY-ODOMETER-READING | 044600 | 035746 |
| 5100-EXIT | 047000 | 035667 |
| 5100-VERIFY-LOAN-PRESENCE | 045700 | 035667 |
| 5200-EXIT | 049000 | 035669 |
| 5200-VALIDATE-TRAN-EFF-DATE | 047400 | 035669 |
| 5300-EXIT | 050400 | 035671 |
| 5300-VERIFY-LOAN-STATUS | 049300 | 035671 |
| 5310-EXIT | 052200 | 050100 |
| 5310-GET-LNSTATUS-VARIABLE | 050700 | 050100 |
| 5320-DUMMY-ROUTINE | 052500 | 050900 |
| 5320-EXIT | 053000 | 050900 |
| 5400-EXIT | 054200 | 035673 |
| 5400-VERIFY-BBCL-FIELDS | 053300 | 035673 |
| 6000-EXIT | 056300 | 035676 |
| 6000-PROCESS-CLOSE-INQUIRY | 054500 | 035676 |
| 6100-DETERMINE-OS-BAL-NET-CAP | 056600 | 054900 |
| 6100-EXIT | 057900 | 054900 |
| 6200-CALCULATE-CLOSING-INT | 058200 | 055100 |
| 6200-EXIT | 060000 | 055100 |
| 6210-EXIT | 061900 | 059100 |
| 6210-UPDATE-INTEREST | 060300 | 059100 |
| 6220-EXIT | 065000 | 059800 |
| 6220-VERIFY-INT-EARN | 062200 | 059800 |
| 6300-DET-AMORT-TERM-REMAINING | 065300 | 055300 |
| 6300-EXIT | 068700 | 055300 |
| 6310-EXIT | 069800 | 065800 |
| 6310-SET-START-DATE | 069000 | 065800 |
| 6400-DETERMINE-LOAN-DESC | 070100 | 055500 |

142

| | | |
|---|---|---|
| 6400-EXIT | 072000 | 055500 |

```
6500-DETERMINE-CLOSING-AMT       072300  055700
6500-EXIT                        073000  055700
6600-DET-PER-DIEM-INT-AMOUNT     073300  055900
6600-EXIT                        075900  055900
6700-CALC-EXCESS-BBCL-CHARGE     076200  056100
6700-EXIT                        076900  056100
6710-EXIT                        079600  076700
6710-SET-EXCESS-KILO-CHARGE      077200  076700
7000-EXIT                        081000  035679
7000-LOG-TRANSACTION             079900  035679
8000-DISPLAY-CLOSE-INQUIRY       081300  035681
8000-EXIT                        083000  035681
8100-EXIT                        084200  081500
8100-SET-UP-BASIC-SCREEN-INFO    083300  081500
8110-EXIT                        086100  083500
8110-SET-TRAN-DATE-AND-TIME      084500  083500
8120-EXIT                        087500  083600
8120-SET-ACCT-LN-LNOFF-SHNAME    086400  083600
8130-EXIT                        090300  083700
8130-SET-RESTIND-LNCURR-LNSTAT   087800  083700
8131-DUMMY-ROUTINE               090600  089000
8131-EXIT                        091000  089000
8200-DISPLAY-BASIC-SCREEN        091300  082000
8200-EXIT                        093100  082000
8300-DISPLAY-SECOND-SCREEN       093400  082300  082500
8300-EXIT                        094700  082300  082500
8310-EXIT                        096100  093600
8310-SET-PYMT-DUE-DATE           095000  093600
8400-DISPLAY-BBCL-SCREEN         096400  082600
8400-EXIT                        097700  082600
8500-EXIT                        099200  082800
8500-SET-REJECT-SCREEN           098000  082800
8600-EXIT                        100000  035800  038500  045100  046800  048800  050200  054000
8600-REJECT-RTN                  099500  035800  038500  045100  046800  048800  050200  054000
9000-CALL-PEM                    100900  035693  035702  035711  035726  035734  037500  041100  043100  046400  048500
                                         058800  059500  061300  063000  066300  070800  074000  075000  075400  078100
                                         080800  084900  092900  094500  095700  097500  099000  099800  102100
9000-EXIT                        101300  035693  035702  035711  035726  035734  037500  041100  043100  046400  048500
                                         058800  059500  061300  063000  066300  070800  074000  075000  075400  078100
                                         080800  084900  092900  094500  095700  097500  099000  099800  102100
9900-EXIT.                       102300  063500  071300  078600
9900-SYSTEM-ABEND                101600  063500  071300  078600
143

CARD    ERROR MESSAGE

IKF1100I-W    2097 SEQUENCE ERRORS IN SOURCE PROGRAM.
```

We claim:

1. A system including a programmed data processor for administering a vehicle loan financing transaction, said financing being granted for a specific amount, loan term and interest rate, and having a loan balance, said system comprising:
   data entry means for entering information regarding the applicant, vehicle and total financing sought;
   means for determining loan eligibility of the applicant and the vehicle;
   means for computing a residual value of the vehicle based upon the type of vehicle and the loan term;
   means for computing a periodic loan payment amount based on the difference between the total financing sought and the residual value and on periodic interest payments on the residual value;
   means for monitoring status of the loan during the term of the loan, including means for determining whether the end of the term has been reached; and
   means for closing out the loan at the end of the term, including means for optionally paying the residual value to the applicant by applying the residual value to the loan balance.

2. The system of claim 1, further comprising:
   means for computing an excess charge based on the usage of the vehicle over the term of the loan; and
   means for computing a new residual value from the excess charge and the residual value, said new residual value becoming the value optionally applied to the loan balance in closing out the loan.

3. The system of claim 1, wherein said residual value is computed by applying to the sticker price of the vehicle a residual value factor selected from a data file of such factors responsive to the input information regarding the vehicle and the loan term.

4. The system of claim 1, wherein said means for determining the loan eligibility of the applicant and the vehicle further comprises:
   data terminal means for entering data identifying the applicant;
   data communication means for transmitting said data identifying the applicant to a remote data processing system;
   means associated with said remote data processing system for selecting stored financial information regarding the identified applicant from a data file of said selected stored financial information;
   data communication means for transmitting the selected stored financial information regarding the applicant to said data terminal means originating said applicant identifying data; and
   data display means at said data terminal for displaying said selected financial information.

5. The system of claim 4, wherein said remote data processing system is a central computer system maintained by a credit bureau.

6. A method for administering vehicle financing using a programmable data processor, comprising the steps of:
   entering and storing signals representative of data regarding a loan, including loan applicant, vehicle, interest rate, loan term, option date and total amount of financing sought, said loan having, at any given time, a loan balance;

computing a residual value of the vehicle, based upon the stored signals representative of vehicle and loan term information;

computing a periodic principal and interest payment based upon the difference, over the loan term, between the total amount of financing sought and the residual value including interest thereon;

computing the periodic interest on the residual value;

processing the periodic principal and interest payment and the periodic interest on the residual value to obtain the periodic loan payment;

retrieving financial information concerning the loan applicant from a file of stored signals representative of said financial information;

analyzing said financial information to compute a credit score for use in determining whether to grant credit to the applicant;

creating a new loan account;

monitoring the status of said loan account to determine when the option date is reached, said option date being the last date of the term of said loan; and at the option of the borrower, paying the residual value to the borrower by applying the residual value to the loan balance to close out the loan at the end of the term.

7. The method of claim 6, wherein said step of computing the residual value of the vehicle further comprises:

looking up a residual value factor in a data file of said residual value factors; and multiplying the residual value factor by the vehicle price to compute the residual value.

8. The method of claim 6, wherein said step of applying said residual value to close out the loan further comprises:

computing an excess charge based upon the usage of the vehicle during the term of the loan;

computing a new residual value using the excess charge and the residual value; and optionally applying the new residual value to the loan balance to close out the loan at the end of the term.

* * * * *

UNITED STATES PATENT AND TRADEMARK OFFICE
CERTIFICATE OF CORRECTION

PATENT NO. : 4,736,294
DATED : April 5, 1988
INVENTOR(S) : Gwyneth Gill et al.

It is certified that error appears in the above-identified patent and that said Letters Patent is hereby corrected as shown below:

```
Column 4, line 55, "concering" should be
  -- concerning --.

Column 6, line 23, "45" should be -- 415 --.

Column 9, line 56, "intest" should be -- interest --.

Column 10, line 1, "t" should be -- to --.

Column 11, line 6, "i" should be deleted.

Column 12, line 27, "("Processing" should be
  -- ("Process --.
```

Signed and Sealed this

Third Day of December, 1991

*Attest:*

HARRY F. MANBECK, JR.

*Attesting Officer*     *Commissioner of Patents and Trademarks*